US007736060B2

(12) United States Patent
Matsumoto et al.

(10) Patent No.: US 7,736,060 B2
(45) Date of Patent: Jun. 15, 2010

(54) ACCOMMODATION BELT FOR ROLLING ELEMENT, AND LINEAR GUIDE APPARATUS

(75) Inventors: Jun Matsumoto, Kanagawa (JP); Yoshinori Mizumura, Kanagawa (JP); Wei Xu, Kanagawa (JP)

(73) Assignee: NSK Ltd., Tokyo (JP)

( * ) Notice: Subject to any disclaimer, the term of this patent is extended or adjusted under 35 U.S.C. 154(b) by 712 days.

(21) Appl. No.: 11/639,246

(22) Filed: Dec. 15, 2006

(65) Prior Publication Data

US 2007/0147714 A1 Jun. 28, 2007

(30) Foreign Application Priority Data

| Dec. 15, 2005 | (JP) | ............... P. 2005-361748 |
| Jan. 27, 2006 | (JP) | ............... P. 2006-019750 |
| Feb. 2, 2006 | (JP) | ............... P. 2006-025951 |
| Apr. 17, 2006 | (JP) | ............... P. 2006-112997 |
| Apr. 28, 2006 | (JP) | ............... P. 2006-126664 |
| Aug. 3, 2006 | (JP) | ............... P. 2006-212483 |

(51) Int. Cl.
  *F16C 29/06* (2006.01)
(52) U.S. Cl. ............... 384/45; 384/44; 384/51
(58) Field of Classification Search ............ 384/43–45, 384/51
 See application file for complete search history.

(56) References Cited

U.S. PATENT DOCUMENTS 5,927,858 A * 7/1999 Agari .................. 384/45

5,951,168 A * 9/1999 Teramachi et al. ........... 384/45

FOREIGN PATENT DOCUMENTS

| JP | 5-52217 A | 3/1993 |
| JP | 07-317762 A | 12/1995 |
| JP | 2607933 A | 2/1997 |
| JP | 10-68417 A | 3/1998 |
| JP | 10-318257 A | 12/1998 |
| JP | 11-2241 A | 1/1999 |
| JP | 3243415 B2 | 10/2001 |
| JP | 3263005 A | 12/2001 |
| JP | 2002-122136 A | 4/2002 |
| JP | 3299450 A | 4/2002 |
| JP | 2002-130272 A | 5/2002 |
| JP | 3420204 B2 | 4/2003 |

OTHER PUBLICATIONS

Notice of Reasons for Rejection issued in counterpart application No. 2006-025951 dated Jan. 26, 2010.

* cited by examiner

*Primary Examiner*—Thomas R Hannon
(74) *Attorney, Agent, or Firm*—Sughrue Mion, PLLC

(57) ABSTRACT

In a linear guide apparatus, a rolling-element accommodation belt 50 is incorporated into each of endless circulation passages. This rolling-element accommodation belt 50 is formed into a shape having ends and has a plurality of rolling-element accommodation sections for individually accommodating balls 46. Of the rolling-element accommodation sections, first rolling-element accommodation sections 55A located at the respective end sections are formed so as to constrain movement of a spacer section 59 located at the end section toward the outer periphery side of an endless circulation passage by means of the ball 46 accommodated in the spacer section. Second rolling-element accommodation sections 55B other than the first rolling-element accommodation sections are formed so as to enable removable accommodation of the balls 46 to be accommodated toward the inner periphery side of the endless circulation passage.

22 Claims, 66 Drawing Sheets

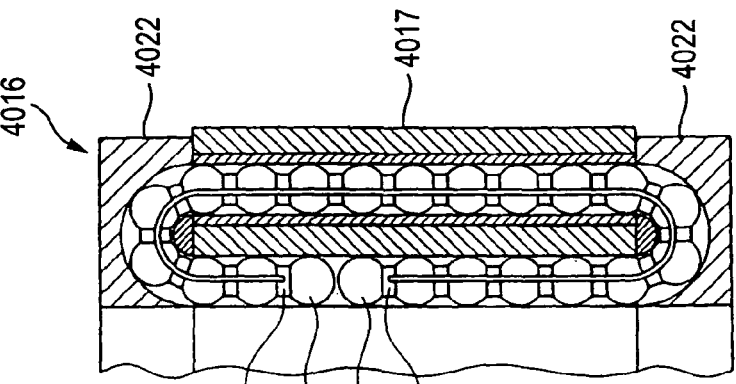
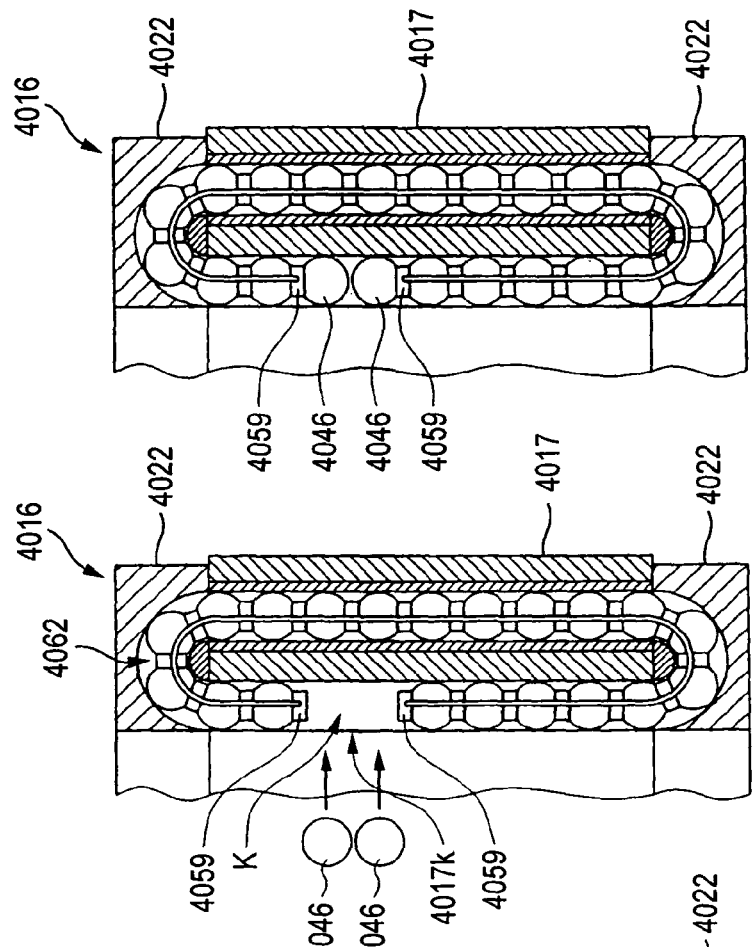
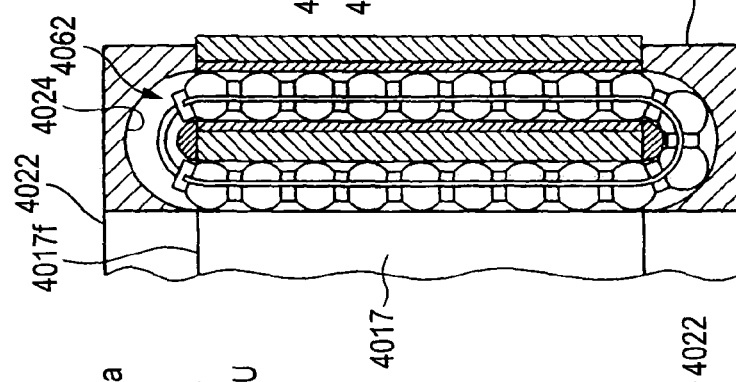
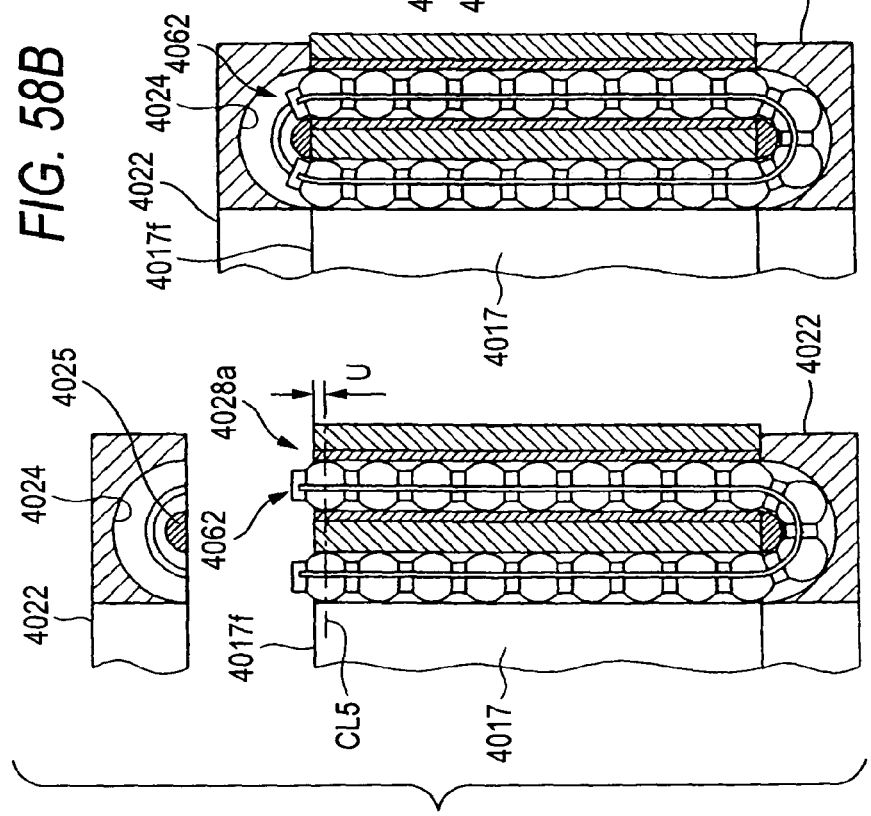

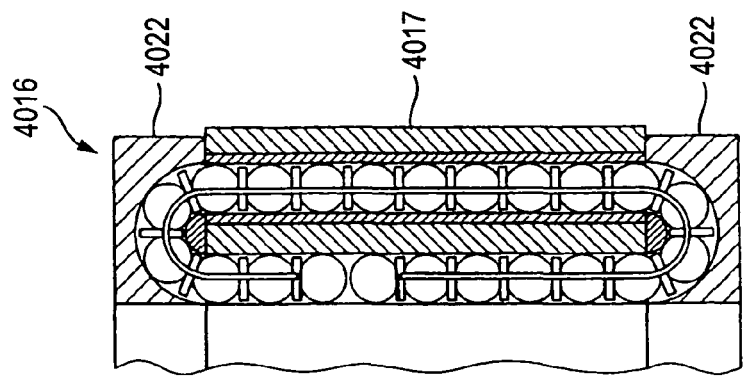
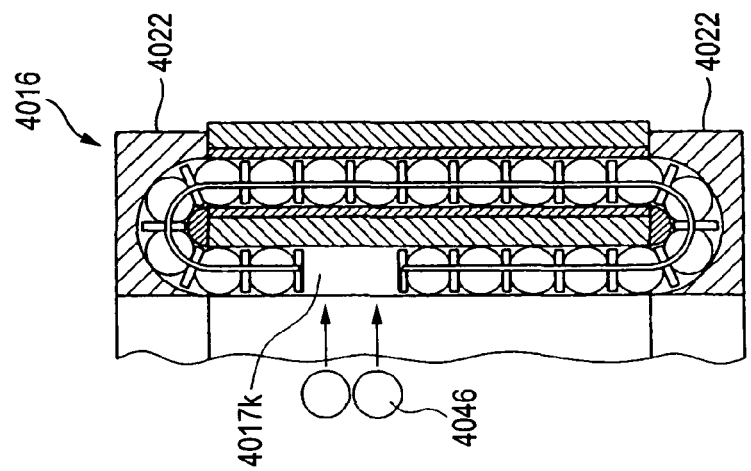
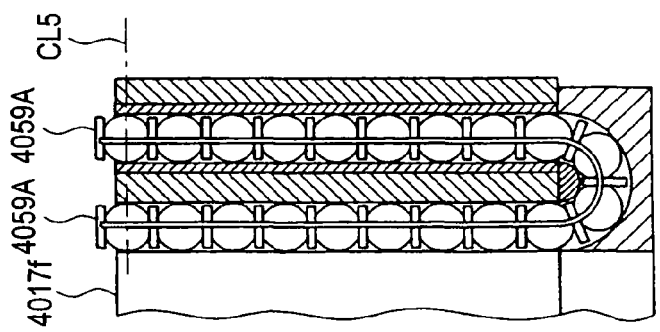
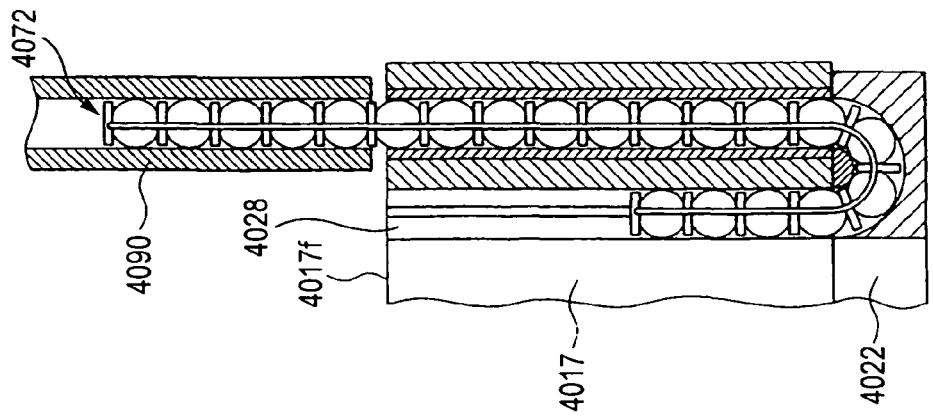

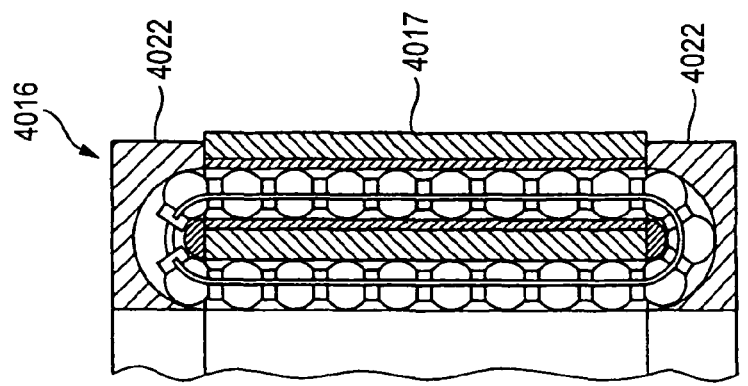
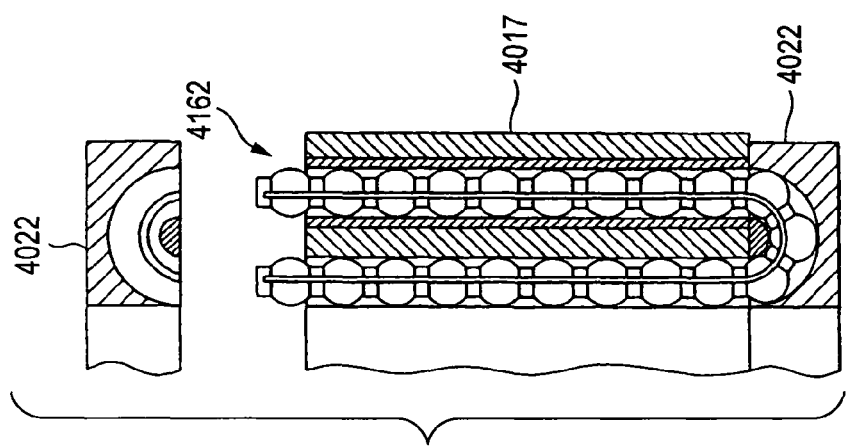
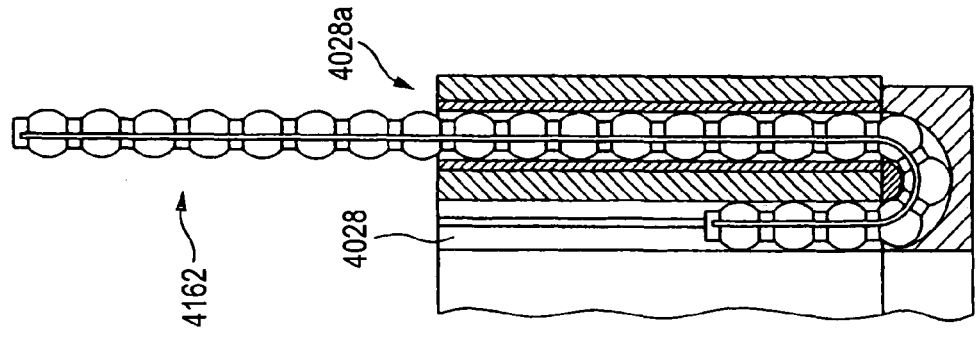
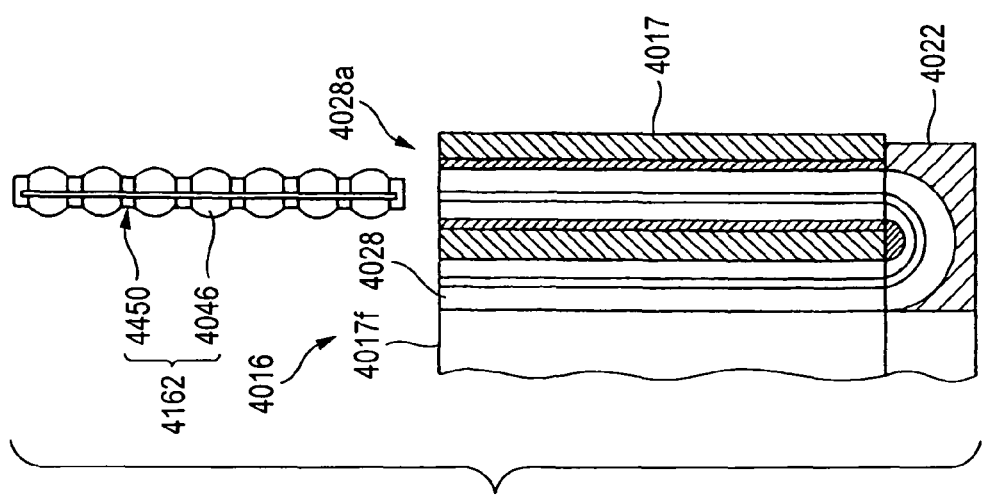

ACCOMMODATION BELT FOR ROLLING ELEMENT, AND LINEAR GUIDE APPARATUS

TECHNICAL FIELD

The present invention relates to a linear guide apparatus used in various machines such as a manufacturing apparatus, stepping machines, and measuring instruments. Particularly, the present invention relates to a rolling-element accommodation belt which has a plurality of rolling-element accommodation sections for individually accommodating rolling elements and placing the rolling elements in a line of rolling elements along the arrangement direction within an infinite circulation passage, as well as to a linear guide apparatus having the rolling-element accommodation belt.

BACKGROUND ART

First Problem

As indicated by a cross-sectional view taken along the endless circulation passage in, e.g., FIG. 9, the principal section of the linear guide apparatus of this type is made up of a guide rail 12; a slider 16 arranged so as to be movable in relation to the guide rail 12; and a plurality of rolling elements (balls 46 of the present embodiment) which roll between the guide rail 12 and the slider 16 under a load. The guide rail 12 has a rolling-element guide surface 14 over which the balls 46 roll. The slider 16 comprises a slider main body 17 and a pair of end caps 22 attached to the respective ends of the slider main body 17 in a moving direction thereof.

A load rolling-element guide surface 18 is formed in the slider main body 17 and, along with the rolling-element guide surface 14, constitutes a rolling-element raceway 26 which is located opposite the rolling-element guide surface 14 of the guide rail 12 and serves as an area where a load is exerted on the rolling elements. Moreover, a rolling-element return passage 20 along which the balls 46 roll when under no load is formed in the slider main body 17. A direction-change passage 24 is formed in each of the pair of end caps 22 so as to become continuous with the corresponding end of the rolling-element return passage 20 as well as with the corresponding end of the rolling-element raceway 26. The endless circulation passage 28 is formed into a plurality of rows by means of the rolling-element raceway 26, the pair of direction-change passages 24, and the rolling-element return passage 20. The plurality of balls 46 roll through the endless circulation passage 28, thereby making the slider 16 movable in relation to the guide rail 12.

The rolling-element accommodation belt used in the linear guide apparatus of this type is usually provided with spacer sections 151 and a connection section 152, as in the case of the rolling-element accommodation belt 150 shown in the drawing.

The spacer section 151 has a pair of rolling-element contact surfaces 151a which slidably contact an outer circumference of the ball 46. The connection section 152 is a belt-shaped member formed from a flexible, thin material, and connects adjacent spacer sections 151 to each other. An area where a rolling element is to be accommodated (hereinafter called "rolling-element accommodation section") is defined between the thus-connected adjacent spacer sections 151. As illustrated in the drawing, the balls 46 are housed in these rolling-element accommodation sections, to thus constitute a line of rolling elements 162. The line of rolling elements 162 circulates through the inside of the endless circulation passage 28 while being guided by a guide grove 60. As a result, friction among the balls 46 or collision between the balls 46 can be prevented, thereby improving the circulation characteristic of the balls 46.

Techniques described in, e.g., JP-B-2607933, JP-B-3299450, and JP-A-11-2241, have hitherto been known in connection with a linear guide apparatus having a rolling-element accommodation belt of this type.

According to the technique described in JP-B-2607933, hold recess sections used for slidably holding a ball, which is to be accommodated in a rolling-element housing section, in all directions, are formed in a spacer section (a ball holding member) as the pair of rolling-element contact surfaces in the rolling-element accommodation belt. A disclosed structure is to hold a ball located between adjacent spacer sections by means of these hold recess sections.

In contrast with the technique described in JP-B-2607933, a technique described in JP-B-3299450 is intended for facilitating replacement of rolling elements. In a disclosed structure, respective rolling-element accommodation sections align rolling elements, which move in a circulating manner, at predetermined intervals without holding the rolling elements to be accommodated in the accommodation sections.

Further, according to a technique described in JP-A-11-2241, a rolling-element accommodation belt is formed into a shape having ends. A pair of concave end faces are formed in edges of respective spacer sections located at ends. The concave end faces oppose each other within an endless circulation passage, and one rolling element for buffer purpose is held between the end faces. Accordingly, during the course of circulation of the rolling elements through the endless circulation passage, both ends of the rolling-element accommodation belt are flexed while following the motion of the rolling element for buffer circulating through an endless circulation passage, thereby immediately preventing occurrence of friction between both ends of the rolling-element accommodation belt and an interior wall of the endless circulation passage.

However, according to, e.g., a technique described in JP-B-2607933, there is provided a structure for holding a rolling element in a space between adjacent spacer sections in all directions in a constraining manner. For this reason, insertion or removal of a rolling element into or from the rolling-element accommodation belt is not easy.

Moreover, according to the technique described in JP-B-3299450, insertion or removal of a rolling element into or from a rolling-element accommodation belt is easy as compared with the technique described in JP-B-2607933. Conversely, neither constraining a rolling element by means of a rolling-element accommodation belt nor constraining the rolling-element accommodation belt by means of the rolling element is possible. Accordingly, even when a guide groove for guiding connection sections of the rolling-element accommodation belt is provided over the entire circumference of the endless circulation passage, the rolling-element accommodation belt meanders within the range of the guide groove.

As illustrated in, e.g., FIG. 9, when a joint (an area indicated by reference symbol T in the drawing) exists between components constituting the endless circulation passage 28, an edge (an area designated by reference numeral 159 in the drawing) of the rolling-element accommodation belt in particular is likely to be caught by the joint.

Moreover, according to the technique described in JP-A-11-2241, the concave end faces of the rolling-element accommodation belt oppose each other in the endless circulation passage. One rolling element for buffer is held between the end faces. Accordingly, clearance for the rolling-element accommodation belt does not exist in the endless circulation passage, thereby posing a problem of an increase in friction.

[Second Problem]

As in the case of a linear guide apparatus 1100 illustrated in, e.g., FIG. 21, a related-art linear guide apparatus is built by comprising a guide rail 1012, a slider 1016 placed so as to be movable in relation to the guide rail 1012, and a plurality of rolling elements (balls 1046 in the present example) which roll between the guide rail 1012 and the slider 1016 under load. The guide rail 1012 has a rolling-element guide surface 1014 over which the balls 1046 roll. The slider 1016 is formed from a slider main body 1017, and a pair of end caps 1022 attached to respective ends of the slider main body 1017 in a moving direction thereof.

As indicated by a cross-sectional view of the principal section of the slider 1016 taken along the endless circulation passage in, e.g., FIG. 22, a loaded rolling-element guide surface 1018 is formed in the slider main body 1017. The loaded rolling-element guide surface 1018 forms a rolling-element raceway 1026 which opposes the rolling-element guide surface 1014 of the guide rail 1012 and which serves as an area where load is exerted on the rolling elements as well as on the rolling-element guide surface 1014. Further, a rolling-element return passage 1020 along which the balls 1046 roll when under no load is formed in the slider main body 1017. A direction-change passage 1024 is formed in each of the pair of end caps 1022 so as to become continuous with the corresponding end of the rolling-element return passage 1020 as well as with the corresponding end of the rolling-element raceway 1026. The endless circulation passage 1028 is formed into a plurality of rows by means of the rolling-element raceway 1026, the pair of direction-change passages 1024, and the rolling-element return passage 1020. The plurality of balls 1046 roll through the endless circulation passage 1028, thereby making the slider 1016 movable in relation to the guide rail 1012.

A technique described in, e.g., JP-A-11-2241, has heretofore been known in connection with the rolling-element accommodation belt used in the linear guide apparatus of this type.

According to the technique described in JP-A-11-2241, a rolling-element accommodation belt is formed into a shape having ends as in the case of a rolling-element accommodation belt 1150 illustrated in, e.g., FIG. 22. Further, the belt is formed by comprising spacer sections 1151 and a connection section 1152.

The spacer section 1151 has a pair of rolling-element contact surfaces 1154a and 1154b which slidably contact an outer circumference of the ball 1046. The connection section 1152 is a belt-shaped member formed from a flexible, thin material, and connects adjacent spacer sections 1151 to each other. An area where a rolling element is to be accommodated (hereinafter called "rolling-element accommodation section") is defined between the thus-connected adjacent spacer sections 1151. The pair of rolling-element contact surfaces 1154a, 1154b form concave surfaces which slidably retain and constrain in all directions the ball 1046 to be accommodated in each of the rolling-element accommodation sections. A ball is retained between adjacent spacer sections by means of the concave surfaces. As shown in FIG. 22, the balls 1046 are accommodated in the rolling-element accommodation sections, to thus form a line of rolling elements 1162. The line of rolling elements 1062 circulates through the inside of the endless circulation passage 1028 while being guided by a guide grove 1060. As a result, friction among the balls 1046 or collision between the balls 1046 can be prevented, thereby improving the circulation characteristic of the balls 1046.

Moreover, as in the case of a rolling-element accommodation belt 1150 shown in FIG. 22, a rolling-element accommodation belt described in JP-A-11-2241 is formed in such a way that a spacer section 1159 located at one edge of the belt is provided with a guide piece 1153 which projects in a circulatory-moving direction and assumes the shape of a thin plate. The guide pieces 1153 are engaged with guide grooves 1060 formed along an endless circulation passage 1028. Thus, occurrence of friction between the edges of the rolling-element accommodation belt and an interior wall of the endless circulation passage is prevented, thereby realizing smooth circulation.

Although the technique described in JP-A-11-2241 enables prevention of friction between the interior wall of the endless circulation passage and the edge of the rolling-element accommodation belt, occurrence of friction of the guide pieces with the guide grooves cannot be prevented. Therefore, friction develops between the rolling-element accommodation belt and the guide grooves, and a plenty of room still remains for a reduction in circulation resistance.

Especially, the guide pieces assume the shape of a thin plate, and the rolling-element accommodation belt is generally made from a flexible resin material. The guide pieces are readily deformed when handled, and hence the degree of flexure changes accordingly.

Since the guide piece is formed to greatly protrude from the rolling element located at the end, a change such as flexure is likely to arise. Depending on the degree of flexure, an extent to which the guide piece rubs against the guide groove becomes greater, which may further increase circulation resistance. Therefore, in order to insert the guide pieces such that an increase in circulation resistance is prevented and a smooth circulation state is achieved, edges of the guide pieces, for instance, must have been flexed inwardly of the endless circulation passage.

However, when the previously-imparted flexure has become small or the direction of flexure has become inverted during handling of the rolling-element accommodation belt, expected smooth circulation cannot be acquired. For this reason, in order to prevent occurrence of a change in the degree of flexure, the rolling-element accommodation belt must be handled carefully during operation; e.g., transporting operation or insertion operation. Consequently, the efficiency of operation for inserting or removing rolling elements into or from the rolling-element accommodation belt is deteriorated, which in turn adds to the cost incurred in manufacture of a linear guide apparatus.

Moreover, since the guide pieces protrude greatly from the rolling element located at the end, both ends of the rolling-element accommodation belt can be caused to approach each other by an amount corresponding to the amount of protrusion within the endless circulation passage. For this reason, an area where no rolling elements are positioned is present over a long range in the vicinity of the ends of the rolling-element accommodation belt. Consequently, when the ends of the rolling-element accommodation belt have come near the rolling-element raceway, the number of rolling elements which bear a load is decreased, and hence a drop arises in the load-carrying capacity and rigidity of the linear guide apparatus.

An example of a separator used in the linear guide apparatus is shown in FIG. 39. A separator 2008 has a disk-shaped spacer section 2026 interposed between adjacent balls 2006 and a connection section 2028 for connecting together the adjacent spacer sections 2026.

The spacer section 2026 is provided with a pair of recess sections 2032*a* and 2032*b* which slidably contact the outer circumstance of the ball 2006. The connection section 2028 is movably fitted into a connection section guide groove formed in a rolling-element rolling passage. When the balls 2006 have moved, the connection section 2028 travels through the rolling-element rolling passage while moving along the connection section guide groove in conjunction with movement of the balls 2006. The connection section guide groove is formed continually along the rolling-element rolling passage, and comprises a load guide section formed in a slider-side rolling-element rolling groove of the slider; a return guide section formed in the rolling-element return passage; and a curved guide section formed in the direction-change passage. Further, a line of rolling elements 2034 is formed from the balls 2006 and the separators 2008. FIG. 39 shows a portion of the line of rolling elements 2034 in the rolling-element rolling passage. The separators 2008 can retain the balls 2006 of the recess sections 2032 (the recess sections 2032*a*, 2032*b*), and hence can prevent occurrence of contact between adjacent balls 2006 and facilitate assembly of a linear guide apparatus.

A separator such as that shown in FIG. 40 is also available. This separator 2008 has the same configuration as that of the above-mentioned separator 2008; namely, the separator 2008 shown in FIG. 39, except that no recess section is formed in the spacer section 2026. Although the separators 2008 retain an interval between the adjacent balls 2006 to a predetermined space, the separators 2008 do not retain the balls 2006. FIG. 40 shows a portion of the line of rolling elements 2034 in the rolling-element rolling passage.

The separators, including the above-mentioned separators, that have heretofore been used are molded from an elastic material such as an elastomer or the like, and can curve in accordance with the shape of the rolling-element rolling passage. The connection section provided for the separators becomes curved along the shape of a curved guide section while passing by a curved guide section. The force required to curve both longitudinal ends of each of the separators in the connection section is greater than the force required to curve the center portion of each of the separators. For this reason, when the rigidity of the separators is high, there may arise a case where both longitudinal ends of each of the separators in the connection section are not smoothly curved during the course of the connection section moving from the load guide section or the return guide section to the curved guide section and are caught by the inside of the load guide section or a step between the return guide section and the curved guide section. When both longitudinal ends of each of the separators in the connection section are caught by the inside of the load guide section or the step between the return guide section and the curved guide section, smooth movement of the separators is hindered, and smooth movement of the separators is prevented. Accordingly, the operating characteristic of the linear guide apparatus is deteriorated. Consequently, in order to enhance the operating characteristic of the linear guide apparatus, the separators must be smoothly moved in the connection section guide groove by means of smoothly curving both longitudinal ends of each of the separators in the connection section.

Hence, there is a linear guide apparatus having separators, wherein the rigidity of the separators is decreased by means of controlling the hardness of a material used for molding the separators, and wherein both longitudinal ends of each of the separators in the connection section are smoothly curved.

Moreover, for example, two types of linear guide apparatus provided below are available as a linear guide apparatus wherein both longitudinal ends of each of the separators in the connection section are smoothly curved without involvement of a change in the rigidity of the separators and the separators move smoothly in the connection section guide groove.

A first linear guide apparatus is as described in JP-A-2002-122136. Specifically, respective spacer sections located at both longitudinal ends of each of the separators are provided with chamfered sections. The shape of the chamfered section is determined such that both longitudinal ends of each of the separators in the connection section are guided through the inside of the load guide section or from the return guide section to the curved guide section when the separators move through the connection section guide groove. In this linear guide apparatus, a mechanism for retaining a rolling element is not formed between the spacer sections located at both longitudinal ends of each of the separators.

A second linear guide apparatus is as described in JP-B-3263005. Specifically, a guide piece protrudes from each of spacer sections located on both longitudinal ends of each of the separators. The shape of the guide piece is determined such that both longitudinal ends of each of the separators in the connection section are guided through the inside of the load guide section or from the return guide section to the curved guide section. In this linear guide apparatus, the guide pieces protrude from the spacer sections. Hence, as in the case of the linear guide apparatus described in JP-A-2002-122136, a mechanism for retaining a rolling element is not formed between the spacer sections located at both longitudinal ends of each of the separators.

Moreover, a linear guide apparatus which enables smooth movement of a line of rolling elements within a rolling-element rolling passage is as described in, e.g., JP-B-3420204. In this linear guide apparatus, an inner peripheral surface of a direction-change passage is formed, at a location where the direction-change passage is connected to the load rolling passing, so as to protrude toward an outer periphery of the rolling-element rolling passage in relation to an inner peripheral surface of the load rolling passage. A step is formed between the inner peripheral surface of the direction-change passage and the inner peripheral surface of the load rolling passage. In such a linear guide apparatus, a rolling element entering the load rolling passage from the direction-change passage is prevented from being caught by a rim of the load rolling passage. Hence, smooth feeding of the rolling elements from a non-load area to a load area or from the load area to the non-load area is enabled, and smooth movement of the line of rolling elements within the rolling element rolling passage becomes feasible.

However, among the pieces of the previously-described related-art linear guide apparatus, the linear guide apparatus where the hardness of a material used for molding separators is controlled is liable to suffer a decrease in the rigidity of the separators. Hence, there may arise a problem of the separators decreasing in durability.

The mechanism for retaining rolling elements is not formed between the spacer sections located at both longitudinal ends of each of the separators in the pieces of the linear guide apparatus described in JP-A-2002-122136 and JP-B-3263005 among the pieces of the previously-described related-art linear guide apparatus. Therefore, a decrease arises in the number of rolling elements that can be inserted into the rolling-element rolling passage, and there may arise a problem of a drop in the load capacity of the linear guide apparatus.

A problem common to the pieces of the previously-described, related-art linear guide apparatus is difficulty in smoothly forming a joint section between the load guide section and the curved guide section and a joint section between the return guide section and the curved guide section. Therefore, there arises a problem of a step, such as that shown in FIG. 41, being formed in the joint section between the return guide section and the curved guide section as well as in the joint section between the load guide section and the curved guide section.

As shown in FIG. 41, an inner peripheral surface 2046 of a curved guide section 2042 protrudes toward an outer periphery of a rolling-element rolling passage 2024 in relation to an inner peripheral surface 2044 of a load guide section 2038 and an inner peripheral surface 2056 of a return guide section 2040. Further, an outer peripheral surface 2064 of the curved guide section 2042 is formed so as to protrude toward an outer periphery of the rolling-element rolling passage 2024 in relation to an outer peripheral surface 2062 of the load guide section 2038 and an outer peripheral surface 2070 of the return guide section 2040. When such steps have been formed, there arises a risk of a connection section being caught during operation of the linear guide apparatus. Hence, there arises a problem of a drop occurring in the operating characteristic of the linear guide apparatus. Moreover, during operation of the linear guide apparatus, an increase arises in sliding resistance between the connection section and a connection section guide groove, which may in turn cause an increase in the abrasion of the connection section. Accordingly, there may arise a problem of a drop occurring in the durability of separators. For the sake of simple explanation, FIG. 41 shows only the rolling-element rolling passage 2024 (a rolling-element return passage 2018, a load rolling passage 2020, and a direction-change passage 2022) and the connection guide groove (the load guide section 2038, the return guide section 2040, and the curved guide section 2042).

This problem is ascribable to the accuracy of attachment of an end cap having a curved guide section formed therein to a slider main body having the load guide section and the return guide section formed therein and the accuracy of molding of the end cap. In order to enhance the accuracy of attachment or the molding accuracy, there may arise a problem of deterioration in efficiency of assembly operation or occurrence of a hike in manufacturing cost.

[Fourth Problem]

FIG. 53 shows a known accommodation belt for rolling elements (i.e., a rolling-element accommodation belt) used in a linear guide apparatus. This rolling-element accommodation belt has a plurality of interposed sections 3151 interposed between adjacent balls 3046 within an endless circulation passage 3028. The interposed sections 3151 are connected to each other by means of connection arm sections 3152 (see, e.g., JP-B-3243415). A guide groove 3060 is formed within the endless circulation passage 3028 in line with the arrangement direction of the balls. The connection arm sections 3152 are circulated while both ends of the connection arm section in the widthwise direction thereof are being curved along the guide groove 3060. According to the rolling-element accommodation belt of this type, occurrence of contact between adjacent rolling elements is prevented by the interposed section interposed therebetween, and hence generation of noise can be lessened.

According to the technique described in connection with JP-B-3243415, the rolling-element accommodation belt is formed into a shape having ends as shown in FIG. 53 and described above. A gap exists between end sections 3159 forming a shape which has ends, and a rolling element is not inserted into the gap.

Another example rolling-element accommodation belt is described in connection with a technique described in, e.g., JP-A-10-318257. Latch sections, which can engage with each other, are provided at respective ends. By means of causing the latch sections at the respective ends to engage with each other, an endless rolling-element accommodation belt can be formed.

As in the case of the technique described in JP-B-3243415, the rolling-element accommodation belt—which is formed into a shape having ends and in which a rolling element is not inserted into a gap between the ends—is assembled in sequence of inserting rolling elements into a rolling-element accommodation belt, and inserting the rolling-element accommodation belt having the rolling-elements accommodated therein into a slider. However, according to the assembly method of this sequence, there may arise a case where accommodated rolling elements go out of the rolling-element accommodation belt when insufficient attention is paid during insertion of the rolling-element accommodation belt into the slider. Hence, difficulty is encountered in assembling the rolling-element accommodation belt.

Accordingly, another conceivable assembly method involving other procedures (hereinafter called a "second assembly method") comprises first inserting only a rolling-element accommodation belt into a slider; and sequentially inserting rolling elements into the rolling-element accommodation belt from an opening section of the slider (i.e., an area of the slider opposing a raceway of a guide rail). This second assembly method prevents the accommodated rolling elements from going out of the rolling-element accommodation belt.

However, when the second assembly method is adopted, the gap exists between the ends of the rolling-element accommodation belt according to the technique described in JP-B-3243415. Hence, there is a potential risk of a rolling element being erroneously inserted into the gap. In a linear guide apparatus where a rolling element is not originally inserted into the gap existing between the two ends of the rolling-element accommodation belt, when a rolling element is inserted into the gap, a rattle arises between the ends of the rolling-element accommodation belt and the rolling element when the dimension of the gap is greater than the diameter of the rolling element with respect to a direction in which the rolling elements are arranged, which in turn induces noise. In contrast, when the dimension of the gap is smaller than the diameter of the rolling element with respect to the direction where the rolling elements are arranged, the rolling-element accommodation belt becomes deformed and circulates in a meandering manner. Therefore, friction developing during circulation is increased, which hinders smooth circulation of the rolling elements.

Meanwhile, the technique described in, e.g., JP-A-10-318257 is free from a problem of erroneous insertion of the rolling element into the gap. However, when an endless rolling-element accommodation belt is formed, latch sections provided at the respective ends must be engaged with each other. Therefore, the number of operations is increased, which in turn adds to cost. Accordingly, the technique cannot necessarily be said to be desirable.

[Fifth Problem]

In relation to the linear guide apparatus of this type, techniques described in, e.g., JP-A-7-317762, JP-A-10-068417, and JP-A-5-052217, have already been known. According to the techniques described in these patent documents, a rolling-element accommodation belt is formed from an elastic material into a shape having ends, and the accommodation belt is used while the ends remain uncoupled with each other (see, e.g., FIG. 7 of JP-A-7-317762, FIG. 1 and paragraph number 0018 of JP-A-10-068417, and FIG. 6 of JP-A-5-052217).

The general view of the line of rolling elements pertaining to the techniques described in these patent documents will be described by reference to FIG. 64.

As in the case of a rolling-element accommodation belt 4150 shown in the drawing, the rolling-element accommodation belt of this type has spacer sections 4151 and a connection section 4152. The spacer section 4151 has a pair of rolling-element contact surfaces 4154a, 4154b which contact an outer periphery of a ball 4046 in a slidable manner. The connection section 4152 is a belt-shaped member formed from a flexible thin material, and connects adjacent spacer sections 4151 together. There is defined an area where the ball 4046 is held from both sides thereof by the connected, adjacent spacer sections 4151, to thus accommodate rolling elements in a constrainable manner (hereinafter called a "rolling-element accommodation section").

The balls 4046 are housed in the rolling-element accommodation sections, thereby constituting a line of rolling elements 4162. The line of rolling elements 4162 circulates through an endless circulation passage 4028.

Thereby, occurrence of abrasion or friction among the balls 4046 is prevented, thereby improving a circulation characteristic of the balls 4046. Here, the rolling-element accommodation belt 4150 of this embodiment is formed into a shape having ends. A gap exists between end sections (a start and an end) 4159 of the rolling-element accommodation belt 4150, and the end sections are not connected together. According to this rolling-element accommodation belt, connection operation for connecting the ends of the rolling-element accommodation belt into an endless shape can be omitted. Moreover, automation of the insertion step is easily implemented.

The rolling-element accommodation belt of this type is built into a linear guide apparatus according to sequences such as those shown in, e.g., FIG. 65.

As illustrated, the balls 4046 are first, in advance, built into a rolling-element accommodation section of the rolling-element accommodation belt 4150 to constitute the line of rolling elements 4162. Meanwhile, one end cap 4022 (an upper end cap in the drawing) is removed, and a portion of the endless circulation passage 4028 is opened (see FIG. 65A).

Next, the previously-assembled line of rolling elements 4162 is inserted into the endless circulation passage 4028 at the side of a slider main body 4017 from the opening section 4028a of the endless circulation passage 4028 (see FIG. 65B). After insertion of the line of rolling elements 4162 fully into the endless circulation passage, the opening section 4028a of the endless circulation passage 4028 is sealed with the end cap 4022 (see FIGS. 65C and 65D). Thus, insertion of the rolling-element accommodation belt (the line of rolling elements 4162) into the slider 4016 is completed.

Incidentally, as shown in, e.g., FIG. 64, a distance between the mutually-opposing end sections 4159 of the rolling-element accommodation belt is usually set to the width of one rolling element or the like (see, e.g., FIG. 6 of JP-A-5-052217). Setting the distance is for preventing occurrence of decreases in the load capacity and rigidity of the linear guide apparatus, which would otherwise be caused by a decrease in the number of rolling elements that bear load when the end sections of the rolling-element accommodation belt have approached a rolling-element raceway.

However, in consideration of the working efficiency achieved during assembly steps such as those mentioned previously, decreasing the distance between end sections of the rolling-element is not desirable in terms of the following points.

Specifically, according to the above-mentioned insertion procedures, the one end cap 4022 is removed, and the rolling-element accommodation belt (the line of rolling elements 4162) is inserted from the opening section 4028a of the slider main body 4017. Accordingly, when the end cap 4022 is attached, the end sections 4159 of the rolling-element accommodation belt 4150 are located in the vicinity of the opening section 4028a of the slider main body 4017 as illustrated in FIG. 66 in an enlarged manner.

In a case where a distance between the mutually-opposing end sections 5159 of the rolling-element accommodation belt 4150 is small, when the line of rolling elements 4162 is inserted with the end cap 4022 being removed, the end sections 4159 greatly protrude from an end face 4017f of the slider main body 4017. Therefore, when the end cap 4022 has contacted the rolling-element accommodation belt 4150 at the time of attachment of the end cap 4022 (as indicated by, e.g., arrow P, in FIG. 66), the rolling-element accommodation belt 4150 becomes deformed in an unexpected direction, which in turn leads to the potential for dislodgment of the rolling elements (i.e., the balls 4046 in this example).

For instance, when being extended straight, the rolling-element accommodation belt described in JP-A-7-317762 can accommodate rolling elements. However, when the rolling-element accommodation belt has become deformed, a distance between the spacer sections becomes greater at a part of the belt which is to form an outer periphery of the belt, and hence the rolling elements tend to easily go out. For this reason, close attention must be paid to attachment of the end cap. In reality, since a plurality of endless circulation passages 4028 are formed in the slider main body 4017, considerable difficulty is encountered in attaching the end cap 4022 to the slider main body 4017 while preventing contact of the end cap 4022 with the rolling-element accommodation belt 4150 in all of the endless circulation passages 4028. Consequently, attachment of an end cap is a factor which deteriorates the efficiency of operation for manufacturing a linear guide.

Moreover, such a drawback is particularly noticeable in the case of components wherein, after a return component forming an inner periphery of a direction-change passage has been attached to an end cap, the end cap is attached to a slider. In short, in this case, an opening section of the end cap is limited to two holes (i.e., opening sections of the direction-change passage). Consequently, the linear guide must be assembled while the position of the rolling-element accommodation belt is adjusted such that the belt fits well into the direction-change passage, and the assembly operation requires experience.

SUMMARY OF THE INVENTION

First Objective

The present invention has been conceived in light of the first drawback and aims at providing a rolling-element accommodation belt and a linear guide apparatus, which facilitates insertion or removal of rolling elements into the rolling-element accommodation belt, makes the rolling elements less susceptible to the influence of a step in an endless circulation passage, and can lessen friction variations.

[Second Objective]

The present invention has been conceived in light of the second drawback and aims at providing a rolling-element accommodation belt and a linear guide apparatus, which obviates a necessity of paying special attention to operation for handling the rolling-element accommodation belt and can lessen circulation resistance resulting from friction between an interior wall of an endless circulation passage or a guide groove and a leading end of the rolling-element accommodation belt.

[Third Objective]

The present invention has been conceived in light of the third drawback and aims at providing a linear guide apparatus which can prevent a decrease in durability of separators and loading capacity of the linear guide apparatus and achieve enhanced operability.

[Fourth Objective]

The present invention has been conceived in light of the fourth drawback and aims at providing a rolling-element accommodation belt and a linear guide apparatus, which prevents erroneous insertion of rolling elements into two end sections of the rolling-element accommodation belt and can facilitate assembly of the rolling-element accommodation belt.

[Fifth Objective]

The present invention has been conceived in light of the fifth drawback and aims at providing a linear guide apparatus and a method for manufacturing the same, which enables facilitation of operation for attaching end caps after insertion of a rolling-element accommodation belt in a step of assembling the rolling-element accommodation belt.

A rolling-element accommodation belt used in a linear guide apparatus having endless circulation passages through which a plurality of rolling elements roll, the belt comprising:

end sections located at respective ends of the belt;

a plurality of rolling-element accommodation sections, each of which individually accommodates one of the plurality of rolling elements, to thereby align the rolling elements in a arrangement direction within the endless circulation passage;

a rolling-element accommodation section located at the end sections having surfaces which contact a rolling element accommodated therein so as to constrain movement of the end sections toward an outer periphery side of each of the endless circulation passage; and rolling-element accommodation sections which are located at positions other than the end sections and are formed so as to enable free removal of rolling elements accommodated therein in at least one of inner and outer periphery sides of each of the endless circulation passages.

According to the rolling-element accommodation belt of the present invention, among the rolling-element accommodation sections, the rolling-element accommodation sections provided at the two end sections are formed so as to constrain movement of the end sections toward the outer periphery side of the endless circulation passage. Accordingly, when the rolling-element accommodation belt is in use while being attached to the linear guide apparatus, meandering of the leading end of the rolling-element accommodation belt can be prevented. As a result, the chance of the rolling-element accommodation belt being subjected to an interference or catch caused by a step between constituent elements in the endless circulation passage; especially, in the vicinity of the direction-change passage. Consequently, the rolling-element accommodation belt is made less susceptible to the influence of the step in the endless circulation passage, and frictional variations can be reduced.

Specifically, flexing force arises in the rolling-element accommodation belt in the direction-change passage, whereupon the rolling-element accommodation belt attempts to protrude toward the outer periphery side of the endless circulation passage. Accordingly, the leading end section of the belt moves so as to run along the outer periphery side of the guide groove. Therefore, when a joint exists between the direction-change passage and a linear section subsequent thereto, there is achieved a great effect of preventing the belt from interfering with the step or a great effect of preventing the belt from being caught by the step, so long as the movement of the end sections of the belt toward the outer periphery side of the endless circulation passage is constrained to prevent occurrence of a catch, which would otherwise be caused by the step.

Further, according to the linear guide of the present invention, the rolling-element accommodation sections located at the two end sections, among the rolling-element accommodation sections, are formed so that the ball to be accommodated in the rolling-element accommodation section can freely leave toward the outer periphery side of the endless circulation passage. Accordingly, this configuration enables easy insertion, removal, or replacement of the rolling element into the rolling-element accommodation belt from the side from which the ball can freely leave.

The rolling-element accommodation sections located at the two end sections are preferably formed so that the ball to be accommodated in the rolling-element accommodation section can freely leave toward the outer periphery side of the endless circulation passage. With such a configuration, the rolling-element accommodation sections, including the other rolling-element accommodation sections, are formed such that a ball to be accommodated in the rolling-element accommodation section can freely leave toward at least one of the inner and outer periphery sides of the endless circulation passage. Accordingly, this configuration is preferable in order to readily perform insertion, removal, or replacement of the rolling element from the side from which the ball can freely leave.

Moreover, when the end sections of the rolling-element accommodation belt oppose each other in a non-contacting manner within the endless circulation passage, a clearance existing between the mutually-opposing end sections serves as an end-to-end rolling-element accommodation section which enables insertion of the rolling element which is not accommodated into the rolling-element accommodation section. Moreover, the end-to-end rolling-element accommodation section preferably has at each of the end sections a contact surface which contacts a rolling element accommodated therein, and the contact surface is preferably formed into a shape by means of which the surface contacts a rolling element accommodated therein so as to constrain movement of each end section toward the outer periphery side of each of the endless circulation passages.

With such a configuration, when the rolling-element accommodation belt is in use while being attached to the linear guide, a rolling element can be positioned in a clearance between the end sections of the rolling-element accommodation belt. Hence, a decrease in the number of rolling elements which bear load in the rolling-element raceway can be prevented. Consequently, the configuration is preferable in view of prevention of a decrease in the loading capacity and rigidity of the linear guide apparatus.

Moreover, movement of the end sections toward the outer periphery side of the endless circulation passage is constrained even at the side of the end-to-end rolling-element accommodation section. Hence, occurrence of meandering of the leading end of the rolling-element accommodation belt can be prevented more preferably. As a result, occurrence of an interference or catch of the rolling-element accommodation belt with a step existing between constituent members within the endless circulation passage; especially, in the vicinity of the direction-change passage, can be diminished more preferably.

Moreover, the present invention provides a linear guide apparatus characterized in that the rolling-element accommodation belt of the present invention is used. According to the linear guide apparatus of the present invention, there can be provided a linear guide apparatus which yields working-effects attributable to the previously-described rolling-element accommodation belt of the present invention.

As mentioned above, the present invention can provide a rolling-element accommodation belt and a linear guide apparatus, which facilitate insertion or removal of rolling elements into a rolling-element accommodation belt and makes the rolling-element accommodation belt less susceptible to the influence of a step in an endless circulation passage, and which can lessen frictional variations.

In order to solve the second problem, according to a third aspect of the present invention, there is provided a rolling-element accommodation belt used in a linear guide apparatus having endless circulation passages through which a plurality of rolling elements roll, the belt comprising:

end sections located at both ends of the belt; and a plurality of rolling-element accommodation sections, each of which individually accommodates one of the plurality of rolling elements, to thereby align the rolling elements in a arrangement direction within the endless circulation passage, wherein the end sections oppose each other in a non-contacting manner within the endless circulation passage;

the mutually-opposing end sections form an end-to-end rolling-element accommodation section which enables insertion of the rolling element;

the end-to-end rolling-element accommodation section has, at each of the end sections, a first contact surface which contacts a rolling element accommodated therein; and the first contact surfaces contact the rolling element accommodated therein such that the rolling element is deviated toward the outer periphery side of each of the endless circulation passages in relation to the rolling element accommodated in the rolling-element accommodation section located at the end section.

Moreover, according to a fourth aspect of the present invention, there is provided a rolling-element accommodation belt used in a linear guide apparatus having endless circulation passages through which a plurality of rolling elements roll, the belt comprising:

end sections located at respective ends of the belt; and a plurality of rolling-element accommodation sections, each of which individually accommodates one of the plurality of rolling elements, to thereby align the rolling elements in a arrangement direction within the endless circulation passage, wherein the rolling-element accommodation section located at each of the end sections has second contact surfaces which contact a rolling element accommodated therein so as to constrain movement of the end sections at least toward the outer periphery side of each of the endless circulation passages; and the second contact surfaces contact the rolling element accommodated therein such that the rolling element is deviated toward the outer periphery side of each of the endless circulation passages in relation to the rolling element accommodated in the rolling-element accommodation section adjacent to the rolling-element accommodation section located at the end section.

According to the present invention, in the end-to-end rolling-element accommodation section, the first contact surfaces contact the rolling element to be accommodated therein such that the rolling element is deviated toward the outer periphery side of each of the endless circulation passages in relation to the rolling element accommodated in the rolling-element accommodation section located at the end sections. Accordingly, flexion toward an inner periphery side can be imparted to the leading end of the rolling-element accommodation belt.

According to the fourth invention, in each of the rolling-element accommodation sections located at the two end sections, the second contact surfaces contact the rolling element accommodated therein such that the rolling element is deviated toward the outer periphery side of each of the endless circulation passages in relation to the rolling element accommodated in the rolling-element accommodation section adjacent to the rolling-element accommodation sections located at the end sections. Accordingly, flexion toward an inner periphery side can be imparted to the leading end of the rolling-element accommodation belt.

The rolling-element accommodation belt of the present invention can have both the configuration of the first contact surface of the third invention and the configuration of the second contact surface of the fourth invention. In this case, the amount of deviation caused by the first contact surface is preferably equal to or greater than the amount of deviation caused by the second contact surface. With such a configuration, flexion toward an inner periphery side can be imparted to the leading end of the rolling-element accommodation belt, and such a configuration is preferable to make flexure in the end sections of the rolling-element accommodation belt mild.

In the rolling-element accommodation belt of the present invention, each of the rolling-element accommodation sections adjacent to the rolling-element accommodation sections located at the end sections can further have a third contact surface which contacts a rolling element accommodated therein so as to constrain movement of each of the end sections at least toward the outer periphery side of the endless circulation passage; and the third contact surface can contact a rolling element accommodated therein such that the rolling element is deviated toward the outer periphery side of the endless circulation passage in relation to a rolling element accommodated in a third rolling-element accommodation section from either of the end sections.

In this case, the amount of deviation caused by the first contact surface is preferably equal to or greater than the amount of deviation caused by the third contact surface. With such a configuration, flexion toward an inner periphery side can be imparted to the leading end of the rolling-element accommodation belt, and such a configuration is preferable to make flexure in the end sections of the rolling-element accommodation belt mild.

Moreover, in this case, the amount of deviation caused by the second contact surface is preferably equal to or greater than the amount of deviation caused by the third contact surface. With such a configuration, flexion toward an inner periphery side can be imparted to the leading end of the rolling-element accommodation belt, and such a configuration is preferable to make flexure in the end sections of the rolling-element accommodation belt mild.

Further, a seventh invention relates to a linear guide apparatus and is characterized in that a rolling-element accommodation belt of the present invention is used.

According to the present invention, in the rolling-element accommodation belt, flexion toward an inner periphery side can be imparted to the leading end of the rolling-element accommodation belt. Accordingly, when the rolling-element accommodation belt is in use while being attached to the linear guide apparatus, the leading end of the belt readily flexes in correspondence to the interior wall of the endless circulation passage or the guide groove when the end section of the rolling-element accommodation belt has approached; e.g., the direction-change passage. For this reason, there can be lessened circulation resistance originating from friction of the interior wall of the endless circulation passage or the guide groove against the leading end of the rolling-element accommodation belt.

Moreover, according to the present invention, the rolling-element accommodation belt can be configured so as not to have a protrusion section on the end section, as in the case of, e.g., the illustrated guide piece. Accordingly, the necessity for paying special attention during the operation of handling the rolling-element accommodation belt is obviated. Moreover, when the rolling-element accommodation belt is in use while being attached to the linear guide apparatus, the two end sections can be caused to approach, the number of rolling elements being load is reduced. Consequently, the loading capacity and rigidity of the linear guide apparatus can be diminished.

As mentioned previously, according to the present invention, the necessity for paying special attention during the operation of handling the rolling-element accommodation belt is obviated. Moreover, there can be provided a rolling-element accommodation belt which can lessen circulation resistances originating from friction of the interior wall of the endless circulation passage or the guide groove against the leading end of the rolling-element accommodation belt, without reducing the loading capacity or rigidity of the linear guide apparatus.

In order to solve the third problem, according to the tenth aspect of the present invention, there is provided a linear guide apparatus comprising:

a guide rail having a rail-side rolling-element raceway groove extending in an axial direction on an exterior surface thereof;

a slider main body which has a slider-side rolling-element raceway groove opposing the rail-side rolling-element raceway groove, which straddles the guide rail so as to be relatively movable, and which has a linear rolling-element return passage;

end caps which are joined to respective axial end faces of the slider main body and each of which is formed with a circular-arc direction-change passage for bringing the rolling-element return passage into mutual communication with a linear load raceway formed from the rail-side rolling-element raceway groove and the slider-side rolling-element raceway groove;

a plurality of rolling elements rollably inserted into a rolling-element raceway formed from the load raceway, the rolling-element return passage, and the direction-change passage; and a separator which has ends, aligns the rolling elements into a line at predetermined intervals, and moves through the inside of the rolling-element raceway in conjunction with movement of the plurality of rolling elements, wherein the separator has a plurality of spacer sections interposed among adjacent rolling elements, and a belt-shaped connection section which connects the adjacent spacer sections and is formed to exhibit flexibility which enables flexion along the rolling-element raceway;

a connection section guide groove into which the connection section movably fits and which is continuous along the rolling-element raceway is formed in the rolling-element raceway;

the connection section guide groove has a linear load guide section formed in the slider-side rolling-element raceway groove, a linear return guide section formed in the rolling-element return passage, and a circular-arc curved guide section formed in the direction-change passage;

among the connection sections, at least connection sections close to the respective longitudinal ends of the separator are taken as curved connection sections which are curved along the curved direction of the curved guide section under no load; and a relational expression of $R1 \geq R2$ stands on condition that a curvature radius of the curved connection section is taken as R1 and that a curvature radius of the curved guide section is taken as R2.

According to the present invention, at least connection sections close to the respective longitudinal ends of the separator are taken as curved connection sections which are curved along the curved direction of the curved guide section when under no load; and a relational expression of $R1 \geq R2$ stands on condition that a curvature radius of the curved connection section is taken as R1 and that a curvature radius of the curved guide section is taken as R2. Consequently, connection sections close to the respective longitudinal ends of the separator are curved in accordance with the curvature radius of the curved guide section when under no load. When the rolling elements and separators are moved within the rolling-element raceway, the connection sections which move from the load guide section or the return guide section to the curved guide section can be prevented from being caught between the load guide section or the return guide section and the curved guide section.

According to the present invention, an area protruding from the spacer section is not formed on each of the spacer sections provided at the two longitudinal ends of the separator. Hence, a mechanism for retaining a rolling element can be formed between spacer sections located at both longitudinal ends of the separator.

According to the present invention, sliding resistance originating between the connection section and the connection section guide groove is made uniform during operation of the linear guide apparatus, and hence occurrence of vibration, which would otherwise be caused during operation of the linear guide apparatus, can be prevented.

Next, according to an eleventh aspect of the present invention, there is provided a linear guide apparatus comprising:

a guide rail having a rail-side rolling-element raceway groove extending in an axial direction on an exterior surface thereof;

a slider main body which has a slider-side rolling-element raceway groove opposing the rail-side rolling-element raceway groove, which straddles the guide rail so as to be relatively movable, and which has a linear rolling-element return passage;

end caps which are joined to respective axial end faces of the slider main body and each of which is formed with a circular-arc direction-change passage for bringing the rolling-element return passage into mutual communication with a linear load raceway formed from the rail-side rolling-element raceway groove and the slider-side rolling-element raceway groove;

a plurality of rolling elements rollably inserted into a rolling-element raceway formed from the load raceway, the rolling-element return passage, and the direction-change passage; and a separator which has ends, aligns the rolling elements into a line at predetermined intervals, and moves through the inside of the rolling-element raceway in conjunction with movement of the plurality of rolling elements, wherein the separator has a plurality of spacer sections interposed among adjacent rolling elements, and a belt-shaped connection section which connects the adjacent spacer sections and is formed to exhibit flexibility which enables flexion along the rolling-element raceway;

a connection section guide groove into which the connection section movably fits and which is continuous along the rolling-element raceway is formed in the rolling-element raceway;

the connection section guide groove has a linear load guide section formed in the slider-side rolling-element raceway groove, a linear return guide section formed in the rolling-element return passage, and a circular-arc curved guide section formed in the direction-change passage;

among the connection sections, at least connection sections close to the respective longitudinal ends of the separator are taken as curved connection sections which are curved along the curved direction of the curved guide section under no load; and a portion of an inner circumferential surface of the load guide section close to the curved guide section is protruded toward an outer periphery side of the rolling-element raceway in relation to a portion of an inner circumferential surface of the curved guide section close to the load guide section.

According to the present invention, a portion of an inner circumferential surface of the load guide section close to the curved guide section is protruded toward the outer periphery side of the rolling-element raceway in relation to a portion of an inner circumferential surface of the curved guide section close to the load guide section. Therefore, when, among the connection sections, the connection sections close to the two longitudinal end sections of the separator move from the load guide section to the curved guide section, the connection sections can be prevented from being caught between the load guide section and the curved guide section.

According to a twelfth aspect of the present invention, a relational expression of A1<B/2 preferably stands on condition that the amount of protrusion of the portion of the inner circumferential surface of the load guide section close to the curved guide section toward the outer periphery side of the rolling-element raceway is taken as A1 and that a clearance existing between the connection section and the connection section guide groove is taken as B.

According to the present invention, the amount of protrusion of the portion of the inner circumferential surface of the load guide section close to the curved guide section toward the outer periphery side of the rolling-element raceway is half or less the clearance between the connection section and the connection section guide groove. Therefore, when, among the connection sections, the connection sections close to the two longitudinal end sections of the separator move from the load guide section to the curved guide section, a clearance is formed between the connection section, the load guide section, and the curved guide section. Hence, the connection sections can be prevented from being caught between the load guide section and the curved guide section.

According to a thirteenth aspect of the present invention, a chamfered section is preferably formed in the portion of the inner circumferential surface of the load guide section close to the curved guide section.

According to the present invention, during the course of the connection section moving from the load guide section to the curved guide section, the connection section moves in correspondence to the shape of the chamfered section, and hence the connection section can be moved smoothly.

According to a fourteenth aspect of the present invention, a chamfered section is preferably formed in the portion of the inner circumferential surface of the curved guide section close to the load guide section.

According to the present invention, during the course of the connection section moving from the load guide section to the curved guide section, the connection section moves in correspondence to the shape of the chamfered section, and hence the connection section can be moved smoothly.

According to a fifteenth aspect of the present invention, there is provided a linear guide apparatus comprising:

a guide rail having a rail-side rolling-element raceway groove extending in an axial direction on an exterior surface thereof;

a slider main body which has a slider-side rolling-element raceway groove opposing the rail-side rolling-element raceway groove, which straddles the guide rail so as to be relatively movable, and which has a linear rolling-element return passage;

end caps which are joined to respective axial end faces of the slider main body and each of which is formed with a circular-arc direction-change passage for bringing the rolling-element return passage into mutual communication with a linear load raceway formed from the rail-side rolling-element raceway groove and the slider-side rolling-element raceway groove;

a plurality of rolling elements rollably inserted into a rolling-element raceway formed from the load raceway, the rolling-element return passage, and the direction-change passage; and a separator which has ends, aligns the rolling elements into a line at predetermined intervals, and moves through the inside of the rolling-element raceway in conjunction with movement of the plurality of rolling elements, wherein the separator has a plurality of spacer sections interposed among adjacent rolling elements, and a belt-shaped connection section which connects the adjacent spacer sections and is formed to exhibit flexibility which enables flexion along the rolling-element raceway;

a connection section guide groove into which the connection section movably fits and which is continuous along the rolling-element raceway is formed in the rolling-element raceway;

the connection section guide groove has a linear load guide section formed in the slider-side rolling-element raceway groove, a linear return guide section formed in the rolling-element return passage, and a circular-arc curved guide section formed in the direction-change passage;

among the connection sections, at least connection sections close to the respective longitudinal ends of the separator are taken as curved connection sections which are curved along the curved direction of the curved guide section under no load; and a portion of an inner circumferential surface of the return guide section close to the curved guide section is protruded toward an outer periphery side of the rolling-element raceway in relation to a portion of an inner circumferential surface of the curved guide section close to the return guide section.

According to the present invention, a portion of an inner circumferential surface of the return guide section close to the curved guide section is protruded toward the outer periphery side of the rolling-element raceway in relation to a portion of an inner circumferential surface of the curved guide section close to the return guide section. Therefore, when, among the connection sections, the connection sections close to the two longitudinal end sections of the separator move from the return guide section to the curved guide section, the connection sections can be prevented from being caught between the return guide section and the curved guide section.

According to a sixteenth aspect of the present invention, a relational expression of A2<B/2 preferably stands on condition that the amount of protrusion of the portion of the inner circumferential surface of the return guide section close to the curved guide section toward the outer periphery side of the rolling-element raceway is taken as A2 and that a clearance existing between the connection section and the connection section guide groove is taken as B.

According to the present invention, the amount of protrusion of the portion of the inner circumferential surface of the return guide section close to the curved guide section toward the outer periphery side of the rolling-element raceway is half or less the clearance between the connection section and the connection section guide groove. Therefore, when, among the connection sections, the connection sections close to the two longitudinal end sections of the separator move from the return guide section to the curved guide section, a clearance is formed between the connection section, the load guide section, and the curved guide section. Hence, the connection sections can be prevented from being caught between the return guide section and the curved guide section.

According to a seventeen aspect of the present invention, a chamfered section is preferably formed in the portion of the inner circumferential surface of the return guide section close to the curved guide section.

According to the present invention, during the course of the connection section moving from the return guide section to the curved guide section, the connection section moves in correspondence to the shape of the chamfered section, and hence the connection section can be moved smoothly.

According to an eighteenth aspect of the present invention, a chamfered section is preferably formed in the portion of the inner circumferential surface of the curved guide section close to the return guide section.

According to the present invention, during the course of the connection section moving from the return guide section to the curved guide section, the connection section moves in correspondence to the shape of the chamfered section, and hence the connection section can be moved smoothly.

According to a nineteenth aspect of the present invention, there is provided a linear guide apparatus comprising:

a guide rail having a rail-side rolling-element raceway groove extending in an axial direction on an exterior surface thereof;

a slider main body which has a slider-side rolling-element raceway groove opposing the rail-side rolling-element raceway groove, which straddles the guide rail so as to be relatively movable; and which has a linear rolling-element return passage;

end caps which are joined to respective axial end faces of the slider main body and each of which is formed with a circular-arc direction-change passage for bringing the rolling-element return passage into mutual communication with a linear load raceway formed from the rail-side rolling-element raceway groove and the slider-side rolling-element raceway groove;

a plurality of rolling elements rollably inserted into a rolling-element raceway formed from the load raceway, the rolling-element return passage, and the direction-change passage; and a separator which has ends, aligns the rolling elements into a line at predetermined intervals, and moves through the inside of the rolling-element raceway in conjunction with movement of the plurality of rolling elements, wherein the separator has a plurality of spacer sections interposed among adjacent rolling elements, and a belt-shaped connection section which connects the adjacent spacer sections and is formed to exhibit flexibility which enables flexion along the rolling-element raceway;

a connection section guide groove into which the connection section movably fits and which is continuous along the rolling-element raceway is formed in the rolling-element raceway;

the connection section guide groove has a linear load guide section formed in the slider-side rolling-element raceway groove, a linear return guide section formed in the rolling-element return passage, and a circular-arc curved guide section formed in the direction-change passage;

among the connection sections, at least connection sections close to the respective longitudinal ends of the separator are taken as curved connection sections which are curved along the curved direction of the curved guide section under no load; and a portion of an outer circumferential surface of the load guide section close to the curved guide section is protruded toward an outer periphery side of the rolling-element raceway in relation to a portion of an outer circumferential surface of the curved guide section close to the load guide section.

According to the present invention, a portion of an outer circumferential surface of the load guide section close to the curved guide section is protruded toward the outer periphery side of the rolling-element raceway in relation to a portion of an outer circumferential surface of the curved guide section close to the load guide section. Therefore, when, among the connection sections, the connection sections close to the two longitudinal end sections of the separator move from the curved guide section to the load guide section, the connection sections can be prevented from being caught between the load guide section and the curved guide section.

According to a twentieth aspect of the present invention, a relational expression of A3<B/2 preferably stands on condition that the amount of protrusion of the portion of the outer circumferential surface of the load guide section close to the curved guide section toward the outer periphery side of the rolling-element raceway is taken as A3 and that a clearance existing between the connection section and the connection section guide groove is taken as B.

According to the present invention, the amount of protrusion of the portion of the outer circumferential surface of the load guide section close to the curved guide section toward the outer periphery side of the rolling-element raceway is half or less the clearance between the connection section and the connection section guide groove. Therefore, when, among the connection sections, the connection sections close to the two longitudinal end sections of the separator move from the curved guide section to the load guide section, a clearance is formed between the connection section, the curved guide section, and the load guide section.

Hence, the connection sections can be prevented from being caught between the curved guide section and the load guide section.

According to a twenty-first aspect of the present invention, a chamfered section is preferably formed in the portion of the outer circumferential surface of the load guide section close to the curved guide section.

According to the present invention, during the course of the connection section moving from the curved guide section to the load guide section, the connection section moves in correspondence to the shape of the chamfered section, and hence the connection section can be moved smoothly. Moreover, during the course of the connection section moving from the load guide section to the curved guide section, the connection section moves in correspondence to the shape of the chamfered section, and hence the connection section can be moved smoothly.

According to a twenty-second aspect of the present invention, a chamfered section is preferably formed in the portion of the outer circumferential surface of the load guide section close to the return guide section.

According to the present invention, during the course of the connection section moving from the curved guide section to the load guide section, the connection section moves in correspondence to the shape of the chamfered section, and hence the connection section can be moved smoothly.

According to a twenty-third aspect of the present invention, there is provided a linear guide apparatus comprising:

a guide rail having a rail-side rolling-element raceway groove extending in an axial direction on an exterior surface thereof;

a slider main body which has a slider-side rolling-element raceway groove opposing the rail-side rolling-element raceway groove, which straddles the guide rail so as to be relatively movable, and which has a linear rolling-element return passage;

end caps which are joined to respective axial end faces of the slider main body and each of which is formed with a circular-arc direction-change passage for bringing the rolling-element return passage into mutual communication with a linear load raceway formed from the rail-side rolling-element raceway groove and the slider-side rolling-element raceway groove;

a plurality of rolling elements rollably inserted into a rolling-element raceway formed from the load raceway, the rolling-element return passage, and the direction-change passage; and a separator which has ends, aligns the rolling elements into a line at predetermined intervals, and moves through the inside of the rolling-element raceway in conjunction with movement of the plurality of rolling elements, wherein the separator has a plurality of spacer sections interposed among adjacent rolling elements, and a belt-shaped connection section which connects the adjacent spacer sections and is formed to exhibit flexibility which enables flexion along the rolling-element raceway;

a connection section guide groove into which the connection section movably fits and which is continuous along the rolling-element raceway is formed in the rolling-element raceway;

the connection section guide groove has a linear load guide section formed in the slider-side rolling-element raceway groove, a linear return guide section formed in the rolling-element return passage, and a circular-arc curved guide section formed in the direction-change passage;

among the connection sections, at least connection sections close to the respective longitudinal ends of the separator are taken as curved connection sections which are curved along the curved direction of the curved guide section under no load; and a portion of an outer circumferential surface of the return guide section close to the curved guide section is protruded toward an outer periphery side of the rolling-element raceway in relation to a portion of an outer circumferential surface of the curved guide section close to the return guide section.

According to the present invention, a portion of an outer circumferential surface of the return guide section close to the curved guide section is protruded toward the outer periphery side of the rolling-element raceway in relation to a portion of an outer circumferential surface of the curved guide section close to the return guide section. Therefore, when, among the connection sections, the connection sections close to the two longitudinal end sections of the separator move from the curved guide section to the return guide section, the connection sections can be prevented from being caught between the return guide section and the curved guide section.

According to a twenty-fourth aspect of the present invention, a relational expression of $A4<B/2$ preferably stands on condition that the amount of protrusion of the portion of the outer circumferential surface of the return guide section close to the curved guide section toward the outer periphery side of the rolling-element raceway is taken as $A4$ and that a clearance existing between the connection section and the connection section guide groove is taken as B.

According to the present invention, the amount of protrusion of the portion of the outer circumferential surface of the return guide section close to the curved guide section toward the outer periphery side of the rolling-element raceway is half or less the clearance between the connection section and the connection section guide groove. Therefore, when, among the connection sections, the connection sections close to the two longitudinal end sections of the separator move from the curved guide section to the return guide section, a clearance is formed between the connection section, the curved guide section, and the return guide section. Hence, the connection sections can be prevented from being caught between the curved guide section and the return guide section.

According to a twenty-fifth aspect of the present invention, a chamfered section is preferably formed in the portion of the outer circumferential surface of the return guide section close to the curved guide section.

According to the present invention, during the course of the connection section moving from the curved guide section to the return guide section, the connection section moves in correspondence to the shape of the chamfered section, and hence the connection section can be moved smoothly.

According to a twenty-sixth aspect of the present invention, a chamfered section is preferably formed in the portion of the inner circumferential surface of the curved guide section close to the return guide section.

According to the present invention, during the course of the connection section moving from the curved guide section to the return guide section, the connection section moves in correspondence to the shape of the chamfered section, and hence the connection section can be moved smoothly. Moreover, during the course of the connection section moving from the return guide section to the curved guide section, the connection section moves in correspondence to the shape of the chamfered section, and hence the connection section can be moved smoothly.

According to a twenty-seventh aspect of the present invention, there is provided a linear guide apparatus comprising:

a guide rail having a rail-side rolling-element raceway groove extending in an axial direction on an exterior surface thereof;

a slider main body which has a slider-side rolling-element raceway groove opposing the rail-side rolling-element raceway groove, which straddles the guide rail so as to be relatively movable, and which has a linear rolling-element return passage;

end caps which are joined to respective axial end faces of the slider main body and each of which is formed with a circular-arc direction-change passage for bringing the rolling-element return passage into mutual communication with a linear load raceway formed from the rail-side rolling-element raceway groove and the slider-side rolling-element raceway groove;

a plurality of rolling elements rollably inserted into a rolling-element raceway formed from the load raceway, the rolling-element return passage, and the direction-change passage; and a separator which has ends, aligns the rolling elements into a line at predetermined intervals, and moves through the inside of the rolling-element raceway in conjunction with movement of the plurality of rolling elements, wherein the separator has a plurality of spacer sections interposed among adjacent rolling elements, and a belt-shaped connection section which connects the adjacent spacer sections and is formed to exhibit flexibility which enables flexion along the rolling-element raceway;

a connection section guide groove into which the connection section movably fits and which is continuous along the rolling-element raceway is formed in the rolling-element raceway;

the connection section guide groove has a linear load guide section formed in the slider-side rolling-element raceway groove, a linear return guide section formed in the rolling-element return passage, and a circular-arc curved guide section formed in the direction-change passage;

a portion of an inner circumferential surface of the load guide section close to the curved guide section is protruded toward an outer periphery side of the rolling-element raceway in relation to a portion of an inner circumferential surface of the curved guide section close to the load guide section; and a portion of an inner circumferential surface of the return guide section close to the curved guide section is protruded toward an outer periphery side of the rolling-element raceway in relation to a portion of an inner circumferential surface of the curved guide section close to the return guide section.

According to the present invention, when, among the connection sections, the connection sections close to the two longitudinal end sections of the separator move from the return guide section to the curved guide section, the connection sections can be prevented from being caught between the return guide section and the curved guide section. Moreover, when moving from the load guide section to the curved guide section, the connection sections can be prevented from being caught between the load guide section and the curved guide section.

According to a twenty-eighth aspect of the present invention, there is provided a linear guide apparatus comprising:

a guide rail having a rail-side rolling-element raceway groove extending in an axial direction on an exterior surface thereof;

a slider main body which has a slider-side rolling-element raceway groove opposing the rail-side rolling-element raceway groove, which straddles the guide rail so as to be relatively movable, and which has a linear rolling-element return passage;

end caps which are joined to respective axial end faces of the slider main body and each of which is formed with a circular-arc direction-change passage for bringing the rolling-element return passage into mutual communication with a linear load raceway formed from the rail-side rolling-element raceway groove and the slider-side rolling-element raceway groove;

a plurality of rolling elements rollably inserted into a rolling-element raceway formed from the load raceway, the rolling-element return passage, and the direction-change passage; and a separator which has ends, aligns the rolling elements into a line at predetermined intervals, and moves through the inside of the rolling-element raceway in conjunction with movement of the plurality of rolling elements, wherein the separator has a plurality of spacer sections interposed among adjacent rolling elements, and a belt-shaped connection section which connects the adjacent spacer sections and is formed to exhibit flexibility which enables flexion along the rolling-element raceway;

a connection section guide groove into which the connection section movably fits and which is continuous along the rolling-element raceway is formed in the rolling-element raceway;

the connection section guide groove has a linear load guide section formed in the slider-side rolling-element raceway groove, a linear return guide section formed in the rolling-element return passage, and a circular-arc curved guide section formed in the direction-change passage;

a portion of an outer circumferential surface of the load guide section close to the curved guide section is protruded toward an outer periphery side of the rolling-element raceway in relation to a portion of an outer circumferential surface of the curved guide section close to the return guide section; and a portion of an outer circumferential surface of the return guide section close to the curved guide section is protruded toward an outer periphery side of the rolling-element raceway in relation to a portion of an outer circumferential surface of the return guide section close to the return guide section.

According to the present invention, when, among the connection sections, the connection sections close to the two longitudinal end sections of the separator move from the inside of the curved guide section to the load guide section, the connection sections can be prevented from being caught between the load guide section and the curved guide section. Moreover, when moving from the curved guide section to the return guide section, the connection sections can be prevented from being caught between the return guide section and the curved guide section.

According to a twenty-ninth aspect of the present invention, there is provided a linear guide apparatus comprising:

a guide rail having a rail-side rolling-element raceway groove extending in an axial direction on an exterior surface thereof;

a slider main body which has a slider-side rolling-element raceway groove opposing the rail-side rolling-element raceway groove, which straddles the guide rail so as to be relatively movable, and which has a linear rolling-element return passage;

end caps which are joined to respective axial end faces of the slider main body and each of which is formed with a circular-arc direction-change passage for bringing the rolling-element return passage into mutual communication with a linear load raceway formed from the rail-side rolling-element raceway groove and the slider-side rolling-element raceway groove;

a plurality of rolling elements rollably inserted into a rolling-element raceway formed from the load raceway, the rolling-element return passage, and the direction-change passage; and a separator which has ends, aligns the rolling elements into a line at predetermined intervals, and moves through the inside of the rolling-element raceway in conjunction with movement of the plurality of rolling elements, wherein the separator has a plurality of spacer sections interposed among adjacent rolling elements, and a belt-shaped connection section which connects the adjacent spacer sections and is formed to exhibit flexibility which enables flexion along the rolling-element raceway;

a connection section guide groove into which the connection section movably fits and which is continuous along the rolling-element raceway is formed in the rolling-element raceway;

the connection section guide groove has a linear load guide section formed in the slider-side rolling-element raceway groove, a linear return guide section formed in the rolling-element return passage, and a circular-arc curved guide section formed in the direction-change passage;

a portion of an inner circumferential surface of the load guide section close to the curved guide section is protruded toward an outer periphery side of the rolling-element raceway in relation to a portion of an inner circumferential surface of the curved guide section close to the load guide section;

a portion of an inner circumferential surface of the return guide section close to the curved guide section is protruded toward an outer periphery side of the rolling-element raceway in relation to a portion of an inner circumferential surface of the curved guide section close to the return guide section;

a portion of an outer circumferential surface of the load guide section close to the curved guide section is protruded toward an outer periphery side of the rolling-element raceway in relation to a portion of an outer circumferential surface of the curved guide section close to the load guide section; and a portion of an outer circumferential surface of the return guide section close to the curved guide section is protruded toward an outer periphery side of the rolling-element raceway in relation to a portion of an outer circumferential surface of the return guide section close to the return guide section.

According to the present invention, when, among the connection sections, the connection sections close to the two longitudinal end sections of the separator move from the inside of the load guide section to the curved guide section, the connection sections can be prevented from being caught between the load guide section and the curved guide section. Moreover, when moving from the return guide section to the curved guide section, the connection sections can be prevented from being caught between the return guide section and the curved guide section. Further, when, among the connection sections, the connection sections close to the two longitudinal end sections of the separator move from the curved guide section to the load guide section, the connection sections can be prevented from being caught between the load guide section and the curved guide section. Moreover, when moving from the curved guide section to the return guide section, the connection sections can be prevented from being caught between the return guide section and the curved guide section.

According to a thirtieth aspect of the present invention, among the connection sections, at least connection sections close to the respective longitudinal ends of the separator are preferably taken as curved connection sections which are curved along the curved direction of the curved guide section under no load; and a relational expression of $R1 \geq R2$ preferably stands on condition that a curvature radius of the curved connection section is taken as $R1$ and that a curvature radius of the curved guide section is taken as $R2$.

According to the present invention, when the rolling elements and separators are moved within the rolling-element raceway, the connection sections which move from the load guide section or the return guide section to the curved guide section can be prevented from being caught between the load guide section or the return guide section and the curved guide section.

Moreover, according to the present invention, an area protruding from the spacer section is not formed on each of the spacer sections provided at the two longitudinal ends of the separator. Hence, a mechanism for retaining a rolling element can be formed between spacer sections located at both longitudinal ends of the separator.

Further, according to the present invention, sliding resistance originating between the connection section and the connection section guide groove is made uniform during operation of the linear guide apparatus, and hence occurrence of vibration, which would otherwise be caused during operation of the linear guide apparatus, can be prevented.

According to the present invention, when the separator is a brand new; e.g., immediately after assembly of a linear guide apparatus, among connection sections, at least connection sections close to the respective longitudinal ends of the separator are curved in correspondence to the curvature radius of the curved guide section when under no load. Therefore, during the course of rolling elements and separators moving through the inside of the rolling-element raceway since the initiation of use of the linear guide apparatus, the connection sections moving from the load guide section or the return guide section to the curved guide section can be prevented from being caught between the load guide section or the return guide section and the curved guide section.

According to a thirty-first aspect of the present invention, a material used for forming the separators is preferably a thermoplastic or thermoplastic elastomer.

According to the present invention, a thermoplastic or thermoplastic elastomer is used as a material used for forming separators. Hence, when the separators are heated when the linear guide apparatus is in user or the like, the separators become softened and easy to flex. Moreover, when the separators which have become softened upon heating are cooled, the softened separators become hardened.

According to the present invention, the separator can be moved smoothly within the connection section guide groove without involvement of a decrease in durability of the separators. Hence, occurrence of a decrease in the durability of separators or a decrease in the loading capacity of the linear guide apparatus can be prevented, and the operability of the linear guide apparatus can be enhanced.

In order to solve the fourth drawback, according to a thirty-second aspect of the present invention, there is provided a rolling-element accommodation belt having endless circulation passages through which a plurality of rolling elements are circulated, and guide grooves extending in a arrangement direction of the rolling elements at both sides in each of the endless circulation passages in a widthwise direction thereof, the belt comprising:

end sections;

interposed sections interposed among the adjacent rolling-elements; and a pair of connection arm sections which connect the interposed sections together on the respective sides of each of the endless circulation passages in a widthwise direction thereof and which extend to the outside from end faces of the interposed sections and are guided by the guide grooves; and protrusion sections protruding in the arrangement direction are formed at the end sections; and said protrusion sections are provided at a position where an overlap exists in the endless circulation passage, and provided without being connected one another.

According to the present invention, a protrusion section protruding in the arrangement direction of the balls is formed at each of the end sections which define the shape of ends of the rolling-element accommodation belt. Since these protrusion sections are provided at the positions within the endless circulation passage where the protrusion sections overlap each other, occurrence of erroneous insertion of the balls between the end sections of the rolling-element accommodation belt can be prevented even when, e.g., the above second assembly method is adopted. Since these protrusion sections are given the non-connection structure where the protrusion sections are not connected together, a necessity for efforts required to engage latch sections provided at both ends to engage with each other, as mentioned previously, is obviated. Consequently, assembly of the rolling-element accommodation belt becomes easy.

In the rolling-element accommodation belt of the present invention, the protrusion sections formed at both end sections are preferably provided so as to overlap with respect to the widthwise direction of the endless circulation passage but do not overlap each other with respect to the inner and outer peripheral directions. With such a configuration, even when the leading end of the rolling-element accommodation belt is situated in the direction-change passage, occurrence of interference between the protrusion sections is prevented, and hence an increase in friction is not induced. Accordingly, smoother circulation can be attained.

In the rolling-element accommodation belt of the present invention, the protrusion sections are preferably provided at the non-engagement position where the protrusion sections are not guided by the guide grooves. With such a configuration, since the protrusion sections are not engaged with the guide grooves, occurrence of an extreme increase in friction between the rolling-element accommodation belt and the guide grooves is prevented or lessened even when the protrusion sections cause slight tottering. Therefore, smoother circulation can be achieved.

Moreover, in the rolling-element accommodation belt of the present invention, the protrusion sections have the convex sections which are provided on the faces of the protrusion sections facing the outer periphery side of the endless circulation passage and which protrude toward the outer periphery side, to thus come into slidable contact with the interior wall surface of the endless circulation passage. With such a configuration, when the end section of the rolling-element accommodation belt has approached the direction-change passage, the convex sections of the protrusion sections come into slidable contact with the interior wall surface of the direction-change passage, thereby acting as guide sections. Consequently, smoother circulation of the rolling-element accommodation belt and smoother circulation of the balls can be accomplished.

According to a thirty-sixth aspect of the present invention, there is provided a rolling-element accommodation belt for use with a linear guide apparatus according to a thirty-seventh aspect of the present invention.

According to the second invention, there can be provided a linear guide apparatus which yields the working-effects attributable to the rolling-element accommodation belt.

As mentioned previously, according to the present invention, there can be provided a linear guide apparatus which can prevent occurrence of erroneous insertion of rolling elements into two end sections of the rolling-element accommodation belt and facilitate assembly of the rolling-element accommodation belt.

In order to solve the fifth drawback, according to a thirty-seventh aspect of the present invention, there is provided a linear guide apparatus comprising:

a guide rail having a rolling-element guide surface;

a slider which is provided so as to be movable relatively to the guide rail and opposes the rolling-element guide surface, to thus constitute a rolling-element raceway along with the rolling-element guide surface; and a plurality of rolling elements which roll through the rolling-element raceway, wherein the slider includes a slider main body having a rolling-element return passage through which the rolling elements roll at no load, and a pair of end caps which are attached to respective ends of the slider main body in the direction of movement thereof, to thus form direction-change passages which are in mutual communication with the respective ends of the rolling-element raceway and the rolling-element return passage;

each of the endless circulation passages is formed from the rolling-element raceway, a pair of direction-change passages, and the rolling-element return passage;

a rolling-element accommodation belt is provided in each of the endless circulation passages, wherein the belt has a plurality of rolling-element accommodation sections for individually accommodating the rolling elements, is formed into a shape having ends, and accommodates the rolling elements into the rolling-element accommodation sections to thereby align the rolling elements in the arrangement direction within the endless circulation passage; and a developed length of the rolling-element accommodation belt is determined such that a distance between centers of the rolling elements in the rolling-element accommodation sections located at the end sections is set so as to become shorter than a remaining path length of the endless circulation passage achieved when one end cap has been removed from the slider.

According to a fortieth aspect of the present invention, there is provided a method for manufacturing a linear guide apparatus comprising:

a guide rail having a rolling-element guide surface;

a slider which is provided so as to be movable relative to the guide rail and opposes the rolling-element guide surface, to thus constitute a rolling-element raceway along with the rolling-element guide surface; and a plurality of rolling elements which roll through the rolling-element raceway, wherein the slider includes a slider main body having a rolling-element return passage through which the rolling elements roll when under no load, and a pair of end caps which are attached to the respective ends of the slider main body in the direction of movement thereof, to thus form direction-change passages which are in mutual communication with the respective ends of the rolling-element raceway and the rolling-element return passage;

each of the plurality of endless circulation passages is formed from the rolling-element raceway, a pair of direction-change passages, and the rolling-element return passage;

a rolling-element accommodation belt is provided in each of the endless circulation passages; and the rolling-element accommodation belt is inserted into each of the endless circulation passages, the belt having a plurality of rolling-element accommodation sections for individually accommodating the rolling elements and being formed into a shape having ends, the method comprising the steps of:

using, as the rolling-element accommodation belt, a rolling-element accommodation belt whose developed length is determined such that a distance between centers of the rolling elements in the rolling-element accommodation sections located at the end sections is set so as to become shorter than a remaining path length of the endless circulation passage achieved when one end cap has been removed from the slider;

a line-of-rolling-elements insertion step of inserting rolling elements into each of the endless circulation passages of the slider from an area from which one of the pair of cover members has been removed while the rolling elements are accommodated in the rolling-element accommodation belt; and an end cap attachment step of attaching the removed end cap to the slider main body after the step of inserting a line of rolling elements.

According to the present invention, in relation to the developed length of the rolling-element accommodation belt, the distance between the centers of the balls in the rolling-element accommodation sections located at the respective ends is shorter than the length of the endless circulation passage achieved by removal of one end cap from the slider. When the endless circulation passage is opened by removal of one end cap in the step of insertion of the rolling-element accommodation belt, the rolling-element accommodation belt can be inserted in such a way that the center positions of the balls located at the respective ends of the rolling-element accommodation belt come to a position inside in relation to the end face of the slider main body. Accordingly, even when the end cap contacts the rolling-element accommodation belt at the time of attachment of the removed one end cap, the rolling-element accommodation belt extending beyond the end face of the slider main body is not flexed to such an extent that the rolling elements are dislodged in unexpected directions. Consequently, the operation for attaching the end cap 4022 can be performed simply and quickly.

In the linear guide apparatus of the present invention, the end sections of the rolling-element accommodation belt oppose each other in a non-contacting manner within the endless circulation passage, and two balls which are not accommodated into any rolling-element accommodation sections are preferably incorporated into a space between the thus-mutually-opposing end sections. With such a configuration, even when the clearance existing between the end sections of the rolling-element accommodation belt is wide, one or more rolling elements can be arranged in the clearance. Hence, a decrease in the number of balls bearing the load in the rolling-element raceway can be inhibited, which is more preferable in terms of prevention of occurrence of a decrease in the loading capacity of the linear guide and a decrease in the rigidity of the linear guide.

Further, under the method for manufacturing a linear guide apparatus, there is used, as the rolling-element accommodation belt, a belt which enables insertion of one rolling element or two or more rolling elements, which are not accommodated into the rolling-element accommodation sections, between the mutually-opposing end sections when the end sections oppose each other in a non-contacting manner within the endless circulation passage. Further, the method also preferably includes, after the cover member attachment step, a non-accommodated rolling element insertion step for moving positions of the end sections of the plurality of the rolling-element accommodation belts within the endless circulation passages in the arrangement direction and inserting one rolling, element or two or more rolling elements, which are not accommodated into the rolling-element accommodation section, into a clearance between the mutually-opposing end sections from an open window section which is opened while opposing the rolling-element guide surface in the slider. As a result, even in the case of a rolling-element accommodation belt where the clearance existing between the end sections of the rolling-element accommodation belt is wide, one or more rolling elements can be arranged in the clearance. Hence, a decrease in the number of balls bearing the load in the rolling-element raceway can be inhibited, which is more preferable in terms of prevention of occurrence of a decrease in the loading capacity of the linear guide and a decrease in the rigidity of the linear guide.

Moreover, in the linear guide apparatus of the present invention, the rolling-element accommodation belt more preferably has a contact surface for contacting a rolling element which is not accommodated into the rolling-element accommodation section, and the contact surface more preferably has a shape which allows movement of the rolling element to be contacted toward the outer periphery of the endless circulation passage. With such a configuration, the contact surface does not constrain the rolling element toward, at least, the outer periphery of the endless circulation passage. Hence, after insertion of the rolling-element accommodation belt into the slider, rolling elements can be readily inserted between the mutually-opposing two end sections.

Further, according to the method for manufacturing a linear guide apparatus of the present invention, the rolling-element accommodation belt more preferably has a contact surface for contacting a rolling element which is not accommodated into the rolling-element accommodation section, and the contact surface more preferably has a shape which allows movement of the rolling element to be contacted toward the outer periphery of the endless circulation passage. Thereby, the contact surface does not constrain the rolling element toward, at least, the outer periphery of the endless circulation passage. Hence, after insertion of the rolling-element accommodation belt into the slider, rolling elements can be readily inserted between the mutually-opposing two end sections.

As mentioned above, according to the present invention, there can be provided a linear guide apparatus and a method for manufacturing the same, wherein operation for attaching end caps after insertion of a rolling-element accommodation belt can be facilitated during a step of insertion of the rolling-element accommodation belt.

BRIEF DESCRIPTION OF THE DRAWINGS

FIG. 14 is a view for describing the rolling-element accommodation belt of Embodiment 2-2;

FIG. 19 is a view for describing the rolling-element accommodation belt of Embodiment 2-6 and operation of the belt;

FIG. 20 is a view for describing a rolling-element accommodation belt of Embodiment 2-7 and operation thereof;

FIG. 58A is a view for describing procedures and operation for inserting a line of rolling elements into a slider performed in a step of inserting a rolling-element accommodation belt in the linear guide apparatus of the fifth embodiment;

FIG. 58B is a view for describing procedures and operation for inserting a line of rolling elements into a slider performed in a step of inserting a rolling-element accommodation belt in the linear guide apparatus of the fifth embodiment;

FIG. 58C is a view for describing procedures and operation for inserting a line of rolling elements into a slider performed in a step of inserting a rolling-element accommodation belt in the linear guide apparatus of the fifth embodiment;

FIG. 58D is a view for describing procedures and operation for inserting a line of rolling elements into a slider performed in a step of inserting a rolling-element accommodation belt in the linear guide apparatus of the fifth embodiment;

FIG. 61C is a view for describing procedures and operation for inserting a line of rolling elements into a rolling-element accommodation belt of the modification, to thus form a line of rolling elements;

FIG. 62A is a view for describing procedures and operation for inserting a line of rolling elements into a rolling-element accommodation belt of the modification, to thus form a line of rolling elements;

FIG. 62B is a view for describing procedures and operation for inserting a line of rolling elements into a rolling-element accommodation belt of the modification, to thus form a line of rolling elements;

FIG. 62C is a view for describing procedures and operation for inserting a line of rolling elements into a rolling-element accommodation belt of the modification, to thus form a line of rolling elements;

FIG. 62D is a view for describing procedures and operation for inserting a line of rolling elements into a rolling-element accommodation belt of the modification, to thus form a line of rolling elements;

FIG. 63 is a view for describing a modification of a rolling-element accommodation belt of the linear guide apparatus of the present invention, showing a portion of the rolling-element accommodation element, including an end section thereof, in the form of a fragmentary enlarged view;

FIG. 64 is a view for describing a related-art direct guide apparatus, showing a portion of a line of rolling elements in the form of a cross-sectional view;

FIG. 65A is a view for describing procedures and operation for inserting a line of rolling elements into a rolling-element accommodation belt of a modification, to thus form a line of rolling elements;

FIG. 65B is a view for describing procedures and operation for inserting a line of rolling elements into the rolling-element accommodation belt of the modification, to thus form a line of rolling elements;

FIG. 65C is a view for describing procedures and operation for inserting a line of rolling elements into the rolling-element accommodation belt of the modification, to thus form a line of rolling elements;

FIG. 65D is a view for describing procedures and operation for inserting a line of rolling elements into the rolling-element accommodation belt of the modification, to thus form a line of rolling elements; and FIG. 66 is an enlarged view of an end section of the inserted rolling-element accommodation belt of FIG. 65C.

BEST MODES FOR IMPLEMENTING THE INVENTION

Embodiment 1-1

Figure 1:
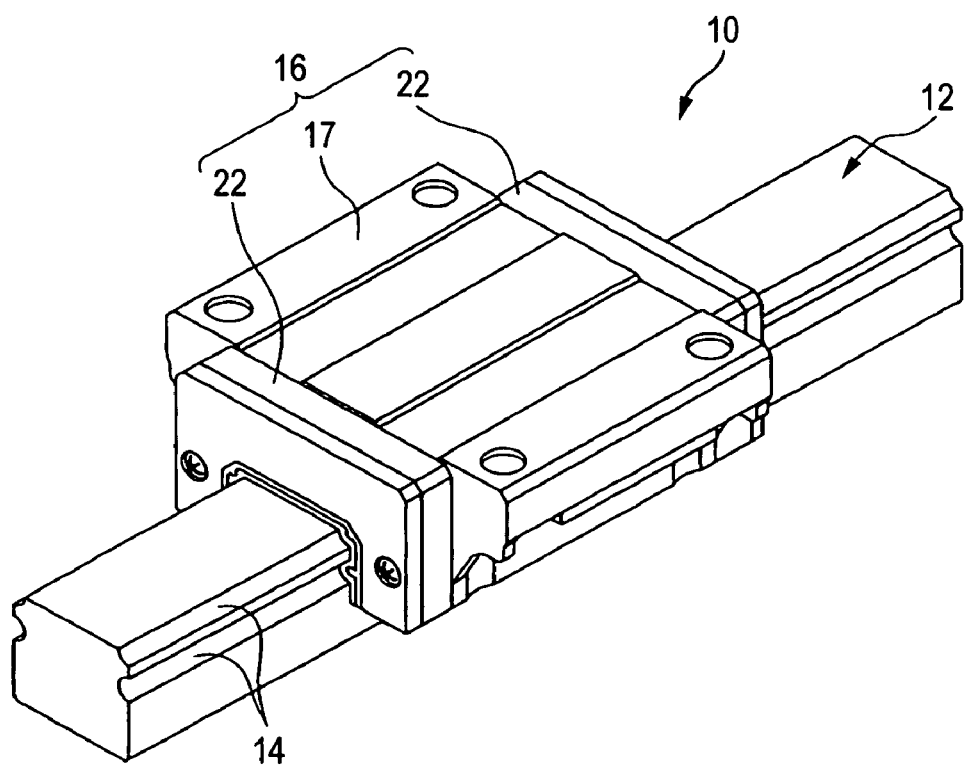
FIG. 1 is a perspective view showing a linear guide according to Embodiment 1-1 of the present invention.

A linear guide apparatus of Embodiment 1-1 of the present invention will now be described hereinbelow. Those elements which are the same as those of the previously-described related-art linear guide apparatus are denoted by the same reference numerals.

Figure 2:
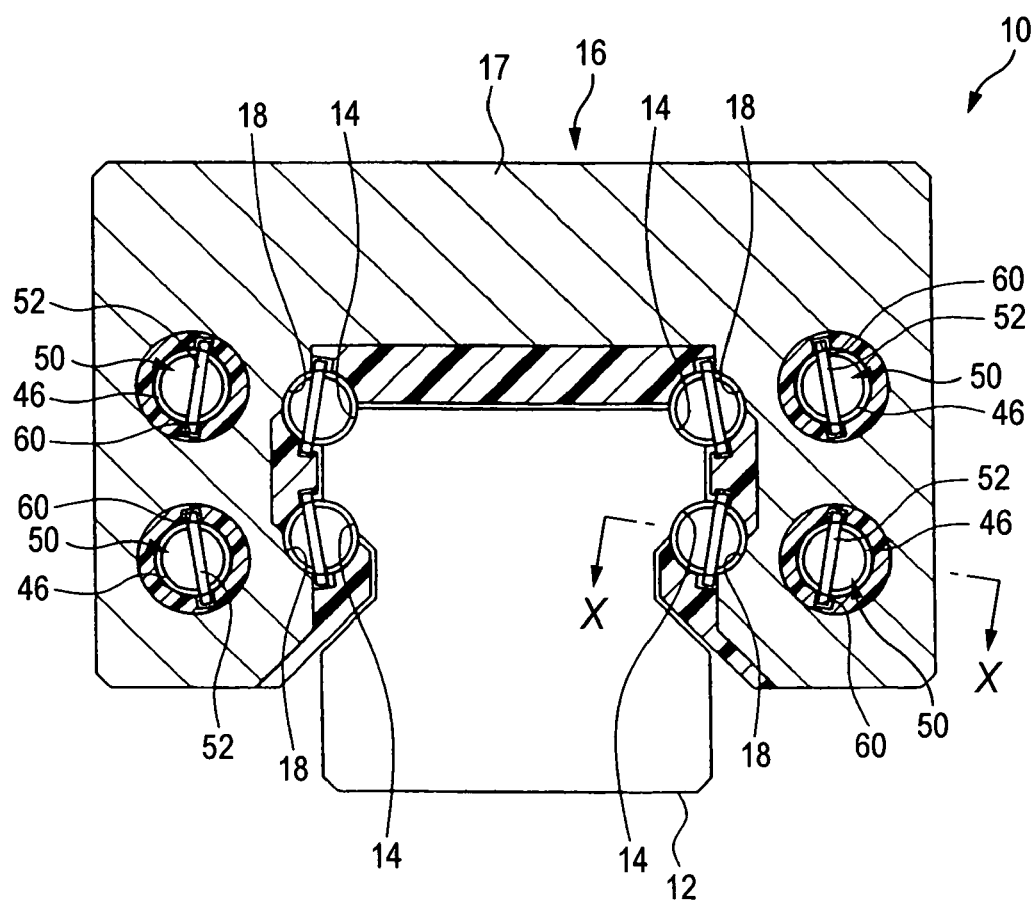
FIG. 2 is a descriptive view showing a slider of the linear guide of FIG. 1 in the form of a transverse plane.
Figure 3:
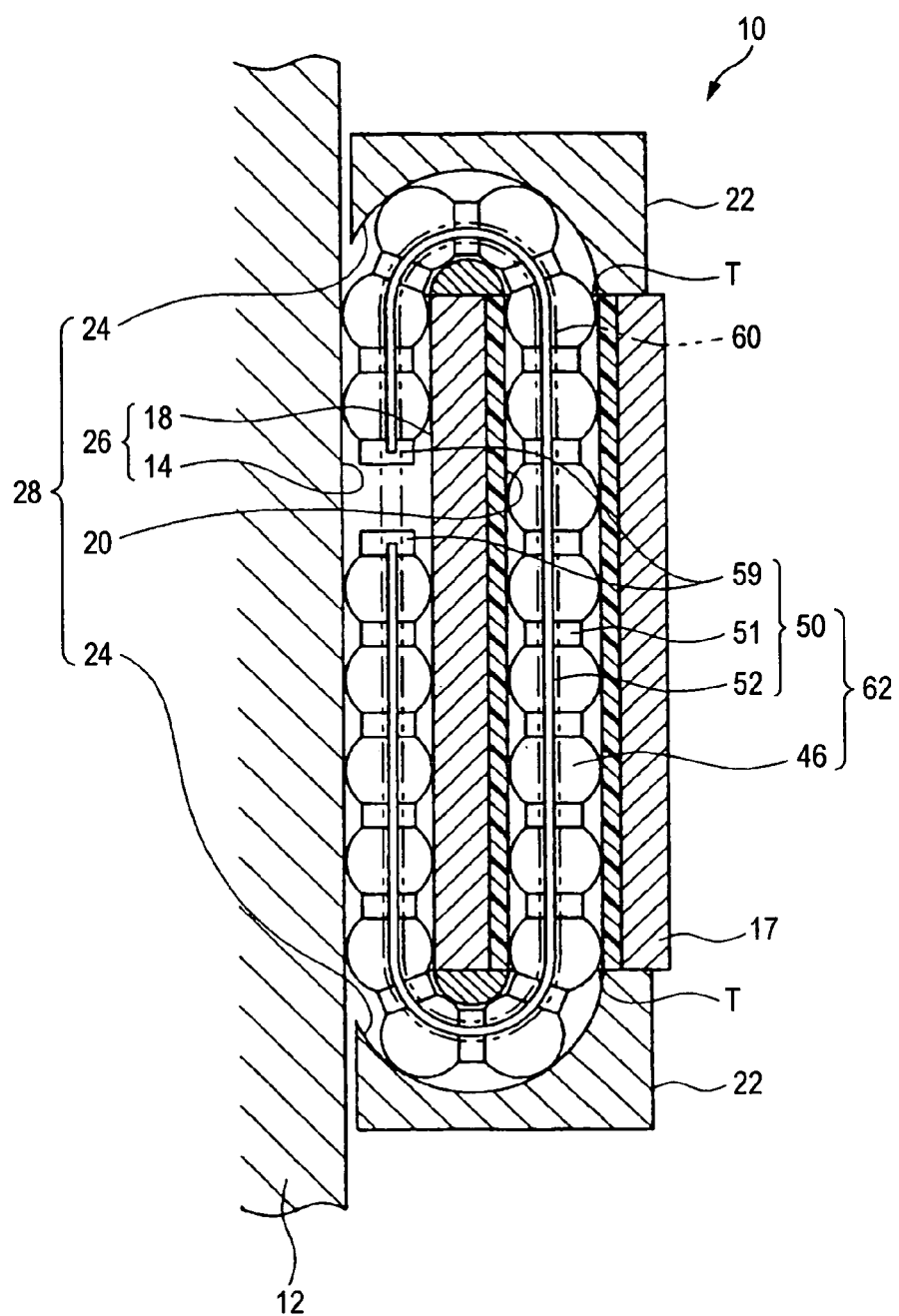
FIG. 3 is a cross-sectional view of the linear guide of FIG. 2 taken along line X-X.

FIG. 1 is a perspective view showing a linear guide of Embodiment 1-1 of the linear guide apparatus of the present invention. FIG. 2 is a descriptive view showing a slider of the linear guide of FIG. 1 in the form of a transverse plane, and FIG. 3 is a cross-sectional view of the linear guide of FIG. 2 taken along line X-X.

As shown in FIGS. 1 and 2, a linear guide 10 has a guide rail 12 having rolling-element raceways 14, and a slider 16 which straddles the guide rail 12 so as to be movable in relation thereto.

The guide rail 12 has an essentially-square cross-sectional profile, and a total of four rows of rolling-element raceways 14 are linearly formed in both side surfaces along a longitudinal direction thereof; namely, two rolling-element raceways are linearly formed in either side surface. As shown in FIG. 1, the slider 16 is formed from a slider main body 17, and end caps 22 which are a pair of cover members attached to respective axial ends of the slider main body 17. When remaining continuous with each other in an axial direction, the slider main body 17 and the end caps 22 each assume an essentially-C-shaped cross-sectional profile.

As shown in FIG. 2, a total of four rows of load rolling-element guide faces 18, which oppose each other and assume an essentially-semicircular cross-sectional profile, are formed in the inside of a sleeve having an essentially-C-shaped cross-sectional profile; specifically, the respective rolling-element guide faces 14 of the guide rail 12. Further, as shown in FIG. 3, a pair of direction-change passages 24—which are brought into mutual communication with respective ends of the load rolling-element guide face 18—are formed in the end cap 22.

Moreover, as shown in FIGS. 2 and 3, rolling-element return passages 20, each of which consists of a through hole of a circular cross-sectional profile parallel to the load rolling-element guide surface 18, are formed in the sleeve section in mutual communication with the pair of direction-change passages 24.

As shown in FIG. 3, a space sandwiched between the rolling-element guide surface 14 of the guide rail 12 and the load rolling-element guide surface 18 of the slider main body 17 opposing thereto forms a rolling-element raceway 26. A total of four rows of endless circulation passages 28 are formed, each being formed from the pair of reverse-of-direction passages 24, the rolling-element return passage 20, and the rolling-element raceway 26 so as to form a continuous loop (see FIG. 2).

Moreover, as shown in FIG. 3, a plurality of balls 46—which roll under load and serve as rolling elements—are inserted into each of the endless circulation passages 28. The plurality of balls 46 in each of the endless circulation passages 28 form a line of rolling elements 62 in conjunction with one rolling-element accommodation belt 50 formed into a shape having ends.

In Embodiment 1-1, the two ends of the rolling-element accommodation belt 50 oppose each other in a noncontact manner within the endless circulation passage 28. As shown in FIG. 2, both sides of connection sections 52 protruding from the belt in a widthwise direction within the endless circulation passage 28 are guided widthways by guide grooves 60 formed within the endless circulation passage 28 in the slider 16.

The rolling-element accommodation belt 50 will be described in more detail hereinbelow.

Figure 4A:
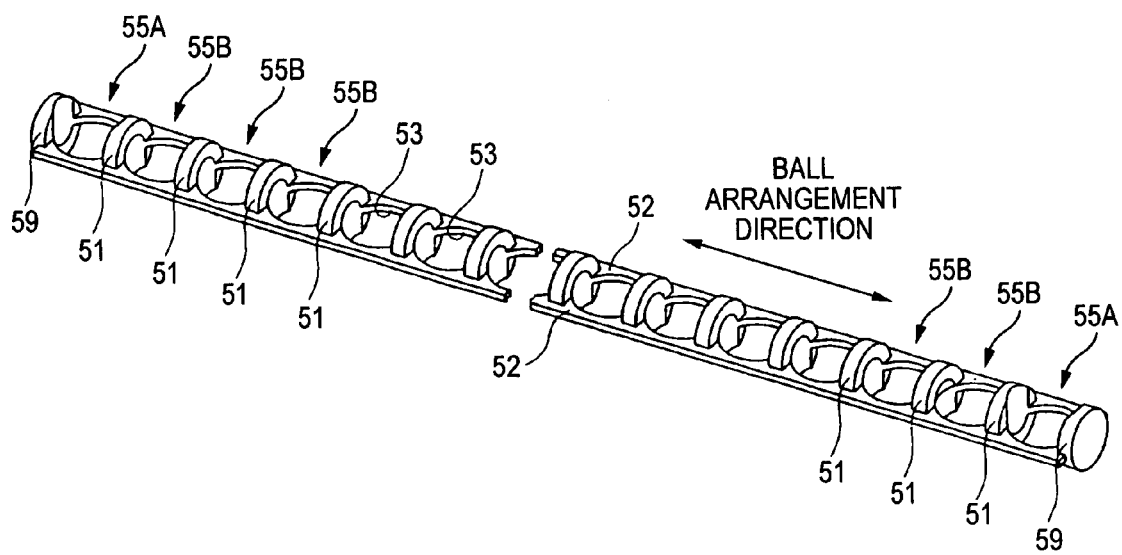
FIG. 4A is a perspective view of a developed, stretched rolling-element accommodation belt of Embodiment 1-1.
Figure 4B:
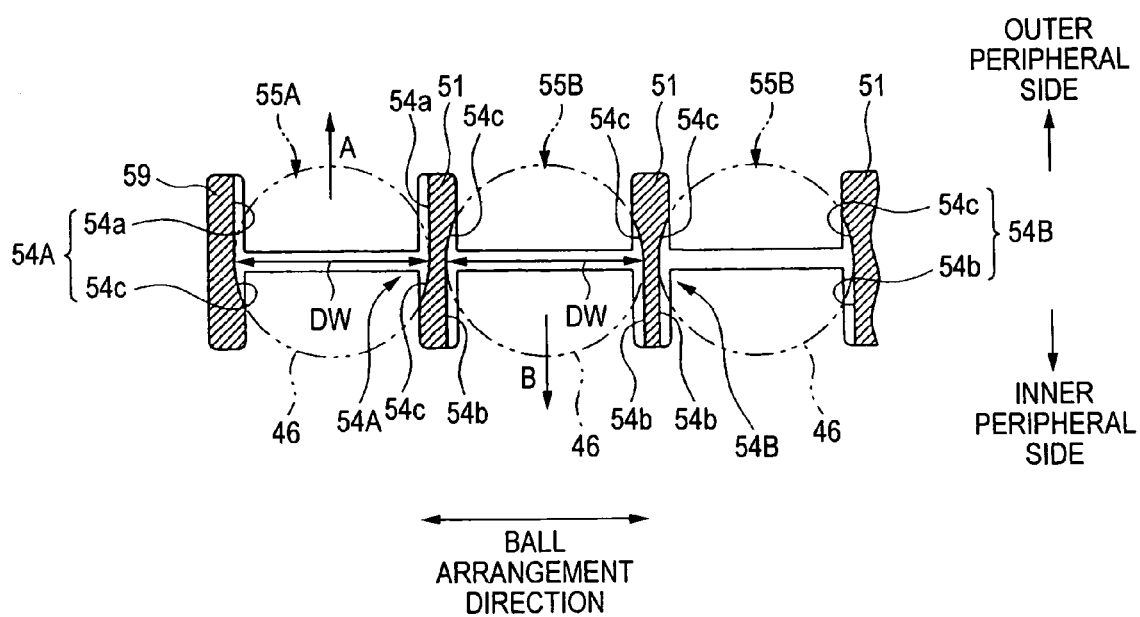
FIG. 4B is a fragmentary, enlarged, descriptive view of the rolling-element accommodation belt of FIG. 4A, which includes end sections of the belt and is taken along a direction in which the belt is arranged.

FIG. 4 is a view for describing a rolling-element accommodation belt. FIG. 4A is a perspective view of a developed, stretched rolling-element accommodation belt of Embodiment 1-1; and FIG. 4B is a fragmentary enlarged descriptive view of the rolling-element accommodation belt of FIG. 4A, which includes end sections of the belt and is taken along a direction in which the belt is arranged.

The rolling-element accommodation belt 50 is formed from an elastic synthetic resin material by means of ejection molding. As shown in FIG. 4B, the rolling-element accommodation belt 50 has spacer sections 51 which are interposed between adjacent balls 46 and partition the balls 46 in the direction of revolution; and spacer sections 59 located at ends of the belt. These spacer sections 51 and 59 are connected together by means of a pair of connection sections 52.

Specifically, the pair of connection sections 52 are thin, long members assuming the shape of a belt. An area where the pair of connection sections 52 oppose each other serves as a ball accommodation hole 53 (see FIG. 4A) which is opened in an essentially-circular shape and in a direction from the front to back of the connection section 52. The respective ball accommodation holes 53 are formed in a line along the longitudinal direction of the rolling-element accommodation belt 50. The inner diameter of each of the ball accommodation holes 53 is slightly larger than the diameter of the ball 46 to be accommodated, so as to enable free disengagement or engagement of the ball 46 with the connection section 52 in the direction from the front to back thereof.

Meanwhile, each of the spacer sections 51 and 59 is a short-cylindrical member whose outer diameter is smaller than that of the ball 46. The axis of the short-cylindrical shape coincides with the longitudinal direction of the rolling-element accommodation belt 50.

The spacer sections 59 are located at the respective ends of the rolling-element accommodation belt 50 formed so as to assume a shape having ends. Spacer sections except the spacer sections 59 correspond to the spacer sections 51. These spacer sections 51 and 59 are disposed on both sides of each of the ball accommodation holes 53 at a given interval and are connected together at both ends of the endless circulation passage 28 in the widthwise direction thereof by means of the pair of connection sections 52. In this rolling-element accommodation belt 50, an area—which is located between adjacent spacer sections and defined along with the ball accommodation hole 53—is formed as a rolling-element accommodation section for individually accommodating each of the balls 46. Specifically, in this rolling-element accommodation belt 50, spaces defined by the respective spacer sections 51, 59 and the ball accommodation holes 53 of the connection sections 52 serve as a plurality of rolling-element accommodation sections. The rolling-element accommodation belt 50 is formed such that the balls 46 are individually accommodated in the rolling-element accommodation sections at given intervals so as to be aligned as a line of rolling elements 62 as shown in FIG. 3.

In the present embodiment, among the plurality of rolling-element accommodation sections, the rolling-element accommodation sections located at the respective ends of the belt are formed so as to accommodate the balls 46 so that the balls can freely leave toward the outer periphery of the endless circulation passage 28, as well as to constrain movement of the end sections toward the outer periphery area of the endless circulation passage 28. The remaining rolling-element accommodation sections are formed so that rolling elements to be accommodated therein can freely leave toward the inner periphery area of the endless circulation passage 28.

As shown in FIG. 4, in the rolling-element accommodation belt 50, the rolling-element accommodation section comprises two types of rolling-element accommodation sections; namely, a first rolling-element accommodation section 55A located at either end of the belt, and a second rolling-element accommodation section 55B other than the first rolling-element accommodation section 55A.

The first rolling-element accommodation section 55A is a rolling-element accommodation section defined between the spacer section 59 located at either end of the belt and the spacer section 51 opposing the spacer section 59 in the arrangement direction.

As shown in FIG. 4B, this first rolling-element accommodation section 55A is formed by providing the spacer section 59 located at either end of the belt and the first spacer section 51 with a first rolling-element contact surface 54A. This first rolling-element contact surface 54A is formed from a concave spherical section 54c and an outer peripheral cylindrical surface section 54a continuous with the concave spherical section 54c. Concave spherical sections 54c opposing each other in the arrangement direction pair up with each other, and outer peripheral cylindrical surface sections 54a opposing each other in the arrangement direction pair up with each other. As a result, first rolling-element contact surfaces 54A opposing each other in the arrangement direction also pair up with each other.

More specifically, the pair of concave spherical sections 54c are formed from concave spherical surfaces fitting to a curved surface of the ball 46. The concave spherical surface is formed in the center of each of the two short-cylindrical end faces of the respective spacer sections 51, 59 which face the ball 46 to be accommodated. An inner diameter DW between mutually-opposing concave spherical sections 54c is slightly larger than the diameter of the ball 46 to be accommodated, so that the ball 46 can roll.

The outer peripheral cylindrical surface section 54c is formed at a side where the outer peripheral cylindrical surface section forms the outer periphery of the endless circulation passage 28 when the rolling-element accommodation belt is attached to the linear guide 10 and in use. The outer peripheral cylindrical surface sections 54a pair up with each other as do the concave spherical sections 54c. A pair of outer peripheral cylindrical surface sections 54a are formed from concave surfaces which form a cylindrical shape when viewed from the top. Consequently, the areas of the spacer sections 51, 59 where the outer peripheral cylindrical surface sections 54a are formed become thin correspondingly. Each of the outer peripheral cylindrical surface sections 54a forms a surface which is smoothly continuous with the corresponding concave spherical section 54c; and extends upwardly in the drawing up to an edge portion of the corresponding spacer section 51 or 59. The inner dimension between the cylindrical surfaces of the pair of outer peripheral cylindrical surface sections 54a is equal to the inner dimension DW between the pair of concave surface sections 54c.

As a result, when the rolling-element accommodation belt 50 is inserted into the endless circulation passage 28, the pair of concave spherical sections 54c of the first rolling-element contact surfaces 54A in the first rolling-element accommodation section 55A act as an engagement section for restricting movement of the ball 46 toward the inner peripheral area of the endless circulation passage 28, as shown in FIG. 4B. In this first rolling-element accommodation section 55A, the outer peripheral cylindrical surface sections 54a can accommodate the ball 46 to be accommodated, so that the ball can freely leave toward the outer peripheral side of the endless circulation passage 28.

A side of the spacer section 59 of Embodiment 1-1 opposite the side thereof facing the ball accommodation hole 53 forms a mere flat surface (see FIG. 4B).

Meanwhile, the second rolling-element accommodation sections 55B are rolling-element accommodation sections other than the previous first rolling-element accommodation sections 55A.

As shown in FIG. 4B, each of the second rolling-element accommodation section 55B is formed by providing each of the adjacent spacer sections 51 with a second rolling-element contact surface 54B. This second rolling-element contact surface 54B is formed from a concave spherical section 54*c* and an inner peripheral cylindrical surface section 54*b* continuous with the concave spherical section 54*c*. The concave spherical sections 54*c* opposing each other in the arrangement direction pair up with each other, and the inner peripheral cylindrical surface sections 54*b* opposing each other in the arrangement direction also pair up with each other. As a result, the second rolling-element contact surfaces 54B opposing each other in the arrangement direction also pair up with each other.

This pair of concave surface sections 54*c* has the same structure as that of the concave spherical surface section 54*c* of the first rolling-element accommodation section 55A. The pair of inner peripheral cylindrical surface sections 54*b* differs from the outer peripheral cylindrical surface sections 54*a* of the first rolling-element accommodation section 55A solely in that the inner peripheral cylindrical surface sections 54*b* are formed at a side of the first rolling-element accommodation sections 55A opposite that where the outer peripheral cylindrical sections 54*a* are formed; namely, at a side where the inner cylindrical surface sections form the inner periphery of the endless circulation passage 28.

As a result, when the rolling-element accommodation belt 50 is inserted into the endless circulation passage 28, the pair of concave surface sections 54*c* of the pair of second rolling-element contact surfaces 54B in the second rolling-element accommodation section 55B act as an engagement section for restricting movement of the ball 46 toward the outer periphery side of the endless circulation passage 28. The pair of inner peripheral cylindrical surface sections 54*b* are formed so that the ball 46 to be accommodated can freely leave toward the inner periphery side of the endless circulation passage 28. In FIG. 4B, an arrow designated by reference symbol A provides an image of the ball 46 being able to freely leave toward the outer periphery side of the endless circulation passage 28, and an arrow indicated by reference symbol B provides an image of the ball 46 being able to freely leave toward the inner periphery side of the endless circulation passage 28 (the same hereinafter applies to other drawings).

Working-effects of this linear guide 10 will now be described.

As mentioned previously, according to this linear guide 10, the first rolling-element accommodation sections 55A, which are located at respective ends of the rolling-element accommodation belt 50, among the rolling-element accommodation sections are formed on the outer periphery side of the endless circulation passage 28 in such a way that movement of the end sections (the spacer sections 59) is restricted by the ball 46 to be accommodated in the first rolling-element accommodation section. Accordingly, when the rolling-element accommodation belt 50 is attached to the linear guide 10 and in use, occurrence of meandering of the leading edge of the rolling-element accommodation belt 50 can be prevented.

Especially, flexing force arises in the rolling-element accommodation belt 50 in the direction-change passage 24, whereupon the rolling-element accommodation belt 50 attempts to protrude toward the outer periphery side of the endless circulation passage 28. Accordingly, the leading end section (i.e., the spacer section 59) of the belt moves so as to run along the outer periphery side of the guide groove 60. Therefore, when a joint T exists between the direction-change passage 24 and a linear section subsequent thereto (see FIG. 3), there is achieved a great effect of preventing the belt from interfering with the step or a great effect of preventing the belt from being caught by the step, so long as the movement of the end sections of the belt toward the outer periphery side of the endless circulation passage 28 is constrained to prevent occurrence of a catch, which would otherwise be caused by the step. Therefore, the chance of occurrence of interference or catch at a joint T between constituent members; namely, the joint T between the direction-change passage 24 and the linear section can be diminished.

Further, according to the linear guide 10, each of the first rolling-element accommodation sections 55A, located at either end of the belt, among the rolling-element accommodation sections is formed so that the ball 46 to be accommodated in the first rolling-element accommodation section 55A can freely leave toward the outer periphery side of the endless circulation passage 28. Moreover, each of the second rolling-element accommodation sections 55B, which are rolling-element accommodation sections other than the first rolling-element accommodation sections 55A, is formed so that the ball 46 to be accommodated in the second rolling-element accommodation section 55B can freely leave toward the inner periphery side of the endless circulation passage 28. Accordingly, this configuration enables easy insertion, removal, or replacement of the ball 46 into the rolling-element accommodation belt 50 from the side from which the ball can freely leave.

In Embodiment 1-1, the rolling-element accommodation belt 50 has been described by reference to the example where the end sections oppose each other in a noncontact manner within the endless circulation passage 28 as shown in FIG. 3 and no ball 46 is inserted between the mutually-opposing end sections. However, the ball may also be inserted between the end sections. Moreover, the concave surface sections 54*c* have been described as the configuration for restricting movement of the ball 46. However, any concave surface may be acceptable, so long as the surface restricts movement of the ball 46 in either the inner peripheral side or the outer peripheral side within the endless circulation passage 28. For instance, a conical surface or the like may also be acceptable.

Embodiment 1-2 of the present invention will now be described. The linear guide of Embodiment 1-2 differs from the counterpart of Embodiment 1-1 described above solely in the configuration of the rolling-element accommodation belt and the configuration of the line of rolling elements. In other respects, the linear guides are identical with each other in terms of configuration. Hence, explanations are given solely to points of difference, and explanations of common points will be omitted.

Embodiment 1-1 has been described by reference to the example where the ball 46 is not inserted between the mutually-opposing end sections of the rolling-element accommodation belt 50. In contrast, Embodiment 1-2 relates to an example where the ball 46 is inserted between the mutually-opposing end sections.

Figure 5:
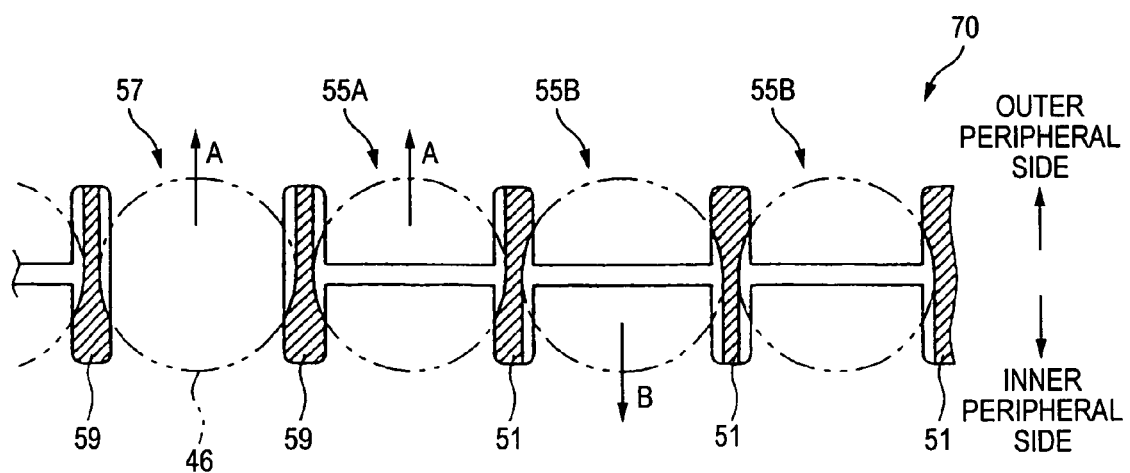
FIG. 5 is a fragmentary cross-sectional view showing a rolling-element accommodation belt of Embodiment 1-2.

Specifically, as shown in FIG. 5, in the linear guide of Embodiment 1-2, a rolling-element accommodation belt 70 is formed such that rolling-element accommodation sections, which are located at respective end sections of the belt, among rolling-element accommodation sections of the belt serve as the first rolling-element accommodation sections 55A as in the case of the rolling-element accommodation belt 50 of Embodiment 1-1 mentioned above; and such that all of the other rolling-element accommodation sections are formed from the second rolling-element accommodation sections 55B. Moreover, the rolling-element accommodation belt 80 has such a developed length that spacer sections 59 located at the respective end sections oppose each other in a noncontact manner within the endless circulation passage 28 while being spaced away from each other at a distance which enables insertion of the ball 46. The space between the end sections serves as an end-to-end rolling-element accommodation section 57 which enables insertion of the ball 46 that is not accommodated into the rolling-element accommodation section.

In this end-to-end rolling-element accommodation section 57, a contact surface which contacts the ball 46 to be accommodated into the end-to-end rolling-element accommodation section is provided on each of the end sections. Specifically, as illustrated in this drawing, the contact surface is formed from a surface having the same configuration as that of the first rolling-element contact surface 54A used in Embodiment 1-1. An area of the contact surface, which forms the outer periphery side of the endless circulation passage 28, is formed into a shape by means of which the contact surface contacts the ball 46 to be accommodated in the accommodation section so as to restrict movement of the respective end sections (the spacer sections 59).

The linear guide of Embodiment 1-2 having such a configuration yields the same working-effect as that yielded by Embodiment 1-1. Since each of both end sections (i.e., the spacer sections 59) has both the first rolling-element accommodation section 55A and the end-to-end rolling-element accommodation section 57, both end sections (i.e., the spacer sections 59) can be constrained more reliably by means of the balls 46 accommodated therein. Specifically, as compared with the configuration of Embodiment 1-1, the configuration of the present embodiment can more reliably prevent occurrence of meandering of the leading end of the rolling-element accommodation belt 80.

Moreover, the linear guide of Embodiment 1-2 is configured such that the ball 46 is inserted between the mutually-opposing end sections (i.e., the spacer sections 59). Hence, occurrence of a decrease in the loading capacity and rigidity of the linear guide can be prevented by means of decreasing the number of the balls 46 bearing the load in the rolling-element raceway 26.

In Embodiment 1-2 (FIG. 5) mentioned above, clearance is assumed not to exist between the mutually-opposing end sections (i.e., the spacer sections 59) and the ball 46, for the sake of convenience of explanation. However, in such a configuration where the ball 46 is nipped in a pressed manner by mutually-opposing end sections (i.e., the spacer sections 59), the rolling-element accommodation belt 80 and the guide groove 60 contact each other, which is in turn responsible for an increase in friction. For this reason, presence of clearance between the mutually-opposing end sections (i.e., the spacer sections 59) and the ball 46 in the endless circulation passage 28 is desirable.

The rolling-element accommodation belt and the linear guide apparatus, both of which pertain to the present invention, are not limited to those mentioned in connection with the above embodiments.

For instance, the embodiments have described examples where the rolling elements are embodied by balls. However, the present invention is not limited to the examples. For instance, even when the rolling element is a roller, similar working-effects can be yielded.

For instance, in Embodiment 1-1, the second rolling-element accommodation sections 55B have been described by reference to the case where the ball 46 to be accommodated into the second rolling-element accommodation section is formed so as to be able to freely leave toward the inner periphery side of the endless circulation passage 28. However, the side toward which the balls are made free to leave is not limited solely to the inner periphery side. The essential requirement is a configuration which enables leaving of rolling elements toward at least either the front side or back side of the rolling-element accommodation belt.

Figure 6A:
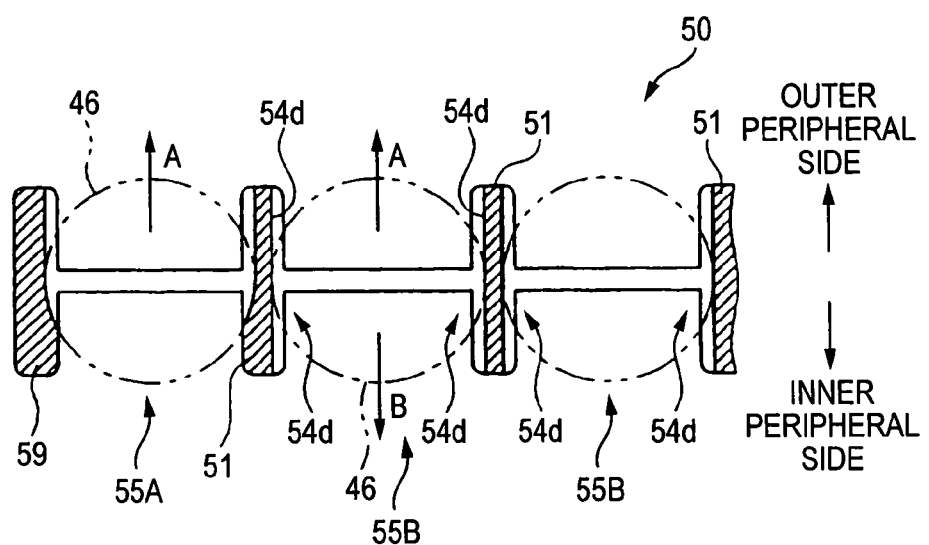
FIG. 6A is a view for describing a rolling-element accommodation belt according to Modification 1-1.

For instance, FIG. 6A shows Modification 1-1. In the second rolling-element accommodation section 55B, a pair of second rolling-element contact surfaces 54B are formed merely from planes 54d. A distance between the mutually-opposing spacer sections 51 is essentially equal to the inner diameter of the ball accommodation hole 53. Specifically, the open size of the second rolling-element accommodation section 55B is greater than the outer size of the ball 46. Dropping of the ball 46 in both the front and back of the connection section 52 is allowed. Specifically, there is enable free engagement or dropping of the ball 46 in both the direction of an inner periphery or an outer periphery within the endless circulation passage 28.

Figure 6B:
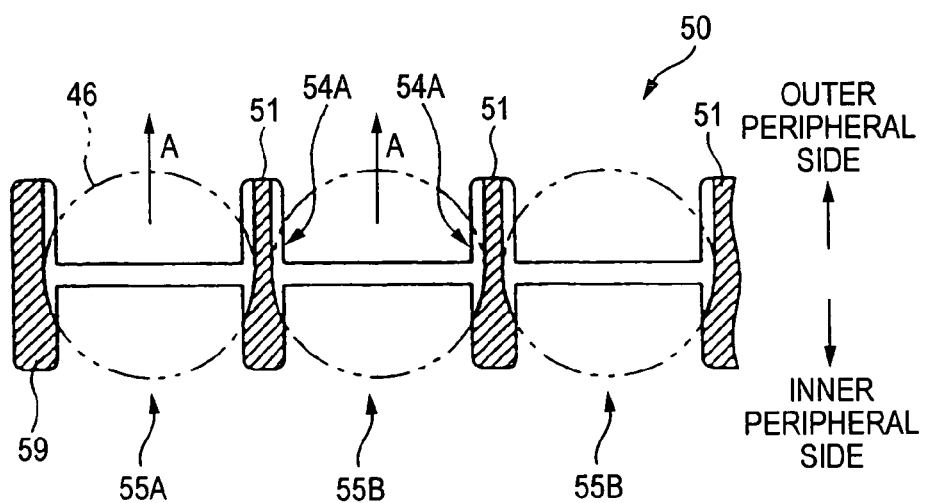
FIG. 6B is a view for describing a rolling-element accommodation belt according to Modification 1-2.

FIG. 6B shows Modification 1-2. In this modification, all of rolling-element accommodation sections are formed from the first rolling-element accommodation sections 55A of Embodiment 1-1. Even in the case of such a configuration, insertion or removal of the ball 46 into or from the rolling-element accommodation belt 50 is facilitated, and the balls are made less susceptible to the influence of the step in the endless circulation passage 28, and frictional variations can be lessened.

For instance, Embodiment 1-1 has been described by reference to the example where the first rolling-element accommodation sections 55A are formed so as to restrict movement of the end sections (i.e., the spacer sections 59) toward the outer periphery side. However, the side at which the movement of the end sections is restricted is not limited solely to the outer periphery side. The essential requirement is a configuration where movement of the respective end sections (i.e., the spacer sections 59) is limited to at least the outer periphery side with respect to the front side or back side of the rolling-element accommodation belt.

Figure 7A:
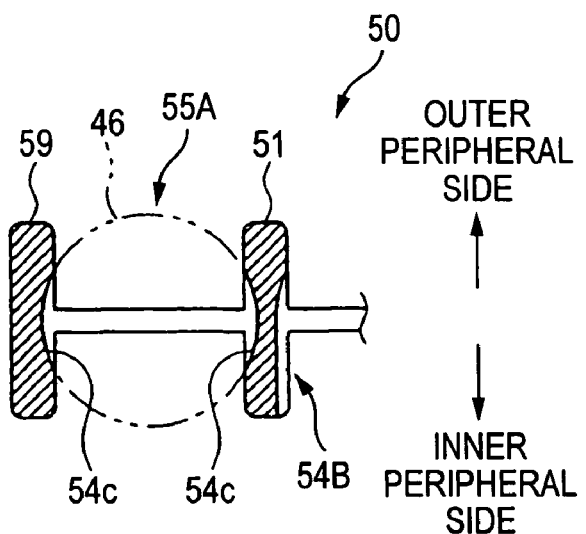
FIG. 7A is a view for describing a rolling-element accommodation belt according to Modification 1-3.

For instance, FIG. 7A shows Modification 1-3. In relation to the first rolling-element accommodation sections 55A, a pair of first rolling-element contact surfaces 54A are formed solely from the concave surface sections 54c and 54c. As a result, the first rolling-element accommodation sections 55A are constrained in all directions in such a way that the balls 46 do not fall from the inside of the first rolling-element accommodation sections 55A. Consequently, even in such a configuration, the first rolling-element accommodation sections 55A are configured so as to restrict movements of the respective end sections (i.e., the spacer sections 59) toward the outer periphery side. Hence, occurrence of meandering of the leading end of the rolling-element accommodation belt can be prevented.

Particularly, in this embodiment, the balls 46 are constrained in every direction. Especially, occurrence of interference or catch at a step between constituent members in the vicinity of the direction-change passage 24 can be diminished further, and frictional variations can also be reduced to a greater extent. In this embodiment, the balls 46 are constrained in every direction, and hence corresponding efforts are required to assemble the balls 46 into the rolling-element accommodation belt 50. Therefore, adopting a combination of appropriate configurations in compliance with required conditions in consideration of efforts required for assembly is preferable.

Moreover, the rolling-element accommodation belt and the linear guide apparatus, both of which pertain to the present invention, are not limited to the embodiments and the modifications thereof. The present invention is susceptible to various modifications by combinations of the embodiments unless otherwise the modifications go beyond the scope of the present invention.

Figure 7B:
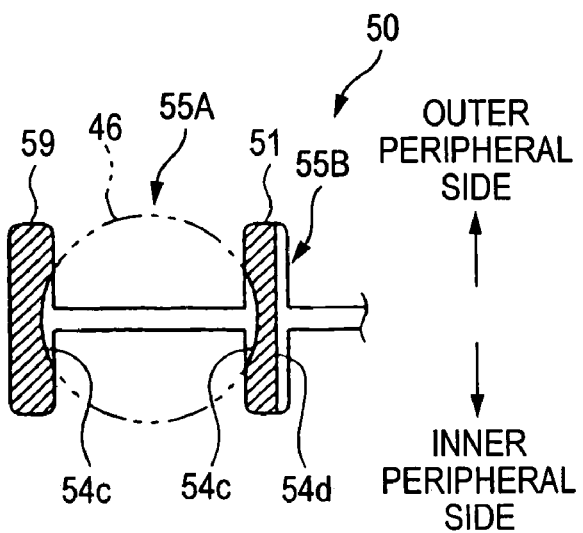
FIG. 7B is a view for describing a rolling-element accommodation belt according to Modification 1-4.

For instance, FIG. 7B shows Modification 1-4. This modification derives from Modification 1-1, wherein the configuration described in connection with Modification 1-3 is adopted for the configuration of the first rolling-element accommodation section 55A of Modification 1-1.

Figure 7C:
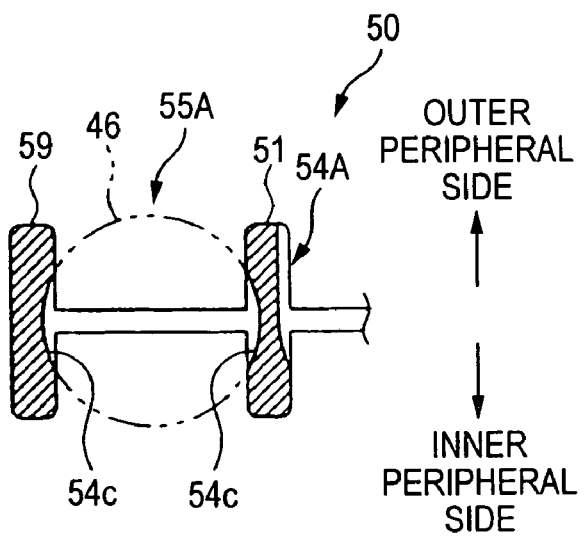
FIG. 7C is a view for describing a rolling-element accommodation belt according to Modification 1-5.

Moreover, FIG. 7C shows, e.g., Modification 1-5. This modification derives from Modification 1-2, wherein the configuration described in connection with Modification 1-3 is adopted for the configuration of the first rolling-element accommodation section 55A of Modification 1-2.

Figure 8A:
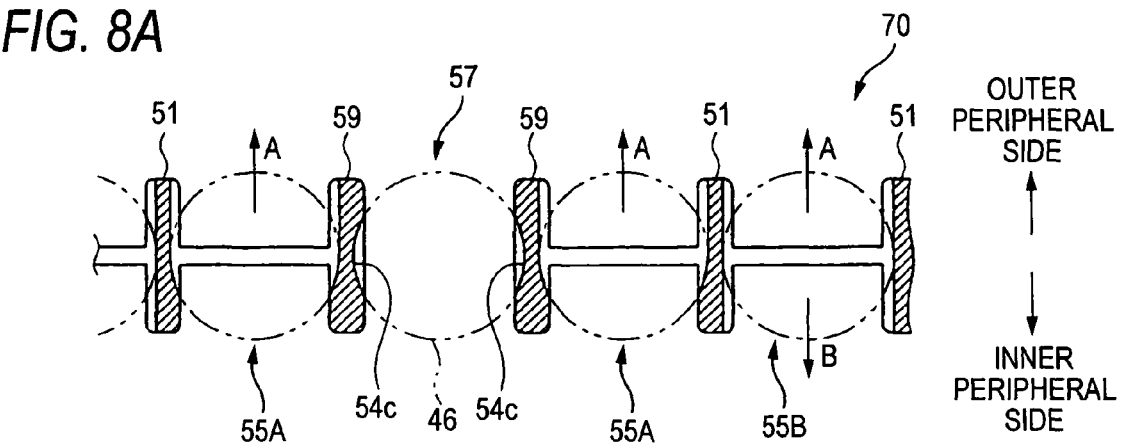
FIG. 8A is a view for describing a rolling-element accommodation belt according to Modification 1-6.

Furthermore, FIG. 8A shows, e.g., Modification 1-6. This modification derives from Modification 1-2, wherein the end-to-end rolling-element accommodation section 57 is formed solely from the spherical surface sections 54c, 54c, and wherein the configuration described in connection with Modification 1-1 is adopted for the configuration of the other rolling-element accommodation sections.

Figure 8B:
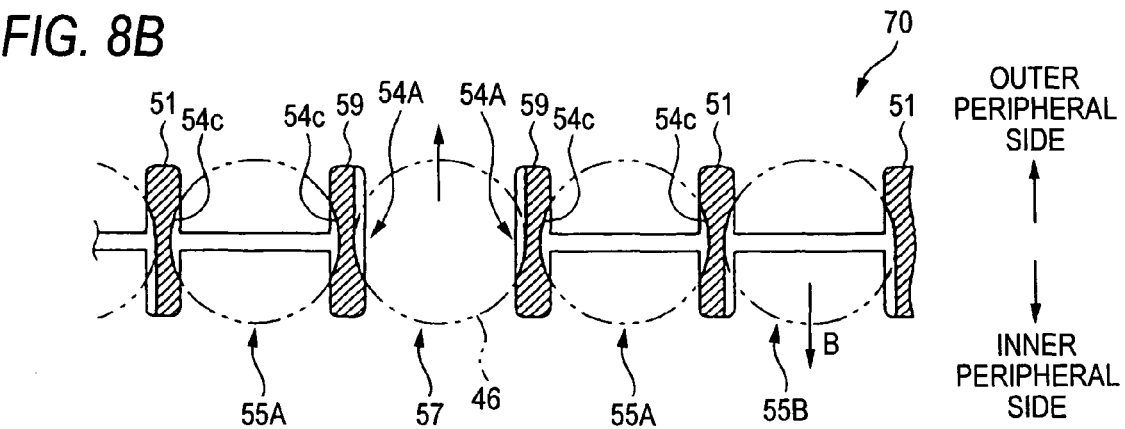
FIG. 8B is a view for describing a rolling-element accommodation belt according to Modification 1-7.

FIG. 8B also shows, e.g., Modification 1-7. This modification derives from Modification 1-2, wherein the end-to-end rolling-element accommodation section 57 is formed from the first rolling-element contact surfaces 54A described in connection with Embodiment 1-2, and wherein the configuration described in connection with Modification 1-3 is adopted for the configuration of the other rolling-element accommodation sections.

Figure 8C:
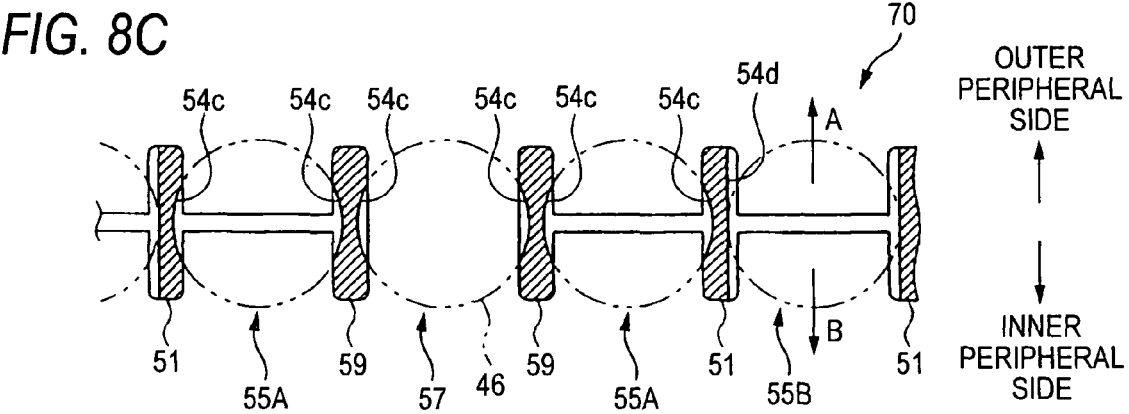
FIG. 8C is a view for describing a rolling-element accommodation belt according to Modification 1-8.
Figure 9:
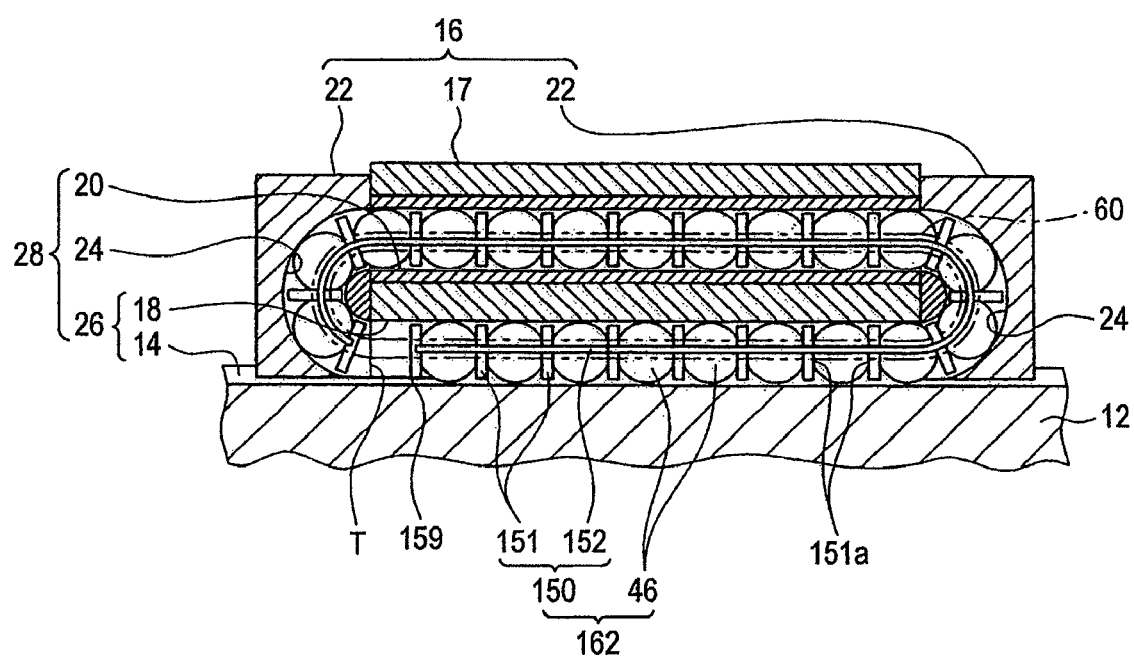
FIG. 9 is a cross-sectional view of an endless circulation passage in a related-art linear guide apparatus taken along a direction where rolling elements are arranged within the endless circulation passage.

FIG. 8C also shows, e.g., Modification 1-8. This modification derives from Modification 1-2, wherein the end-to-end rolling-element accommodation section 57 is formed solely from the concave surface sections 54c and 54c, and wherein the configuration described in connection with the fourth modification is adopted for the configuration of the other rolling-element accommodation sections.

Insertion or removal of the rolling elements into or from the rolling-element accommodation belt is facilitated by means of the configurations shown in the respective modifications. Further, the belt can be made less susceptible to the influence of the step in the endless circulation passage, and frictional variations can be lessened.

Embodiment 2-1

A rolling-element accommodation belt 1050 of Embodiment 2 of the present invention will be described hereunder.

Figure 11A:
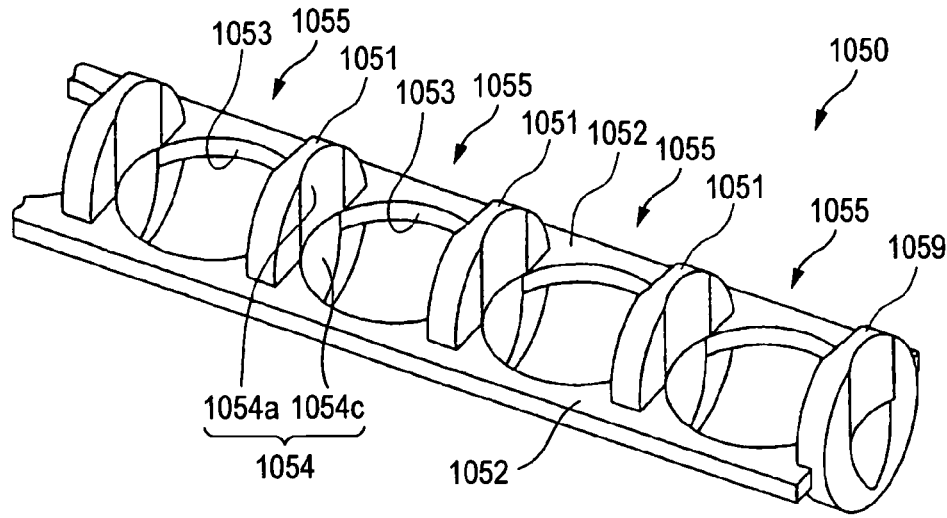
FIG. 11A is a fragmentary enlarged plan view showing the developed rolling-element accommodation belt of Embodiment 2-1 including an end section.
Figure 11B:
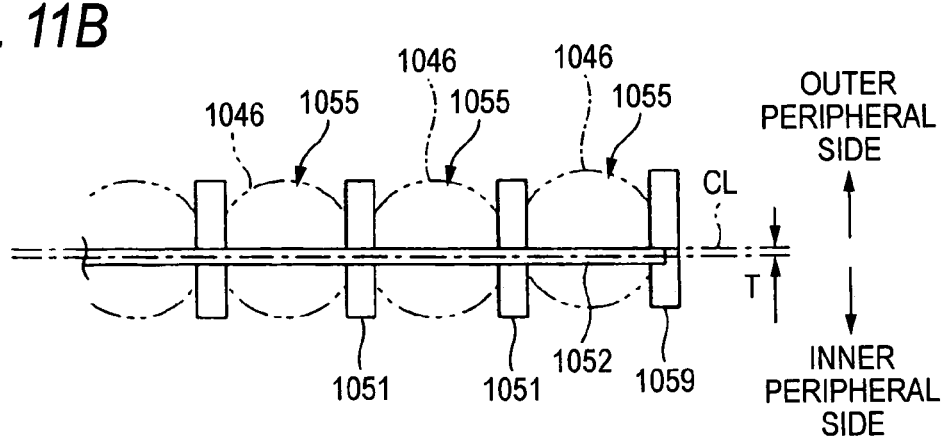
FIG. 11B is a side view of FIG. 11A.
Figure 11C:
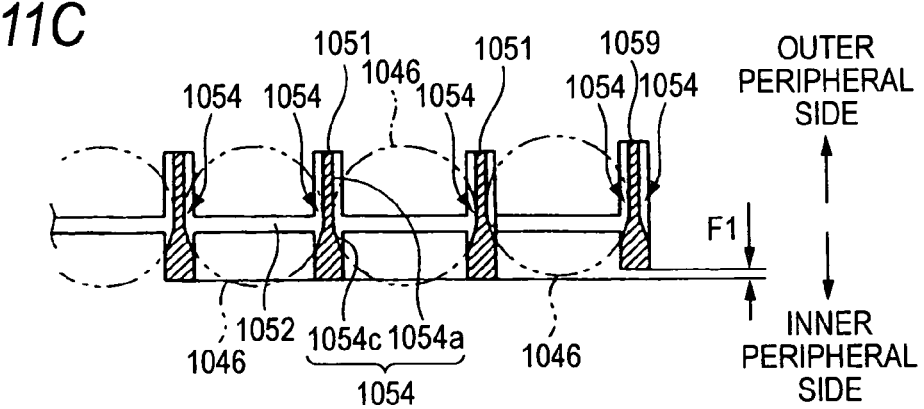
FIG. 11C is a cross-sectional view of FIG. 11B acquired in a direction where balls are arranged.

FIG. 11 is a view for describing the rolling-element accommodation belt. Specifically, FIG. 11A is a fragmentary enlarged perspective view of the developed rolling-element accommodation belt including an end section; FIG. 11B is a side view of the same; and FIG. 11C is a cross-sectional view of the rolling-element accommodation belt acquired in a direction where balls are arranged.

The rolling-element accommodation belt 1050 is formed from a flexible synthetic resin material by means of injection molding. As illustrated, the belt comprises spacer sections 1051 which are interposed among adjacent balls 1046 to thereby partition the balls 1046 from each other in the direction of revolution; and spacer sections 1059 located at end sections of the belt. The spacer section 1051 and the spacer section 1059 are coupled together by means of a pair of connection sections 1052.

Specifically, the pair of connection sections 1052 are thin, long, and strip-shaped (belt-shaped) members. An area where the pair of connection sections 1052 oppose each other serves as a ball accommodation hole 1053 (see FIG. 11A) which is opened in an essentially-circular shape and in a direction from the front to back of the connection sections 1052. The respective ball accommodation holes 1053 are formed in a line along the longitudinal direction of the rolling-element accommodation belt 1050. The inner diameter of each of the ball accommodation holes 1053 is slightly larger than the diameter of the ball 1046 to be accommodated, in such a way as to enable free disengagement or engagement of the balls 1046 from or with the connection sections 1052 in the direction from the front to back thereof.

Meanwhile, each of the spacer sections 1051 and 1059 is a short cylindrical member whose outer diameter is smaller than that of the ball 1046. The axis of the short-cylindrical shape coincides with the longitudinal direction of the rolling-element accommodation belt 1050.

The spacer sections 1059 are located at respective ends of the rolling-element accommodation belt 1050 formed into a shape having ends. Spacer sections other than the spacer sections 1059 serve as the spacer sections 1051. These spacer sections 1051 and 1059 are disposed on both sides of each of the ball accommodation holes 1053 at a given interval and connected together at both ends of an endless circulation passage 1028 in the widthwise direction thereof by means of the pair of connection sections 1052. In this rolling-element accommodation belt 1050, an area—which is located between adjacent spacer sections and defined along with the ball accommodation hole 1053—is formed as a rolling-element accommodation section 1055 for individually accommodating the corresponding ball 1046.

A position where the spacer section 1051 and the spacer section 1059 are connected together by means of the pair of connection sections 1052 is deviated, by an amount of offset T, toward the inner periphery side of the endless circulation passage 1028 when the belt is in use, with reference to a line CL connecting the centers of the balls 1046 to be accommodated (except the ball 1046 located at the end section where the ball is accommodated so as to be deviated as will be described later).

Moreover, a rolling-element contact surface 1054 is formed at either side of each of the spacer sections 1051 and 1059. Of the pair of these rolling-element contact surfaces 1054, one rolling-element contact surface 1054 is formed so as to oppose one adjacent ball 1046, and the other rolling-element contact surface 1054 is formed so as to oppose another adjacent ball 1046 in a direction opposite the direction in which the one rolling-element contact surface 1054 faces. This rolling-element contact surface 1054 is formed from a concave surface section 1054c and a cylindrical-surface, section 1054a continuous with the concave surface section 1054c. Concave surface sections 1054c opposing in the arrangement direction pair up with each other, and cylindrical sections 1054a opposing each other in the arrangement direction pair up with each other in the arrangement direction. As a result, the rolling-element contact surfaces 1054 opposing each other in the arrangement direction also pair up with each other.

More specifically, the pair of concave surface sections 1054c are formed from concave surfaces—which fit to a curved surface of the ball 1046—among both end faces of each of the short-cylindrical spacer sections 1051 and 1059 facing the ball 1046 to be accommodated. An inner diameter between the mutually-opposing concave sections 1054c is slightly larger than the diameter of the ball 1046 to be accommodated, so that the ball 1046 can roll.

The cylindrical surface section 1054a is formed at a side close to the outer periphery of the endless circulation passage 1028 when the rolling-element accommodation belt is attached to a linear guide 1010 and in use. The cylindrical surface sections 1054*a* pair up with each other as do the concave surface sections 1054*c*. A pair of cylindrical surface sections 1054*a* are formed from concave surfaces which form a cylindrical shape when viewed from the top. Consequently, each of the cylindrical surface sections 1054*a* forms a surface which is smoothly continuous with the corresponding concave surface section 1054*c*; and extends upwardly in the drawing up to an edge portion of each of the spacer sections 1051, 1059. The inner dimension between the cylindrical concave surfaces of the pair of cylindrical surface sections 1054*a* is equal to the inner dimension between the pair of concave surface sections 1054*c*.

When the rolling-element accommodation belt 1050 is inserted into the endless circulation passage 1028, the pair of concave surface sections 1054*c* of each of the first rolling-element accommodation sections 1055 act as an engagement section for restricting movement of the ball 1046 toward the inner peripheral area of the endless circulation passage 1028, as shown in FIG. 11C. Moreover, the pair of cylindrical surface sections 1054*a* are formed from surfaces which oppose each other and have a given width so as to allow the ball 1046 to be accommodated between the cylindrical face sections 105*a* freely leave toward the outer periphery side of the endless circulation passage 1028. Put another way, in each of the rolling-element accommodation sections 1055, the rolling-element contact surfaces 1054 are formed as surfaces which contact the ball 1046 to be accommodated in the rolling-element accommodation section 1055 so as to restrict movement of each of the space sections 1051 and 1059 toward the outer periphery side of the endless circulation passage 1028.

Moreover, as shown in FIG. 11C, only the spacer sections 1059 located at the end sections of the rolling-element accommodation belt 1050 are connected to corresponding space sections 1051 at positions which are deviated by the amount of shift F1 (the "amount of shift" is also hereinafter called the "amount of offset") toward the outer periphery side within the endless circulation passage 1028. The space sections 1059 located at both end sections are connected to corresponding space sections 1051 with the amount of offset F1. As a result, the spacer sections 1059 are provided with the contact surfaces which contact the balls 1046 accommodated in the rolling-element accommodation section 1055 located at the end sections so as to deviate toward the outer periphery side in the endless circulation passage 1028 in relation to the balls 1046 accommodated in the remaining rolling-element accommodation sections 1055. The amount of offset F1 is preferably set to about 2% to 6% of the diameter of the ball 1046. In the present embodiment, the amount of offset F1 is set to 0.2 mm in relation to the diameter of the ball 1046=4.76 mm The second contact surfaces correspond to the rolling-element contact surface 1054 facing the rolling-element accommodation sections 1055 located at the respective end sections of the spacer sections 1059.

Working-effects of this linear guide 1010 will now be described.

Figure 10:
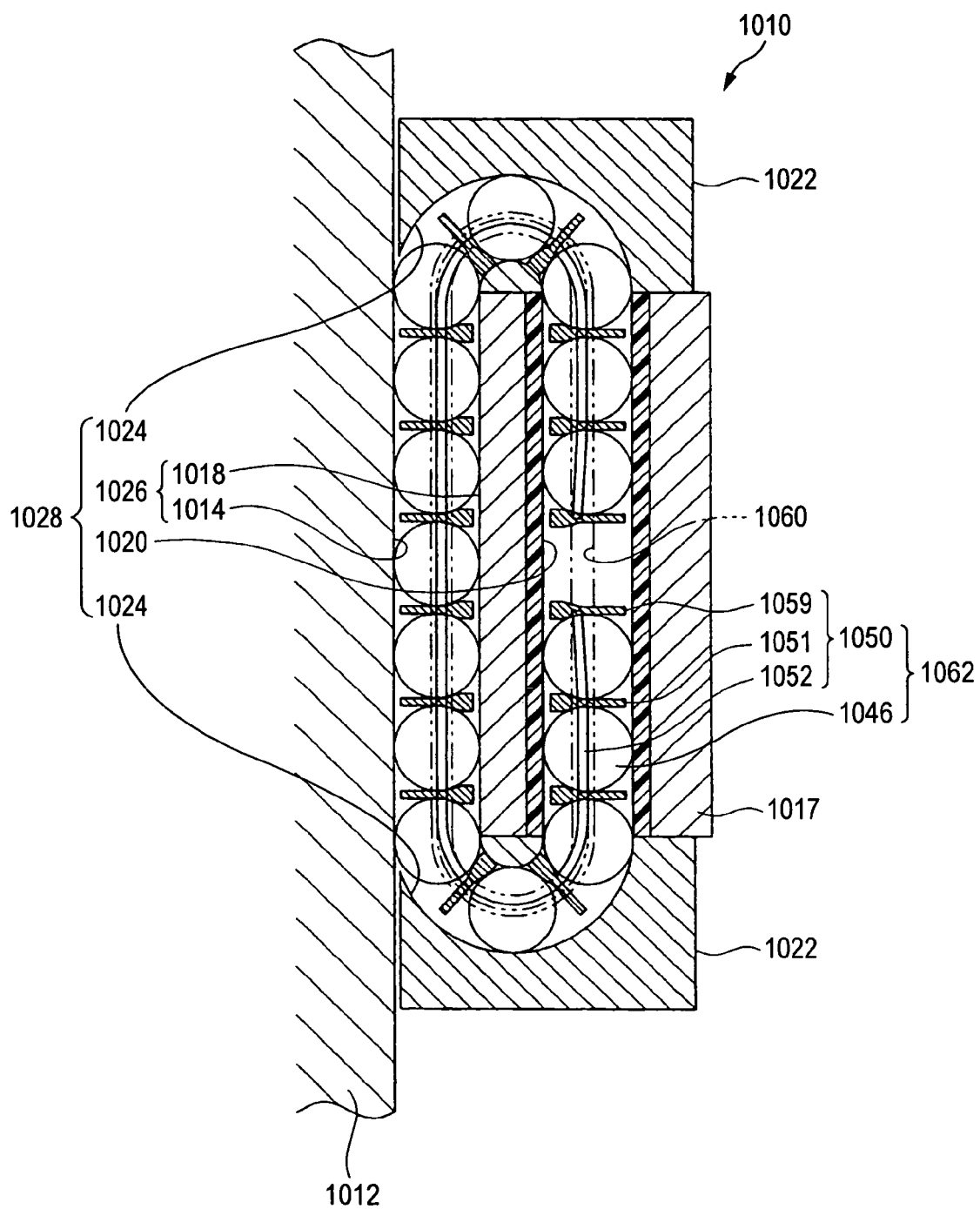
FIG. 10 is a cross-sectional view of a linear guide of Embodiment 2-11 taken along line X-X of FIG. 2.

In this linear guide 1010 having the previous configuration, spaces defined by the respective spacer sections 1051 and 1059 and the respective ball accommodation holes 1053 of the connection sections 1052 serve as a plurality of rolling-element accommodation sections 1055. The balls 1046 can be individually accommodated into the respective rolling-element accommodation sections 1055 at given intervals. Consequently, as shown in FIG. 10, the balls 1046 can be arranged to thus form a line of rolling elements 1062 within the endless circulation passage 1028. Accordingly, occurrence of abrasion or friction among the balls 1046 is prevented, and the circulation characteristic of the balls 1046 is enhanced.

As mentioned previously, according to the linear guide 1010, the rolling-element accommodation belt 1050 is formed such that the rolling-element accommodation sections 1055 of the belt retain the balls 1046 so as to render them unremovable in the direction of the inner peripheral side of the endless circulation passage 1028 while the belt is in use but removable in the outer-periphery direction of the same. Accordingly, the balls 1046 can be readily inserted into the respective rolling-element accommodation sections 1055 from the removable side. Consequently, the efficiency of operation for inserting the balls 1046 into the rolling-element accommodation belts 1050 can be enhanced.

Figure 12:
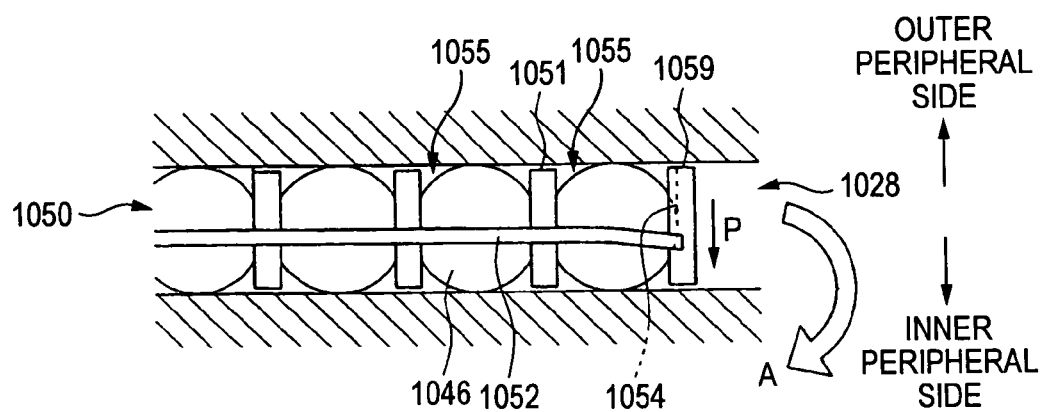
FIG. 12 is a fragmentary enlarged cross-sectional view of a rolling-element accommodation belt of Embodiment 2-1 attached to the linear guide including an end section of the belt.

Moreover, when the rolling-element accommodation belt 1050 (the line of rolling elements 1062) is inserted into the endless circulation passage 1028, the spacer sections 1059 located at the respective ends sections are connected to the corresponding spacer sections 1051 at positions which are deviated toward the outer periphery of the endless circulation passage 1028 by the amount of offset F1. Accordingly, as shown in FIG. 12, in each of the spacer section 1059 located at the respective end sections, the rolling-element contact surfaces 1054 facing the rolling-element accommodation section 1055 are pushed by the ball 1046 in the inner-periphery direction of the endless circulation passage 1028.

As a result, the connection arm sections 1052 located at the leading ends of the rolling-element accommodation belt 1050 are curved toward the inner periphery side of the endless circulation passage 1028. Since a flexion toward the inner periphery side can be imparted to the leading end, the leading end of the rolling-element accommodation belt 1050 can be smoothly guided, while being oriented toward the direction of circulation thereof, into the direction-change passage 1024 along an interior wall of the endless circulation passage 1028 or the guide groove 1060 when approaching the direction-change passage 1024. Specifically, the leading end can be readily curved along the interior wall of the endless circulation passage 1028 or the guide groove 1060, and hence there can be lessened circulation resistance originating from friction of the interior wall of the endless circulation passage 1028 or the guide groove 1060 against the leading end of the rolling-element accommodation belt 1050. Consequently, the linear guide 1010 can be operated smoothly. In the drawing, the arrow designated by reference symbol P indicates an image of the spacer section 1059 being pushed by the ball 1046 in the direction of the inner peripheral side of the endless circulation passage 1028. Further, the arrow designated by reference symbol A indicates an image of the direction of circulation being achieved when the linear guide has approached the direction-change passage 1024 in the endless circulation passage 1028 (the same also applies to any counterparts in other embodiments).

According to the linear guide 1010, the flexion of the leading end of the rolling-element accommodation belt 1050 toward the inner periphery side is not imparted previously but arises as a result of the rolling-element contact surfaces 1054 of the spacer section 1059 connected at the position deviated by the amount of offset F1 being pushed by the ball 1046. Even when the leading end of the rolling-element accommodation belt 1050 has become flexed during the course of handling, the flexion does not affect the degree of flexion achieved during use of the rolling-element accommodation belt. Therefore, the necessity for paying special attention during the operation of handling the linear guide is obviated, and the rolling-element accommodation belt is easy to handle.

Moreover, in contrast with the previously-illustrated guide piece, the rolling-element accommodation belt 1050 does not have any portion protruding from the end section (i.e., the spacer section 1059). Accordingly, when the rolling-element accommodation belt is in use while being attached to the linear guide 1010, the spacer sections 1059 located at the respective end sections can be made to approach each other. Alternatively, a ball used for filling a gap between the spacer sections 1059 can be positioned. For this reason, when compared with, e.g., the embodiment where the rolling-element accommodation belt has the previously-described guide pieces, the number of balls 1046 bearing load is not reduced. Consequently, no drop arises in the loading capacity and rigidity of the linear guide 1010.

Embodiment 2-2

Embodiment 2-2 of the present invention will now be described. The linear guide of Embodiment 2-2 differs from the linear guide of Embodiment 2-1 in terms of only the configuration of the rolling-element accommodation belt and the configuration of the line of rolling elements. In other respects, the linear guides are identical in configuration with each other. Hence, explanations are given solely to differences, and explanations about other aspects are omitted.

Figure 13:
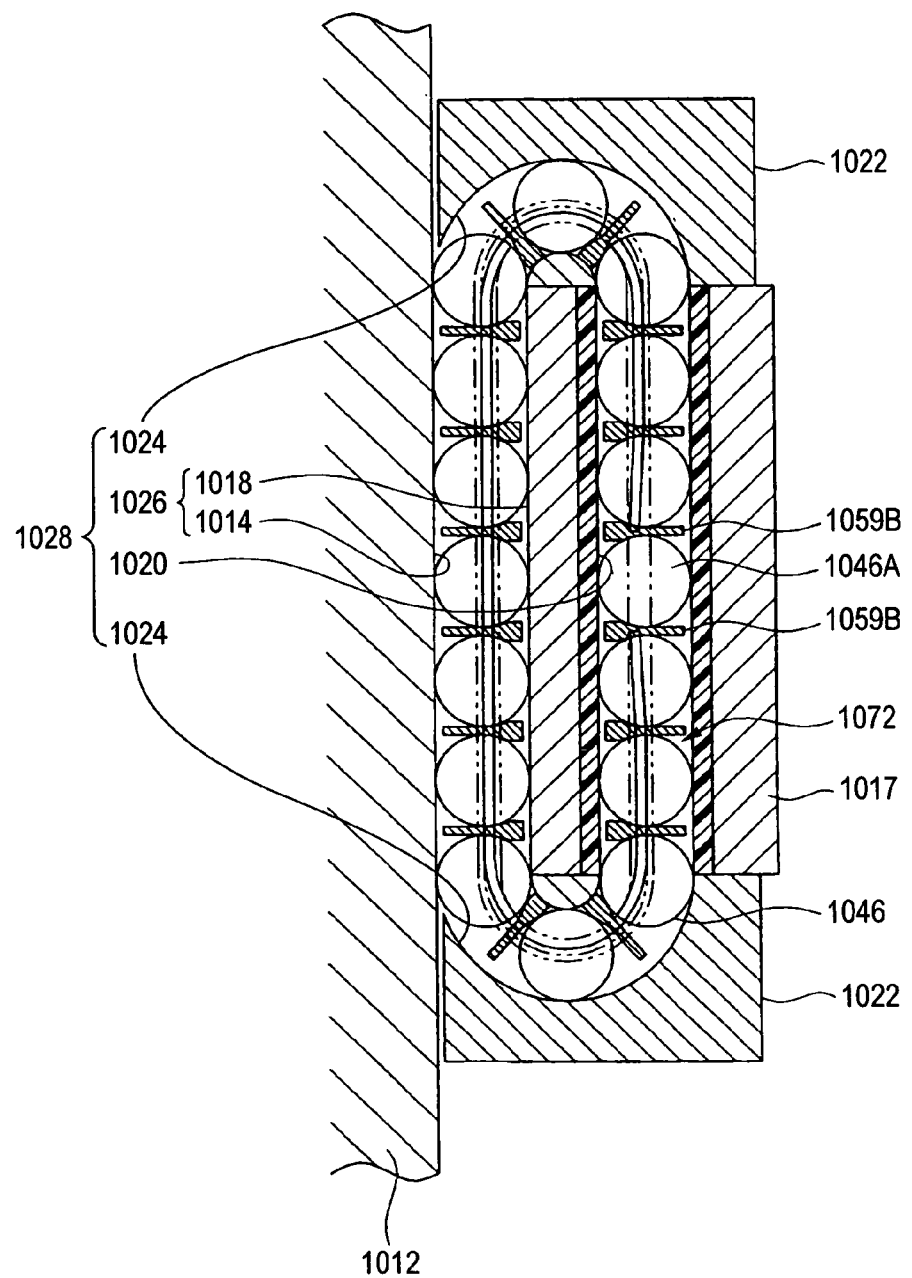
FIG. 13 is a view which corresponds to FIG. 10 and describes the configuration of a rolling-element accommodation belt and that of a line of rolling elements, both pertaining to Embodiment 2-2.
Figure 14A:
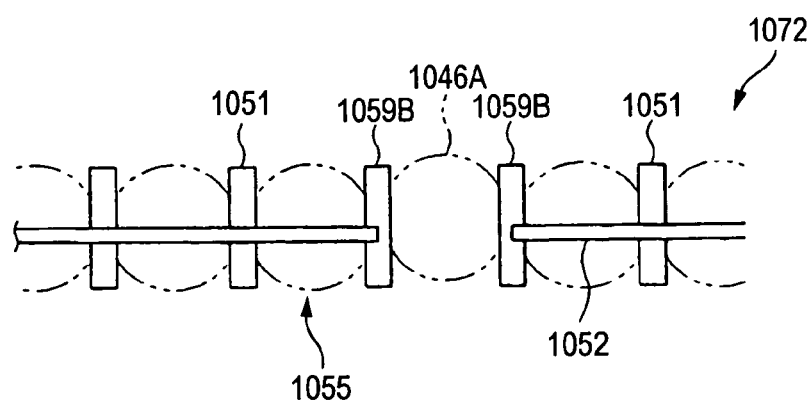
FIG. 14A is a fragmentary enlarged side view of the developed, stretched rolling-element accommodation belt of Embodiment 2-2 including end sections.
Figure 14B:
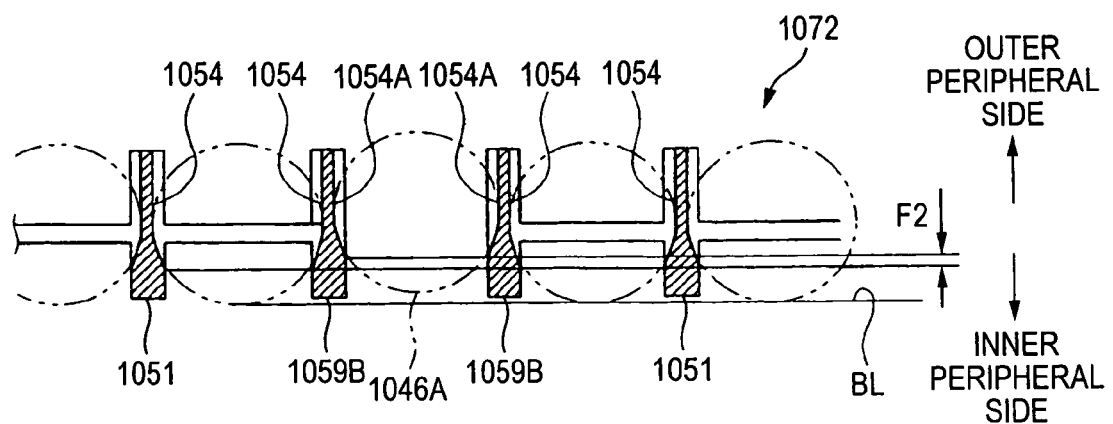
FIG. 14B is a cross-sectional view of FIG. 14 taken along a direction where balls are arranged.

FIG. 13 is a view for describing the configuration of a rolling-element accommodation belt and that of a line of rolling elements, both pertaining to Embodiment 2-2. Further, FIG. 14 is a view for describing the rolling-element accommodation belt, wherein FIG. 14A is a fragmentary enlarged side view of the developed, stretched rolling-element accommodation belt including end sections, and wherein FIG. 14B is a cross-sectional view of FIG. 14 taken along a direction in which balls are arranged.

As shown in FIG. 13, in the linear guide of Embodiment 2-2, spacer sections 1059B located at respective end sections of a rolling-element accommodation belt 1072 oppose each other in a non-contact manner within the endless circulation passage 1028. The mutually-opposing end sections form an end-to-end rolling-element accommodation section which enables insertion of a ball 1046A that is not accommodated into the rolling-element accommodation sections. The ball 1046A is further inserted into the end-to-end rolling-element accommodation section.

Moreover, the rolling-element accommodation belt 1072 differs from the rolling-element accommodation belt 1050 of Embodiment 2-1 in terms of the rolling-element contact surfaces 1054 of the spacer sections 1059B and the location where the spacer section 1059B is connected to the connection section 1052.

Specifically, the rolling-element accommodation belt 1050 of Embodiment 2-1 is an example where the spacer sections 1059 are connected to the spacer sections 1051 with the amount of offset F1. However, as shown in FIG. 14B, the spacer sections 1059B located at the respective end sections of the rolling-element accommodation belt 1072 of Embodiment 2-2 do not have any offset and are connected to the spacer sections 1051 at positions BL flush therewith. In Embodiment 2-2, the spacer sections 1059B are provided at a location where mutually-opposing rolling-element contact surfaces 1054A among rolling-element contact surfaces provided on both sides of the respective spacer sections 1059B are wholly translated toward the outer periphery of the endless circulation passage 1028 by the amount of shift (the amount of offset) F2. As in the case of the amount of offset F1, the amount of offset F2 is set to about 2% to 6% of the diameter of the ball 1046. In this embodiment, the amount of shift F2 is set to 0.2 mm in relation to the diameter of the ball 1046=4.76 mm. As a result, the mutually-opposing rolling-element contact surfaces 1054A serve as surfaces which cause a deviation, toward the outer periphery side of the endless circulation passage 1028, of the ball 1046A to be accommodated into a rolling-element accommodation section 1055 formed between the spacer sections 1059B as compared with the balls 1046 accommodated into the other rolling-element accommodation sections 1055. The mutually-opposing rolling-element contact surfaces 1054A between the spacer sections 1059B correspond respectively to the first contact surfaces.

Figure 15:
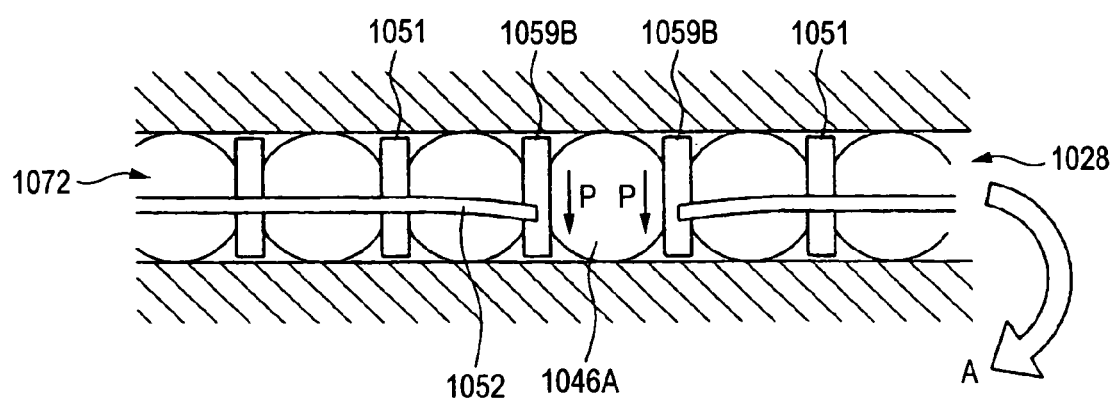
FIG. 15 is a view for describing operation of the rolling-element accommodation belt of Embodiment 2-2.

According to the linear guide of Embodiment 2-2 having such a configuration, when the rolling-element accommodation belt 1072 is inserted into the endless circulation passage 1028, the mutually-opposing rolling-element contact surfaces 1054A located between the spacer sections 1059B accommodate the balls 1046A at a position that is deviated toward the outer periphery side of the endless circulation passage 1028 as compared with the rolling-element contact surfaces 1054 located among the spacer sections 1051. Accordingly, as shown in FIG. 15, the rolling-element contact surfaces 1054A between the spacer sections 1059 located at the respective end sections are pushed by the ball 1046A in the inner-periphery direction of the endless circulation passage 1028 (indicated by reference symbol P in the drawing).

As a result, the connection arm sections 1052 located at the leading ends of the rolling-element accommodation belt 1072 are curved toward the inner periphery side of the endless circulation passage 1028. Accordingly, as in the case of Embodiment 2-1, flexion toward the inner periphery side can be imparted to the leading end. Hence, when the rolling-element accommodation belt 1072 has approached the direction-change passage 1024, the leading end of the rolling-element accommodation belt 1072 can be smoothly guided into the direction-change passage along the interior wall of the endless circulation passage 1028 or the guide groove 1060. Specifically, since the leading end can be bent readily along the interior wall of the endless circulation passage 1028 or the guide groove 1060, there can be lessened the circulation resistance originating from friction of the interior wall of the endless circulation passage 1028 or the guide groove 1060 against the leading end of the rolling-element accommodation belt 1072. Consequently, the linear guide can be smoothly operated.

Further, the flexion of the leading end of the rolling-element accommodation belt 1072 toward the inner periphery side is not imparted previously but arises as a result of the spacer sections 1059 having the rolling-element contact surfaces 1054A formed at the deviated positions being pushed by the ball 1046A. As in the case of Embodiment 2-1, even when the leading end of the rolling-element accommodation belt 1072 has become flexed during the course of handling, the flexion does not affect the degree of flexion achieved during use of the rolling-element accommodation belt. Therefore, the necessity for paying special attention during the operation of handling the rolling-element accommodation belt is obviated, and the rolling-element accommodation belt can be easily handled.

Moreover, in contrast with the previously-illustrated guide piece, the rolling-element accommodation belt 1072 does not have any portion protruding from the end section (i.e., the spacer section 1059). Accordingly, when the rolling-element accommodation belt is in use while being attached to the linear guide, the spacer sections 1059 located at the respective end sections can be made to approach each other. Further, the ball 1046A is additionally interposed between the spacer sections 1059, and hence occurrence of a reduction in the number of balls 1046 bearing load can be prevented, which is preferable. Consequently, the rolling-element accommodation belt is more preferable in terms of realization of a configuration where no drop arises in the loading capacity and rigidity of the linear guide.

Embodiment 2-3

Embodiment 2-3 of the present invention will now be described. The linear guide of Embodiment 2-3 differs from the linear guide of Embodiment 2-1 in terms of only the configuration of the rolling-element accommodation belt and the configuration of the line of rolling elements. In other respects, the linear guides are identical in configuration with each other. Hence, explanations are given solely to differences, and explanations about other aspects are omitted.

Figure 16A:
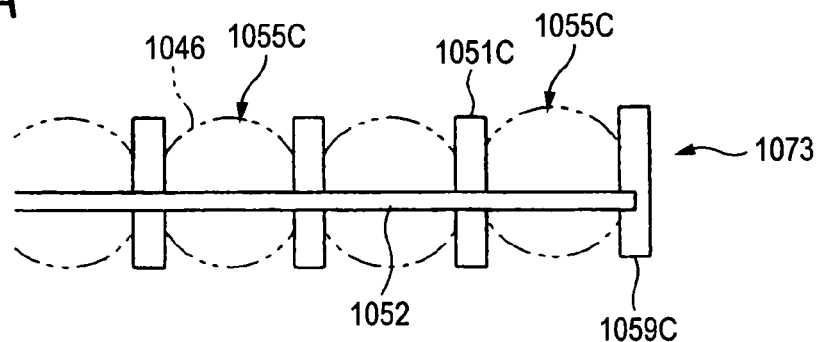
FIG. 16A is a fragmentary enlarged side view of the developed, stretched, rolling-element accommodation belt of Embodiment 2-3 including an end section.
Figure 16B:
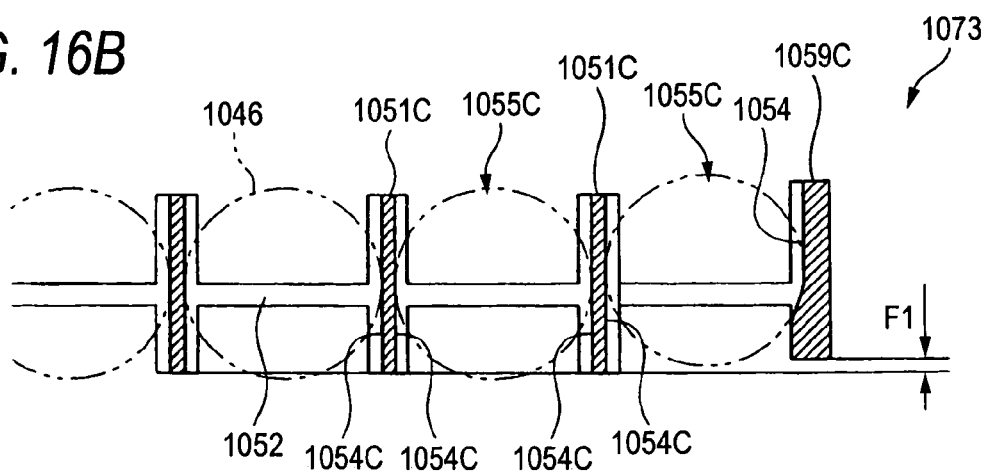
FIG. 16B is a cross-sectional view of FIG. 16A acquired in a direction in which rolling elements are arranged.
Figure 16C:
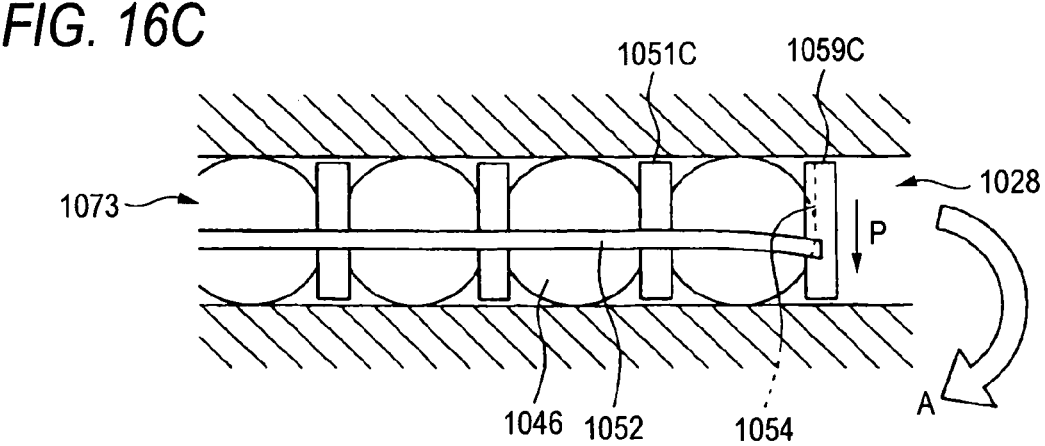
FIG. 16C is a fragmentary enlarged side view of an end section of the linear guide equipped with the rolling-element accommodation belt in FIG. 16A including the end section.

FIG. 16 is a view for describing the configuration of a rolling-belt accommodation belt and the configuration of a line of rolling elements arranged in the rolling-element accommodation belt, both of which pertain to Embodiment 2-3. FIG. 16A is a fragmentary enlarged side view of the developed, stretched rolling-element accommodation belt including an end section; FIG. 16B is a cross-sectional view of the rolling-element accommodation belt acquired in a direction where rolling elements are arranged; and FIG. 16C is a fragmentary enlarged view of the rolling-element accommodation belt which is in use while being attached to a linear guide including end sections.

In relation to the linear guide of Embodiment 2-1, the pair of rolling-element contact surfaces 1054 among the rolling-element accommodation sections 1055 have been described by reference to the example where the balls 1046 to be accommodated between the pair of rolling-element contact surfaces are held in a slidable manner while being constrained on the inner peripheral side of the endless circulation passage 1028. Embodiment 2-3 is an example where each of the rolling-element accommodation sections 1055C enables removable insertion of the ball 1046, which are to be accommodated between mutually-opposing space sections, toward both the inner and outer peripheral sides of the endless circulation passage 1028.

As shown in FIG. 16B, in relation to spacer sections 1051C of a rolling-element accommodation belt 1073, a pair of rolling-element contact surfaces 1054C and 1054C are planes, and each of rolling-element accommodation sections 1055C located among adjacent spacer sections 1051C does not constrain the ball 1046 toward the inner or outer peripheral side of the endless circulation passage 1028. The space sections 1059C located at both end sections differ from the space sections 1059 of Embodiment 2-1 only in that a side of the spacer section 1059 opposite the side thereof facing the rolling-element accommodation section 1055C is flat. As illustrated in the drawing, this embodiment is an example where a position where the spacer sections 1059C located at the end sections are to be connected is deviated as in the case of Embodiment 2-1. The amount of offset is equal to the amount of offset F1 described in connection with Embodiment 2-1.

As in the case of Embodiment 2-1, the balls 1046 can be readily inserted into the respective rolling-element accommodation sections 1055C from the side at which the balls are removably inserted, even in the linear guide of Embodiment 2-3 configured as mentioned above. Consequently, the efficiency of operation for inserting the balls 1046 into the rolling-element accommodation belt 1073 can be enhanced.

Moreover, when the rolling-element accommodation belt 1073 is inserted into the endless circulation passage 1028, the spacer sections 1059C located at the respective ends sections are connected to the other corresponding spacer sections 1051C at positions which are deviated toward the outer periphery of the endless circulation passage 1028 by the amount of offset F1. Accordingly, as shown in FIG. 16C, in each of the spacer sections 1059C located at the respective end sections, the rolling-element contact surfaces 1054 facing the spacer sections 1059C are pushed in the inner-periphery direction of the endless circulation passage 1028 by the ball 1046 located at the end section. Since a flexion toward the inner periphery side can be imparted to the leading end, the leading end of the rolling-element accommodation belt 1073 can be smoothly guided, while being oriented toward the direction of circulation thereof, into the direction-change passage 1024 along an interior wall of the endless circulation passage 1028 or the guide groove 1060 when approaching the direction-change passage 1024. Hence, there can be lessened circulation resistance originating from friction of the interior wall of the endless circulation passage 1028 or the guide groove 1060 against the leading end of the rolling-element accommodation belt 1073. Consequently, the linear guide 1010 can be operated smoothly.

The flexion of the leading end of the rolling-element accommodation belt 1073 toward the inner periphery side is not imparted previously but arises as a result of the rolling-element contact surfaces 1054 of the spacer section 1059 connected at the position deviated by the amount of offset F1 being pushed by the ball 1046 located at the end section. Therefore, the flexion does not affect the degree of flexion achieved during use of the rolling-element accommodation belt. Consequently, the necessity for paying special attention during the operation of handling the linear guide is obviated, and the rolling-element accommodation belt is easy to handle.

Embodiment 2-4

Embodiment 2-4 of the present invention will now be described. The linear guide of Embodiment 2-4 differs from the linear guide of Embodiment 2-1 in terms of only the configuration of the rolling-element accommodation belt and the configuration of the line of rolling elements. In other respects, the linear guides are identical in configuration with each other. Hence, explanations are given solely to differences, and explanations about other aspects are omitted.

Figure 17A:
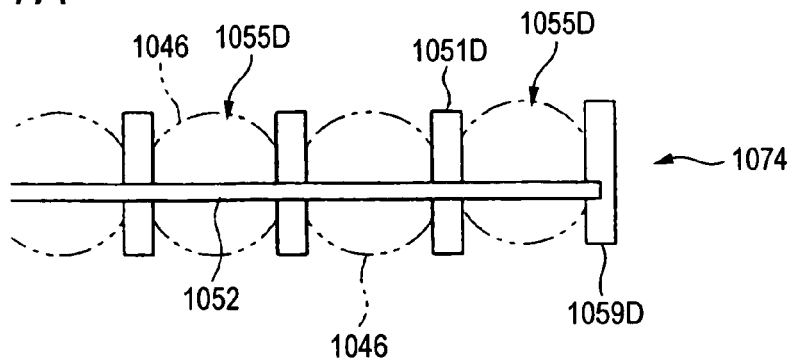
FIG. 17A is a fragmentary enlarged side view of the developed, stretched, rolling-element accommodation belt of Embodiment 2-4 including an end section.
Figure 17B:
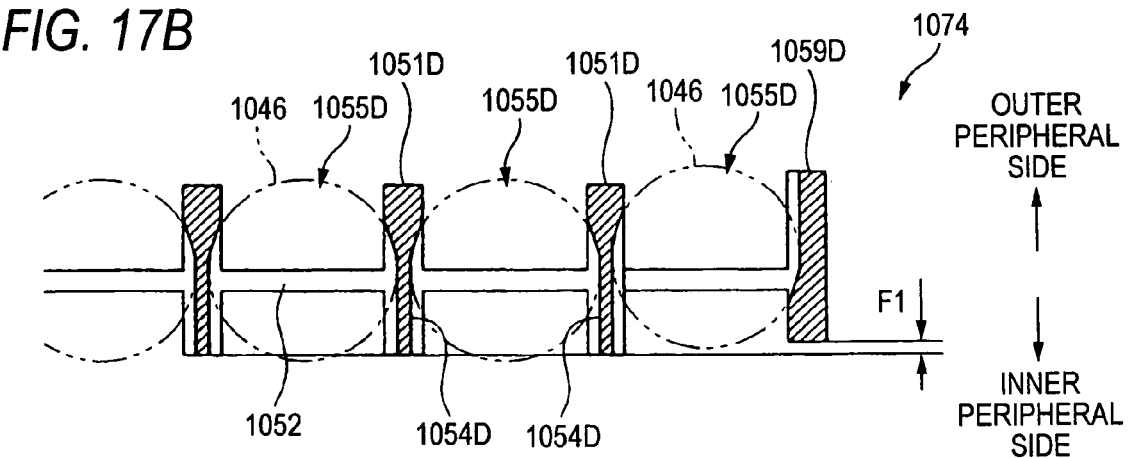
FIG. 17B is a cross-sectional view of FIG. 17A acquired in a direction in which rolling elements are arranged.
Figure 17C:
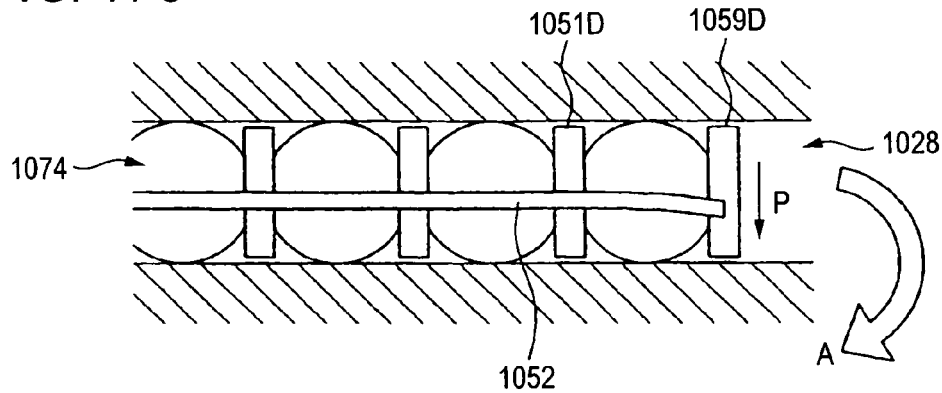
FIG. 17C is a fragmentary enlarged view of a rolling-element accommodation belt in a usage state, where the belt is attached to the linear guide of FIG. 17A including the end section of the belt.

FIG. 17 is a view for describing a rolling-element accommodation belt of Embodiment 2-4. FIG. 17A is a fragmentary enlarged side view of the developed, stretched rolling-element accommodation belt including an end section; FIG. 17B is a cross-sectional view of the rolling-element accommodation belt acquired in a direction where rolling elements are arranged; and FIG. 17C is a fragmentary enlarged view of the rolling-element accommodation belt which includes the end section of the belt and is in use while being attached to the linear guide.

In relation to the linear guide of Embodiment 2-1, the pair of rolling-element contact surfaces 1054 among the rolling-element accommodation sections 1055 have been described by reference to the example where the balls 1046 to be accommodated between the pair of rolling-element contact surfaces are held in a slidable manner while being constrained on the inner peripheral side of the endless circulation passage 1028. Embodiment 2-4 is an example where each of the rolling-element accommodation sections 1055D slidably retains the ball 1046 to be accommodated in the rolling-element accommodation section 1055D while constraining the ball toward both the outer peripheral side of the endless circulation passage 1028. Specifically, as shown in FIG. 17B, this rolling-element accommodation belt 1074 differs from the rolling-element accommodation belt 1050 of Embodiment 2-1 only in that the pair of rolling-element contact surfaces 1054D of the spacer sections 1051D are formed so as to face the inner periphery side of the endless circulation passage 1028 and the pair of rolling-element contact surfaces 1054 of the spacer sections 1051 of Embodiment 2-1 are formed so as to face the outer periphery side of the endless circulation passage 1028. However, only the spacer sections 1059D located at the respective end sections are formed in the same manner as are the rolling-element contact surfaces 1054 of Embodiment 2-1.

Specifically, the spacer sections 1059D are formed such that the rolling-element contact surfaces 1054 facing the rolling-element accommodation sections 1055D located at the respective end sections are formed so as not to constrain the ball 1046 to be accommodated therein toward the outer periphery side of the endless circulation passage 1028 but to constrain the same toward the inner periphery side of the same as do the rolling-element contact surfaces 1054 of Embodiment 2-1. Only the spacer sections 1059D located at the end sections are connected to the corresponding spacer sections 1051 at the positions deviated toward the outer periphery side of the endless circulation passage 1028 by the amount of offset F1.

As a result, the spacer sections 1059d located at the respective end sections are connected to the corresponding spacer sections 1051D at the amount of offset F1. The rolling-element contact surfaces 1054 serve as contact surfaces which contact the balls 1046 to be accommodated into the other rolling-element accommodation sections 1055D such that the balls are deviated toward the outer periphery side of the endless circulation passage 1028. Consequently, the linear guide of Embodiment 2-4 can yield the same working-effects as those yielded by Embodiment 2-1.

Embodiment 2-5

Embodiment 2-5 of the present invention will now be described. The linear guide of Embodiment 2-5 differs from the linear guide of Embodiment 2-1 in terms of only the configuration of the rolling-element accommodation belt and the configuration of the line of rolling elements. In other respects, the linear guides are identical in configuration with each other. Hence, explanations are given solely to differences, and explanations about other aspects are omitted.

Figure 18A:
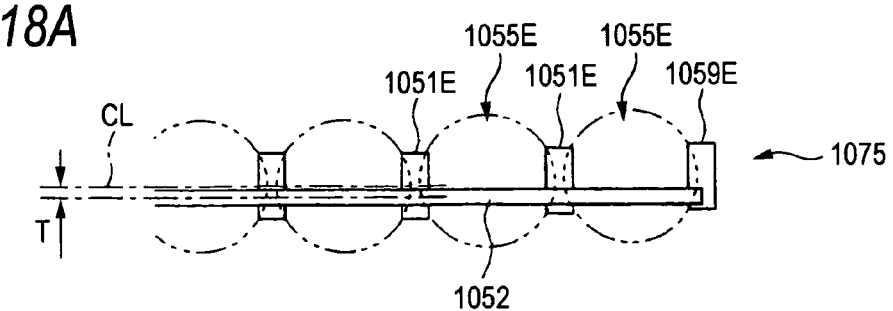
FIG. 18A is a fragmentary enlarged side view of the developed, stretched, rolling-element accommodation belt of Embodiment 2-5 including an end section.
Figure 18B:
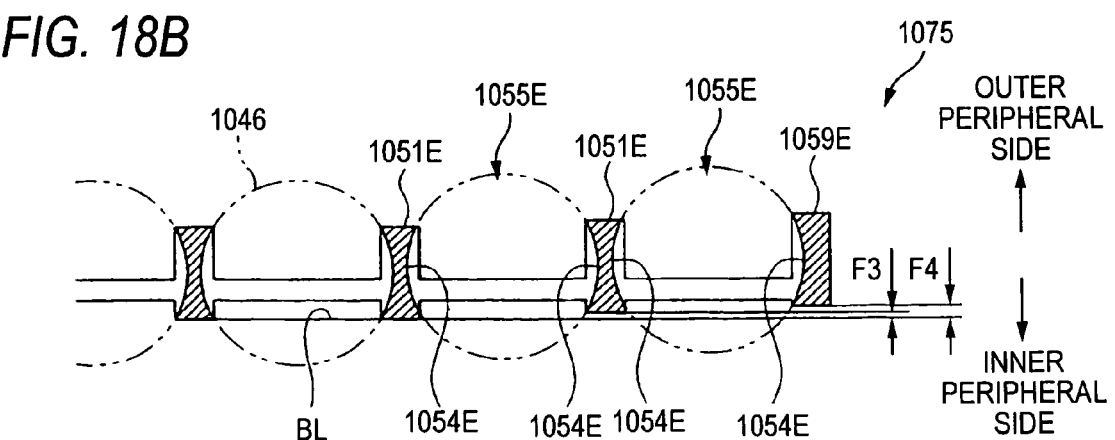
FIG. 18B is a cross-sectional view of FIG. 18A acquired in a direction in which rolling elements are arranged.
Figure 18C:
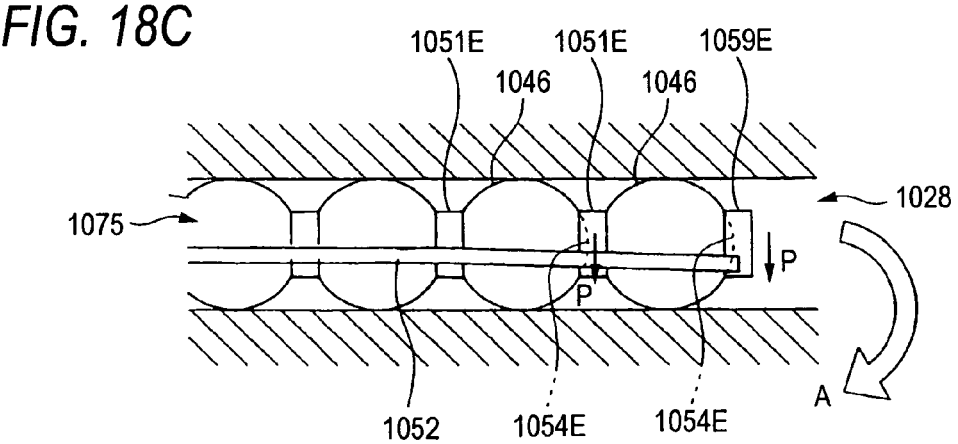
FIG. 18C is a fragmentary enlarged view of the rolling-element accommodation belt of FIG. 18A.

FIG. 18 is a view for describing a rolling-element accommodation belt of Embodiment 2-5. FIG. 18A is a fragmentary enlarged side view of the developed, stretched rolling-element accommodation belt including an end section; FIG. 18B is a cross-sectional view of the rolling-element accommodation belt acquired in a direction where rolling elements are arranged; and FIG. 18C is a fragmentary enlarged view of the rolling-element accommodation belt which includes the end section of the belt and is in use while being attached to the linear guide.

The previous embodiments have described an example configuration where a first level of shift (i.e., the amount of offset) is provided for the end sections of the rolling-element accommodation belt. A rolling-element accommodation belt 1075 is an example where two levels of shift (amounts of offset) are provided for the end sections.

As shown in FIG. 18, the rolling-element accommodation belt 1075 is configured by means of comprising spacer sections 1051E and 1059E in place of the spacer sections 1051 and 1059 of Embodiment 2-1. The spacer sections 1051E and 1059E are short cylindrical members whose outer diameter is smaller than that of the ball 1046, as in the case of the spacer sections 1051 and 1059 described in connection with Embodiment 2-1. In the present embodiment, the spacer sections 1051E and 1059E are smaller in outer diameter than the spacer sections 1051 and 1059.

Each of the spacer sections 1051E and 1059E has a rolling-element contact surface 1054E which contacts the outer periphery of the ball 1046 in a slidable manner.

As shown in FIG. 18B, the rolling-element contact surface 1054E is formed, as a concave surface (a concave spherical surface) fitting around the curved surface of the ball 1046, on faces among short-cylindrical end faces of the respective spacer sections 1051E and 1059E facing the balls 1046 to be accommodated. An internal diameter defined between mutually-opposing rolling-element contact surfaces 1054E is nominally larger than the diameter of the ball 1046 to be accommodated so that the ball 1046 can roll. As a result, the pair of mutually-opposing rolling-element contact surfaces 1054E, 1054E are arranged so as to slidably retain the ball 1046 to be accommodated into each of the rolling-element accommodation sections 1055E while constraining the ball in every direction. A remaining side of the spacer section 1059E located at the end section, the side being opposite the side of the spacer section facing the rolling-element accommodation section 1055C, is flat.

In the rolling-element accommodation belt 1075, as in the case of Embodiment 2-1, a position where the spacer sections 1051E are connected together by means of a pair of connection sections 1052 is deviated, by the amount of offset T, toward the inner periphery side of the endless circulation passage 1028 when the belt is in use, with reference to the line CL connecting the centers of the balls 1046 to be accommodated. On the assumption that a phantom line connecting bottom portions of the respective spacer sections 1051E located at the position deviated by the amount of offset T is taken as reference BL, the spacer sections 1059E located at both end sections and adjacent spacer sections 1051E are connected at positions deviated toward the outer periphery side of the endless circulation passage 1028.

Specifically, the spacer sections 1059E located at the respective end sections are connected together at positions which are deviated by an amount of offset F4 toward the outer periphery side of the endless circulation passage 1028. Moreover, the spacer sections 1051E adjacent to the spacer section 1059E are connected at positions which are deviated by an amount of offset F3 toward the outer periphery side of the endless circulation passage 1028. The amount of offset F4 is greater than the amount of offset F3. In the present embodiment, in relation to the diameter of the ball 1046=4.76 mm, there are set the amount of offset F3=0.2 mm and the amount of offset F4=0.4 mm. In this embodiment, the rolling-element contact surface 1054E of the spacer section 1059E located at either end section corresponds to the second contact surface. Moreover, among the rolling-element contact surfaces 1054E of the spacer sections 1051E adjacent to the spacer sections 1059E located at the respective end sections, the rolling-element contact surface 1054E facing a direction opposite the rolling-element accommodation section 1055 located at the end section side corresponds to the third contact surface.

According to the linear guide of Embodiment 2-5, when the rolling-element accommodation belt 1075 is inserted into the endless circulation passage 1028, the spacer sections 1059E located at the respective ends sections are connected to the adjacent spacer sections 1051E at positions which are deviated in relation to the other spacer sections 1051E toward the outer periphery of the endless circulation passage 1028 by the amounts of offsets F3 and F4, respectively. Accordingly, as shown in FIG. 18C, in each of the spacer sections 1059E and the adjacent spacer sections 1051E, the rolling-element contact surface 1054E is pushed toward the inner peripheral side of the endless circulation passage 1028 by means of the balls 1046 located at the end sections and the balls 1046 accommodated adjacently thereto. Since a flexion toward the inner periphery side can be imparted to the leading end of the rolling-element accommodation element 1075, the leading end of the rolling-element accommodation belt 1075 can be smoothly guided, while being oriented toward the direction of circulation thereof, into the direction-change passage 1024 along an interior wall of the endless circulation passage 1028 or the guide groove 1060 when approaching the direction-change passage 1024. Hence, there can be lessened circulation resistance originating from friction of the interior wall of the endless circulation passage 1028 or the guide groove 1060 against the leading end of the rolling-element accommodation belt 1075. Consequently, the linear guide can be operated smoothly.

The flexion of the leading end of the rolling-element accommodation belt 1075 toward the inner periphery side is not imparted previously but arises as a result of the rolling-element contact surfaces 1054E of the spacer sections 1059E being connected at the positions deviated by the amounts of offsets F3 and F4 and, therefore, being pushed by the balls 1046 located at the end sections and the balls 1046 accommodated adjacently thereto. Therefore, the flexion does not affect the degree of flexion achieved during use of the rolling-element accommodation belt. Consequently, the necessity for paying special attention during the operation of handling the linear guide is obviated, and the rolling-element accommodation belt is easy to handle.

This rolling-element accommodation belt 1075 is configured such that the amount of offset is imparted to the plurality of balls 1046 from the leading end. Accordingly, as in the case of, e.g., Embodiment 2-1, the rolling-element accommodation belt can be smoothly circulated as compared with the configuration where only the balls 1046 located at the leading ends are offset.

The reason for this is that, because the rolling-accommodation belt is formed from an elastic resin material, force develops between the rolling-element accommodation belt and the balls by means of the spring effect derived from elastic force when the belt is flexed. When the force is great, frictional force developing between the balls and the rolling-element accommodation belt increases. Accordingly, smooth circulation of the rolling-element accommodation belt is inhibited. The larger the flexion per unit length of the rolling-element accommodation belt, the greater the force required to flex the rolling-element accommodation belt. Specifically, the more gentle the flexion of the rolling-element accommodation belt, the smaller the force required to flex the rolling-element accommodation belt. Consequently, as in the case of this rolling-element accommodation belt 1075, so long as the amount of offset has been imparted to the plurality of balls 1046 from the leading end, the rolling-element accommodation belt can be flexed gently as compared with the case where the amount of offset is imparted solely to the ball 1046 located at the leading end, so that the rolling-element accommodation belt can be circulated more smoothly.

Particularly, according to the rolling-element accommodation belt 1075, the amount of offset F3 imparted to the spacer sections 1051E adjacent to the spacer sections 1059E and the amount of offset F4 imparted to the spacer sections 1059E located at the respective end sections are made different from each other. Flexion is made greater stepwise by means of making the amount of offset F4 greater than the amount of offset F3. Accordingly, the rolling-element accommodation belt can be flexed more smoothly.

Embodiment 2-6

Embodiment 2-6 of the present invention will now be described. A linear guide of Embodiment 2-6 differs from that described in connection with Embodiment 2-5 in terms of only the configuration of the rolling-element accommodation belt. The linear guides are identical in terms of other elements. Hence, explanations are given to points of difference, and explanations of other aspects are omitted.

Figure 19A:
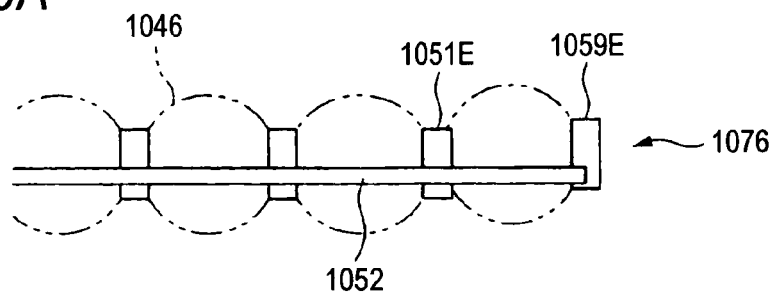
FIG. 19A is a fragmentary enlarged side view of the developed, stretched rolling-element accommodation belt of Embodiment 2-6 including an end section.
Figure 19B:
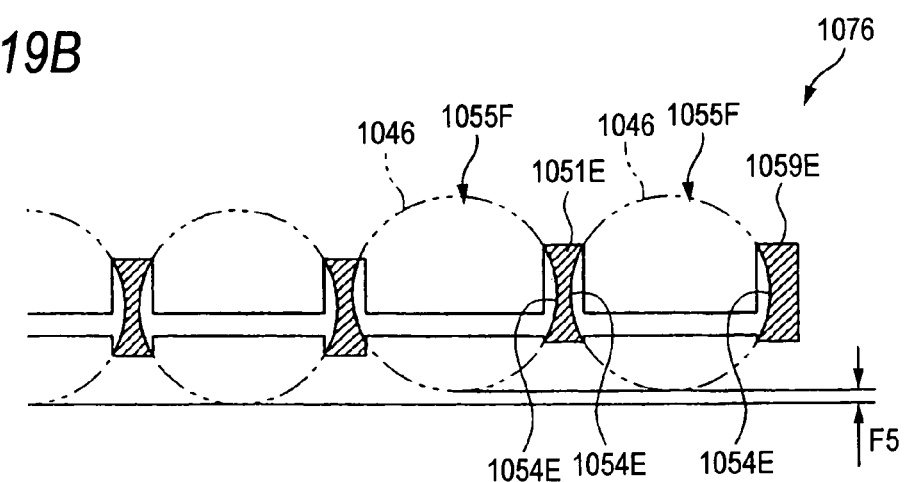
FIG. 19B is a cross-sectional view of FIG. 19A acquired in a direction in which balls are arranged.
Figure 19C:
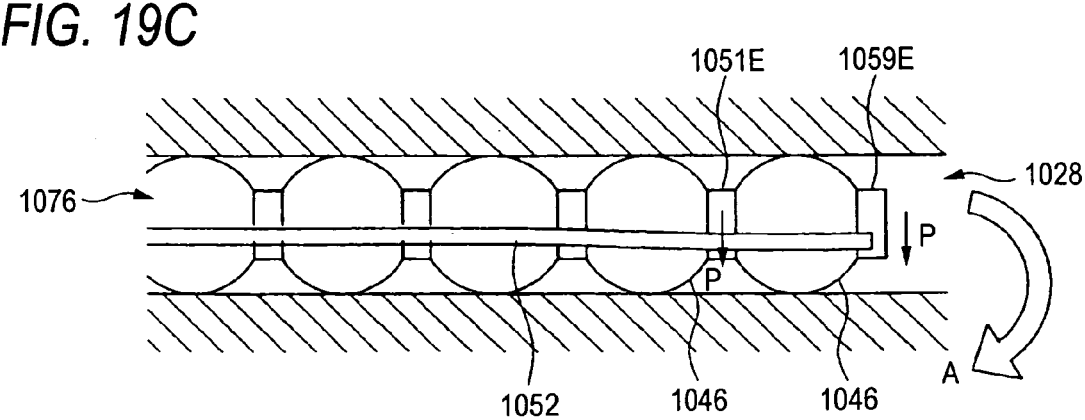
FIG. 19C is a fragmentary enlarged view of the rolling-element accommodation belt of FIG. 19A including the end section.

FIG. 19 is a view for describing the rolling-element accommodation belt of Embodiment 2-6; FIG. 19A is a fragmentary enlarged side view of the developed, stretched rolling-element accommodation belt including an end section; FIG. 19B is a cross-sectional view of the rolling-element accommodation belt acquired in a direction where balls are arranged; and FIG. 19C is a fragmentary enlarged view of the rolling-element accommodation belt when in use while being attached to a linear guide.

Embodiment 2-5 has been described by reference to the example where the amounts of shift (the amounts of offsets F3 and F4) are imparted stepwise to the plurality of balls 1046 from the leading end of the rolling-element accommodation belt 1075. A rolling-element accommodation belt 1076 differs from that described in connection with Embodiment 2-5 only in that the amount of shift in one level (i.e., a single amount of offset) is provided.

As shown in FIG. 19B, in this rolling-element accommodation belt 1076, the spacer sections 1059E located at the respective end sections and the spacer sections 1051E adjacent to the spacer sections 1059E are connected together at locations which are deviated toward the outer periphery side of the endless circulation passage 1028 by a single amount of offset F5. As a result, the rolling-element contact surfaces 1054E—which contact the balls 1046 accommodated in rolling-element accommodation sections 1055F located at the end sections and adjacent thereto—serve as contact surfaces which constrain movement of the respective spacer sections 1051E and 1059E toward the outer periphery side of the endless circulation passage 1028 and which cause the spacer sections 1051E and 1059E to deviate toward the outer periphery side of the endless circulation passage 1028 by the amount of offset F5.

Consequently, as shown in FIG. 19C, as compared with the configuration where only the ball 1046 located at the leading end is offset as in, e.g., Embodiment 2-1, the linear guide of Embodiment 2-6 can also flex the rolling-element accommodation belt more gently. Accordingly, the rolling-element accommodation belt can be circulated smoothly.

Embodiment 2-7

Embodiment 2-7 of the present invention will now be described. A linear guide of Embodiment 2-7 differs from that described in connection with Embodiment 2-1 in terms of only the configuration of the rolling-element accommodation belt. The linear guides are identical in terms of other elements. Hence, explanations are given to points of difference, and explanations of the other aspects are omitted.

FIG. 20 is a view for describing the rolling-element accommodation belt of Embodiment 2-7; FIG. 20A is a fragmentary enlarged side view of the developed, stretched rolling-element accommodation belt including an end section; FIG. 20B is a side view of the rolling-element accommodation belt; FIG. 20C is a cross-sectional view of the rolling-element accommodation belt acquired in a direction where balls are arranged; and FIG. 20D is a fragmentary enlarged view of the rolling-element accommodation belt in use while being attached to a linear guide.

As illustrated, a rolling-element accommodation belt 1077 does not have any spacer sections. Specifically, only a pair of connection sections 1052 are formed into the shape of an elongated strip (i.e., the shape of a belt). Ball accommodation holes 1053 are opened in mutually-opposing areas of the pair of connection sections 1052 as rolling-element accommodation sections 1055G which individually accommodate the balls 1046. A latch claw section 1058 is provided at either end of this rolling-element accommodation belt 1077 (see FIG. 20B).

Figure 20A:
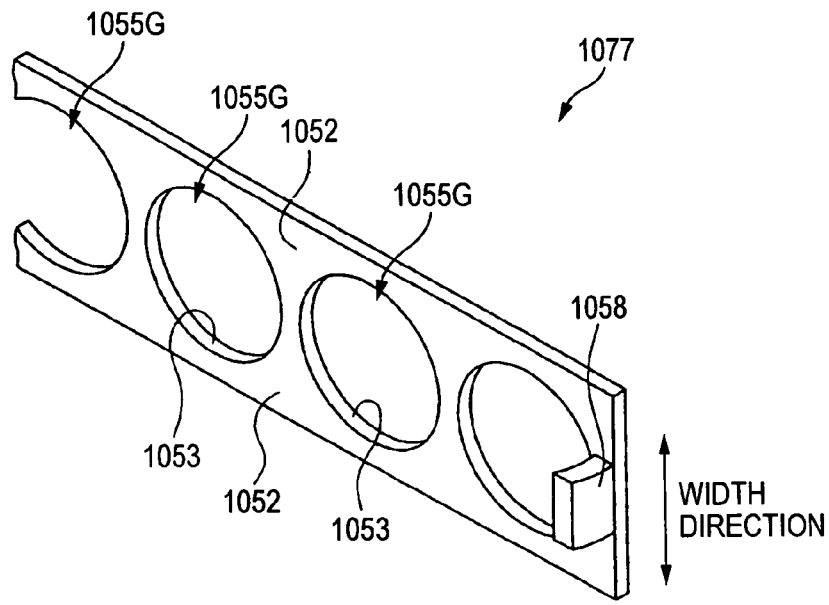
FIG. 20A is a fragmentary enlarged side view of the developed, stretched rolling-element accommodation belt of Embodiment 2-7 including an end section.
Figure 20B:
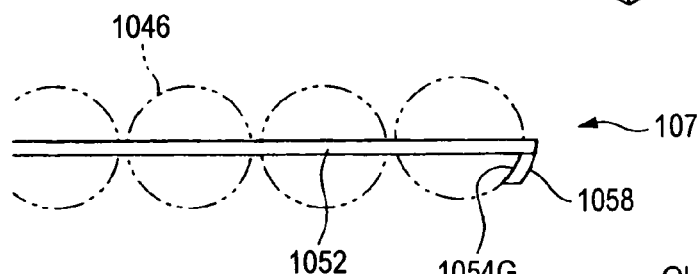
FIG. 20B is a side view of FIG. 20A.
Figure 20C:
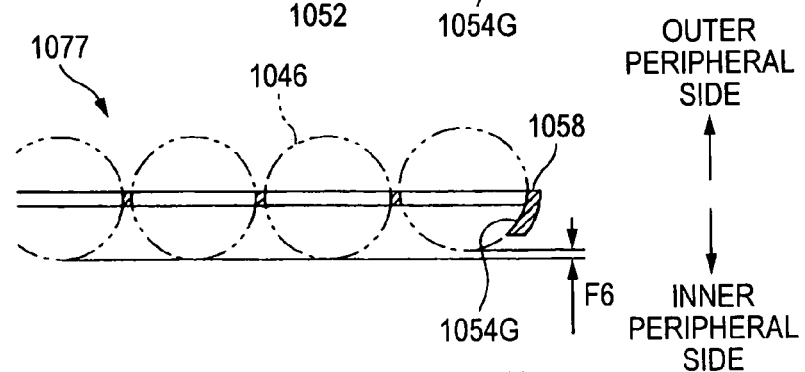
FIG. 20C is a cross-sectional view of FIG. 20A acquired in a direction where balls are arranged.

When viewed from above, the latch claw section 1058 assumes a rectangular shape of such a size as not to cause interference with the interior wall of the endless circulation passage 1028 and the guide groove 1060. As shown in FIG. 20C, the latch claw section 1058 is a plate-like member which, when viewed from the side, curves along the ball 1046 accommodated into the ball accommodation hole 1053 (the rolling-element accommodation section 1055G) formed in the area where the pair of connection sections 1052 oppose each other. The surface of the latch claw section 1058 contacting the ball 1046 is formed as a rolling-element contact surface 1054G. This rolling-element contact surface 1054G is formed from a concave surface following the curved surface of the ball 1046. Moreover, the surface of the latch claw section 1058 serves also as a surface which contacts the ball 1046 accommodated in the ball accommodation hole 1053 located at the end section so as to cause the ball to deviate toward the outer periphery side of the endless circulation passage 1028 by an amount of offset F6 in relation to the balls 1046 accommodated in the remaining ball accommodation holes 1053. The amount of offset F6 is equal to the amount of offset F1 described in connection with Embodiment 2-1.

As in the case of Embodiment 2-1, the balls 1046 can be readily inserted into the respective rolling-element accommodation holes 1053 (the rolling-element accommodation sections 1055G) even in the linear guide of Embodiment 2-7 configured as mentioned above. Consequently, the efficiency of operation for inserting the balls 1046 into the rolling-element accommodation belt 1077 can be enhanced.

Figure 20D:
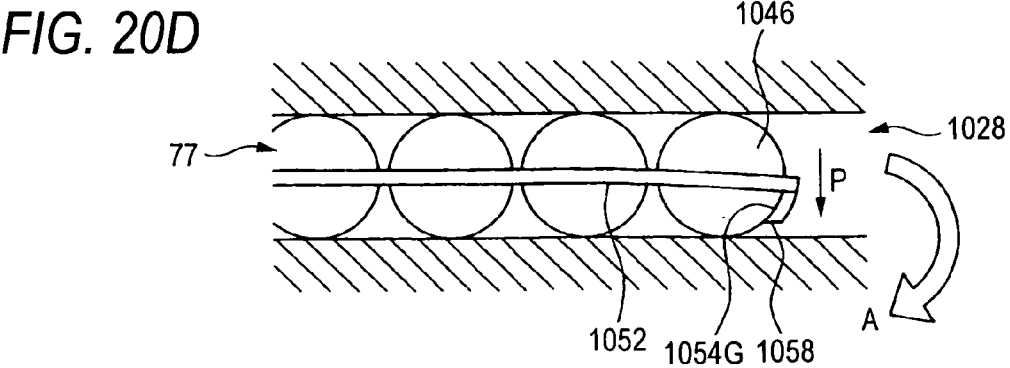
FIG. 20D is a fragmentary enlarged view of a rolling-element accommodation belt in a usage state, where the belt is attached to the linear guide of FIG. 20A including the end section of the belt.
Figure 21:
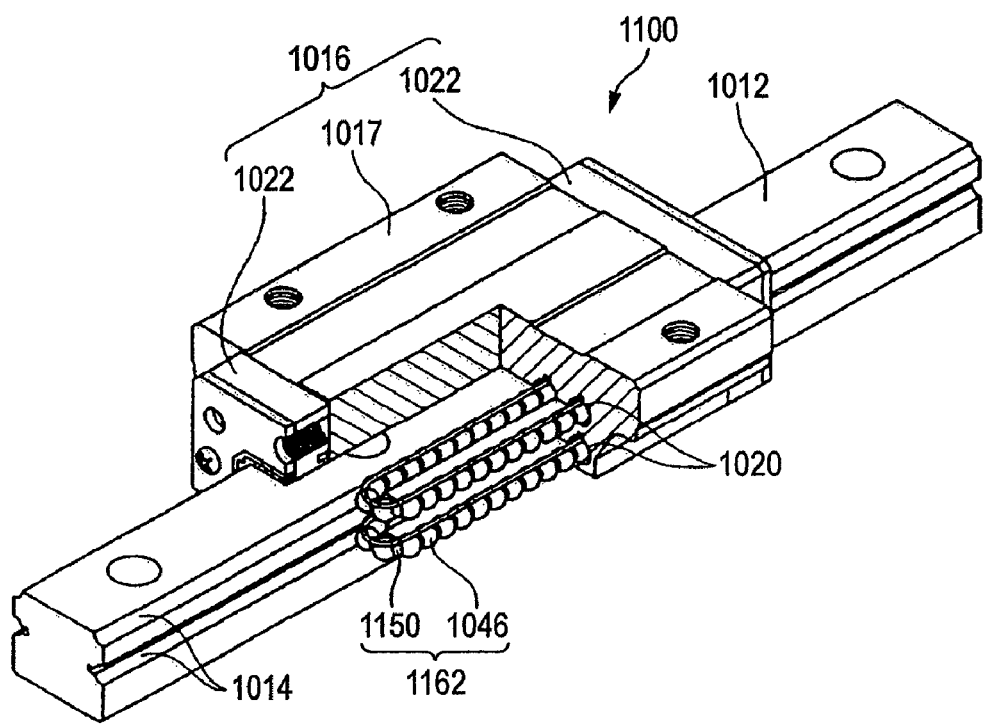
FIG. 21 is a perspective view for describing an example of a related-art linear guide apparatus.
Figure 22:
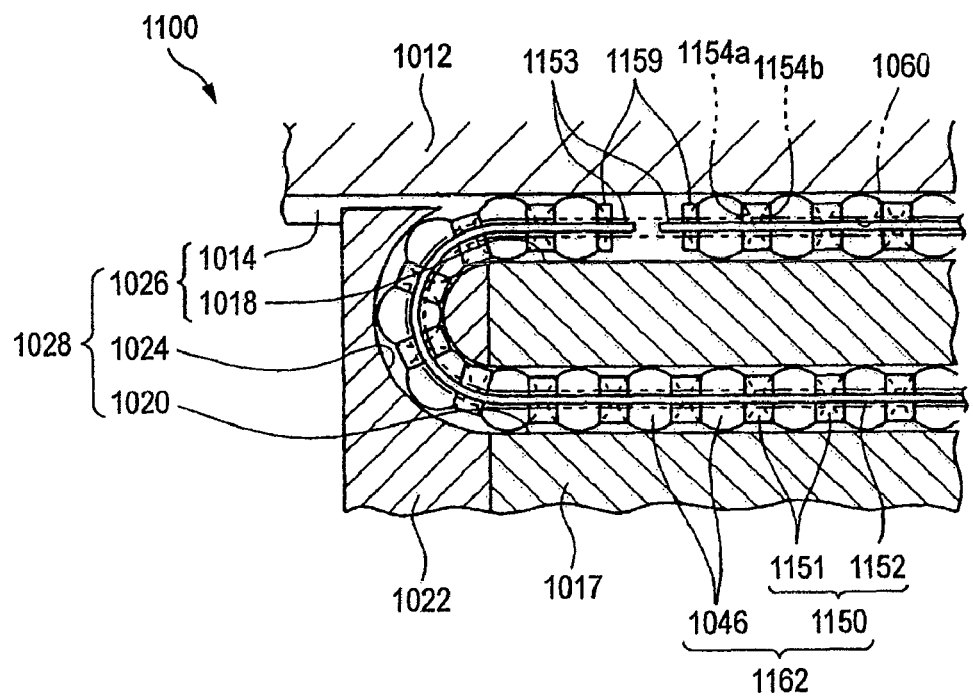
FIG. 22 is a cross-sectional view of an endless circulation passage of the related-art linear guide apparatus taken along a direction in which rolling elements are arranged.

Moreover, as shown in FIG. 20D, when the rolling-element accommodation belt 1077 is inserted into the endless circulation passage 1028, the rolling-element contact surfaces 1054G of the latch claw sections 1058 located at the respective ends sections are pushed toward the inner periphery side of the endless circulation passage 1028 by the balls 1046 located at the end sections. Hence, there can be lessened circulation resistance originating from friction of the interior wall of the endless circulation passage 1028 or the guide groove 1060 against the leading end of the rolling-element accommodation belt 1077. Consequently, the linear guide can be operated smoothly.

Even in this rolling-element accommodation belt 1077, as in the case of the respective embodiments, the flexion is not imparted previously but arises as a result of the rolling-element contact surface 1054G being pushed by the ball 1046 located at the end section. Therefore, the flexion does not affect the degree of flexion achieved during use of the rolling-element accommodation belt. Consequently, the necessity for paying special attention during the operation of handling the linear guide is obviated, and the rolling-element accommodation belt is easy to handle.

Particularly, according to the rolling-element accommodation belt 1072, the side of the belt provided with the latch claw section 1058 comes to the inner periphery side of the endless circulation passage 1028. However, the latch claw section 1058 can be readily, visually ascertained. Hence, at the time of insertion of the rolling-element accommodation belt 1072 into the endless circulation passage 1028, determination of the front or back of the belt is easy. Therefore, assembly of the rolling-element accommodation belt is easy.

The rolling-element accommodation belt and the linear guide apparatus equipped therewith, both of which pertain to the present invention, are not limited to those mentioned in connection with the embodiments but are susceptible to various modifications without departing from the scope of the present invention.

For instance, the respective embodiments have described the case where the rolling element is a ball. However, the present invention is not limited to the case. Even in a case where the rolling element is, e.g., a roller, similar working-effects are yielded.

The rolling-element accommodation belt and the linear guide apparatus equipped therewith, both of which pertain to the present invention, are not limited to those mentioned in connection with the embodiments; and, as a matter of course, the configurations of the embodiments can be combined as appropriate.

For instance, Embodiment 2-2 has illustrated the case where the rolling-element contact surfaces 1054A provided on the mutually-opposing sides of the spacer sections 1059B of the rolling-element accommodation belt 1072 correspond to the first contact surfaces. Other embodiments can be further provided with the first contact surfaces of the present invention. The same also applies to the third contact surface. Embodiment 1 or Embodiment 2-2 can also additionally be provided with the third contact surface of the present invention.

Moreover, for example, the first through third contact surfaces have been described by reference to the case where the surface contacts the rolling element, which is to be accommodated into the rolling-element accommodation section not having any contact surface, so as to offset the rolling element toward the outer periphery side of the endless circulation passage. However, the working-effects of the present invention can be yielded, so long as the first through third contact surfaces have become contact surfaces that contact at least the rolling elements—which are to be accommodated into the rolling-element accommodation sections adjacent to the rolling-element accommodation sections having these contact surfaces—such that the rolling elements are offset toward the outer periphery side of the endless circulation passage.

Specifically, flexion toward the inner periphery side can be imparted to the leading end of the rolling-element accommodation belt, so long as the first contact surface has become a surface that contacts a rolling element—which is to be accommodated into the rolling-element accommodation section formed by the first contact surface—such that the rolling element is offset toward the outer periphery side of the endless circulation passage in relation to at least rolling elements to be accommodated into rolling-element accommodation sections located at the respective end sections.

Moreover, flexion toward the inner periphery side can be imparted to the leading end of the rolling-element accommodation belt, so long as the second contact surface has become a surface that contacts a rolling element—which is to be accommodated into the rolling-element accommodation section formed by the second contact surface—such that the rolling element is offset toward the outer periphery side of the endless circulation passage in relation to at least rolling elements to be accommodated into rolling-element accommodation sections located at the respective end sections.

Moreover, the third contact surface is formed in conjunction with at least one of the first contact surface and the second contact surface. Flexion toward the inner periphery side can be imparted to the leading end of the rolling-element accommodation belt, so long as the third contact surface has become a surface that contacts a rolling element—which is to be accommodated into the rolling-element accommodation section formed by the third contact surface—such that the rolling element is offset toward the outer periphery side of the endless circulation passage in relation to at least a rolling element to be accommodated into a rolling-element accommodation section located at a third position from either end section.

Embodiment 3

Embodiment 3 of the present invention will now be described by reference to the drawings. The present embodiment will be described by reference to a case where a ball is used as a rolling element. However, the configuration of the rolling element is not limited to the ball. For instance, a cylindrical roller may also be used as a rolling element.

Figure 39:
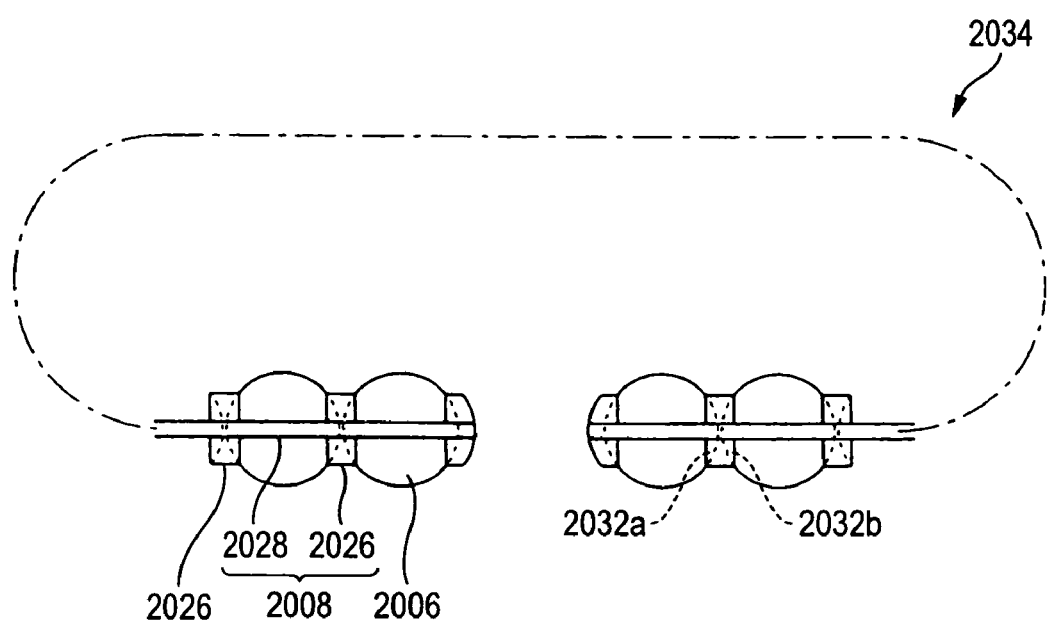
FIG. 39 is a view showing a line of rolling elements made up of related-art separators and rolling elements.
Figure 40:
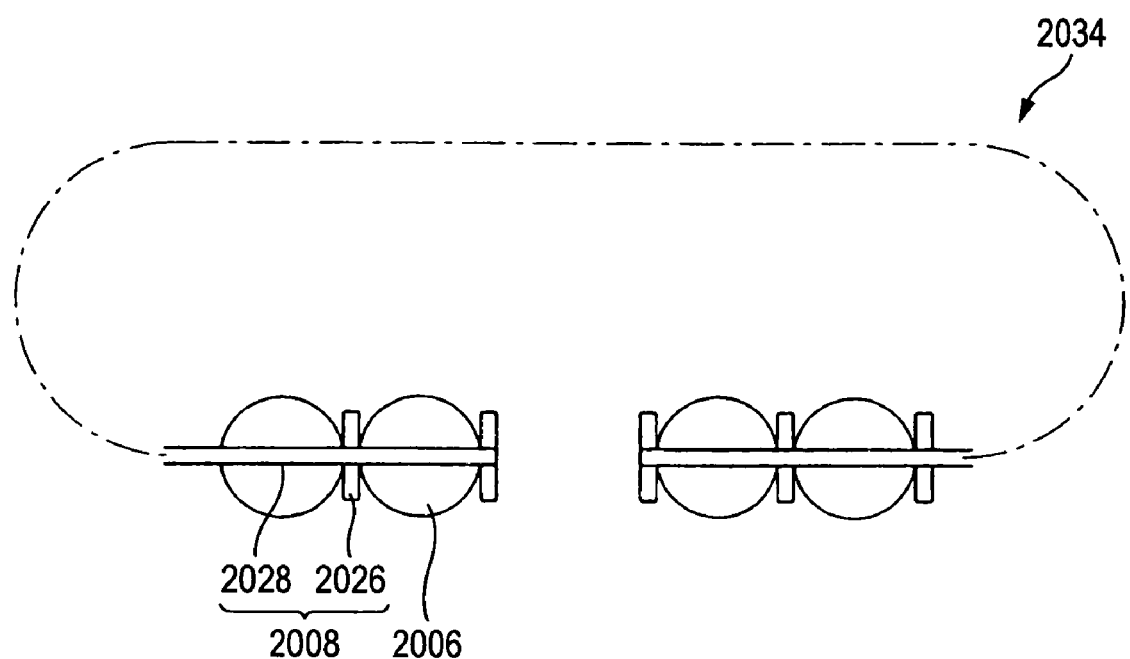
FIG. 40 is a view showing a line of rolling elements made up of related-art separators and rolling elements.
Figure 41:
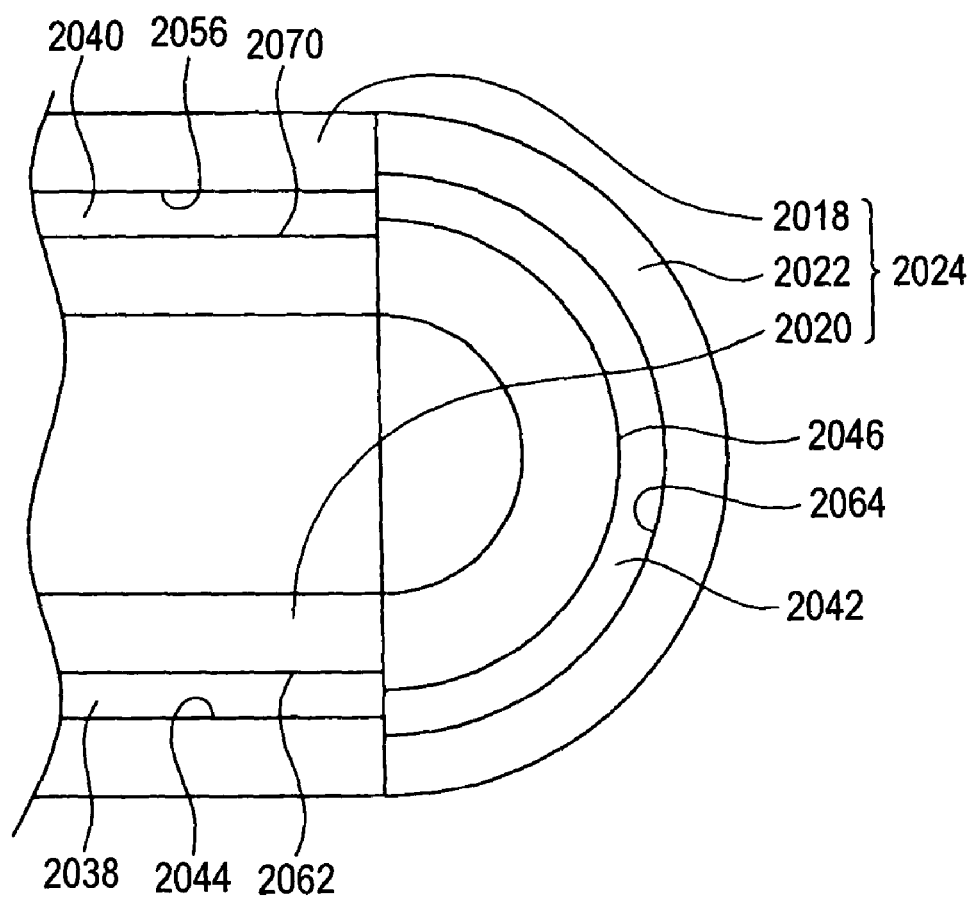
FIG. 41 is a view showing steps having arisen in a connection guide groove of a related-art linear guide apparatus.

First, the configuration of the embodiment will be described by reference to FIGS. 23 to 29. Those elements similar to those shown in FIGS. 39 to 41 are assigned the same reference numerals, and their repeated explanations are omitted.

Figure 23:
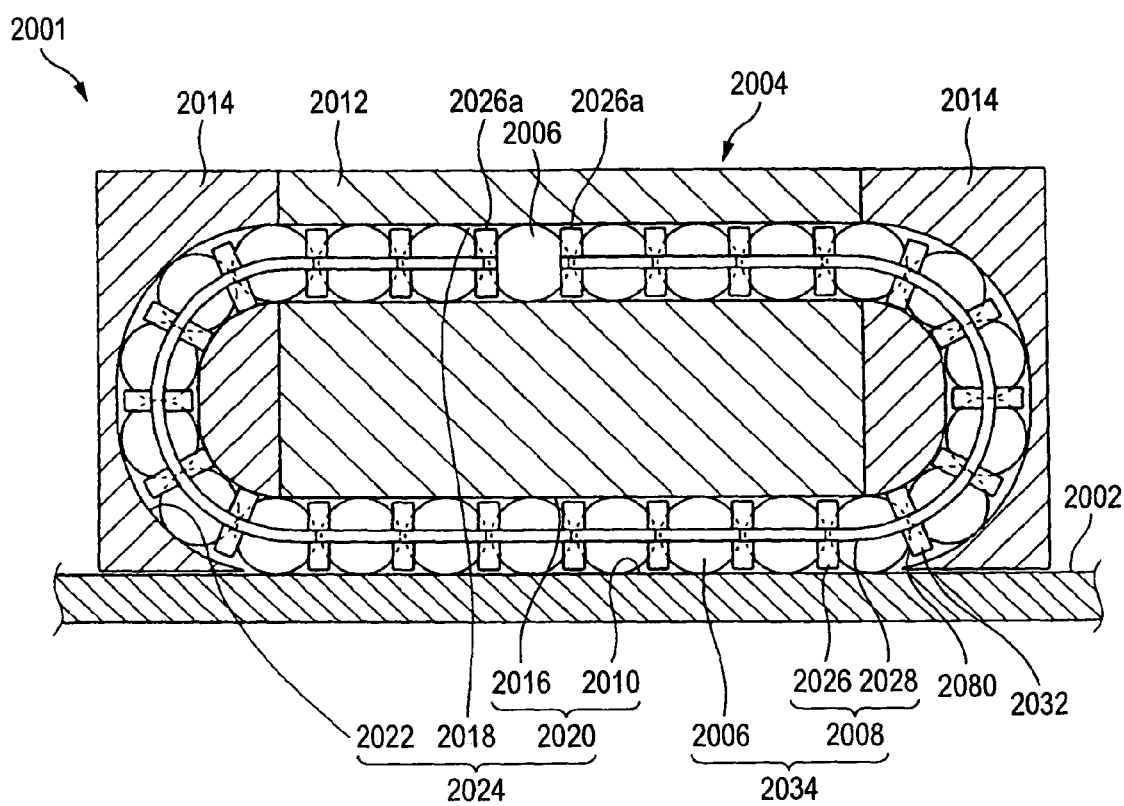
FIG. 23 is a view showing a linear guide apparatus of a third embodiment of the present invention.

FIG. 23 is a cross-sectional view showing the configuration of a linear guide apparatus 2001 of the present embodiment.

As shown in FIG. 23, the linear guide apparatus 2001 of the present embodiment comprises a guide rail 2002; a slider 2004 straddling the guide rail 2002 so as to be movable in relation to the guide rail 2002; a plurality of balls 2006 formed from steel; and separators 2008.

A rail-side rolling-element raceway groove 2010 extending in the axial direction thereof is formed in an exterior surface of the guide rail 2002.

The slider 2004 comprises a slider main body 2012; and end caps 2014 joined to the respective axial end faces of the slider main body 2012. The slider main body 2012 comprises a slider-side rolling-element raceway groove 2016 opposing the rail-side rolling-element raceway groove 2010, and a linear rolling-element return path 2018 parallel to the slider-side rolling-element raceway groove 2016. A linear load raceway 2020 is formed between the rail-side rolling-element raceway groove 2010 and the slider-side rolling-element raceway groove 2016. Each of the end caps 2014 has a circular-arc direction-change passage 2022 which brings the load raceway 2020 into mutual communication with the rolling-element return path 2018. Moreover, a rolling-element raceway 2024 is formed from the rolling-element return path 2018, the load raceway 2020, and the direction-change passage 2022. A plurality of balls 2006 are inserted into, the rolling-element raceway 2024 in a rotatable manner. Adjacent balls 2006 are arranged in a line at given intervals by means of the separators 2008.

The separators 2008 comprise a plurality of disk-shaped spacer sections 2026, and connection sections 2028 for connecting the adjacent spacer sections 2026 to each other. The spacer sections 2026 and the connection section 2028 are formed from a thermoplastic; e.g., PELPRENE (tradename) manufactured by Toyobo Co., Ltd., HYTREL (tradename) manufactured by Du Pont-Toray Co., Ltd., and PRIMALLOY (tradename) manufactured by Mitsubishi Chemical Corporation. The separator 2008 is formed by means of integrally forming the thus-formed spacer sections 2026 and the connection sections 2028.

The respective spacer sections 2026 are interposed among adjacent balls 2006. A recess section 2032 which contacts the outer periphery of the ball 2006 in a slidable manner is formed, as a section for retaining the ball 2006, in a flat surface section 2030 of the spacer section 2026 facing the ball 2006.

The connection sections 2028 are formed so as to be flexible along the rolling-element raceway 2024, and connect together the adjacent spacer sections 2026 such that a line of rolling elements 2034 consisting of the balls 2006 and the separators 2008 becomes endless within the rolling-element raceway 2024. Specifically, the spacer sections 2026 exclusive of spacer sections 2026a located at the respective ends are connected together by the connection sections 2028 within the rolling-element raceway 2024, and a single separator 2008 is positioned in a single rolling-element raceway 2024. Moreover, the connection sections 2028 are movably fitted to connection section guide grooves (not shown) formed in the rolling-element raceway 2024.

The configuration of the connection section guide grooves and the configuration of the rolling-element raceways 2024 will be described hereinbelow by reference to FIGS. 24 to 28.

Figure 24:
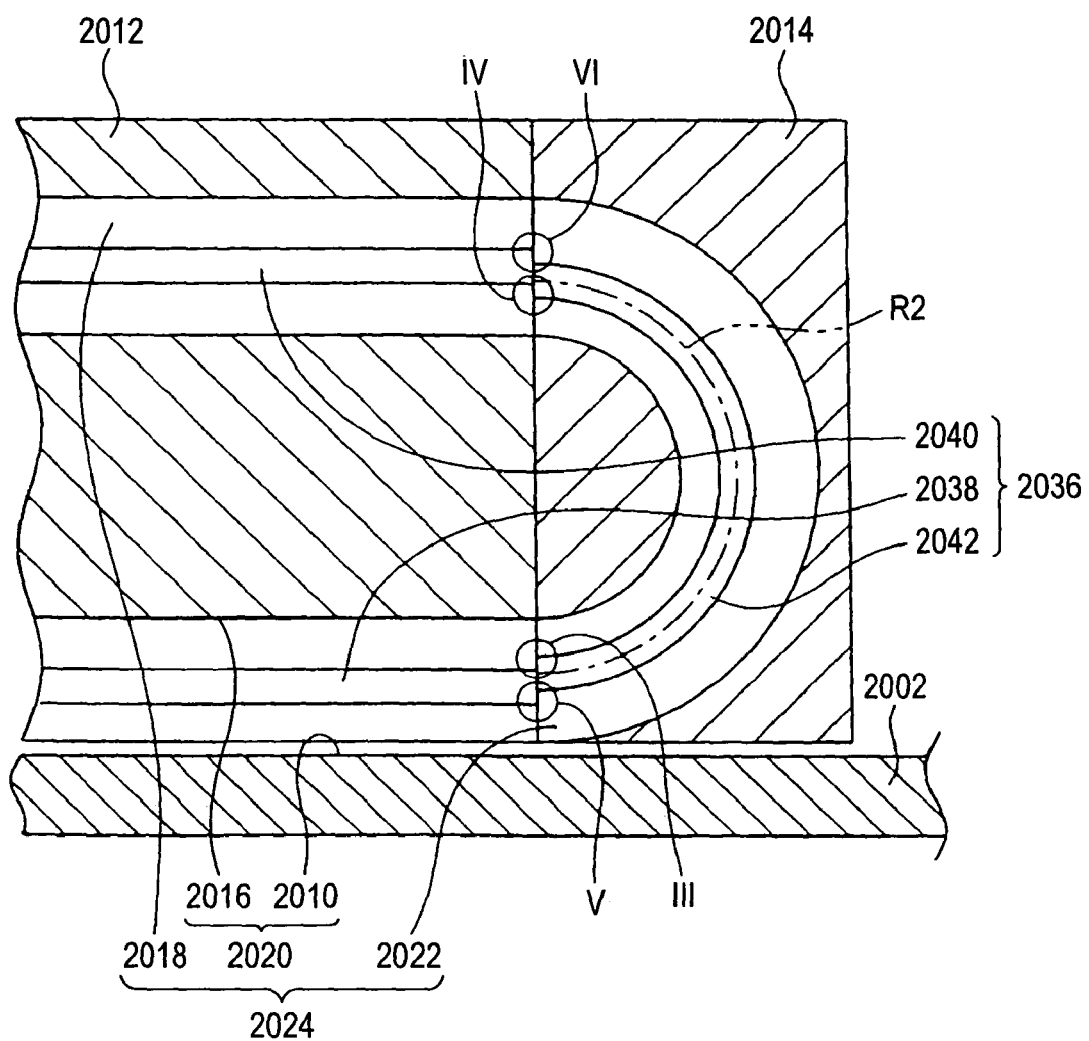
FIG. 24 is a view showing the configuration of a connection section guide groove.

FIG. 24 is a view showing the configuration of the connection section guide grooves.

As shown in FIG. 24, the connection section guide groove 2036 is formed into a shape continual along the rolling-element raceway 2024; and comprises a linear load guide section 2038 formed in the slider-side rolling-element raceway groove 2016; a linear return guide section 2040 formed in the rolling-element return passage 2018; and a circular-arc curved guide section 2042 formed in the direction-change passage 2022. A dashed line denoted by R2 in FIG. 24 indicates the curvature radius of the curved guide section 2042.

Figure 25:
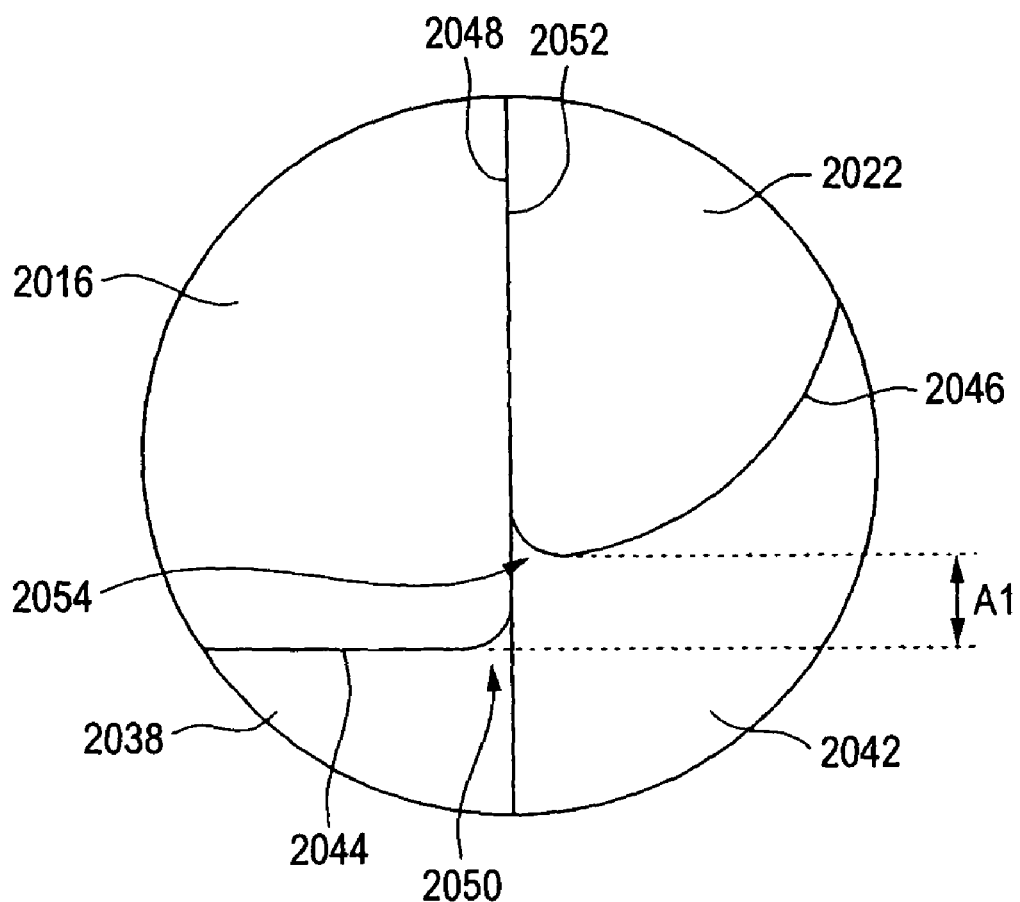
FIG. 25 is an enlarged view of an area indicated by circle III in FIG. 24.

FIG. 25 is a fragmentary enlarged view of an area indicated by circle III in FIG. 24.

As shown in FIG. 25, an inner circumferential surface 2044 of the load guide section 2038 is formed such that a portion of an inner circumferential surface 2044 of the load guide section 2038 close to the curved guide section 2042 protrudes toward the outer periphery side of the rolling-element raceway 2024 in relation to a portion of an inner circumferential surface 2046 of the curved guide section 2042 close to the load guide section 2038.

Moreover, the inner circumferential surface 2044 of the load guide section 2038 is formed such that a relational expression of A1<B/2 stands on the assumption that the amount of protrusion of the portion of the inner circumferential surface 2044 of the load guide section 2038 close to the curved guide section 2042 toward the outer periphery side of the rolling-element raceway 2024 is taken as A1 and that a clearance existing between the connection section 2028 and the connection section guide groove 2036 is taken as B.

An inner circumference load guide chamfered section 2050 is formed in the portion of the inner circumferential surface 2044 of the load guide section 2038 close to the curved guide section 2042. The inner circumference load guide chamfered section 2050 may be configured by means of R-chamfering a connection section between the inner circumferential surface 2044 of the load guide section 2038 and a slider-main-body-side opposing surface 2048 or R-chamfering a connection section between the inner circumferential surface 2044 of the load guide section 2038 and the inner circumferential surface 2046 of the curved guide section 2042. The inner circumference load guide chamfered section 2050 may also be formed by means of C-chamfering rather than R-chamfering.

A load-side inner circumference curved guide chamfered section 2054 is formed in a portion of the inner circumferential surface 2046 of the curved guide section 2042 close to the load guide section 2038. The load-side inner circumference curved guide chamfered section 2054 may be configured by means of R-chamfering a connection section between the inner circumferential surface 2046 of the curved guide section 2042 and an end-cap-side opposing surface 2052 or R-chamfering a connection section between the inner circumferential surface 2046 of the curved guide section 2042 and the inner circumferential surface 2044 of the load guide section 2038. Moreover, the load-side inner circumference guide chamfered section 2054 may be formed by means of C-chamfering rather than R-chamfering.

Figure 26:
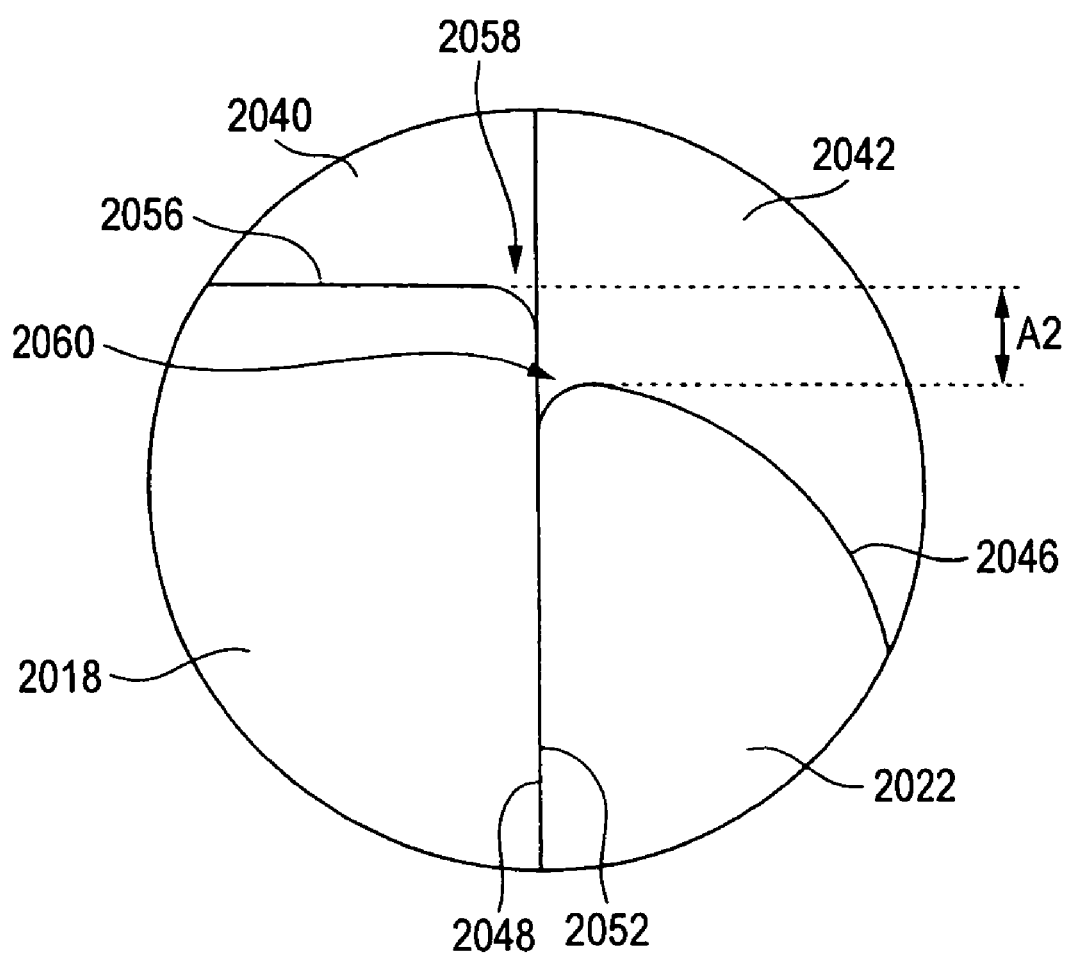
FIG. 26 is an enlarged view of an area indicated by circle IV in FIG. 24.

FIG. 26 is a fragmentary enlarged view of an area indicated by circle IV in FIG. 24.

As shown in FIG. 26, an inner circumferential surface 2056 of the return guide section 2040 is formed such that a portion of the inner circumferential surface 2056 of the return guide section 2040 close to the curved guide section 2042 protrudes toward the outer periphery side of the rolling-element raceway 2024 in relation to a portion of the inner circumferential surface 2046 of the curved guide section 2042 close to the return guide section 2040.

Moreover, the inner circumferential surface 2056 of the return guide section 2040 is formed such that a relational expression of A2<B/2 stands on the assumption that the amount of protrusion of the portion of the inner circumferential surface 2056 of the return guide section 2040 close to the curved guide section 2042 toward the outer periphery side of the rolling-element raceway 2024 is taken as A2 and that a clearance existing between the connection section 2028 and the connection section guide groove 2036 is taken as B.

An inner circumference return guide chamfered section 2058 is formed in the portion of the inner circumferential surface 2056 of the return guide section 2040 close to the curved guide section 2042. The inner circumference return guide chamfered section 2058 may be configured by means of R-chamfering a connection section between the inner circumferential surface 2056 of the return guide section 2040 and the slider-main-body-side opposing surface 2048 or R-chamfering a connection section between the inner circumferential surface 2056 of the return guide section 2040 and the inner circumferential surface 2046 of the curved guide section 2042. The inner circumference return guide chamfered section 2058 may also be formed by means of C-chamfering rather than R-chamfering.

A return-side inner circumference curved guide chamfered section 2060 is formed in a portion of the inner circumferential surface 2046 of the curved guide section 2042 close to the return guide section 2040. The return-side inner circumference curved guide chamfered section 2060 may be configured by means of R-chamfering the connection section between the inner circumferential surface 2046 of the curved guide section 2042 and the end-cap-side opposing surface 2052 or R-chamfering a connection section between the inner circumferential surface 2046 of the curved guide section 2042 and the inner circumferential surface 2056 of the return guide section 2040. Moreover, the return-side inner circumference guide chamfered section 2060 may be formed by means of C-chamfering rather than R-chamfering.

Figure 27:
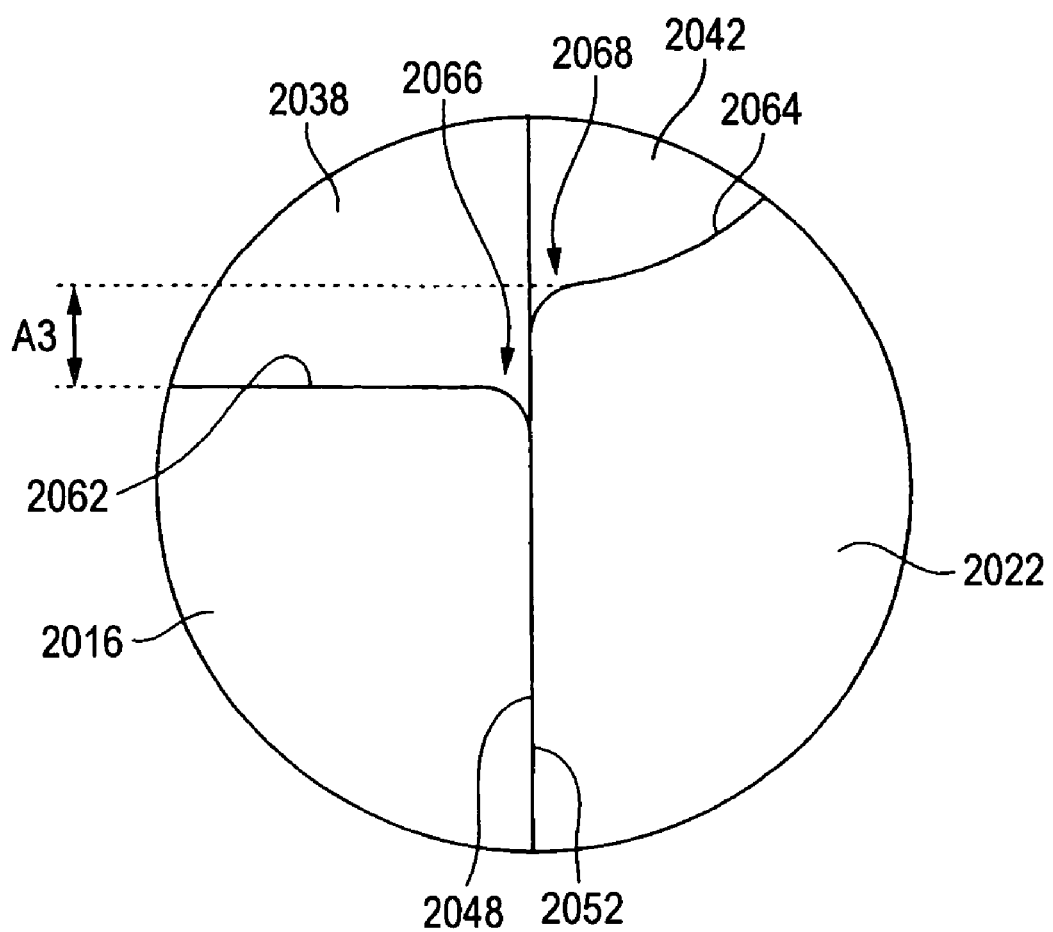
FIG. 27 is an enlarged view of an area indicated by circle V in FIG. 24.

FIG. 27 is a fragmentary enlarged view of an area indicated by circle V in FIG. 24.

As shown in FIG. 27, an outer circumferential surface 2062 of the load guide section 2038 is formed such that a portion of the outer circumferential surface 2062 of the load guide section 2038 close to the curved guide section 2042 protrudes toward the outer periphery side of the rolling-element raceway 2024 in relation to a portion of an outer circumferential surface 2064 of the curved guide section 2042 close to the load guide section 2038.

Moreover, the outer circumferential surface 2062 of the load guide section 2038 is formed such that a relational expression of A3<B/2 stands on the assumption that the amount of protrusion of the portion of the outer circumferential surface 2062 of the load guide section 2038 close to the curved guide section 2042 toward the outer periphery side of the rolling-element raceway 2024 is taken as A3 and that a clearance existing between the connection section 2028 and the connection section guide groove 2036 is taken as B.

An outer circumference load guide chamfered section 2066 is formed in the portion of the outer circumferential surface 2062 of the load guide section 2038 close to the curved guide section 2042. The outer circumference load guide chamfered section 2066 may be configured by means of R-chamfering a connection section between the outer circumferential surface 2062 of the load guide section 2038 and the slider-main-body-side opposing surface 2048 or R-chamfering a connection section between the outer circumferential surface 2062 of the load guide section 2038 and the inner circumferential surface 2046 of the curved guide section 2042. The outer circumference load guide chamfered section 2066 may be formed by means of C-chamfering rather than R-chamfering.

A load-side outer circumference curved guide chamfered section 2068 is formed in a portion of the outer circumferential surface 2064 of the curved guide section 2042 close to the load guide section 2038. The load-side outer circumference curved guide chamfered section 2068 may be configured by means of R-chamfering a connection section between the outer circumferential surface 2064 of the curved guide section 2042 and an end-cap-side opposing surface 2052 or R-chamfering a connection section between the outer circumferential surface 2064 of the curved guide section 2042 and the outer circumferential surface 2062 of the load guide section 2038. Moreover, the load-side outer circumference guide chamfered section 2068 may be formed by means of C-chamfering rather than R-chamfering.

Figure 28:
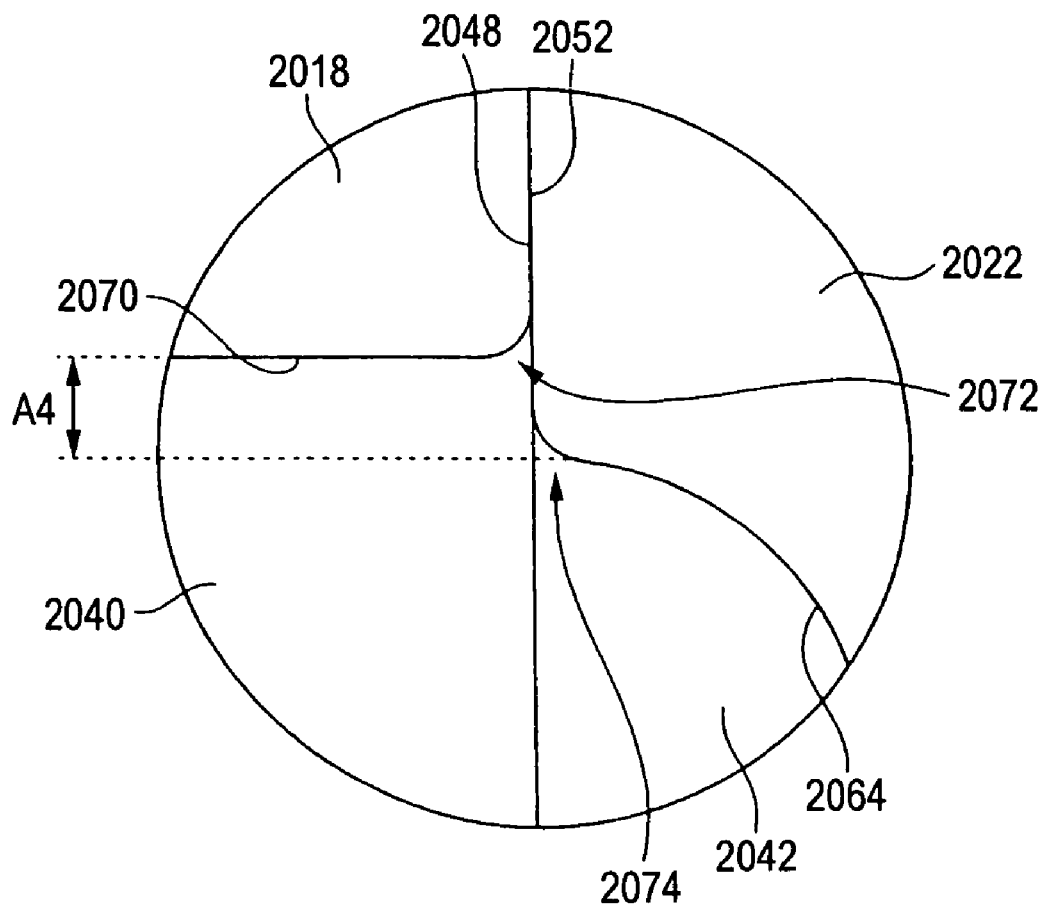
FIG. 28 is an enlarged view of an area indicated by circle VI in FIG. 24.

FIG. 28 is a fragmentary enlarged view of an area indicated by circle VI in FIG. 24.

As shown in FIG. 28, an outer circumferential surface 2070 of the return guide section 2040 is formed such that a portion of the outer circumferential surface 2070 of the return guide section 2040 close to the curved guide section 2042 protrudes toward the outer periphery side of the rolling-element raceway 2024 in relation to a portion of the outer circumferential surface 2064 of the curved guide section 2042 close to the return guide section 2040.

Moreover, the outer circumferential surface 2070 of the return guide section 2040 is formed such that a relational expression of A4<B/2 stands on the assumption that the amount of protrusion of the portion of the outer circumferential surface 2070 of the return guide section 2040 close to the curved guide section 2042 toward the outer periphery side of the rolling-element raceway 2024 is taken as A4 and that a clearance existing between the connection section 2028 and the connection section guide groove 2036 is taken as B.

An outer circumference return guide chamfered section 2072 is formed in the portion of the outer circumferential surface 2070 of the return guide section 2040 close to the curved guide section 2042. The outer circumference return guide chamfered section 2072 may be configured by means of R-chamfering a connection section between the outer circumferential surface 2070 of the return guide section 2040 and the slider-main-body-side opposing surface 2048 or R-chamfering a connection section between the outer circumferential surface 2070 of the return guide section 2040 and the inner circumferential surface 2046 of the curved guide section 2042. The outer circumference return guide chamfered section 2072 may also be formed by means of C-chamfering rather than R-chamfering.

A return-side outer circumference curved guide chamfered section 2074 is formed in a portion of the outer circumferential surface 2064 of the curved guide section 2042 close to the return guide section 2040. The return-side outer circumference curved guide chamfered section 2074 may be configured by means of R-chamfering a connection section between the outer circumferential surface 2064 of the curved guide section 2042 and the end-cap-side opposing surface 2052 or R-chamfering a connection section between the outer circumferential surface 2064 of the curved guide section 2042 and the outer circumferential surface 2070 of the return guide section 2040. Moreover, the return-side outer circumference guide chamfered section 2074 may also be formed by means of C-chamfering rather than R-chamfering.

Figure 29:
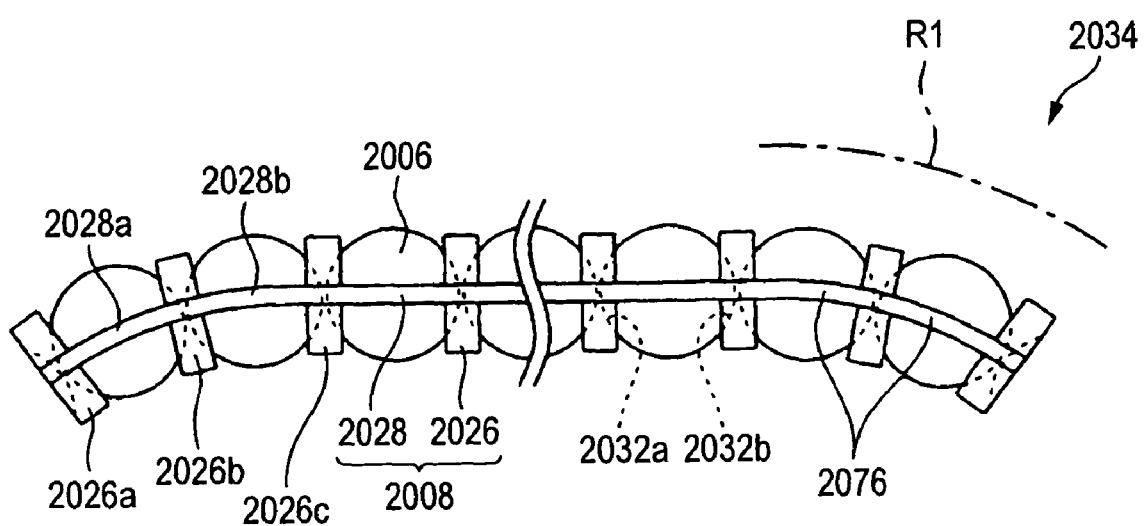
FIG. 29 is a view showing a line of rolling elements made up of separators and rolling elements, both of which pertain to the present invention.

FIG. 29 is a view showing a line of rolling elements.

As shown in FIG. 29, in the connection section 2028, a portion 2028*a*—which connects a first spacer section 2026*a* from either longitudinal end of the separator 2008 to a second spacer section 2026*b* from the same—and a portion 2028*b*—which connects the second spacer section 2026*b* from either longitudinal end of the separator 2008 to a third spacer section 2026*c* from the same—constitute a curved connection section 2076 which is curved along the curved direction of the curved guide section 2042 when under no load. The curved connection section 2076 is formed such that a relational expression of $R1 \geqq R2$ stands on condition that the curvature radius of the curved connection section 2076 denoted by a dashed line is taken as R1 and that the curvature radius of the curved guide section 2042 is taken as R2. When the curved guide section 2042 assumes an oval shape, the curvature radius R2 of the curved guide section 2042 denotes the curvature radius of a circular-arc portion of the curved guide section 2042.

Working-effects of the linear guide apparatus having the above configuration will now be described.

When the slider 2004 has moved in relation to the guide rail 2002 during operation of the linear guide apparatus 2001, the balls 2006 in the load raceway 2020 move at a speed slower than that of the slider 2004 in the moving direction of the slider 2004. After having made a U-turn at the direction-change passage 2022 at one end, the balls 2006 move in a rolling manner in a reverse direction through the rolling-element return passage 2018. Further, after having made a U-turn at the direction-change passage 2022 at the other end, the balls 2006 return to the inside of the load raceway 2020, thereby iterating circulation.

When the slider 2004 has moved in relation to the guide rail 2002, the separators 2008 move through the inside of the rolling-element raceway 2024 in conjunction with movement of the balls 2006. When the balls 2006 in the load raceway 2020 make a U-turn at the direction-change passage 2022 and then move in a rolling manner through the rolling-element return passage 2018, the connection sections 2028 move from the curved guide section 2042 to the return guide section 2040 after having moved from the load guide section 2038 to the curved guide section 2042. Moreover, when the balls 2006 in the rolling-element return passage 2018 make a U-turn at the direction-change passage 2022 and then return to the inside of the load raceway 2020, the connection sections 2028 move from the curved guide section 2042 to the load guide section 2038 after having moved from the return guide section 2040 to the curved guide section 2042. Specifically, during operation of the linear guide apparatus 2001, the line of rolling elements 2034 makes endless circulation through the inside of the rolling-element raceway 2024, and the connection sections 2028 make endless circulation through the inside of the connection section guide groove 2036.

At this time, the portions 2028*a* and 2028*b* in the connection section 2028, which constitute the curved connection section 2076, are formed such that a relational expression of $R1 \geqq R2$ stands when under no load on condition that the curvature radius of the curved connection section 2076 is taken as R1 and that the curvature radius of the curved guide section 2042 is taken as R2. Specifically, of the connection section 2028, the portions 2028*a* and 2028*b* located at respective longitudinal ends of the separator 2008 constitute the curved connection section 2076. The curved connection section 2076 is curved in correspondence to the curvature radius R2 of the curved guide section 2042. Therefore, even when the curved connection section 2076 has moved from the load guide section 2038 or the return guide section 2040 to the curved guide section 2042 during movement of the line of rolling elements 2034 through the inside of the rolling-element raceway 2024, the curved connection section 2076 is prevented from being caught by anything between the load guide section 2038 or the return guide section 2040 and the curved guide section 2042.

By reference FIGS. 30 through 33, there will now be described the state of contact between the connection section 2028 and the connection section guide groove 2036 achieved during endless circulation of the connection section 2028 through the inside of the connection section guide groove 2036. For the sake of explanation, the balls 2006 and the spacer sections 2026 are omitted from FIGS. 30 to 33.

First, the state of contact of the curved connection section 2076 with the load guide section 2038 and the curved guide section 2042, which is achieved when the connection section 2028 moves from the load guide section 2038 to the curved guide section 2042, will be described by reference to FIG. 30.

FIG. 30 is a view showing the state of contact of the curved connection section 2076 with the load guide section 2038 and the curved guide section 2042 achieved when the connection section 2028 moves from the load guide section 2038 to the curved guide section 2042. The manner of movement of the curved connection section 2076 from the load guide section 2038 to the curved guide section 2042 is shown in sequence of FIG. 30A, FIG. 30B, FIG. 30C, and FIG. 30D. Arrows provided in FIGS. 30A to 30D denote the moving direction of the connection section 2028.

Figure 30A:
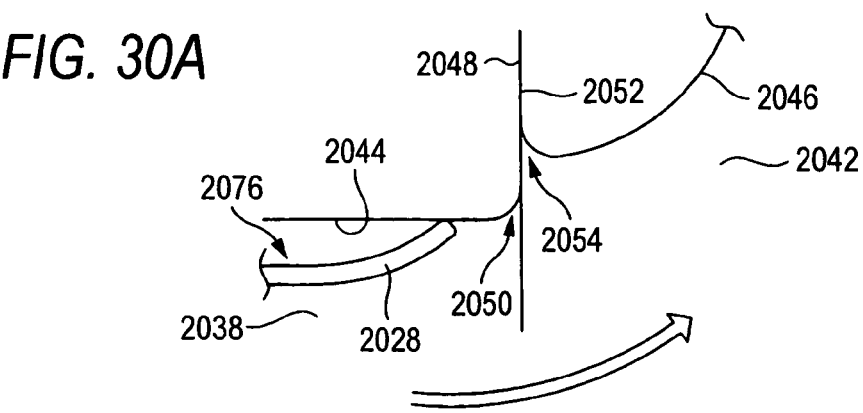
FIG. 30A is a view showing the state of contact between a connection section and a connection section guide groove.

FIG. 30A is a view showing the state of contact of the curved connection section 2076, which moves toward the curved guide section 2042 in the load guide section 2038, with the inner circumferential surface 2044 of the load guide section 2038.

As shown in FIG. 30A, the curved connection section 2076 which comes to the front end of the line of rolling elements 2034, in the connection section 2028 that moves from the load guide section 2038 to the curved guide section 2042, is curved along the curved direction of the curved connection section 2076. Hence, the curved connection section 2076 moves toward the curved guide section 2042 through the inside of the load guide section 2038 while remaining in contact with the inner circumferential surface 2044 of the load guide section 2038. Therefore, during the course of the curved connection section 2076 moving through the inside of the load guide section 2038, the state of contact between the curved connection section 2076 and the inner circumferential surface 2044 of the load guide section 2038 becomes constant or essentially constant; and sliding resistance arising between the curved connection section 2076 and the inner circumferential surface 2044 of the load guide section 2038 becomes uniform or essentially uniform.

Figure 30B:
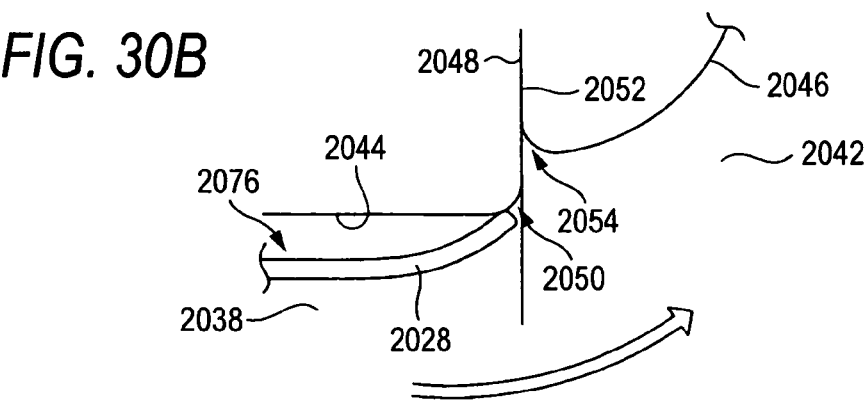
FIG. 30B is a view showing the state of contact between the connection section and the connection section guide groove.

FIG. 30B is a view showing the state of contact between the curved connection section 2076, which moves toward the curved guide section 2042 in the load guide section 2038, and the inner circumference load guide chamfered section 2050.

As shown in FIG. 30B, the inner circumference load guide chamfered section 2050 is formed in the portion of the inner circumferential surface 2044 of the load guide section 2038 close to the curved guide section 2042. Therefore, when the curved connection section 2076 contacts the inner circumference load guide chamfered section 2050 during the course of movement from the load guide section 2038 to the curved guide section 2042, the curved connection section 2076 moves along the shape of the inner circumference load guide chamfered section 2050. Hence, the curved connection section 2076 can be moved smoothly.

Figure 30C:
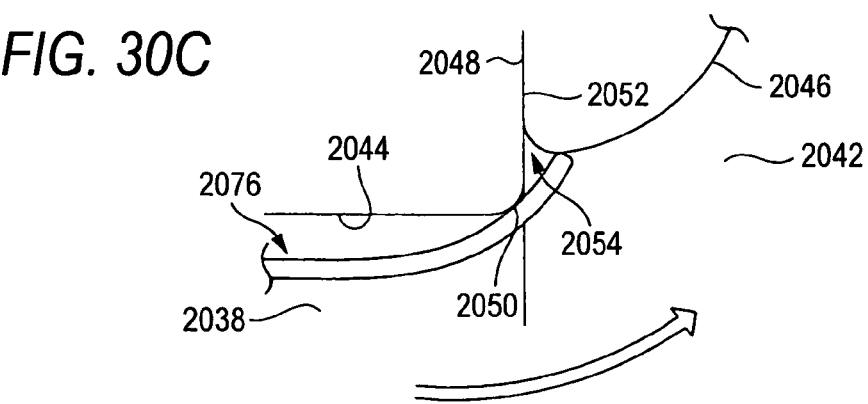
FIG. 30C is a view showing the state of contact between the connection section and the connection section guide groove.

FIG. 30C is a view showing the state of contact between the curved connection section 2076, which has moved from the load guide section 2038 to the curved guide section 2042, and the load-side inner circumference curved guide chamfered section 2054.

As shown in FIG. 30C, the load-side inner circumference curved guide chamfered section 2054 is formed in the portion of the inner circumferential surface 2046 of the curved guide section 2042 close to the load guide section 2038. Therefore, when the curved connection section 2076 contacts the load-side inner circumference curved guide chamfered section 2054 during the course of movement from the load guide section 2038 to the curved guide section 2042, the curved connection section 2076 moves along the shape of the load-side inner circumference curved guide chamfered section 2054. Hence, the curved connection section 2076 can be moved smoothly.

Figure 30D:
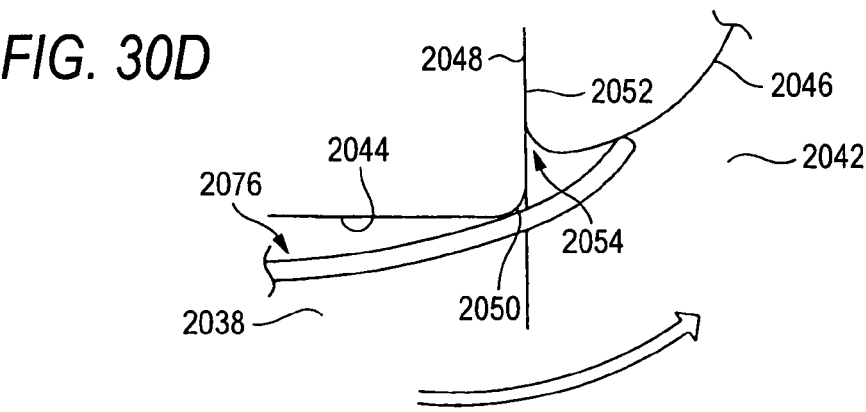
FIG. 30D is a view showing the state of contact between the connection section and the connection section guide groove.

FIG. 30D is a view showing the state of contact between the curved connection section 2076 having moved to the curved guide section 2042 and the inner circumferential surface 2046 of the curved guide section 2042.

As shown in FIG. 30D, the inner circumferential surface 2044 of the load guide section 2038 is formed such that the portion of the inner circumferential surface 2044 of the load guide section 2038 close to the curved guide section 2042 protrudes toward the outer periphery side of the rolling-element raceway 2024 in relation to the portion of the inner circumferential surface 2046 of the curved guide section 2042 close to the load guide section 2038. Therefore, when moving from the load guide section 2038 to the curved guide section 2042, the curved connection section 2076 is prevented from being caught by anything.

The inner circumferential surface 2044 of the load guide section 2038 is formed such that a relational expression of A1<B/2 stands on condition that the amount of protrusion of the portion of the inner circumferential surface 2044 of the load guide section 2038 close to the curved guide section 2042 toward the outer periphery side of the rolling-element raceway 2024 is taken as A1 and that a clearance existing between the connection section 2028 and the connection section guide groove 2036 is taken as B. Since clearance is formed between the curved connection section 2076, and the load guide section 2038 and the curved guide section 2042 when the curved connection section 2076 moves from the load guide section 2038 to the curved guide section 2042, the curved connection section 2076 is prevented from being caught by anything between the load guide section 2038 and the curved guide section 2042.

After the curved connection section 2076 has moved from the load guide section 2038 to the curved guide section 2042, a portion of the connection section 2028 closer to the longitudinal center of the separator 2008 in relation to the curved connection section 2076 moves from the load guide section 2038 to the curved guide section 2042 subsequent to the curved connection section 2076.

At this time, since the connection section 2028 is formed so as to be flexible along the rolling-element raceway 2024, the connection section 2028 having moved from the load guide section 2038 to the curved guide section 2042 moves along the curved guide section 2042 while being deformed in accordance with the shape of the curved guide section 2042.

Second, the state of contact of the curved connection section 2076 with the curved guide section 2042 and the return guide section 2040, which is achieved when the connection section 2028 moves from the curved guide section 2042 to the return guide section 2040, will be described by reference to FIG. 31.

Figure 31A:
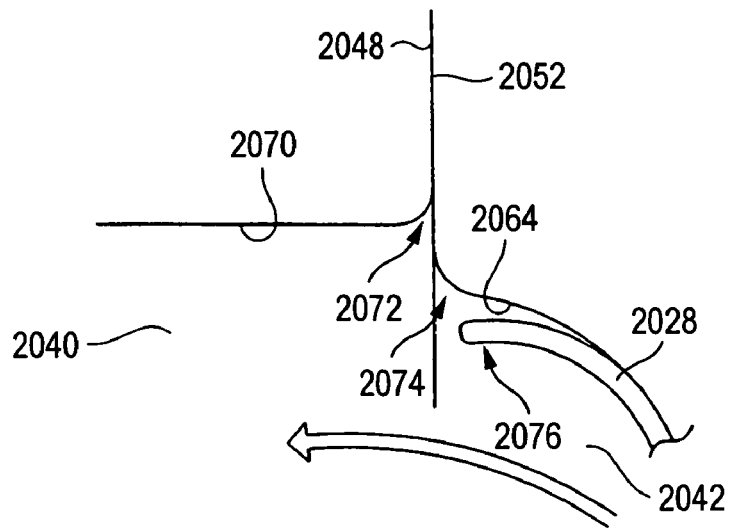
FIG. 31A is a view showing the state of contact between the connection section and the connection section guide groove.
Figure 31B:
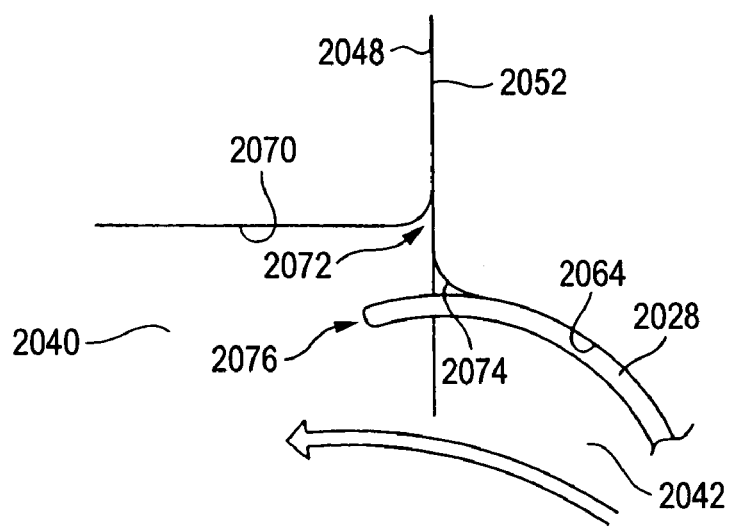
FIG. 31B is a view showing the state of contact between the connection section and the connection section guide groove.
Figure 31C:
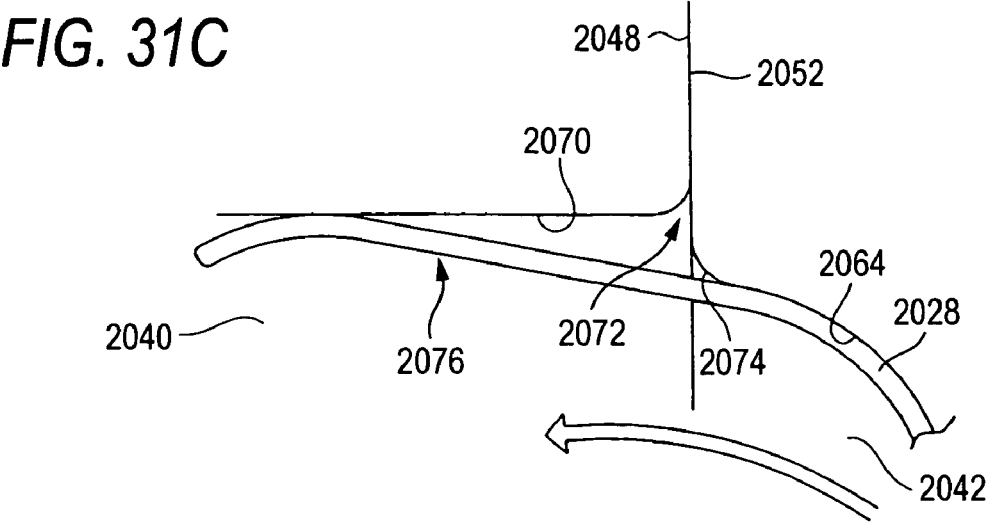
FIG. 31C is a view showing the state of contact between the connection section and the connection section guide groove.

FIG. 31 is a view showing the state of contact of the curved connection section 2076 with the curved guide section 2042 and the return guide section 2040 achieved when the connection section 2028 moves from the curved guide section 2042 to the return guide section 2040. The manner of movement of the curved connection section 2076 from the curved guide section 2042 to the return guide section 2040 is shown in sequence, of FIG. 31A, FIG. 31B, and FIG. 31C. Arrows provided in FIGS. 31A to 31C denote the moving direction of the connection section 2028.

FIG. 31A is a view showing the state of contact of the curved connection section 2076, which moves toward the curved guide section 2042 in the return guide section 2040, with the outer circumferential surface 2064 of the curved guide section 2042.

As shown in FIG. 31A, the connection section 2028, which moves from the curved guide section 2042 to the return guide section 2040, is curved along the curved direction of the curved connection section 2076. Hence, the curved connection section 2076 moves through the inside of the curved guide section 2042 toward the return guide section 2040 while remaining in contact with the outer circumferential surface 2064 of the curved guide section 2042. Therefore, during the course of the curved connection section 2076 moving through the inside of the curved guide section 2042, the state of contact between the curved connection section 2076 and the outer circumferential surface 2064 of the curved guide section 2042 becomes constant or essentially constant; and sliding resistance arising between the curved connection section 2076 and the outer circumferential surface 2064 of the curved guide section 2042 becomes uniform or essentially uniform.

FIG. 31B is a view showing the state of contact between the curved connection section 2076, which moves through the inside of the curved guide section 2042 toward the return guide section 2040, and a return-side outer circumference curved guide chamfered section 2074.

As shown in FIG. 31B, the return-side outer circumference curved guide chamfered section 2074 is formed in the portion of the outer circumferential surface 2064 of the curved guide section 2042 close to the return guide section 2040. Therefore, when the curved connection section 2076 contacts the return-side outer circumference curved guide chamfered section 2074 during the course of movement from the curved guide section 2042 to the return guide section 2040, the curved connection section 2076 moves along the shape of the return-side outer circumference curved guide chamfered section 2074. Hence, the curved connection section 2076 can be moved smoothly.

FIG. 31C is a view showing the state of contact between the curved connection section 2076 having moved to the return guide section 2040 and the outer circumferential surface 2070 of the return guide section 2040.

As shown in FIG. 31C, the outer circumferential surface 2070 of the return guide section 2040 is formed such that the portion of the outer circumferential surface 2070 of the return guide section 2040 close to the curved guide section 2042 protrudes toward the outer periphery side of the rolling-element guide section 2042 in relation to the portion of the outer circumferential surface 2064 of the curved guide section 2042 close to the return guide section 2040. Therefore, the curved connection section 2076 which moves from the load guide section 2038 to the curved guide section 2042 is prevented from being caught by anything between the load guide section 2038 and the curved guide section 2042.

The outer circumferential surface 2070 of the return guide section 2040 is formed such that a relational expression of A4<B/2 stands on condition that the amount of protrusion of the portion of the outer circumferential surface 2070 of the return guide section 2040 close to the curved guide section 2042 toward the outer periphery side of the rolling-element raceway 2024 is taken as A4 and that a clearance existing between the connection section 2028 and the connection section guide groove 2036 is taken as B. Since clearance is formed between the curved connection section 2076, and the curved guide section 2042 and the return guide section 2040 when the curved connection section 2076 moves from the curved guide section 2042 to the return guide section 2040, the curved connection section 2076 is prevented from being caught by anything located between the curved guide section 2042 and the return guide section 2040.

After the curved connection section 2076 has moved from the curved guide section 2042 to the return guide section 2040, a portion of the connection section 2028 closer to the longitudinal center of the separator 2008 in relation to the curved connection section 2076 moves from the curved guide section 2042 to the return guide section 2040 subsequent to the curved connection section 2076.

First, the state of contact of the curved connection section 2076 with the return guide section 2040 and the curved guide section 2042, which is achieved when the connection section 2028 moves from the return guide section 2040 to the curved guide section 2042, will be described by reference to FIG. 32.

FIG. 32 is a view showing the state of contact of the curved connection section 2076 with the return guide section 2040 and the curved guide section 2042 achieved when the connection section 2028 moves from the return guide section 2040 to the curved guide section 2042. The manner of movement of the curved connection section 2076 from the return guide section 2040 to the curved guide section 2042 is shown in sequence of FIG. 32A, FIG. 32B, FIG. 32C, and FIG. 32D. Arrows provided in FIGS. 32A to 32D denote the moving direction of the connection section 2028.

Figure 32A:
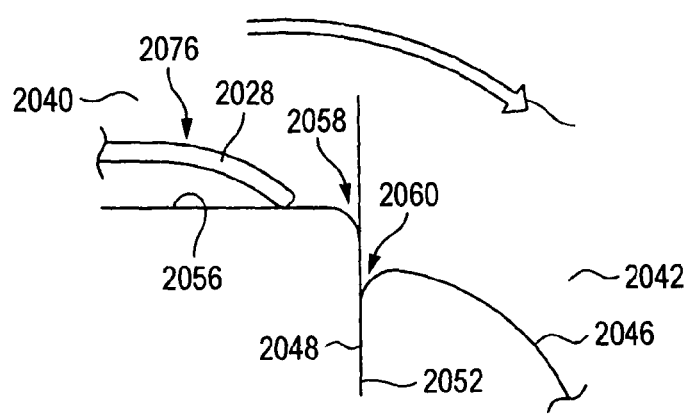
FIG. 32A is a view showing the state of contact between a connection section and a connection section guide groove.

FIG. 32A is a view showing the state of contact of the curved connection section 2076, which moves from the return guide section 2040 to the curved guide section 2042, with the inner circumferential surface 2056 of the return guide section 2040.

As shown in FIG. 32A, the curved connection section 2076 which comes to the front end of the line of rolling elements 2034, in the connection section 2028 that moves from the return guide section 2040 to the curved guide section 2042, is curved along the curved direction of the curved connection section 2076. Hence, the curved connection section 2076 moves toward the curved guide section 2042 through the inside of the return guide section 2040 while remaining in contact with the inner circumferential surface 2056 of the return guide section 2040. Therefore, during the course of the curved connection section 2076 moving through the inside of the return guide section 2040, the state of contact between the curved connection section 2076 and the inner circumferential surface 2056 of the return guide section 2040 becomes constant or essentially constant; and sliding resistance arising between the curved connection section 2076 and the inner circumferential surface 2056 of the return guide section 2040 becomes uniform or essentially uniform.

Figure 32B:
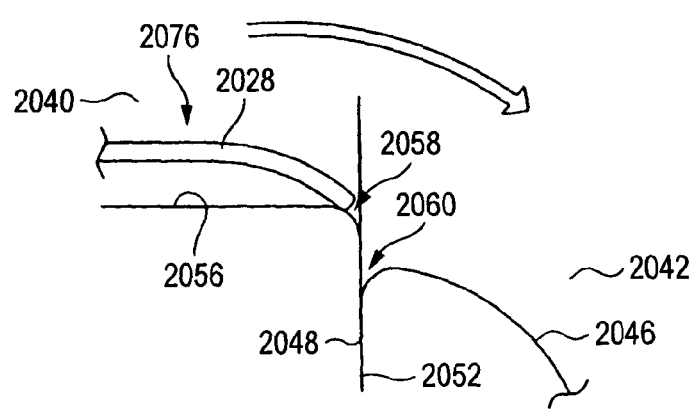
FIG. 32B is a view showing the state of contact between the connection section and the connection section guide groove.

FIG. 32B is a view showing the state of contact between the curved connection section 2076, which moves toward the curved guide section 2042 in the return guide section 2040, and the inner circumference return guide chamfered section 2058.

As shown in FIG. 32B, the inner circumference return guide chamfered section 2058 is formed in the portion of the inner circumferential surface 2056 of the return guide section 2040 close to the curved guide section 2042. Therefore, when the curved connection section 2076 contacts the inner circumference return guide chamfered section 2058 during the course of movement from the return guide section 2040 to the curved guide section 2042, the curved connection section 2076 moves along the shape of the inner circumference return guide chamfered section 2058. Hence, the curved connection section 2076 can be moved smoothly.

Figure 32C:
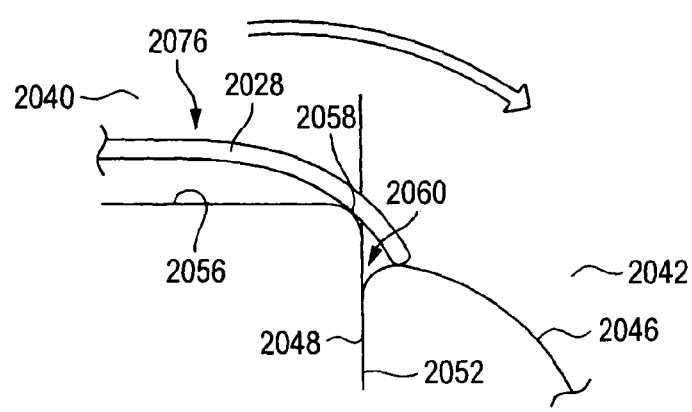
FIG. 32C is a view showing the state of contact between the connection section and the connection section guide groove.

FIG. 32C is a view showing the state of contact between the curved connection section 2076 having moved from the return guide section 2040 to the curved guide section 2042 and the return-side inner circumference curved guide chamfered section 2060.

As shown in FIG. 32C, the return-side inner circumference curved guide chamfered section 2060 is formed in the portion of the inner circumferential surface 2046 of the curved guide section 2042 close to the return guide section 2040. Therefore, when the curved connection section 2076 contacts the return-side inner circumference curved guide chamfered section 2060 during the course of movement from the return guide section 2040 to the curved guide section 2042, the curved connection section 2076 moves along the shape of the return-side inner circumference curved guide chamfered section 2060. Hence, the curved connection section 2076 can be moved smoothly.

Figure 32D:
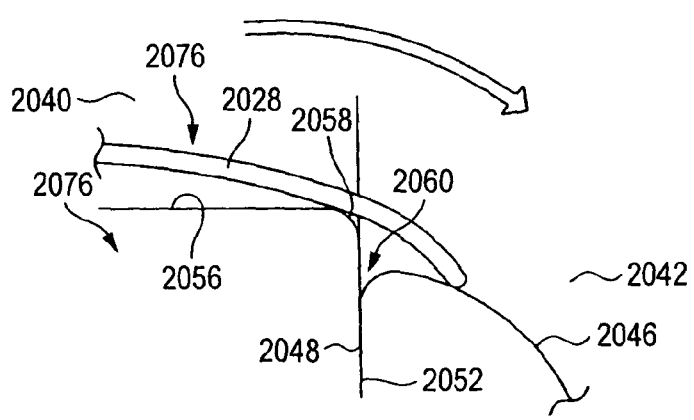
FIG. 32D is a view showing the state of contact between the connection section and the connection section guide groove.

FIG. 32D is a view showing the state of contact between the curved connection section 2076 having moved to the curved guide section 2042 and the inner circumferential surface 2046 of the curved guide section 2042.

As shown in FIG. 32D, the inner circumferential surface 2056 of the return guide section 2040 is formed such that the portion of the inner circumferential surface 2056 of the return guide section 2040 close to the curved guide section 2042 protrudes toward the outer periphery side of the rolling-element raceway 2024 in relation to the portion of the inner circumferential surface 2046 of the curved guide section 2042 close to the return guide section 2040. Therefore, the curved connection section 2076 which moves from the return guide section 2040 to the curved guide section 2042 is prevented from being caught by anything between the return guide section 2040 and the curved guide section 2042.

The inner circumferential surface 2056 of the return guide section 2040 is formed such that a relational expression of A2<B/2 stands on condition that the amount of protrusion of the portion of the inner circumferential surface 2056 of the return guide section 2040 close to the curved guide section 2042 toward the outer periphery side of the rolling-element raceway 2024 is taken as A2 and that a clearance existing between the connection section 2028 and the connection section guide groove 2036 is taken as B. Since clearance is formed between the curved connection section 2076, and the return guide section 2040 and the curved guide section 2042 when the curved connection section 2076 moves from the return guide section 2040 to the curved guide section 2042, the curved connection section 2076 is prevented from being caught by anything between the curved guide section 2042 and the return guide section 2040.

After the curved connection section 2076 has moved from the return guide section 2040 to the curved guide section 2042, a portion of the connection section 2028 closer to the longitudinal center of the separator 2008 in relation to the curved connection section 2076 moves from the return guide section 2040 to the curved guide section 2042 subsequent to the curved connection section 2076.

At this time, since the connection section 2028 is formed so as to be flexible along the rolling-element raceway 2024, the connection section 2028 having moved from the return guide section 2040 to the curved guide section 2042 moves along the curved guide section 2042 while being deformed in accordance with the shape of the curved guide section 2042.

Next, the state of contact of the curved connection section 2076 with the curved guide section 2042 and the load guide section 2038, which is achieved when the connection section 2028 moves from the curved guide section 2042 to the load guide section 2040, will be described by reference to FIG. 33.

Figure 33A:
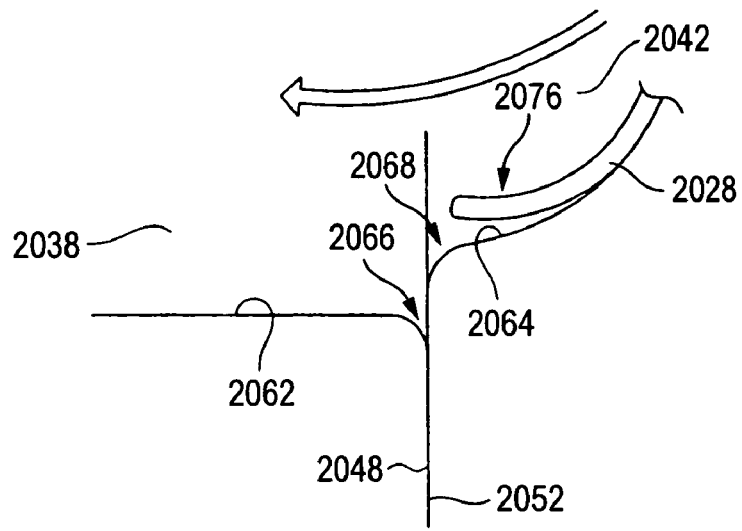
FIG. 33A is a view showing the state of contact between the connection section and the connection section guide groove.
Figure 33B:
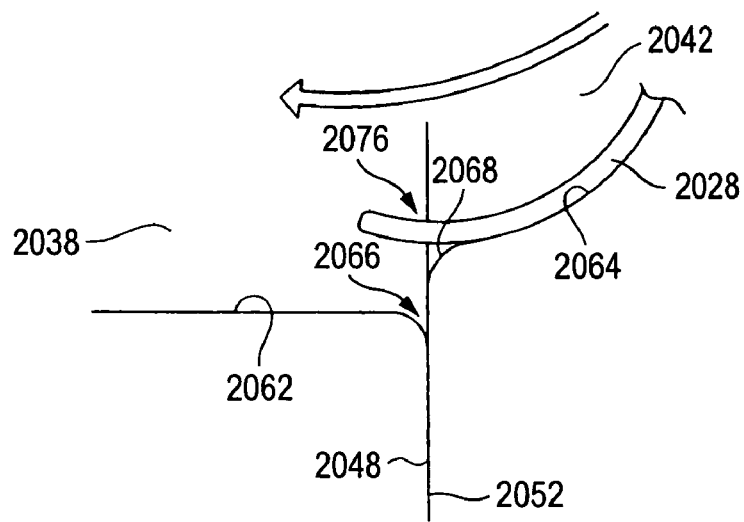
FIG. 33B is a view showing the state of contact between the connection section and the connection section guide groove.
Figure 33C:
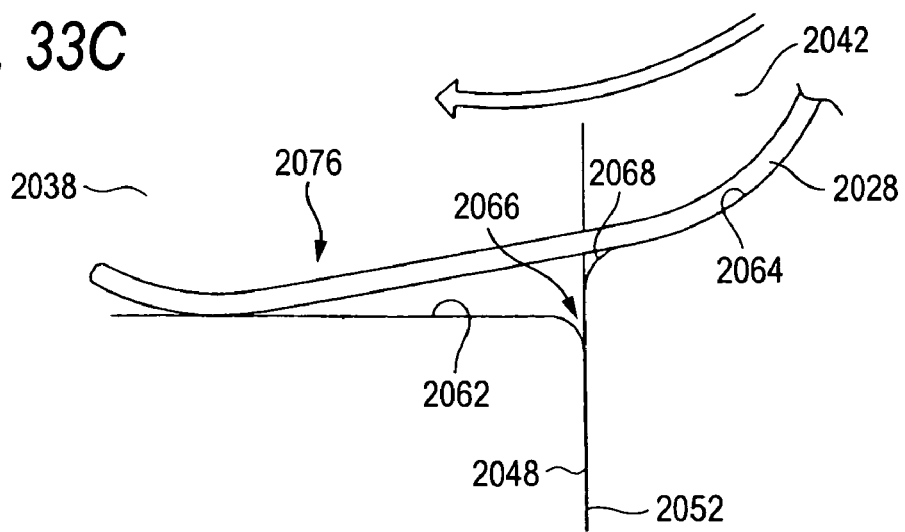
FIG. 33C is a view showing the state of contact between the connection section and the connection section guide groove.

FIG. 33 is a view showing the state of contact of the curved connection section 2076 with the curved guide section 2042 and the load guide section 2038 achieved when the connection section 2028 moves from the curved guide section 2042 to the load guide section 2038. The manner of movement of the curved connection section 2076 from the curved guide section 2042 to the load guide section 2038 is shown in sequence of FIG. 33A, FIG. 33B, and FIG. 33C. Arrows provided in FIGS. 33A to 33C denote the moving direction of the connection section 2028.

FIG. 33A is a view showing the state of contact of the curved connection section 2076, which moves toward the curved guide section 2042 to the load guide section 2038, with the outer circumferential surface 2056 of the return guide section 2040.

As shown in FIG. 33A, the connection section 2028, which moves from the curved guide section 2042 to the load guide section 2038, is curved along the curved direction of the curved connection section 2076. Hence, the curved connection section 2076 moves through the inside of the curved guide section 2042 toward the load guide section 2038 while remaining in contact with the outer circumferential surface 2064 of the curved guide section 2042. Therefore, during the course of the curved connection section 2076 moving through the inside of the curved guide section 2042, the state of contact between the curved connection section 2076 and the outer circumferential surface 2064 of the curved guide section 2042 becomes constant or essentially constant; and sliding resistance arising between the curved connection section 2076 and the outer circumferential surface 2064 of the curved guide section 2042 becomes uniform or essentially uniform.

FIG. 33B is a view showing the state of contact between the curved connection section 2076, which moves through the inside of the return guide section 2040 toward the curved guide section 2042, and the load-side outer circumference curved guide chamfered section 2068.

As shown in FIG. 33B, the load-side outer circumference curved guide chamfered section 2068 is formed in the portion of the outer circumferential surface 2064 of the curved guide section 2042 close to the load guide section 2038. Therefore, when the curved connection section 2076 contacts the load-side outer circumference curved guide chamfered section 2068 during the course of movement from the curved guide section 2042 to the load guide section 2038, the curved connection section 2076 moves along the shape of the load-side outer circumference curved guide chamfered section 2068. Hence, the curved connection section 2076 can be moved smoothly.

FIG. 33C is a view showing the state of contact between the curved connection section 2076 having moved to the load guide section 2038 and the outer circumferential surface 2062 of the load guide section 2038.

As shown in FIG. 33C, the outer circumferential surface 2062 of the load guide section 2038 is formed such that the portion of the outer circumferential surface 2062 of the load guide section 2038 close to the curved guide section 2042 protrudes toward the outer periphery side of the rolling-element raceway 2024 in relation to the portion of the outer circumferential surface 2064 of the curved guide section 2042 close to the load guide section 2038. Therefore, the curved connection section 2076 which moves from the curved guide section 2042 to the load guide section 2038 is prevented from being caught by anything between the curved guide section 2042 and the load guide section 2038.

The outer circumferential surface 2062 of the load guide section 2038 is formed such that a relational expression of A3<B/2 stands on condition that the amount of protrusion of the portion of the outer circumferential surface 2062 of the load guide section 2038 close to the curved guide section 2042 toward the outer periphery side of the rolling-element raceway 2024 is taken as A3 and that a clearance existing between the connection section 2028 and the connection section guide groove 2036 is taken as B. Since clearance is formed between the curved connection section 2076, and the curved guide section 2042 and the load guide section 2038 when the curved connection section 2076 moves from the curved guide section 2042 to the load guide section 2038, the curved connection section 2076 is prevented from being caught by anything located between the curved guide section 2042 and the load guide section 2038.

After the curved connection section 2076 has moved from the curved guide section 2042 to the load guide section 2038, a portion of the connection section 2028 closer to the longitudinal center of the separator 2008 in relation to the curved connection section 2076 moves from the curved guide section 2042 to the load guide section 2038 subsequent to the curved connection section 2076.

Consequently, in the linear guide apparatus 2001 of the present embodiment, the portions 2028a and 2028b of the connection section 2028, which are located at the respective longitudinal ends of the separator 2008, form the curved connection section 2076 curved in the curved direction of the curved guide section 2042 when under no load. This curved connection section 2076 is formed such that a relational expression of R1≧R2 stands on condition that the curvature radius of the curved connection section 2076 is taken as R1 and that the curvature radius of the curved guide section 2042 is taken as R2. Specifically, the curved connection section 2076 is curved in correspondence to the curvature radius R2 of the curved guide section 2042. Therefore, even when the curved connection section 2076 has moved from the load guide section 2038 or the return guide section 2040 to the curved guide section 2042 during movement of the balls 2006 or the separator 2008 through the inside of the rolling-element raceway 2024, the curved connection section 2076 can be prevented from being caught by anything between the load guide section 2038 or the return guide section 2040 and the curved guide section 2042. Consequently, smooth movement of the separator 2008 in the connection section guide groove 2036 is enabled, and smooth movement of the line of rolling elements 2034 in the rolling-element raceway 2024 is enabled, so that the operability of the linear guide apparatus 2001 can be enhanced.

In the linear guide 2001 of the present embodiment, the spacer sections 2026a, which are located at respective longitudinal ends of the separator 2008, among the plurality of spacer sections 2026 are formed into the same shape as that of the other spacer section 2026. Hence, a mechanism for retaining the balls 2006 can be formed between the spacer sections 2026a and 2026a. Consequently, a reduction in the number of balls 2006 which can be inserted into the rolling-element raceway 2024 can be prevented, and hence occurrence of a decrease in the loading capacity of the linear guide apparatus 2001 can be prevented.

Moreover, in the linear guide apparatus 2001 of the present embodiment, the portions 2028a and 2028b located at respective longitudinal ends of the connection section 2028 form the curved connection section 2076 curved in the curved direction of the curved guide section 2042 when under no load. Specifically, the curved connection section 2076 is curved in correspondence to the curvature radius R2 of the curved guide section 2042 before the separator 2008 is inserted into the connection section guide groove 2036 during the operation for assembling the linear guide apparatus 2001. Therefore, even when the curved connection section 2076 has moved from the load guide section 2038 or the return guide section 2040 to the curved guide section 2042 during movement of the balls 2006 or the separator 2008 through the inside of the rolling-element raceway 2024, the curved connection section 2076 can be prevented from being caught by anything between the load guide section 2038 or the return guide section 2040 and the curved guide section 2042. Consequently, smooth movement of the separator 2008 in the connection section guide groove 2036 is enabled, and smooth movement of the line of rolling elements 2034 in the rolling-element raceway 2024 is enabled, so that the operability of the linear guide apparatus 2001 can be enhanced.

In the linear guide apparatus 2001 of the present embodiment, the inner circumferential surface 2044 of the load guide section 2038 is formed such that the portion of the inner circumferential surface 2044 of the load guide section 2038 close to the curved guide section 2042 protrudes toward the outer periphery side of the rolling-element raceway 2024 in relation to the portion of the inner circumferential surface 2046 of the curved guide section 2042 close to the load guide section 2038. Therefore, when moving from the load guide section 2038 to the curved guide section 2042, the curved connection section 2076 is prevented from being caught by anything, and the operability of the linear guide 2001 can be enhanced.

Moreover, in the linear guide apparatus 2001 of the present embodiment, the inner circumferential surface 2044 of the load guide section 2038 is formed such that a relational expression of A1<B/2 stands on condition that the amount of protrusion of the portion of the inner circumferential surface 2044 of the load guide section 2038 close to the curved guide section 2042 toward the outer periphery side of the rolling-element raceway 2024 is taken as A1 and that a clearance existing between the connection section 2028 and the connection section guide groove 2036 is taken as B. Since clearance is formed between the curved connection section 2076, and the load guide section 2038 and the curved guide section 2042 when the curved connection section 2076 moves from the load guide section 2038 to the curved guide section 2042, the curved connection section 2076 is prevented from being caught by anything between the load guide section 2038 and the curved guide section 2042, so that the operability of the linear guide apparatus 2001 can be enhanced.

In the linear guide apparatus 2001 of the present embodiment, the inner circumference load guide chamfered section 2050 is formed in the portion of the inner circumferential surface 2044 of the load guide section 2038 close to the curved guide section 2042. Therefore, when the curved connection section 2076 contacts the inner circumference load guide chamfered section 2050 during the course of movement from the load guide section 2038 to the curved guide section 2042, the curved connection section 2076 moves along the shape of the inner circumference load guide chamfered section 2050. Since the curved connection section 2076 can move smoothly, the operability of the linear guide 2001 can be enhanced.

In the linear guide apparatus 2001 of the present embodiment, the load-side inner circumference curved guide chamfered section 2054 is formed in the portion of the inner circumferential surface 2046 of the curved guide section 2042 close to the load guide section 2038. Therefore, when the curved connection section 2076 contacts the load-side inner circumference curved guide chamfered section 2054 during the course of movement from the load guide section 2038 to the curved guide section 2042, the curved connection section 2076 moves along the shape of the load-side inner circumference curved guide chamfered section 2054. Since the curved connection section 2076 can move smoothly, the operability of the linear guide 2001 can be enhanced.

In the linear guide apparatus 2001 of the present embodiment, the curved connection section 2076 which comes to the front end of the line of rolling elements 2034, in the connection section 2028 that moves from the load guide section 2038 to the curved guide section 2042, is curved along the curved direction of the curved connection section 2076. Hence, the curved connection section 2076 moves toward the curved guide section 2042 through the inside of the load guide section 2038 while remaining in contact with the inner circumferential surface 2044 of the load guide section 2038. Therefore, during the course of the curved connection section 2076 moving through the inside of the load guide section 2038, the state of contact between the curved connection section 2076 and the inner circumferential surface 2044 of the load guide section 2038 becomes constant or essentially constant; and sliding resistance arising between the curved connection section 2076 and the inner circumferential surface 2044 of the load guide section 2038 becomes uniform or essentially uniform. Consequently, occurrence of vibration, which would otherwise be caused during operation of the linear guide apparatus 2001, can be prevented.

In the linear guide apparatus 2001 of the present embodiment, the inner circumferential surface 2056 of the return guide section 2040 is formed such that the portion of the inner circumferential surface 2056 of the return guide section 2040 close to the curved guide section 2042 protrudes toward the outer periphery side of the rolling-element raceway 2024 in relation to the portion of the inner circumferential surface 2046 of the curved guide section 2042 close to the return guide section 2040. Therefore, the curved connection section 2076 which moves from the return guide section 2040 to the curved guide section 2042 is prevented from being caught by anything between the return guide section 2040 and the curved guide section 2042, and the operability of the linear guide 2001 can be enhanced.

Moreover, in the linear guide apparatus 2001 of the present embodiment, the inner circumferential surface 2056 of the return guide section 2040 is formed such that a relational expression of A2<B/2 stands on condition that the amount of protrusion of the portion of the inner circumferential surface 2056 of the return guide section 2040 close to the curved guide section 2042 toward the outer periphery side of the rolling-element raceway 2024 is taken as A2 and that a clearance existing between the connection section 2028 and the connection section guide groove 2036 is taken as B. Since clearance is formed between the curved connection section 2076, and the return guide section 2040 and the curved guide section 2042 when the curved connection section 2076 moves from the return guide section 2040 to the curved guide section 2042, the curved connection section 2076 is prevented from being caught by anything between the curved guide section 2042 and the return guide section 2040, so that the operability of the linear guide apparatus 2001 can be enhanced.

In the linear guide apparatus 2001 of the present embodiment, the inner circumference return guide chamfered section 2058 is formed in the portion of the inner circumferential surface 2056 of the return guide section 2040 close to the curved guide section 2042. Therefore, when the curved connection section 2076 contacts the inner circumference return guide chamfered section 2058 during the course of movement from the return guide section 2040 to the curved guide section 2042, the curved connection section 2076 moves along the shape of the inner circumference return guide chamfered section 2058. Since the curved connection section 2076 can move smoothly, the operability of the linear guide 2001 can be enhanced.

In the linear guide apparatus 2001 of the present embodiment, the return-side inner circumference curved guide chamfered section 2060 is formed in the portion of the inner circumferential surface 2046 of the curved guide section 2042 close to the return guide section 2040. Therefore, when the curved connection section 2076 contacts the return-side inner circumference curved guide chamfered section 2060 during the course of movement from the return guide section 2040 to the curved guide section 2042, the curved connection section 2076 moves along the shape of the return-side inner circumference curved guide chamfered section 2060. Since the curved connection section 2076 can move smoothly, the operability of the linear guide 2001 can be enhanced.

In the linear guide apparatus 2001 of the present embodiment, the curved connection section 2076 which comes to the front end of the line of rolling elements 2034, in the connection section 2028 that moves from the return guide section 2040 to the curved guide section 2042, is curved along the curved direction of the curved connection section 2076. Hence, the curved connection section 2076 moves toward the curved guide section 2042 through the inside of the return guide section 2040 while remaining in contact with the inner circumferential surface 2056 of the return guide section 2040. Therefore, during the course of the curved connection section 2076 moving through the inside of the return guide section 2040, the state of contact between the curved connection section 2076 and the inner circumferential surface 2056 of the return guide section 2040 becomes constant or essentially constant; and sliding resistance arising between the curved connection section 2076 and the inner circumferential surface 2056 of the return guide section 2040 becomes uniform or essentially uniform. Consequently, occurrence of vibration, which would otherwise be caused during operation of the linear guide apparatus 2001, can be prevented.

In the linear guide apparatus 2001 of the present embodiment, the outer circumferential surface 2062 of the load guide section 2038 is formed such that the portion of the outer circumferential surface 2062 of the load guide section 2038 close to the curved guide section 2042 protrudes toward the outer periphery side of the rolling-element raceway 2024 in relation to the portion of the outer circumferential surface 2064 of the curved guide section 2042 close to the load guide section 2038. Therefore, the curved connection section 2076 which moves from the curved guide section 2042 to the load guide section 2038 is prevented from being caught by anything between the curved guide section 2042 and the load guide section 2038, and the operability of the linear guide 2001 can be enhanced.

Moreover, in the linear guide apparatus 2001 of the present embodiment, the outer circumferential surface 2062 of the load guide section 2038 is formed such that a relational expression of A3<B/2 stands on condition that the amount of protrusion of the portion of the outer circumferential surface 2062 of the load guide section 2038 close to the curved guide section 2042 toward the outer periphery side of the rolling-element raceway 2024 is taken as A3 and that a clearance existing between the connection section 2028 and the connection section guide groove 2036 is taken as B. Since clearance is formed between the curved connection section 2076, and the curved guide section 2042 and the load guide section 2038 when the curved connection section 2076 moves from the curved guide section 2042 to the load guide section 2038, the curved connection section 2076 is prevented from being caught by anything located between the curved guide section 2042 and the load guide section 2038, so that the operability of the linear guide apparatus 2001 can be enhanced.

In the linear guide apparatus 2001 of the present embodiment, the outer circumference load guide chamfered section 2066 is formed in the portion of the outer circumferential surface 2062 of the load guide section 2038 close to the curved guide section 2042. Therefore, when the curved connection section 2076 contacts the outer circumference load guide chamfered section 2066 during the course of movement from the curved guide section 2042 to the load guide section 2038, the curved connection section 2076 moves along the shape of the outer circumference load guide chamfered section 2066. Since the curved connection section 2076 can move smoothly, the operability of the linear guide 2001 can be enhanced. Moreover, when the curved connection section 2076 contacts the outer circumference load guide chamfered section 2066 during the course of movement from the load guide section 2038 to the curved guide section 2042, the curved connection section 2076 moves along the shape of the outer circumference load guide chamfered section 2066. Since the curved connection section 2076 can move smoothly, the operability of the linear guide 2001 can be enhanced.

In the linear guide apparatus 2001 of the present embodiment, the load-side outer circumference curved guide chamfered section 2068 is formed in the portion of the outer circumferential surface 2064 of the curved guide section 2042 close to the load guide section 2038. Therefore, when the curved connection section 2076 contacts the load-side outer circumference curved guide chamfered section 2068 during the course of movement from the curved guide section 2042 to the load guide section 2038, the curved connection section 2076 moves along the shape of the load-side outer circumference curved guide chamfered section 2068. Since the curved connection section 2076 can move smoothly, the operability of the linear guide 2001 can be enhanced.

In the linear guide apparatus 2001 of the present embodiment, the connection section 2028, which moves from the curved guide section 2042 to the load guide section 2038, is curved along the curved direction of the curved connection section 2076. Hence, the curved connection section 2076 moves through the inside of the curved guide section 2042 toward the load guide section 2038 while remaining in contact with the outer circumferential surface 2064 of the curved guide section 2042. Therefore, during the course of the curved connection section 2076 moving through the inside of the curved guide section 2042, the state of contact between the curved connection section 2076 and the outer circumferential surface 2064 of the curved guide section 2042 becomes constant or essentially constant; and sliding resistance arising between the curved connection section 2076 and the outer circumferential surface 2064 of the curved guide section 2042 becomes uniform or essentially uniform. Consequently, occurrence of vibration, which would otherwise be caused during operation of the linear guide apparatus 2001, can be prevented.

In the linear guide apparatus 2001 of the present embodiment, the outer circumferential surface 2070 of the return guide section 2040 is formed such that the portion of the outer circumferential surface 2070 of the return guide section 2040 close to the curved guide section 2042 protrudes toward the outer periphery side of the rolling-element guide section 2042 in relation to the portion of the outer circumferential surface 2064 of the curved guide section 2042 close to the return guide section 2040. Therefore, the curved connection section 2076 which moves from the load guide section 2038 to the curved guide section 2042 is prevented from being caught by anything between the load guide section 2038 and the curved guide section 2042, and the operability of the linear guide 2001 can be enhanced.

Moreover, in the linear guide apparatus 2001 of the present embodiment, the outer circumferential surface 2070 of the return guide section 2040 is formed such that a relational expression of A4<B/2 stands on condition that the amount of protrusion of the portion of the outer circumferential surface 2070 of the return guide section 2040 close to the curved guide section 2042 toward the outer periphery side of the rolling-element raceway 2024 is taken as A4 and that a clearance existing between the connection section 2028 and the connection section guide groove 2036 is taken as B. Since clearance is formed between the curved connection section 2076, and the curved guide section 2042 and the return guide section 2040 when the curved connection section 2076 moves from the curved guide section 2042 to the return guide section 2040, the curved connection section 2076 is prevented from being caught by anything located between the curved guide section 2042 and the return guide section 2040, so that the operability of the linear guide apparatus 2001 can be enhanced.

In the linear guide apparatus 2001 of the present embodiment, the outer circumference return guide chamfered section 2072 is formed in the portion of the outer circumferential surface 2070 of the return guide section 2040 close to the curved guide section 2042. Therefore, when the curved connection section 2076 contacts the outer circumference return guide chamfered section 2072 during the course of movement from the curved guide section 2042 to the return guide section 2040, the curved connection section 2076 moves along the shape of the outer circumference return guide chamfered section 2072. Since the curved connection section 2076 can move smoothly, the operability of the linear guide 2001 can be enhanced.

In the linear guide apparatus 2001 of the present embodiment, the return-side outer circumference curved guide chamfered section 2074 is formed in the portion of the outer circumferential surface 2064 of the curved guide section 2042 close to the return guide section 2040. Therefore, when the curved connection section 2076 contacts the return-side outer circumference curved guide chamfered section 2074 during the course of movement from the curved guide section 2042 to the return guide section 2040, the curved connection section 2076 moves along the shape of the return-side outer circumference curved guide chamfered section 2074. Since the curved connection section 2076 can move smoothly, the operability of the linear guide 2001 can be enhanced. Moreover, when the curved connection section 2076 contacts the return-side outer circumference curved guide chamfered section 2074 during the course of movement from the return guide section 2040 to the curved guide section 2042, the curved connection section 2076 moves along the shape of the return-side outer circumference curved guide chamfered section 2074. Since the curved connection section 2076 can move smoothly, the operability of the linear guide 2001 can be enhanced.

In the linear guide apparatus 2001 of the present embodiment, the connection section 2028, which moves from the curved guide section 2042 to the return guide section 2040, is curved along the curved direction of the curved connection section 2076. Hence, the curved connection section 2076 moves through the inside of the curved guide section 2042 toward the return guide section 2040 while remaining in contact with the outer circumferential surface 2064 of the curved guide section 2042. Therefore, during the course of the curved connection section 2076 moving through the inside of the curved guide section 2042, the state of contact between the curved connection section 2076 and the outer circumferential surface 2064 of the curved guide section 2042 becomes constant or essentially constant; and sliding resistance arising between the curved connection section 2076 and the outer circumferential surface 2064 of the curved guide section 2042 becomes uniform or essentially uniform. Consequently, occurrence of vibration, which would otherwise be caused during operation of the linear guide apparatus 2001, can be prevented.

In the linear guide apparatus 2001 of the present embodiment, a thermoplastic is used as a material forming the separator 2008. When the separator 2008 is heated during use of the linear guide apparatus 2001, or the like, the separator 2008 becomes softened and easily flexed. Consequently, the separator 2008 can be smoothly moved in the connection section guide groove 2036, and smooth movement of the line of rolling elements 2034 in the rolling-element raceway 2024 becomes feasible. Therefore, the operability of the linear guide apparatus 2001 can be enhanced. Moreover, when the heated separator 2008 is cooled, the softened separator 2008 becomes hardened, thereby preventing occurrence of a decrease in the durability of the separator 2008.

In the linear guide apparatus 2001 of the present embodiment, the separator 2008 forms the rolling-element raceway 2004 and the connection section guide groove 2036 so as to satisfy conditions (1) to (5) provided below.

(1) In the linear guide apparatus 2001 of the present embodiment, the portions 2028*a* and 2028*b*, which are located at both longitudinal ends of the separator 2008, in the connection section 2028 form the curved connection section 2076 curved in the curved direction of the curved guide section 2042 when under no load. This curved connection section 2076 is formed such that a relational expression of R1≧R2 stands on condition that the curvature radius of the curved connection section 2076 is taken as R1 and that the curvature radius of the curved guide section 2042 is taken as R2.

(2) The inner circumferential surface 2044 of the load guide section 2038 is formed such that the portion of the inner circumferential surface 2044 of the load guide section 2038 close to the curved guide section 2042 protrudes toward the outer periphery side of the rolling-element raceway 2024 in relation to the portion of the inner circumferential surface 2046 of the curved guide section 2042 close to the load guide section 2038.

(3) The inner circumferential surface 2056 of the return guide section 2040 is formed such that the portion of the inner circumferential surface 2056 of the return guide section 2040 close to the curved guide section 2042 protrudes toward the outer periphery side of the rolling-element raceway 2024 in relation to the portion of the inner circumferential surface 2046 of the curved guide section 2042 close to the return guide section 2040.

(4) The outer circumferential surface 2062 of the load guide section 2038 is formed such that the portion of the outer circumferential surface 2062 of the load guide section 2038 close to the curved guide section 2042 protrudes toward the outer periphery side of the rolling-element raceway 2024 in relation to the portion of the outer circumferential surface 2064 of the curved guide section 2042 close to the load guide section 2038.

(5) The outer circumferential surface 2070 of the return guide section 2040 is formed such that the portion of the outer circumferential surface 2070 of the return guide section 2040 close to the curved guide section 2042 protrudes toward the outer periphery side of the rolling-element guide section 2042 in relation to the portion of the outer circumferential surface 2064 of the curved guide section 2042 close to the return guide section 2040.

However, the configuration of the linear guide apparatus 2001 is not limited to the above descriptions. Specifically, for instance, there may also be adopted a configuration which satisfies only condition (1) of conditions (1) to (5) mentioned above, or another configuration which satisfies only condition (2). The essential requirement is that the configuration of the linear guide apparatus 2001 enables smooth movement of the separator 2008 within the connection section guide groove 2036 and smooth movement of the line of rolling elements 2034 within the rolling-element raceway 2024.

[Modifications]

Figure 34:
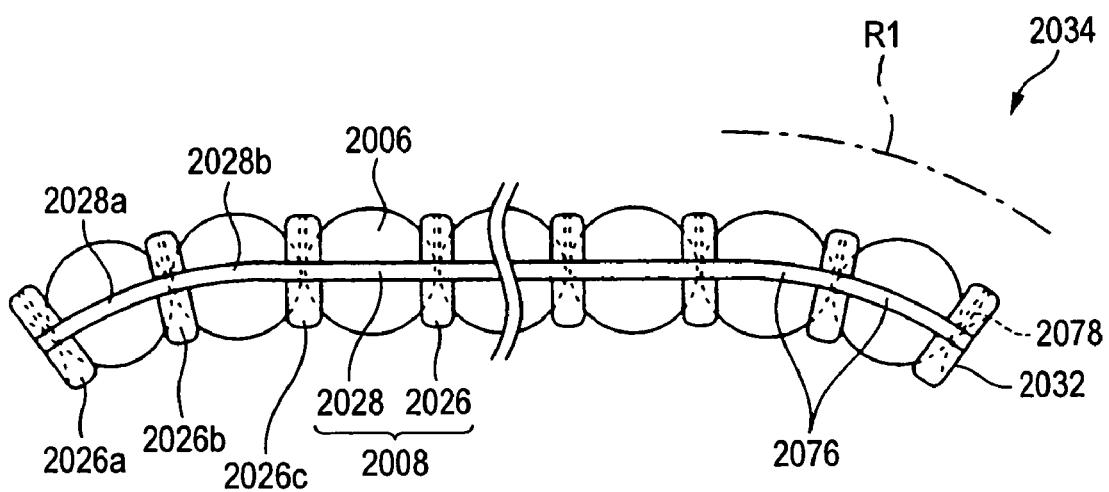
FIG. 34 is a view showing a line of rolling elements made up of separators and rolling elements, both of which pertain to a modification of the present invention.

Moreover, in the linear guide apparatus 2001 of the present embodiment, the recess section 2032 which contacts the outer periphery of the ball 2006 in a slidable manner is formed, as a section for retaining the ball 2006, in the flat surface section 2030 of the spacer section 2026 facing the ball 2006. However, the present invention is not limited to this embodiment. For instance, as shown in FIG. 34, a notch section 2078 is formed in the spacer section 2026 so as to be in mutual communication with the recess section 2032, and notched in such a way that the recess section 2032 opens toward the outer periphery side of the spacer section 2062. In this case, insertion of the ball 2006 between the adjacent spacer sections 2026 becomes easy.

Figure 35:
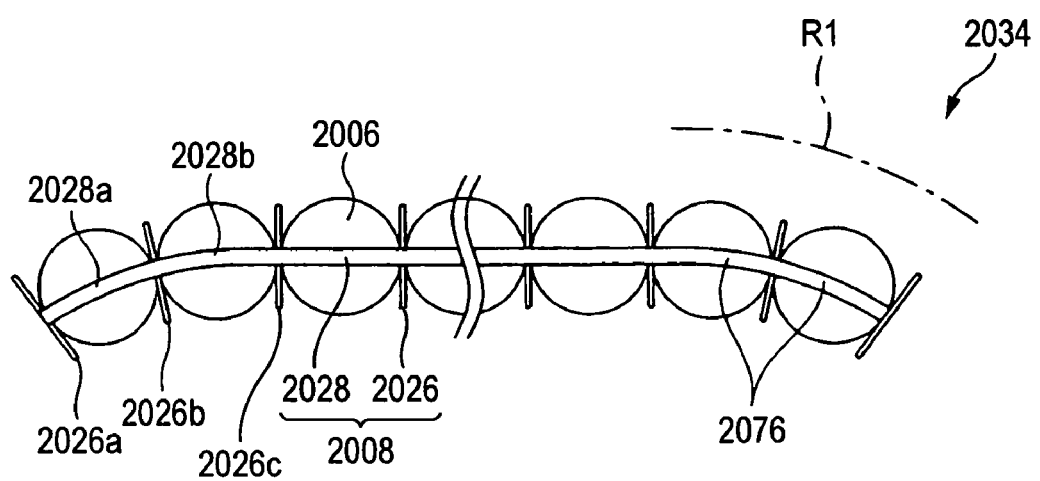
FIG. 35 is a view showing a line of rolling elements made up of separators and rolling elements, both of which pertain to another modification of the present invention.
Figure 36:
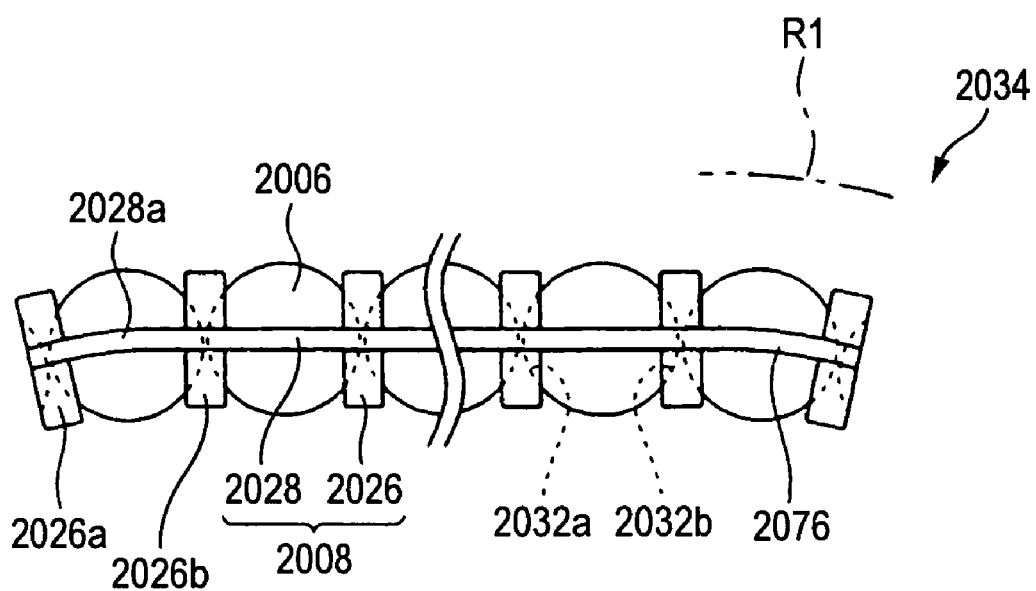
FIG. 36 is a view showing a line of rolling elements made up of separators and rolling elements, both of which pertain to yet another modification of the present invention.

Further, as shown in FIG. 35, there may also be adopted a configuration where a holding section for holding the ball 2006 is not formed in the spacer section 2026. In this case, steps for molding the spacer sections 2026 are simplified. The essential requirement is a configuration which enables holding a space between the adjacent balls 2006 at a predetermined interval.

Moreover, in the linear guide apparatus 2001 of the present embodiment, the curved connection section 2076 is formed from the portion 2028a that connects the first spacer section 2026a from either longitudinal end of the separator 2008 to the second spacer section 2026b from the same; and the portion 2028b that connects the second spacer section 2026b from either longitudinal end of the separator 2008 to the third spacer section 2026c from the same. However, the present invention is not limited to the embodiment.

Specifically, as shown in, e.g., FIG. 32, the curved connection section 2076 is formed solely from the portion 2028a that connects the first spacer section 2026a from either longitudinal end of the separator 2008 to the second spacer section 2026b from the same.

Figure 37:
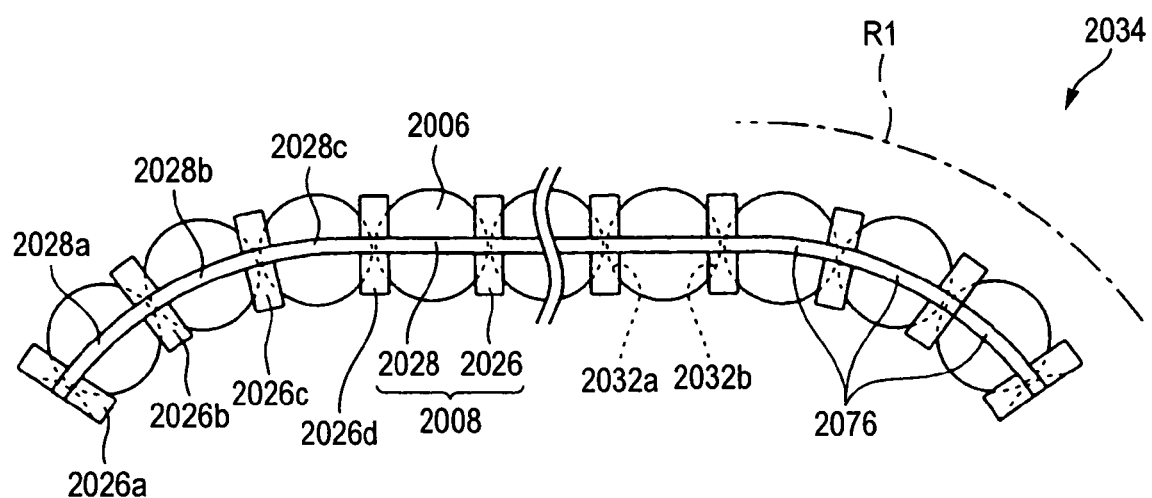
FIG. 37 is a view showing a line of rolling elements made up of separators and rolling elements, both of which pertain to still another modification of the present invention.

Further, as shown in FIG. 37, the curved connection section 2076 may also be formed from, of the connection section 2028, the portion 2028a that connects the first spacer section 2026a from either longitudinal end of the separator 2008 to the second spacer section 2026b from the same; the portion 2028b that connects the second spacer section 2026b from either longitudinal end of the separator 2008 to the third spacer section 2026c from the same; and a portion 2028c that connects the third spacer section 2026c from either longitudinal end of the separator 2008 to a fourth spacer section 2026d from the same. The essential requirement is that the curved connection section 2076 is formed from the connection sections 2028 located at the respective longitudinal ends of the separator 2008. Although not illustrated specially, it may be the case that only one of the connection sections 2028 located at the respective longitudinal ends of the separator 2008 is formed so as to become curved in correspondence to the curvature radius R1 when under no load and such that a relational expression of R1≧R2 stands.

In the linear guide apparatus 2001 of the present embodiment, the shape of the spacer section 2026 is taken as a disk shape. However, the shape is not limited to the disk shape.

Figure 38:
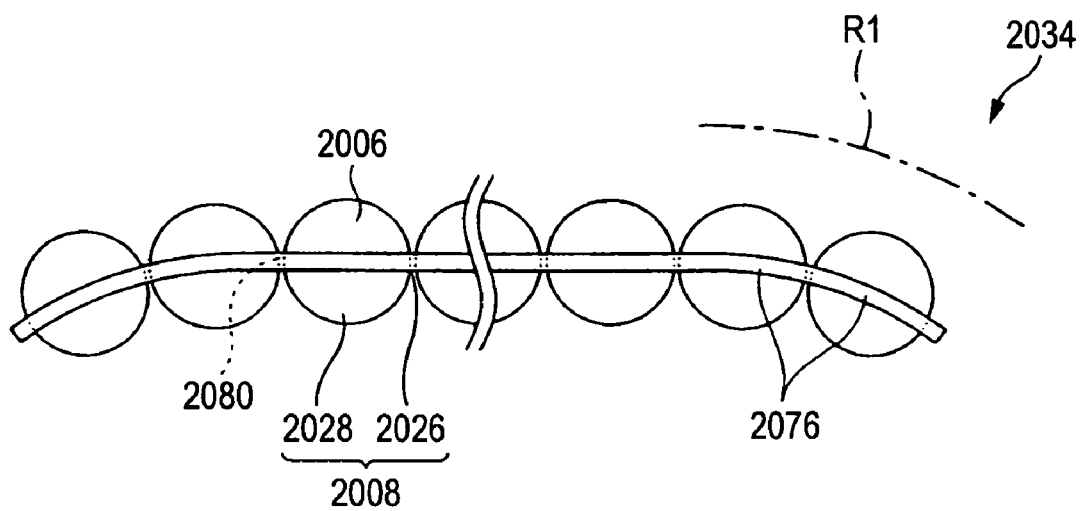
FIG. 38 is a view showing a line of rolling elements made up of separators and rolling elements, both of which pertain to yet another modification of the present invention.

Specifically, as shown in, e.g., FIG. 38, there may also be adopted a configuration wherein the separator 2008 is molded into the shape of a plate; gap sections 2080, each of which assumes a shape for enabling holding of the ball 2006, are provided; and a clearance between the adjacent balls 2006 is maintained to a predetermined interval by means of adjacent gap sections 2080 of the separator 2008. Namely, the spacer sections 2026 may also be formed so as to have the above configuration.

In the present embodiment, the inner circumferential surface 2044 of the load guide section 2038 is formed such that a relational expression of A1<B/2 stands on the assumption that the amount of protrusion of the portion of the inner circumferential surface 2044 of the load guide section 2038 close to the curved guide section 2042 toward the outer periphery side of the rolling-element raceway 2024 is taken as A1 and that a clearance existing between the connection section 2028 and the connection section guide groove 2036 is taken as B. However, the linear guide apparatus is not limited to this configuration. The inner circumferential surface may also be formed such that a relational expression of, e.g., A1=B/2 stands. However, since the operability of the linear guide apparatus 2001 can be enhanced, forming the inner circumferential surface 2044 of the load guide section 2038 in such a way that a relational expression of A1<B/2 stands is preferable, as in the case of the linear guide apparatus 2001 of the present embodiment.

In the linear guide apparatus 2001 of the present embodiment, the inner circumference load guide chamfered section 2050 is formed in the portion of the inner circumferential surface 2044 of the load guide section 2038 close to the curved guide section 2042. However, the linear guide apparatus is not limited to this configuration. Specifically, there may also be adopted a configuration where the inner circumference load guide chamfered section 2050 is not formed in the portion of the inner circumferential surface 2044 of the load guide section 2038 close to the curved guide section 2042. However, since the operability of the linear guide apparatus 2001 can be enhanced, forming the inner circumference load guide chamfered section 2050 in the portion of the inner circumferential surface 2044 of the load guide section 2038 close to the curved guide section 2042 is preferable, as in the case of the linear guide apparatus 2001 of the present embodiment.

In the linear guide apparatus 2001 of the present embodiment, the load-side inner circumference curved guide chamfered section 2054 is formed in the portion of the inner circumferential surface 2046 of the curved guide section 2042 close to the load guide section 2038. However, the linear guide apparatus is not limited to this configuration. Specifically, there may also be adopted a configuration where the load-side inner circumference curved guide chamfered section 2054 is not formed in the portion of the inner circumferential surface 2046 of the curved guide section 2042 close to the load guide section 2038. However, since the operability of the linear guide apparatus 2001 can be enhanced, forming the load-side inner circumference curved guide chamfered section 2054 in the portion of the inner circumferential surface 2046 of the curved guide section 2042 close to the load guide section 2038 is preferable, as in the case of the linear guide apparatus 2001 of the present embodiment.

In the present embodiment, the inner circumferential surface 2044 of the load guide section 2038 is formed such that the inner circumferential surface 2056 of the return guide section 2040 is formed such that a relational expression of A2<B/2 stands on condition that the amount of protrusion of the portion of the inner circumferential surface 2056 of the return guide section 2040 close to the curved guide section 2042 toward the outer periphery side of the rolling-element raceway 2024 is taken as A2 and that a clearance existing between the connection section 2028 and the connection section guide groove 2036 is taken as B. However, the linear guide apparatus is not limited to this configuration. The inner circumferential surface may also be formed such that a relational expression of, e.g., A2=B/2 stands. However, since the operability of the linear guide apparatus 2001 can be enhanced, forming the inner circumferential surface 2044 of the load guide section 2038 in such a way that a relational expression of A2<B/2 stands is preferable, as in the case of the linear guide apparatus 2001 of the present embodiment.

In the linear guide apparatus 2001 of the present embodiment, the inner circumference return guide chamfered section 2058 is formed in the portion of the inner circumferential surface 2056 of the return guide section 2040 close to the curved guide section 2042. However, the linear guide apparatus is not limited to this configuration. Specifically, there may also be adopted a configuration where the inner circumference return guide chamfered section 2058 is not formed in the portion of the inner circumferential surface 2056 of the return guide section 2040 close to the curved guide section 2042. However, since the operability of the linear guide apparatus 2001 can be enhanced, forming the inner circumference return guide chamfered section 2058 in the portion of the inner circumferential surface 2056 of the return guide section 2040 close to the curved guide section 2042 is preferable, as in the case of the linear guide apparatus 2001 of the present embodiment.

In the linear guide apparatus 2001 of the present embodiment, the return-side inner circumference curved guide chamfered section 2060 is formed in the portion of the inner circumferential surface 2046 of the curved guide section 2042 close to the return guide section 2040. However, the linear guide apparatus is not limited to this configuration. Specifically, there may also be adopted a configuration where the return-side inner circumference curved guide chamfered section 2060 is not formed in the portion of the inner circumferential surface 2046 of the curved guide section 2042 close to the return guide section 2040. However, since the operability of the linear guide apparatus 2001 can be enhanced, forming the return-side inner circumference curved guide chamfered section 2060 in the portion of the inner circumferential surface 2046 of the curved guide section 2042 close to the return guide section 2040 is preferable, as in the case of the linear guide apparatus 2001 of the present embodiment.

In the present embodiment, the outer circumferential surface 2062 of the load guide section 2038 is formed such that a relational expression of A3<B/2 stands on condition that the amount of protrusion of the portion of the outer circumferential surface 2062 of the load guide section 2038 close to the curved guide section 2042 toward the outer periphery side of the rolling-element raceway 2024 is taken as A3 and that a clearance existing between the connection section 2028 and the connection section guide groove 2036 is taken as B. However, the linear guide apparatus is not limited to this configuration. The inner circumferential surface may also be formed such that a relational expression of, e.g., A3=B/2 stands. However, since the operability of the linear guide apparatus 2001 can be enhanced, forming the outer circumferential surface 2062 of the load guide section 2038 such that a relational expression of A3<B/2 stands is preferable, as in the case of the linear guide apparatus 2001 of the present embodiment.

In the linear guide apparatus 2001 of the present embodiment, the outer circumference load guide chamfered section 2066 is formed in the portion of the outer circumferential surface 2062 of the load guide section 2038 close to the curved guide section 2042. However, the linear guide apparatus is not limited to this configuration. Specifically, there may also be adopted a configuration where the outer circumference load guide chamfered section 2066 is not formed in the portion of the outer circumferential surface 2062 of the load guide section 2038 close to the curved guide section 2042. However, since the operability of the linear guide apparatus 2001 can be enhanced, forming the outer circumference load guide chamfered section 2066 in the portion of the outer circumferential surface 2062 of the load guide section 2038 close to the curved guide section 2042 is preferable, as in the case of the linear guide apparatus 2001 of the present embodiment.

In the linear guide apparatus 2001 of the present embodiment, the load-side outer circumference curved guide chamfered section 2068 is formed in the portion of the outer circumferential surface 2064 of the curved guide section 2042 close to the load guide section 2038. However, the linear guide apparatus is not limited to this configuration. Specifically, there may also be adopted a configuration where the load-side outer circumference curved guide chamfered section 2068 is not formed in the portion of the outer circumferential surface 2064 of the curved guide section 2042 close to the load guide section 2038. However, since the operability of the linear guide apparatus 2001 can be enhanced, forming the load-side outer circumference curved guide chamfered section 2068 in the portion of the outer circumferential surface 2064 of the curved guide section 2042 close to the load guide section 2038 is preferable, as in the case of the linear guide apparatus 2001 of the present embodiment.

In the present embodiment, the outer circumferential surface 2070 of the return guide section 2040 is formed such that a relational expression of A4<B/2 stands on condition that the amount of protrusion of the portion of the outer circumferential surface 2070 of the return guide section 2040 close to the curved guide section 2042 toward the outer periphery side of the rolling-element raceway 2024 is taken as A4 and that a clearance existing between the connection section 2028 and the connection section guide groove 2036 is taken as B. However, the linear guide apparatus is not limited to this configuration. The inner circumferential surface may also be formed such that a relational expression of, e.g., A4=B/2 stands. However, since the operability of the linear guide apparatus 2001 can be enhanced, forming the outer circumferential surface 2070 of the return guide section 2040 such that a relational expression of A4<B/2 stands is preferable, as in the case of the linear guide apparatus 2001 of the present embodiment.

In the linear guide apparatus 2001 of the present embodiment, the outer circumference return guide chamfered section 2072 is formed in the portion of the outer circumferential surface 2070 of the return guide section 2040 close to the curved guide section 2042. However, the linear guide apparatus is not limited to this configuration. Specifically, there may also be adopted a configuration where the outer circumference return guide chamfered section 2072 is not formed in the portion of the outer circumferential surface 2070 of the return guide section 2040 close to the curved guide section 2042. However, since the operability of the linear guide apparatus 2001 can be enhanced, forming the outer circumference return guide chamfered section 2072 in the portion of the outer circumferential surface 2070 of the return guide section 2040 close to the curved guide section 2042 is preferable, as in the case of the linear guide apparatus 2001 of the present embodiment.

In the linear guide apparatus 2001 of the present embodiment, the return-side outer circumference curved guide chamfered section 2074 is formed in the portion of the outer circumferential surface 2064 of the curved guide section 2042 close to the return guide section 2040. However, the linear guide apparatus is not limited to this configuration. Specifically, there may also be adopted a configuration where the return-side outer circumference curved guide chamfered section 2074 is not formed in the portion of the outer circumferential surface 2064 of the curved guide section 2042 close to the return guide section 2040. However, since the operability of the linear guide apparatus 2001 can be enhanced, forming the return-side outer circumference curved guide chamfered section 2074 in the portion of the outer circumferential surface 2064 of the curved guide section 2042 close to the return guide section 2040 is preferable, as in the case of the linear guide apparatus 2001 of the present embodiment.

In the linear guide apparatus 2001 of the present embodiment, the material used for forming the separators 2008 is embodied by a thermoplastic. However, the material is not limited to the thermoplastic. The material used for forming the separators 2008 may also be embodied by thermoplastic elastomer. In short, the essential requirement is to form the separates 2008 from a material which makes the separators 2008 soft when the separators 2008 are heated and hard when the heated separators 2008 are cooled. For instance, a polyester elastomer; e.g., PELPRENE (tradename) manufactured by Toyobo Co., Ltd., HYTREL (tradename) manufactured by Du Pont-Toray Co., Ltd., or PRIMALLOY (tradename) manufactured by Mitsubishi Chemical Corporation, is used as the thermoplastic elastomer.

Moreover, in the linear guide apparatus 2001 of the present embodiment, the material used for forming the separators 2008 is embodied by a thermoplastic; namely, a material having a thermoplastic property. However, the material is not limited to this. The material used for forming the separators 2008 may also be embodied by a material which does not have any thermoplastic property. The essential requirement is to form the separators 2008 from a material which makes the connection sections 2028 flexible along the rolling-element raceway 2024. However, using a material possessing a thermoplastic property as the material of the separators 2008 is preferable to enhance the operability of the linear guide apparatus 2001, as in the case of the linear guide apparatus 2001 of the present embodiment.

In the linear guide apparatus 2001 of the present embodiment, there is adopted a configuration where a single separator 2008 is positioned within a single rolling-element raceway 2024. However, the linear guide is not limited to this configuration. Two or more separators 2008 may also be positioned within a single rolling-element raceway 2024.

In the linear guide apparatus 2001 of the present embodiment, the separators 2008 are configured in such a way that the plurality of spacer sections 2026 are connected together by means of a single connection section 2028. However, the configuration of the separators 2008 is not limited to this. Specifically, there may also be adopted a configuration where the connection sections 2028 are formed from a plurality of spacer section constituent members and where adjacent spacer sections 2026 are connected together by means of a single spacer section constituent member. However, as in the case of the linear guide apparatus 2001 of the present embodiment, configuring the separator 2008 in such a way that the plurality of spacer sections 2026 are connected together by means of a single connection section 2028 is preferable to enhance the operability of the linear guide apparatus 2001.

Fourth Embodiment

A linear guide apparatus according to a fourth embodiment of the present invention will be described hereunder. Those elements which are the same as those of the previously-described related-art linear guide apparatus are denoted by the same reference numerals, and their repeated explanations are omitted.

Figure 42:
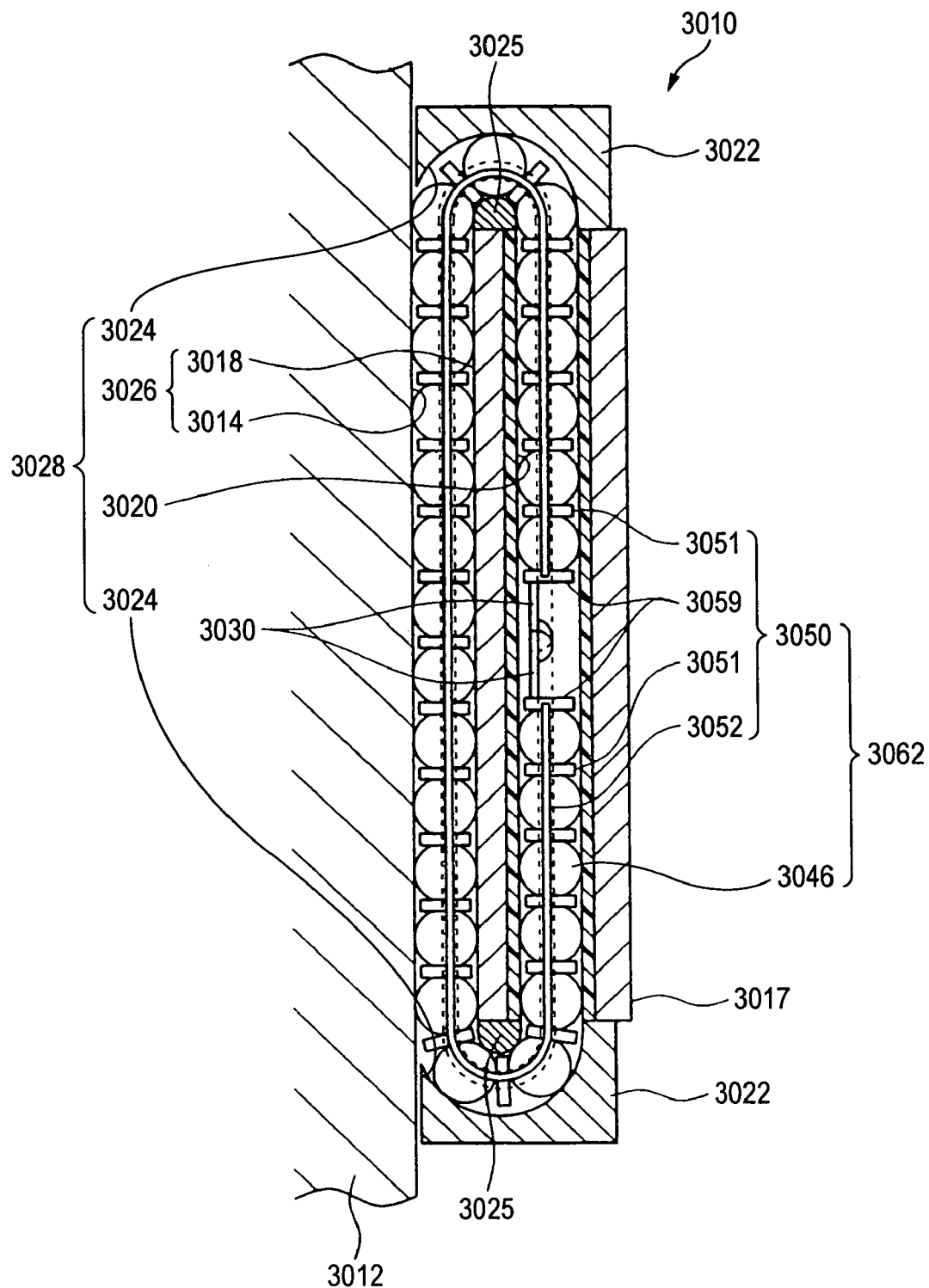
FIG. 42 is a cross-sectional view of a linear guide of a fourth embodiment taken along line X-X of FIG. 2.

FIG. 42 is a cross-sectional view of a linear guide of the fourth embodiment taken along line X-X of FIG. 2. As can be seen from FIG. 42, a return member 3025 is attached to an inner circumferential surface of the direction-change passage 3024 in the end cap 3022. Depending on the configuration of a component, there may also arise a case where the return member is attached to an end face of the slider main body 3017.

Two end sections 3059 located at the respective ends which form a shape having ends are caused to oppose each other in a non-contacting manner within the endless circulation passage 3028, and a space between the mutually-opposing end sections 3059 serves as a clearance. In a linear guide 3010, a rolling element is not inserted into a clearance between two end sections 3059 of a rolling-element accommodation belt 3050. Protrusion sections 3030 are formed respectively on the end sections 3059 so as to protrude in the arrangement direction of the balls 3046.

The rolling-element accommodation belt 3050 of the fourth embodiment will be described in more detail hereunder.

FIG. 43 is a view for describing the rolling-element accommodation belt 3050 of the fourth embodiment. FIG. 43A is a fragmentary, enlarged perspective view showing the rolling-element accommodation belt including end sections thereof; FIG. 43B is a cross-sectional view of the rolling-element accommodation belt taken at an arbitrary location along the arrangement direction of balls; FIG. 43C is a plan view of mutually-opposing end sections of the rolling-element accommodation belt within an endless circulation passage; and FIG. 43D is a front view of the rolling-element accommodation belt of FIG. 43C.

This rolling-element accommodation belt 3050 is formed from a flexible synthetic resin material into a shape having ends. As shown in FIGS. 42 and 43, the end section 3059 is provided at each of leading ends which form a shape having ends. Interposed sections 3051 to be interposed among adjacent balls 3046 are provided in areas other than the end sections 3059. The end sections 3059 and the interposed sections 3051 are connected together at both ends in the widthwise direction thereof by means of belt-shaped connection arm sections 3052.

More specifically, the connection arm section 3052 is a thin, long, belt-shaped member which is continual in the arrangement direction of the balls 3046. The connection arm sections 3052 are positioned on both widthwise sides of the endless circulation passage 3028, to thus pair up with each other. The connection arm sections 3052 pairing up with each other are formed such that portions of the connection arm sections mutually opposing each other in a widthwise direction thereof are arranged longitudinally at predetermined intervals as ball accommodation holes 3055 for accommodating the balls 3046 (see FIG. 43A). Each of the ball accommodation holes 3055 is a through hole formed from a concentric circle whose inner diameter is slightly greater than the outer diameter of the ball 3046 to be accommodated and which is wide enough to permit removable engagement of the ball 3046 in the front-to-back direction of the connection arm sections 3052 (i.e., the thicknesswise direction thereof). The location where the connection arm section 3052 connects the end section 3059 to the interposed section 3051 is deviated toward the inner periphery side of the endless circulation passage with reference to the connection line CL interconnecting the centers of the adjacent balls 3046 (see FIG. 43B).

Each of the end sections 3059 and the interposed sections 3051 assumes a short-cylindrical shape whose outer diameter is smaller than that of the ball 3046. The axial line of the short-cylindrical shape coincides with the longitudinal direction of the rolling-element accommodation belt 3050. The interposed sections 3051 are positioned on both sides of each ball accommodation hole 3055 while being separated from each other at a predetermined distance, and are connected together at both widthwise sides of the endless circulation passage 3028. In each of the end sections 3059 and the interposed sections 3051, a surface facing an adjacent interposed section 3051 is provided with a rolling-element contact surface 3054 (see FIG. 43B). The rolling-element accommodation belt 3050 can individually accommodate the ball 3046 in an area which is located between the adjacent interposed sections 3051 and defined along with the ball accommodation hole 3055.

Figure 43A:
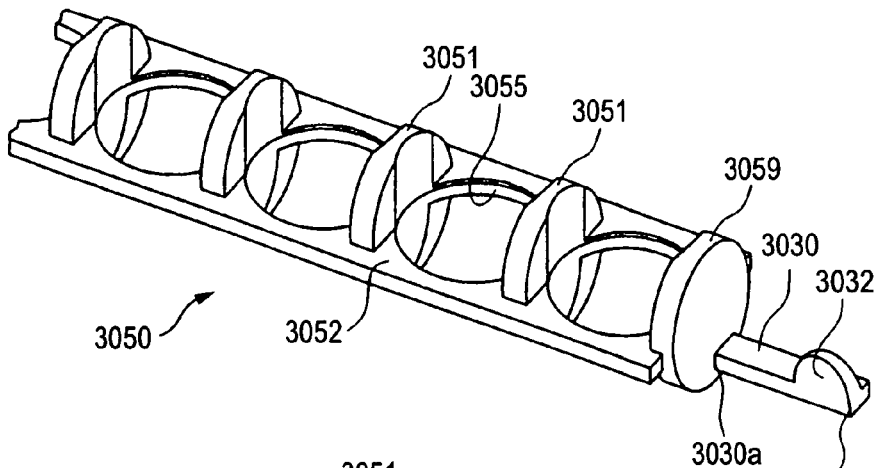
FIG. 43A is a view for describing a rolling-element accommodation belt of the fourth embodiment.
Figure 43B:
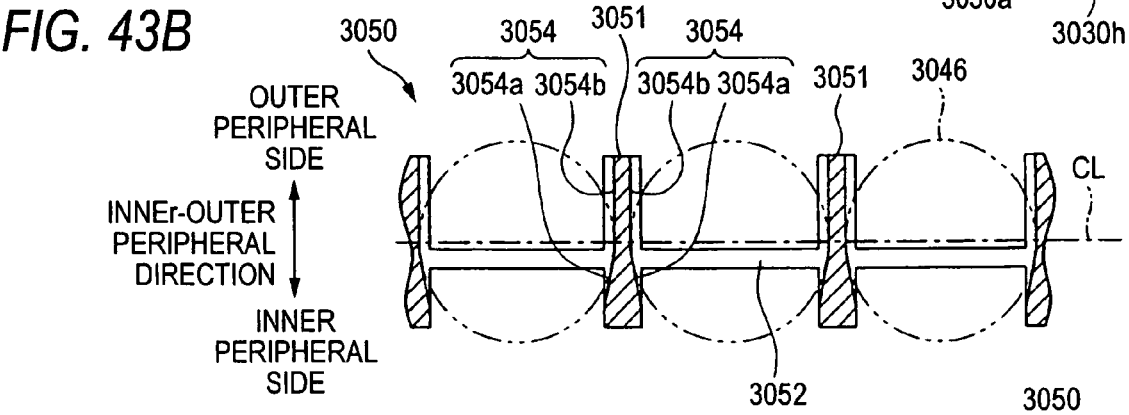
FIG. 43B is a view for describing a rolling-element accommodation belt of the fourth embodiment.

Specifically, as shown in FIG. 43B, each of the interposed sections 3051 and the end sections 3059 has a pair of rolling-element contact surfaces 3054 which contact a spherical surface; namely, a rolling-contact surface, of the ball 3046. The rolling-element contact surface 3054 comprises two surfaces; i.e., a thin, plate-like side surface portion 3054b which extends toward the outer periphery side while maintaining a uniform width, and a slope portion 3054a which is a concave conical surface made from an area spreading toward an edge. The side surface portion 3054b is formed along the arrangement direction of the balls 3046 within the endless circulation passage 3028. A distance between the opposing side surface portions 3054b is equal to the inner diameter (i.e., a diameter) of the ball accommodation hole 3055, and movement of the ball 3046 accommodated into each of the ball accommodation holes 3055 toward the outer periphery side of the endless circulation passage 3028 is permitted. Meanwhile, the slope portion 3054a forms a concave conical surface which makes contact at a predetermined angle of inclination with respect to the arrangement direction, and is formed so as to constrain movement of the balls 3046 accommodated into the respective ball accommodation holes 3055 toward the inner periphery side of the endless circulation passage 3028.

As a result, in relation to the interposed sections 3051 and the end sections 3059, the rolling-element contact surfaces 3054 opposing each other in the arrangement direction pair up with each other, thereby permitting movement of the balls 3046 in the respective ball accommodation holes 3055 toward the outer periphery side of the endless circulation passage 3028 and rollable holding of the balls 3046 while constraining the balls toward the inner periphery side of the same.

Figure 43C:
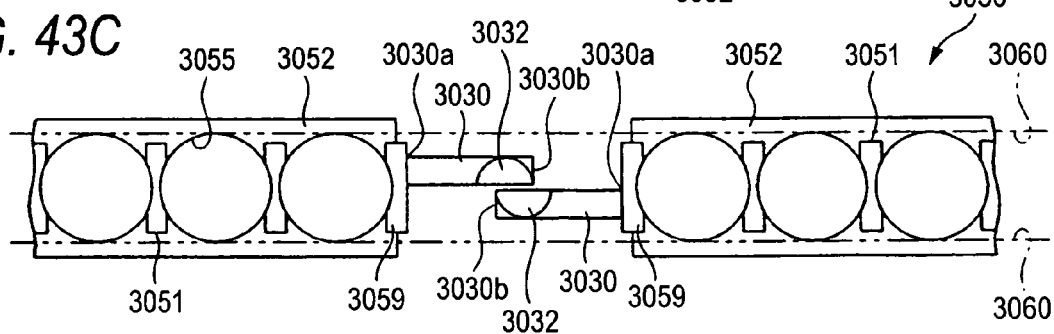
FIG. 43C is a view for describing a rolling-element accommodation belt of the fourth embodiment.
Figure 43D:
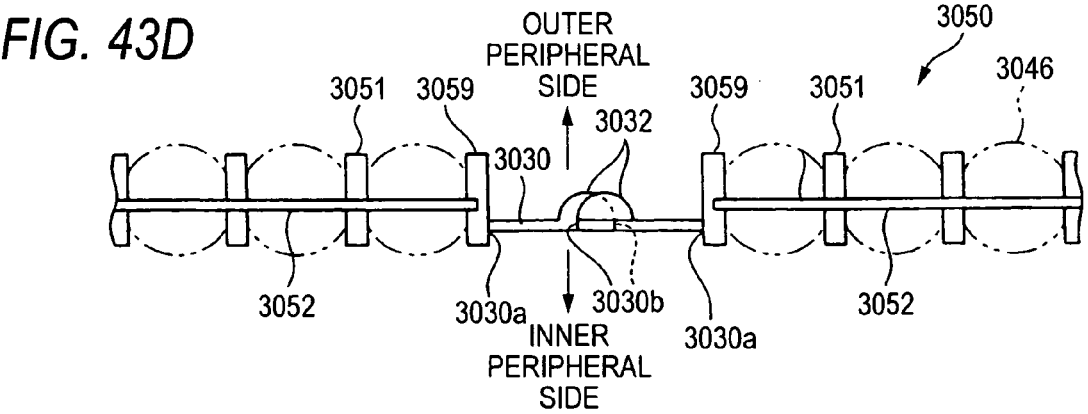
FIG. 43D is a view for describing a rolling-element accommodation belt of the fourth embodiment.

As shown in FIGS. 43C and 43D, the protrusion section 3030 protruding in the arrangement direction of the balls 3046 is formed on each of the end sections 3059 of the rolling-element accommodation belt 3050. These protrusion sections 3030 are provided at positions within the endless circulation passage 3028 where the protrusion sections overlap each other. Specifically, the protrusion sections 3030 are formed so as to protrude in directions where the end sections 3059 oppose each other along the arrangement direction of the balls 3046. Moreover, these protrusion sections 3030 have a non-connection structure where the protrusion sections are not connected together.

In more detail, each of the protrusion sections 3030 has a base end portion 3030a which is provided on the surface of the end section 3059 opposite the surface thereof facing the ball accommodation hole 3055. As shown in FIG. 43C, as to the widthwise positions where the base end sections 3030a are provided, one protrusion section 3030 is provided at a position closer to the inside in relation to one widthwise edge and the guide groove 3060 provided along the one edge, and the opposing, remaining protrusion section 3030 is provided at another position closer to the inside in relation to the other widthwise edge and the guide groove 3060 provided along the other edge. Thus, the protrusion sections 3030 are provided at non-engagement positions within the endless circulation passage 3028 where the protrusion sections are not guided by the guide grooves 3060. Each of the protrusion sections 3030 has a width which prevents occurrence of contact between the protrusion sections in the widthwise direction thereof. As a result, the protrusion sections overlap each other with respect to the widthwise direction of the endless circulation passage 3028 but do not overlap with respect to the inner and outer periphery directions.

As shown in FIG. 43D, the position where the base end portions 3030a of the protrusion sections 3030 are provided is closer toward the inner periphery side of the endless circulation passage 3028 in relation to the deviated position where the connection arm sections 3052 connect the end section 3059 to the interposed section 3051. The locations where the base end portions 3030a of the protrusion sections 3030 are provided are identical with each other (at the same height with respect to the inner and outer peripheral directions) when viewed from the front. The protrusion sections 3030 are formed so as to extend from the positions where the base end portions 3030*a* are provided along the arrangement direction of the balls 3046. The transverse cross-sectional profile of the extended portion assumes an essentially-rectangular shape, and surroundings of the extended portion are chamfered.

Each of the protrusion sections 3030 is also formed so as to have a convex section 3032 at the leading-end portion 3030*b* facing the outer periphery side of the endless circulation passage 3028, wherein the convex section 3032 protrudes toward the outer periphery side and has an essentially four-part split spherical surface. The spherical portion of the convex section 3032 makes slidable contact with an interior wall surface of the direction-change passage 3024 that is a curved portion of the endless circulation passage 3028.

Working-effects of the rolling-element accommodation belt and those of the linear guide apparatus will now be described.

According to the linear guide 3010 having the above configuration, the spaces defined by the respective ball accommodation holes 3055 in the rolling-element accommodation belt 3050 can individually accommodate the respective balls 3046 at predetermined intervals and rollably retain the balls 3046 while constraining movement of the balls 3046 toward the inner periphery side of the endless circulation passage 3028 by means of the pairs of the rolling-element contact surfaces 3054. Consequently, as shown in FIG. 42, the balls 3046 can be aligned in the form of the line of rolling elements 3062 within the endless circulation passage 3028, whereby occurrence of friction or collision of the balls 3046 is prevented, and the circulation characteristic of the balls 3046 is enhanced. According to the rolling-element accommodation belt 3050, the interposed sections 3051 are placed among the adjacent balls 3046 within the endless circulation passage 3028. Therefore, occurrence of contact among the adjacent balls 3046 can be prevented thoroughly.

Since the interposed sections 3051 and the end sections 3059 allow removable movement of the balls 3046, which are to be accommodated in the pairs of rolling-element contact surfaces 3054, toward the outer periphery side of the endless circulation passage, the balls 3046 can be readily inserted into the rolling-element accommodation belt 3050 from the outer periphery side thereof during insertion operation.

Specifically, for example, when the balls can be removed in neither the outer peripheral direction nor the inner peripheral direction as described in connection with JP-B-3243415 provided in the related-art example, difficulty is encountered in inserting balls into the rolling-element accommodation belt from the outer peripheral direction. According to the present embodiment, when there is adopted the second assembly method described in connection with the related-art example, the balls 3046 can be readily inserted from opening sections (an area of the guide rail 3012 opposing the rolling-element guide surface 3014) of the slider main body 3017 after insertion of only the rolling-element accommodation belt 3050 into the slider main body 3017.

According to this linear guide 3010, the protrusion section 3030 protruding in the arrangement direction of the balls 3046 is formed at each of the end sections 3059 which define the shape of ends of the rolling-element accommodation belt 3050. Since these protrusion sections 3030 are provided at the positions within the endless circulation passage 3028 where the protrusion sections overlap each other, occurrence of erroneous insertion of the balls 3046 between the end sections 3059 of the rolling-element accommodation belt 3050 can be prevented. Since these protrusion sections 3030 are given the non-connection structure where the protrusion sections are not connected together, a necessity for efforts required to engage latch sections provided at both ends to engage with each other, as described in, e.g., JP-A-10-318257, is obviated. Consequently, assembly of the rolling-element accommodation belt 3050 becomes easy.

Figure 44:
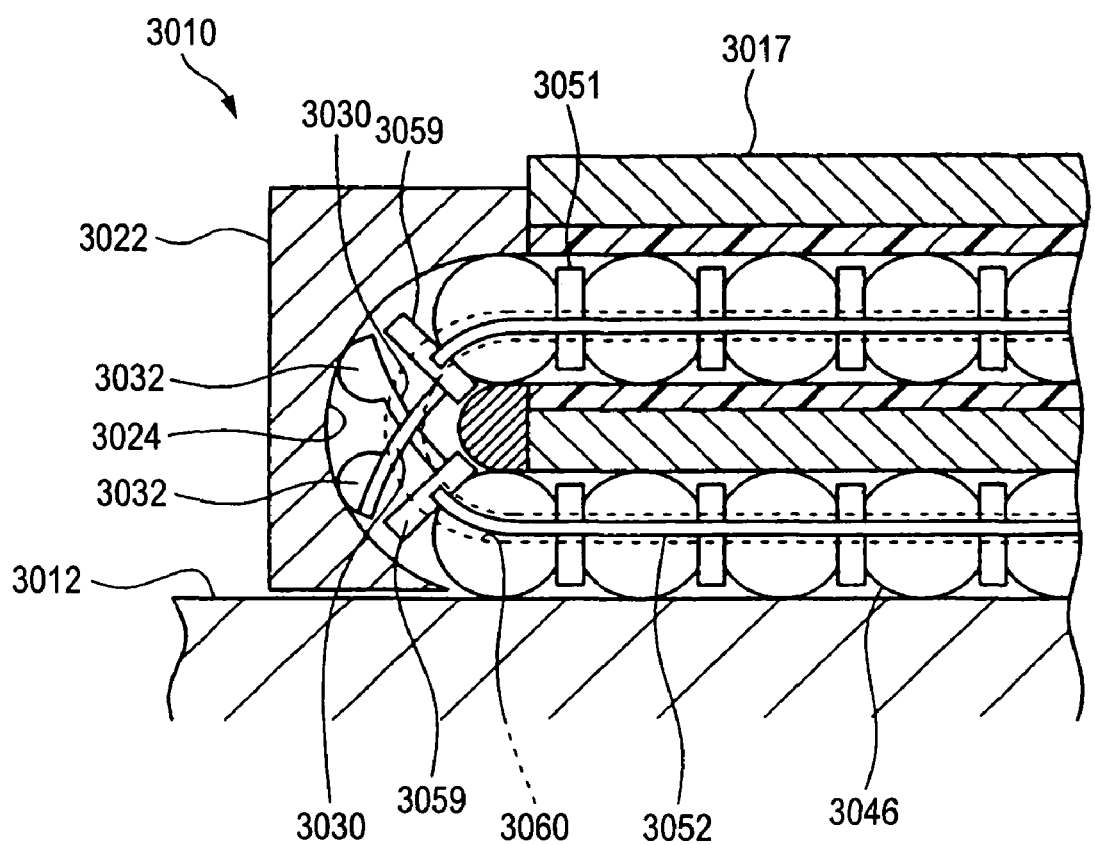
FIG. 44 is a view for describing operation of the rolling-element accommodation belt of the fourth embodiment.

According to the rolling-element accommodation belt 3050, the protrusion sections 3030 formed at both end sections 3059 are provided so as to overlap with respect to the widthwise direction of the endless circulation passage 3028 but do not overlap each other with respect to the inner and outer peripheral directions. As shown in FIG. 44, even when the leading end of the rolling-element accommodation belt 3050 is situated in the direction-change passage 3024, occurrence of interference between the protrusion sections 3030 is prevented, and hence an increase in friction is not induced. Accordingly, smoother circulation can be attained.

According to the rolling-element accommodation belt 3050, the protrusion sections 3030 are provided at the non-engagement position where the protrusion sections are not guided by the guide grooves 3060, as having been described by reference to FIG. 43C. Thus, since the protrusion sections 3030 are not engaged with the guide grooves 3060, occurrence of an extreme increase in friction between the rolling-element accommodation belt 3050 and the guide grooves 3060 is prevented or lessened even when the protrusion sections 3030 cause slight tottering. Therefore, smoother circulation can be achieved.

Moreover, according to the rolling-element accommodation belt 3050, the protrusion sections 3030 have the convex sections 3032 which are provided on the faces of the protrusion sections facing the outer periphery side of the endless circulation passage 3028 and which protrude toward the outer periphery side, to thus come into slidable contact with the interior wall surface of the endless circulation passage 3028. When the end section 3059 of the rolling-element accommodation belt 3050 has approached the direction-change passage 3024, the convex sections 3032 of the protrusion sections 3030 come into slidable contact with the interior wall surface of the direction-change passage 3024, thereby acting as guide sections as shown in FIG. 44. As a result, the protrusion section 3030 becomes deflected pursuant to guiding action of the protrusion section 3032, and the end section 3059 can smoothly enter the direction-change passage 3024 while being guided by the protrusion section 3030. Consequently, smoother circulation of the rolling-element accommodation belt and smoother circulation of the balls 3046 can be accomplished.

As mentioned above, the rolling-element accommodation belt 3050 and the linear guide 3010, both of which pertain to the present invention, prevent occurrence of erroneous insertion of the balls 3046 between the end sections 3059 of the rolling-element accommodation belt 3050, and assembly of the rolling-element accommodation belt 3050 can be facilitated.

The rolling-element accommodation belt and the linear guide apparatus, both of which pertain to the present invention, are not limited to those mentioned in connection with the embodiments and susceptible to various modifications without departing from the scope of the gist of the present invention.

For instance, in the above embodiment, the protrusion sections 3030 are formed at both end sections 3059. However, the structure of the protrusion sections 3030 is not limited to that mentioned in connection with the above embodiment.

[Modification 4-1]

Figure 45:
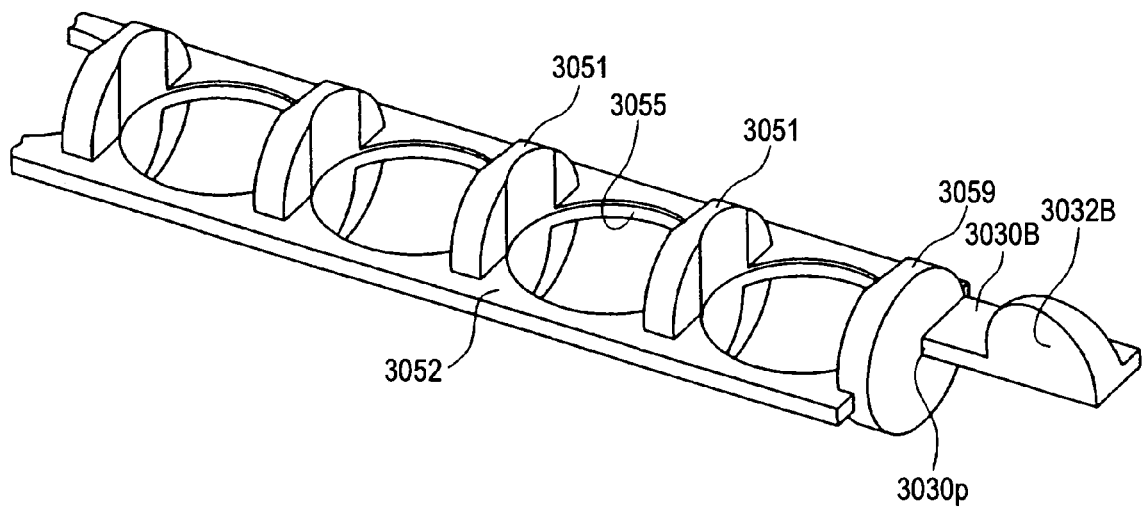
FIG. 45 is a perspective view of the principal section for describing a modification (Modification 4-1) of the rolling-element accommodation belt of the fourth embodiment.

Modification 4-1 is shown in, e.g., FIG. 45.

In the protrusion section 3030 of the above embodiment, the location of the base end section 3030a with respect to the outer-and-inner-periphery direction is closer toward the inner periphery side of the endless circulation passage 3028 in relation to the deviated location where the connection arm section 3053 connects the end section 3059 to the interposed section 3051. A protrusion section 3030B described in connection with Modification 4-1 differs from the protrusion sections 3030 in that base end sections 3030p thereof are located at the same location where the arm connection sections 3052 connect the end sections 3059 to the interposed sections 3051. Thus, the location of the base end sections can be changed, as required, with respect to the outer-and-inner-periphery direction.

As indicated by Modification 4-1, when the location of the base end sections 3030p with respect to the outer-and-inner-periphery direction is set to the same location where the connection arm sections 3052 are situated, the following drawbacks arise.

Namely, when the protrusion portion 3030B described in connection with Embodiment 4-1 has approached an opening section of the slider 3016 from the direction-change passage 3024 with the slider 3016 being removed from the guide rail 3012, the leading end of the protrusion portion 3030B (and the bulging portion 3032B) protrudes outside from the opening section of the slider 3016. When in use, the opening section of the slider 3016 is closed by the guide rail 3012, and hence no problem arises. However, when the linear guide 3010 is set on a machine bed, or the like, there may arise a case where the slider 3016 is removed from the guide rail 3012. Although the potential of occurrence of a problem is low, when the protrusion portion protrudes outside from the opening section of the slider 3016, damage may be erroneously inflicted on the protrusion portion.

Figure 46A:
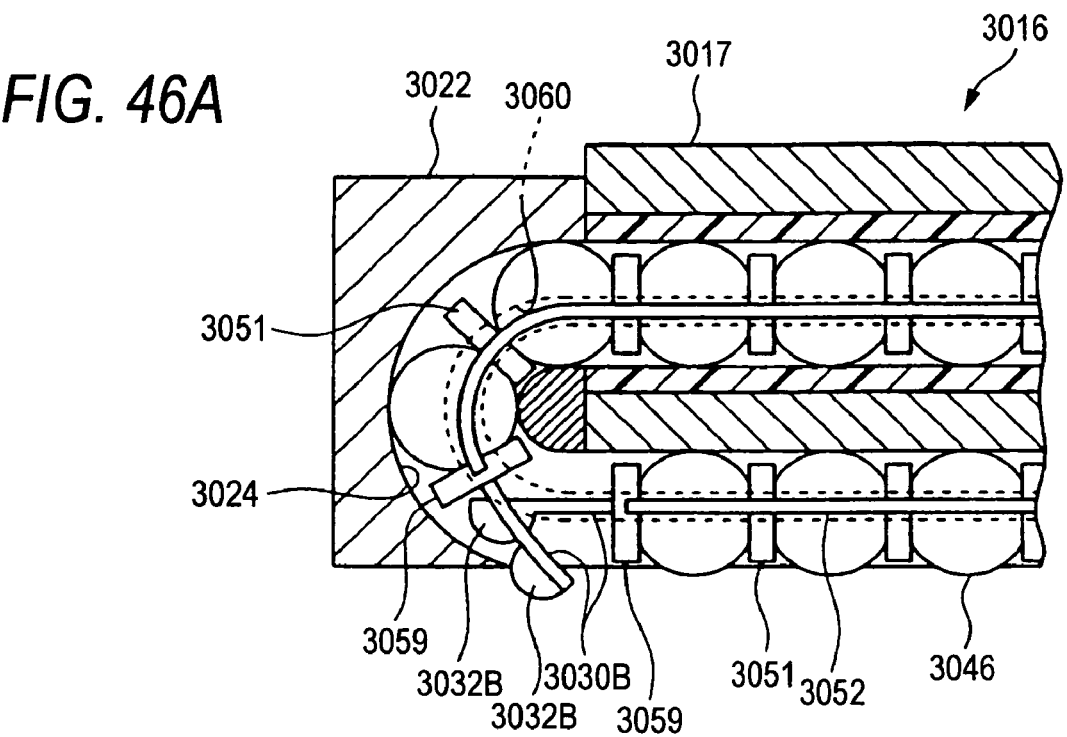
FIG. 46A is a view for describing Modification 4-1.
Figure 46B:
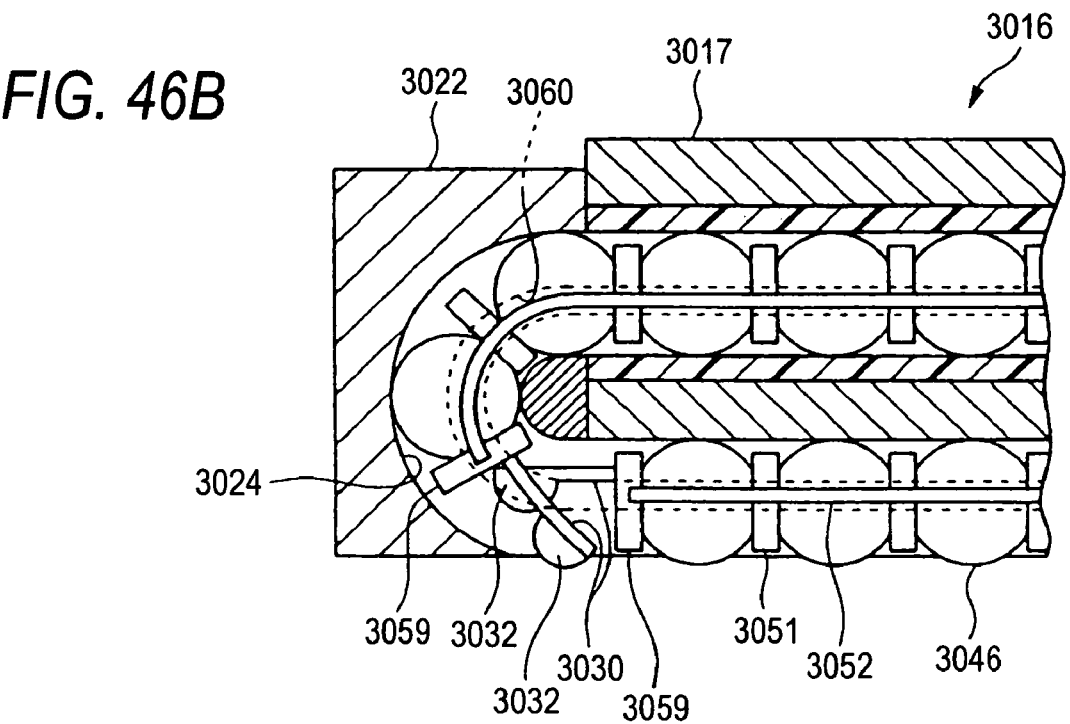
FIG. 46B is a view for describing the rolling-element accommodation belt of the fourth embodiment.

Accordingly, in the present embodiment, the location of the base end section 3030a of the protrusion section 3030 with respect to the outer-and-inner-periphery direction is set to a position closer to the inner periphery side of the endless circulation passage 3028 in relation to the deviated position of the connection arm section 3052. As a result, even when the protrusion portion 3030B described in connection with Embodiment 4-1 has approached an opening section of the slider 3016 from the direction-change passage 3024 with the slider 3016 being removed from the guide rail 3012 as shown in FIG. 46B, the amount of protrusion of the slider 3016 from the opening section becomes nominal. Consequently, even when the slider 3016 has been removed from the guide rail 3012, the present modification is preferable in terms of prevention of infliction of damage on the protrusion sections 3030.

[Modification 4-2]

Figure 47A:
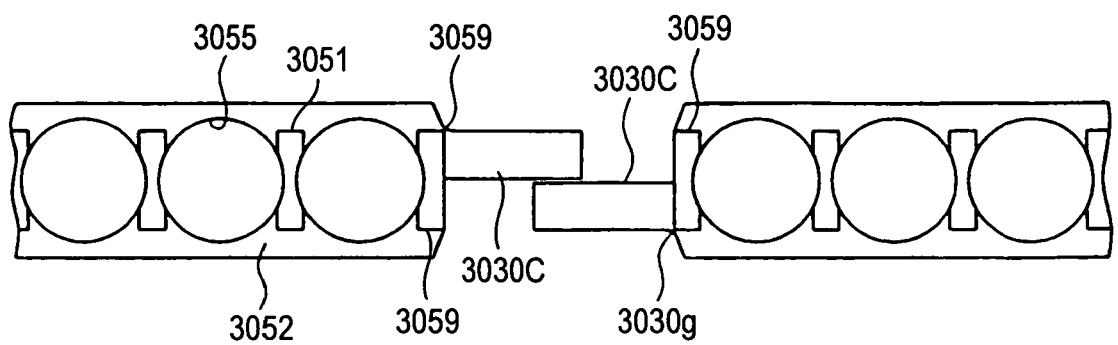
FIG. 47A is a view of the rolling-element accommodation belt of Modification 4-2, corresponding to FIG. 43C.
Figure 47B:
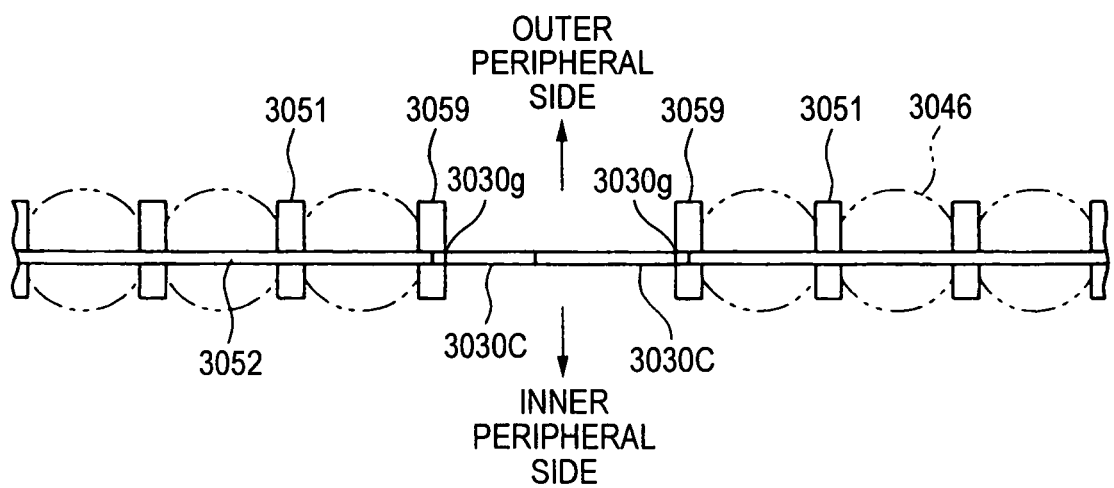
FIG. 47B is a view of the rolling-element accommodation belt of Modification 4-2, corresponding to FIG. 43D.

Modification 4-2 is shown in, e.g., FIGS. 47A and 47B. Modification 4-2 differs from the embodiment in that, in contrast with the protrusion sections 3030 of the embodiment, the location of a base end section 3030g is set to the same location where the connection arm 3052 is located in the outer-and-inner-periphery direction, as in the case of Modification 4-1; and in that the protrusion section is formed into the shape of a simple rectangle without provision of a convex section at the leading end of each of protrusion sections 3030C. By means of such a configuration, the rolling-element guide apparatus of the modification is simpler in structure than the counterpart apparatus of the embodiment and, hence, is preferable in terms of a reduction in the cost of manufacture of the rolling-element accommodation belt. However, even when the slider 3016 is removed from the guide rail 3012, setting the location of the base end section 3030a, with respect to the outer-and-inner-periphery direction, to a position much closer to the inner periphery side of the endless circulation passage 3028 in relation to the deviated position of the connection arm section 3052 is preferable in terms of prevention of infliction of damage to the protrusion section, as in the case of the protrusion section 3030 of the embodiment. In order to enable the end section 3059 to smoothly enter the direction-change passage 3024, providing the leading end of the protrusion section 3030 with the convex section 3032—which serves as a guide section upon slidable contact with the interior wall surface of the direction-change passage 30124—is desirable as mentioned in connection with the fourth embodiment.

[Modification 4-3]

Figure 48A:
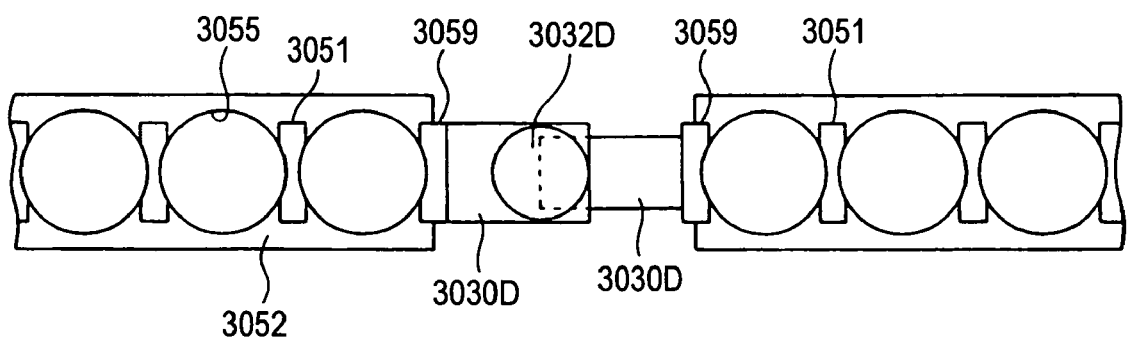
FIG. 48A is a view of the rolling-element accommodation belt of Modification 4-3, corresponding to FIG. 43C.
Figure 48B:
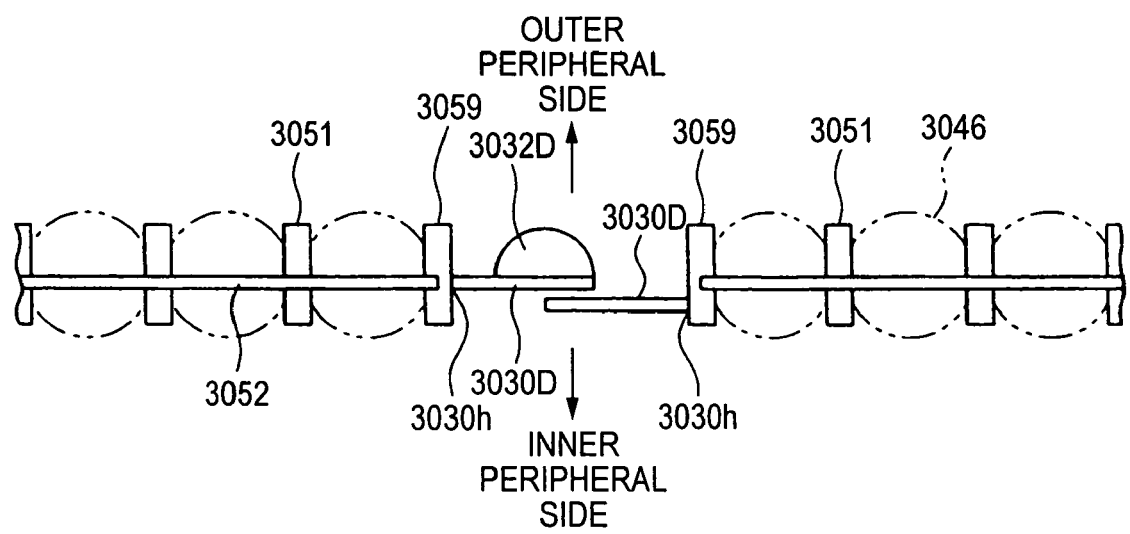
FIG. 48B is a view of the rolling-element accommodation belt of Modification 4-3, corresponding to FIG. 43D.

Modification 4-3 is shown in, e.g., FIGS. 48A and 48B. Modification 4-3 differs from the embodiment in that, in contrast with the protrusion section 3030 of the embodiment, the protrusion sections 3030D are provided so as to overlap each other with respect to the outer-and-inner-periphery direction of the endless circulation passage. Of the protrusion sections 3030D overlapping with respect to the outer-and-inner-periphery direction, a base end section 3030h of the protrusion section 3030D on the outer periphery side (i.e., a left-side protrusion section 3030D in the drawing) is set to the same position of the connection arm section 3052 with respect to the outer-and-inner-periphery direction. In the protrusion section 3030D on the inner periphery side (i.e., a right-side protrusion section 3030D in the drawing), the position of the base end section 3030h is set so as to become closer to the inner periphery side in relation to the position of the connection arm section 3052, with respect to the outer-and-inner-periphery direction. In connection with the widths of the respective protrusion sections 3030D, the protrusion section 3030D located on the outer periphery side is greater in width than the protrusion section 3030D located on the inner periphery side (the end sections 3059 are essentially equal to each other in terms of outer diameter). This modification differs from the embodiment in that a hemispherical convex section 3032D is provided at the leading end of the protrusion section 3030D located at the outer periphery side, among the protrusion sections 3030D overlapping with respect to the outer-and-inner-periphery direction; and in that the other protrusion section 3030D is not provided with the convex section and is formed into a simple rectangular shape.

With such a configuration, since the hemispherical convex section 3032D is provided on the protrusion section 3030D located at the outer periphery side, the convex section 30302D serves as a guide section upon contact with the interior wall surface of the direction-change passage 3024 when the end section 3059 of the rolling-element accommodation belt 3050 has approached the direction-change passage 3024, as in the case of the above embodiment. Therefore, smooth circulation of the rolling-element accommodation belt 3050 and the balls 3046 can be attained. In contrast with the embodiment, the width of the protrusion section 3030D can be broadened, and hence the strength of the protrusion section 3030D can be enhanced. Consequently, such a configuration is preferable in view of further lessening or prevention of damage, such as breakage or the like. However, in order to prevent occurrence of interference between the protrusion sections and an increase in friction, the protrusion sections formed at the respective end sections 3059 are preferably provided so as to overlap each other with respect to the widthwise direction of the endless circulation passage 3028 but not to overlap with respect to the outer-and-inner-periphery direction.

[Modification 4-4]

Figure 49A:
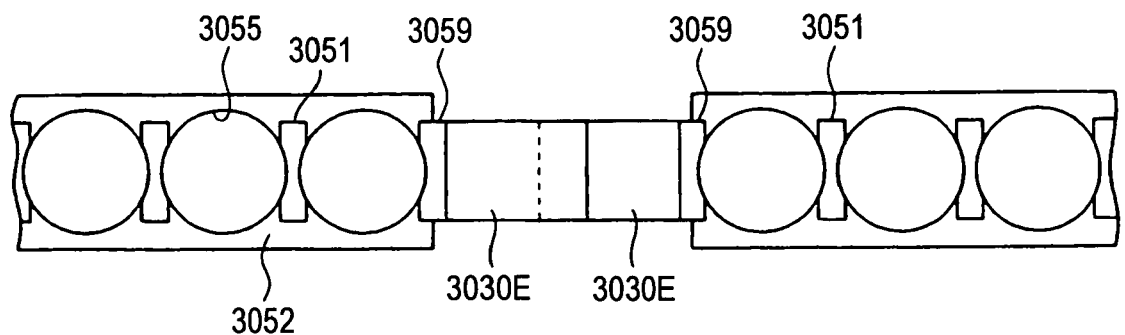
FIG. 49A is a view of the rolling-element accommodation belt of Modification 4-4, corresponding to FIG. 43C.
Figure 49B:
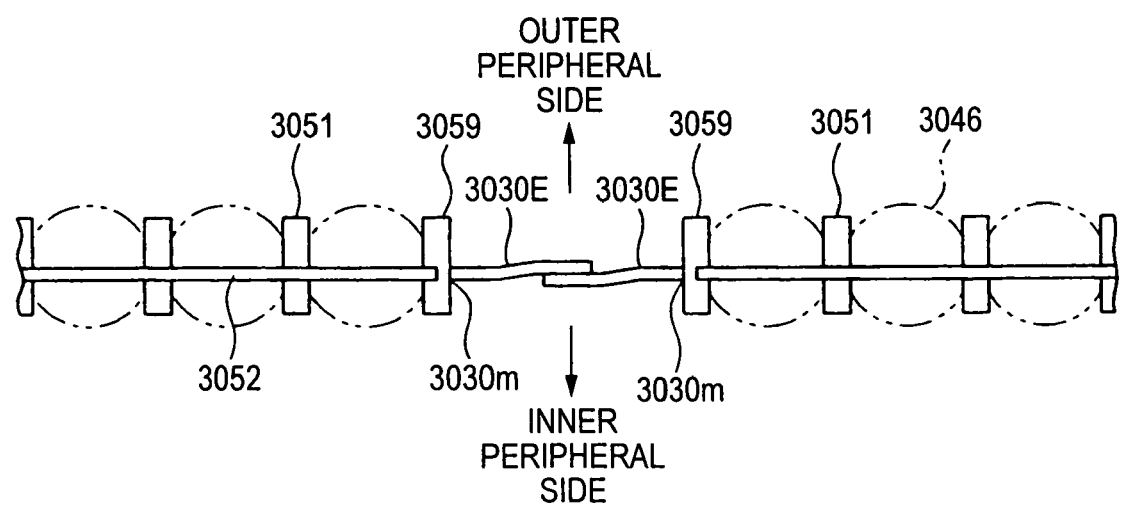
FIG. 49B is a view of the rolling-element accommodation belt of Modification 4-4, corresponding to FIG. 43D.

Moreover, Modification 4-4 is shown in, e.g., FIGS. 49A and 49B. Modification 4-4 differs from the embodiment in that, in contrast with the protrusion sections 3030, protrusion sections 3030E are provided so as to overlap each other with respect to the outer-and-inner-periphery direction of the endless circulation passage 3028. The mutually-opposing protrusion sections 3030E assume the same rectangular shape. In the protrusion sections 3030E overlapping each other with respect to the outer-and-inner-periphery direction, base end sections 3030m are set to the same location as that of the connection arm sections 3052 with respect to the outer-and-inner-periphery direction. Further, the respective protrusion sections 3030E have the same width (essentially the same outer diameter as that of the end sections 3059). The protrusion sections 3030E are overlapped in a slightly, elastically deformed manner within the endless circulation passage 3028. In relation to the overlapping manner, the protrusion section 3030E at either side may come to the outer periphery side. With such a configuration, the protrusion section 3030E coming to the outer periphery side is arbitrary in, e.g., Modification 4-3 mentioned above. Since the protrusion section at either side may come to the outer periphery side, the number of items to be checked during assembly can be diminished. Consequently, assembly of the linear guide can be performed correspondingly quickly, and the cost of manufacture of the linear guide 3010 can be lowered.

[Modification 4-5]

Figure 50A:
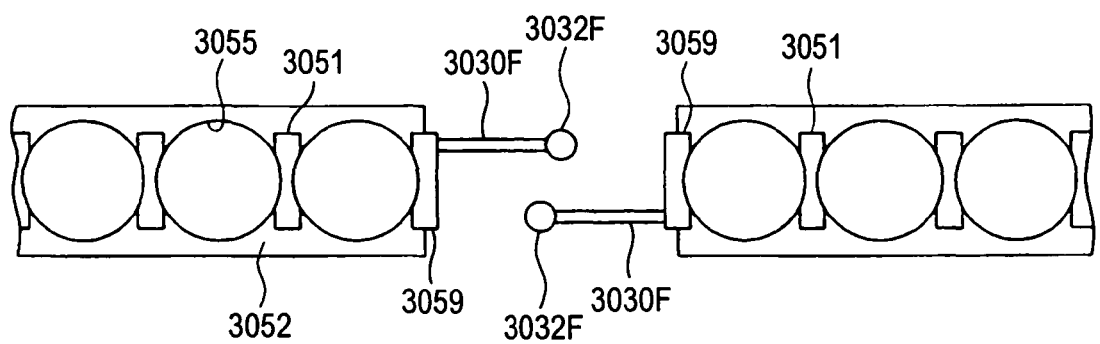
FIG. 50A is a view of the rolling-element accommodation belt of Modification 4-5, corresponding to FIG. 43C.
Figure 50B:
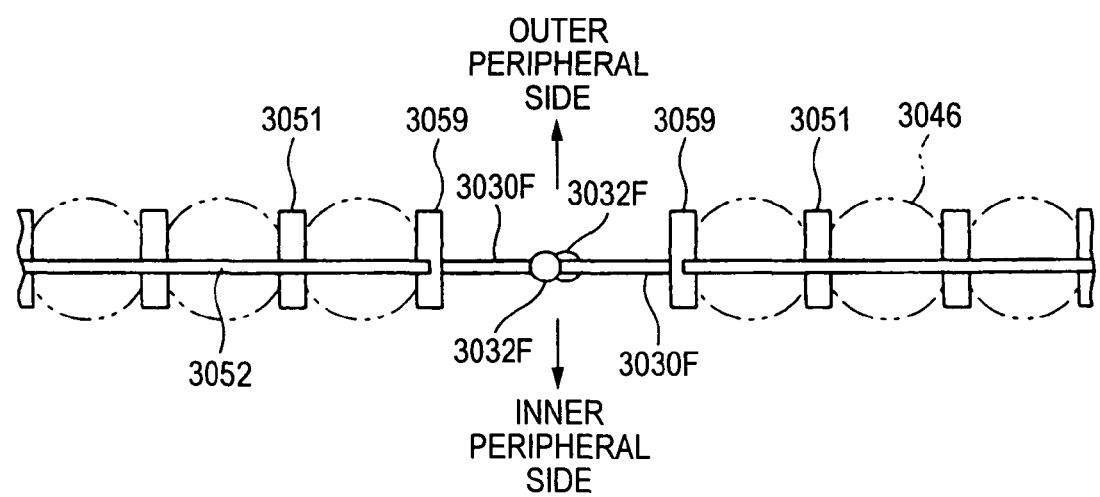
FIG. 50B is a view of the rolling-element accommodation belt of Modification 4-5, corresponding to FIG. 43D.
Figure 51A:
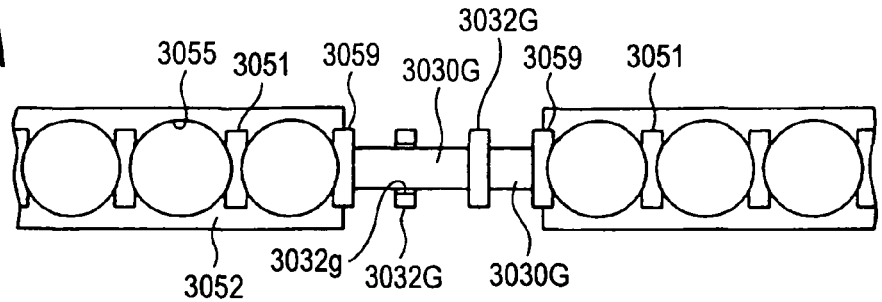
FIG. 51A is a view of the rolling-element accommodation belt of Modification 4-6, corresponding to FIG. 43C.
Figure 51B:
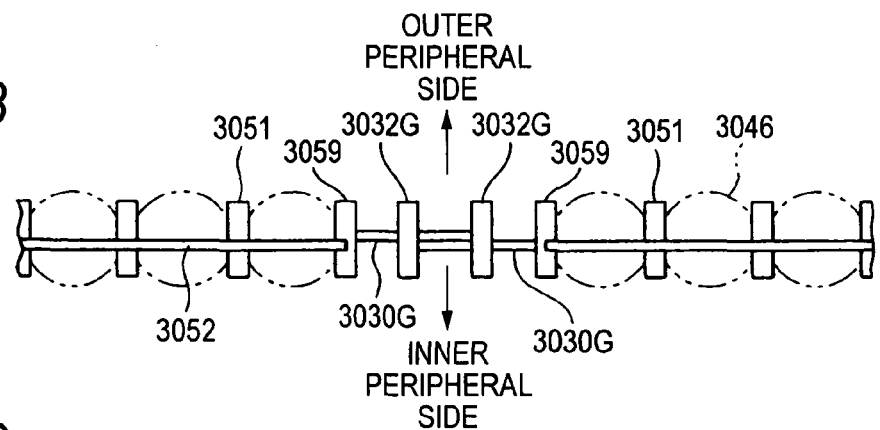
FIG. 51B is a view of the rolling-element accommodation belt of Modification 4-6, corresponding to FIG. 43D.
Figure 51C:
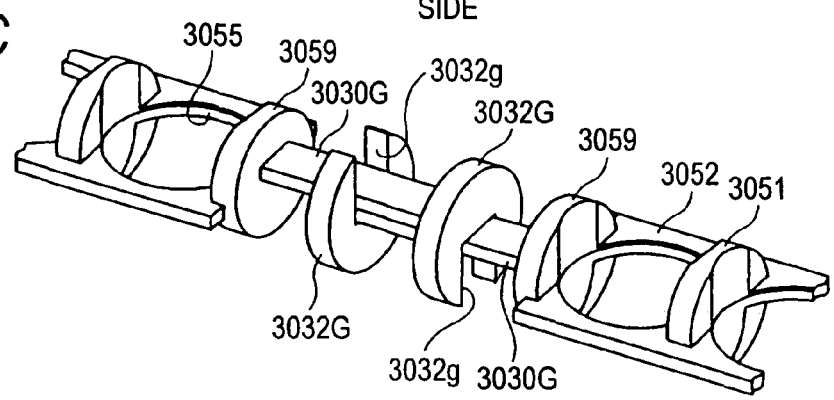
FIG. 51C is an enlarged perspective view of end sections of FIG. 51A, showing an overlap between protruding portions.
Figure 51D:
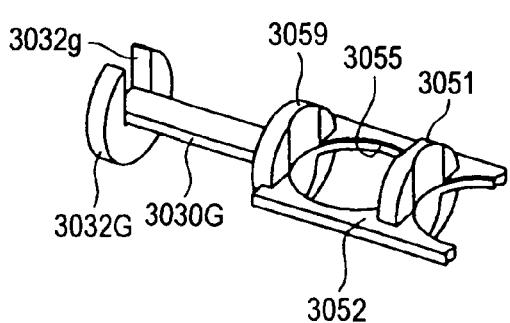
FIG. 51D is a view showing end sections of FIG. 51C.
Figure 51E:
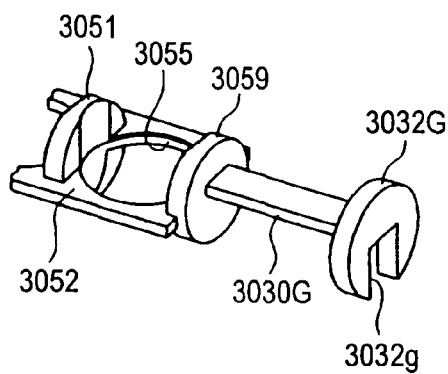
FIG. 51E is a view showing end sections of FIG. 51C.

Moreover, Modification 4-5 of the embodiment is described in, e.g., FIGS. 50A and 50B.

Modification 4-5 differs from the embodiment in that, in contrast with the protrusion sections 3030 of the embodiment, a portion of a protrusion section 3030F extending in the arrangement direction of the balls 3046 is essentially cylindrical. The diameter of the essentially-cylindrical protrusion sections 3030F is essentially as narrow as the thickness of the rectangular protrusion section 3030 in the outer-and-inner-periphery direction. Moreover, the protrusion sections 3030F differs from the protrusion sections 3030 in that a convex section 3032F provided at the leading end of the protrusion section is formed into an essentially-spherical shape. The essentially-spherical convex section 3032F is provided in line with the essentially-cylindrical protrusion section 3030F. With such a configuration, the essentially-cylindrical protrusion section 3030F can be made to have a flexural rigidity smaller than that of the rectangular protrusion section of the embodiment or the rectangular protrusion sections of the modifications. Accordingly, the protrusion sections 3030F can be readily bent in the direction-change passage 3024, and circulation resistance can be diminished. Consequently, there can be provided a linear guide which enables smooth circulation of the rolling-element accommodation belt and operates well.

[Modification 4-6]

Moreover, Modification 4-6 is shown in, e.g., FIGS. 51A to 51E.

As illustrated, Modification 4-6 differs from the embodiment, as in the case of Modification 4-3, in that mutually-opposing flat-plate-like protrusion sections 3030G are provided so as to overlap each other with respect to the outer-and-inner-periphery direction of the endless circulation passage. In this modification, a short-cylindrical bulging portion 3032G is provided at a leading end of each of protrusion sections 3030G overlapping with respect to the outer-and-inner-periphery direction. Further, a notch 3032g is formed in a portion of the bulging portion 3032G. The short-cylindrical convex section 3032G has an outer diameter which is greater than the diameter of the end section 3059 and that of the interposed section 3051 and can be accommodated in the endless circulation passage 3028. The axis of the short-cylindrical shape coincides with the longitudinal direction of the rolling-element accommodation belt 3050. The notch 3032g is formed into a recess section which is greater in width than the protrusion section 3030G and assumes an essentially-rectangular shape. The opening of the recess section is formed so as to oppose an area of the other protrusion section 3030G when the two protrusion sections 3030G overlap each other with respect to the outer-and-inner-periphery direction of the endless circulation passage 3028. As a result, the notch 3032g of the one protrusion section 3032G can fit to the other flat-plate-shaped protrusion section 3030G at the position where the protrusion sections 3030G overlap each other with respect to the outer-and-inner-periphery direction of the endless circulation passage 3028 (see FIG. 51C).

With such a configuration, as in the case of Modification 4-3, the protrusion sections 3030G can overlap each other with respect to the outer-and-inner-periphery direction of the endless circulation passage. Accordingly, erroneous insertion of the balls 3046 between the two end sections of the rolling-element accommodation belt is prevented. Since each of the protrusion sections 3030G has a short-cylindrical bulging portion 3032G, the protrusion section 3030G acts as a guide section as a result of the outer circumferential surface of the bulging portion 3032G making slidable contact with the interior wall surface of the direction-change passage 3024 when the end section 3059 of the rolling-element accommodation belt 3050 has approached the direction-change passage 3024 as in the case of the above embodiment. Consequently, smooth circulation of the rolling-element accommodation belt 3050 and smooth circulation of the balls 3046 can be achieved. Moreover, the protrusion section 3032G has the notch 3032g, and each notch sections 3032g fits to the corresponding flat-plate-like protrusion section 3030G. Accordingly, movement of the rolling-element accommodation belt 3050 in the widthwise direction thereof is constrained by the inner side surfaces of the notches 3032g, thereby preventing or lessening occurrence of meandering of the leading end portion of the belt. Therefore, the leading end of the rolling-element accommodation belt is prevented from being caught by the interior wall surface of the endless circulation passage 3028, or the chance of the leading end being caught by the interior wall surface is diminished, and hence there can be provided a linear guide which enables smooth circulation of the rolling-element accommodation belt and operates well. Further, the protrusion sections 3030G merely overlap each other and are not connected together. For this reason, the necessity for efforts required to cause the latch sections provided at both ends to engage with each other, such as those described in connection with JP-A-10-318257, is obviated, and assembly of the linear guide is easy.

[Modification 4-7]

Moreover, Modification 4-7 is described in, e.g., FIGS. 52A to 52D.

As illustrated, Modification 4-7 differs from the embodiment, as in the case of Embodiment 4-6, in that mutually-opposing flat-plate-like protrusion sections 3030H are provided so as to overlap each other with respect to the outer-and-inner-periphery direction of the endless circulation passage.

As in the case of Embodiment 4-6, the protrusion sections 3030H overlap each other with respect to the outer-and-innerperiphery direction of the endless circulation passage 3028. The position where a base end section of the protrusion section 3030H is to be formed is determined at a location deviated in the outer-and-inner-periphery direction of the endless circulation passage 3028 in such a way that mutual interference does not arise between the base end sections. Specifically, when the protrusion sections overlap each other, the protrusion section 3030H (i.e., the protrusion section shown in FIG. 52A) to be located at a position closer to the inner periphery side of the endless circulation passage 3028 is formed so as to have its base end section at the position deviated closer to the inner periphery side with respect to the outer-and-inner-periphery direction of the endless circulation passage 3028. Meanwhile, the section 3030H (i.e., the protrusion section shown in FIG. 52B) to be located at a position closer to the outer periphery side of the endless circulation passage 3028 is formed so as to have its base end section at the position deviated closer to the outer periphery side with respect to the outer-and-inner-periphery direction of the endless circulation passage 3028.

In Embodiment 4-7, the flat-plate-like protrusion sections 3030H have previously been formed into a shape curved toward the inner side with respect to the outer-and-inner-periphery direction of the endless circulation passage 3028, in conformity with the curved portion of the endless circulation passage 3028. Specifically, the curvature radius of the curved shape of the protrusion section 3030H (i.e., the protrusion section shown in FIG. 52A) that is to come to the inner periphery side of the endless circulation passage 3028 when the two protrusion sections 3030H overlap each other is previously determined so as to become smaller than the curvature radius of the curved shape of the protrusion section 3030H (the protrusion section shown in FIG. 52B) that is to come to the outer periphery side.

Figure 52A:
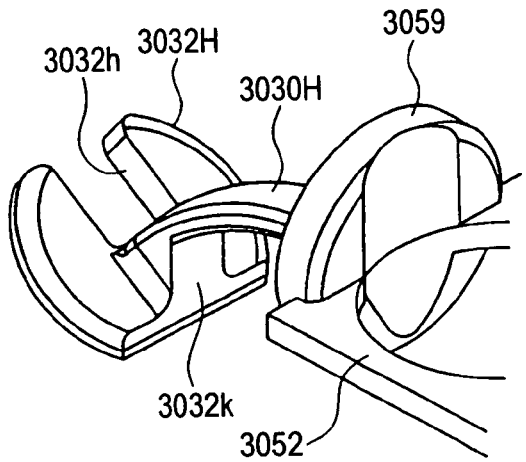
FIG. 52A is a perspective view showing end sections of a rolling-element accommodation belt of Modification 4-7.
Figure 52B:
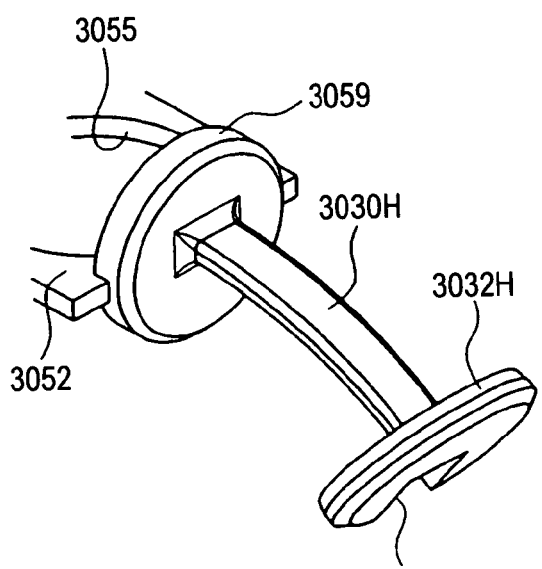
FIG. 52B is a perspective view showing the end sections of the rolling-element accommodation belt of Modification 4-7.

Each of the protrusion sections 3030H has a convex section formed in the same manner as in the case of Modification 4-6. Specifically, each of the protrusion sections 3030H has, at a leading-end thereof, an essentially-short-cylindrical convex section 3032H having a notch 3032h formed therein. As shown in FIG. 52A, a flank 3032k used for preventing the convex section from being caught by the interior wall surface of the endless circulation passage 3028 is formed in the convex section 3032H of the protrusion section 3030H to be located at the inner periphery side of the endless circulation passage 3028. This flank 3032k is formed by means of cutting out a portion of the area of the protrusion section opposing the inner periphery side of the endless circulation passage 3028 by only an amount required to prevent occurrence of interference between the interior wall surface of the endless circulation passage 3028 and the protrusion section.

Figure 52C:
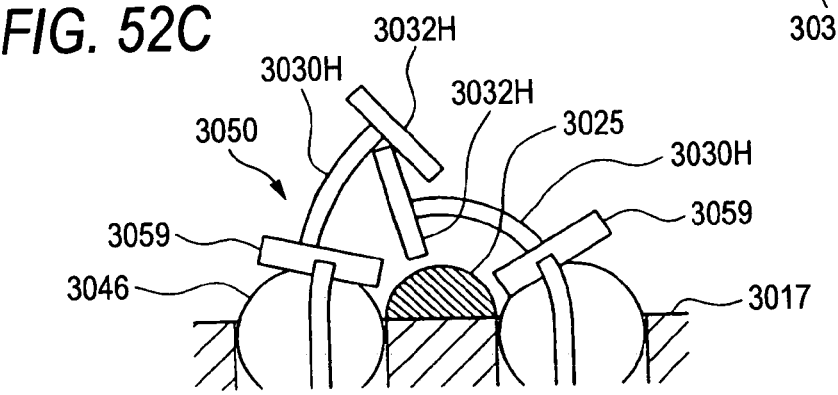
FIG. 52C shows a state where the rolling-element accommodation belt of Modification 4-7 is incorporated into a slider main body with an end cap removed.
Figure 52D:
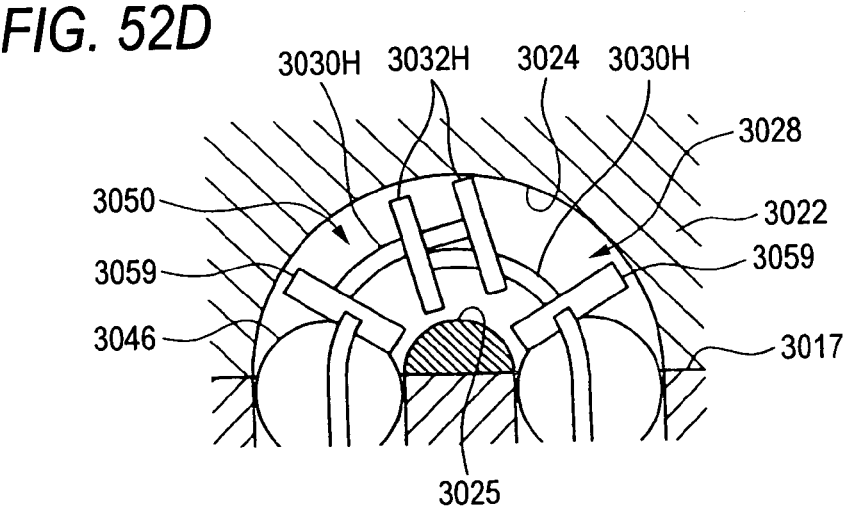
FIG. 52D shows a state where the end cap is removed after the rolling-element accommodation belt of Modification 4-7 has been inserted into a slider main body.
Figure 53:
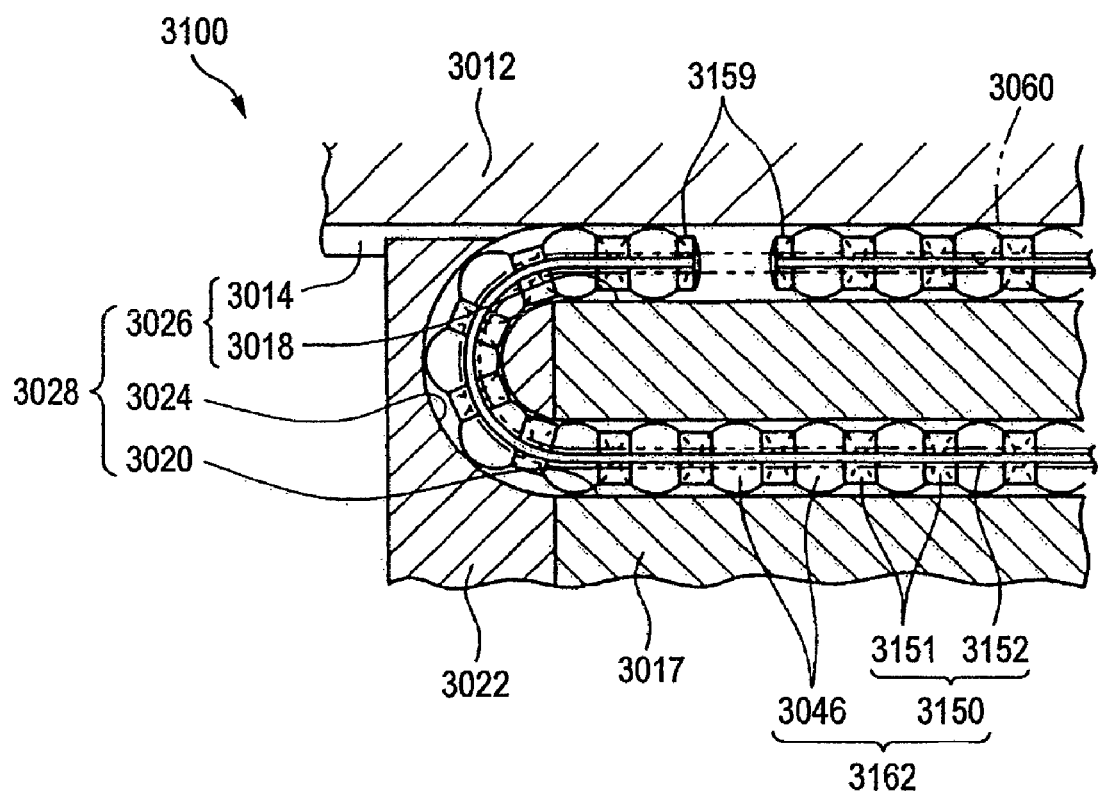
FIG. 53 is a view for describing an example of the related-art linear guide apparatus, showing an endless circulation passage in the form of a cross-sectional view taken along in a direction in which rolling elements are arranged.

Incidentally, under the above-mentioned "second assembly method," as shown in FIG. 52C, one end cap 3022 of the slider 3016 is removed from the slider main body 3017, and the rolling-element accommodation belt 3050 is inserted into the endless circulation passage 3028 from the opening of the slider main body 3017. After insertion of the rolling-element accommodation belt 3050 into the slider main body 3017, the end cap 3022 is attached as shown in FIG. 52D.

If the rolling-element accommodation belt 3050 has the configuration described in connection with Modification 4-7, both protrusion sections 3030H have previously been formed into the curved shape, as mentioned, during the assembly operation. Accordingly, at the time of attachment of the end cap 3022, the protrusion section 3030H to be located at the inner periphery side of the endless circulation passage 3028 naturally comes to the inner periphery side, and the protrusion section 3030H to be located at the outer periphery side of the endless circulation passage 3028 naturally comes to the outer periphery side (see FIGS. 52C and 52D). The rolling-element accommodation belt 3050 can be incorporated into a desired inserted state without paying special consideration to the arrangement of the end sections of the rolling-element accommodation belt 3050 at the inner and outer peripheries. Consequently, efforts required to make corrections on the arrangement of the end sections of the rolling-element accommodation belt 3050 at the inner and outer peripheries can be obviated, and hence assembly of the rolling-element accommodation belt is easy.

Fifth Embodiment

A rolling-element accommodation belt 4050 according to a fifth embodiment of the present invention will now be described.

Figure 54:
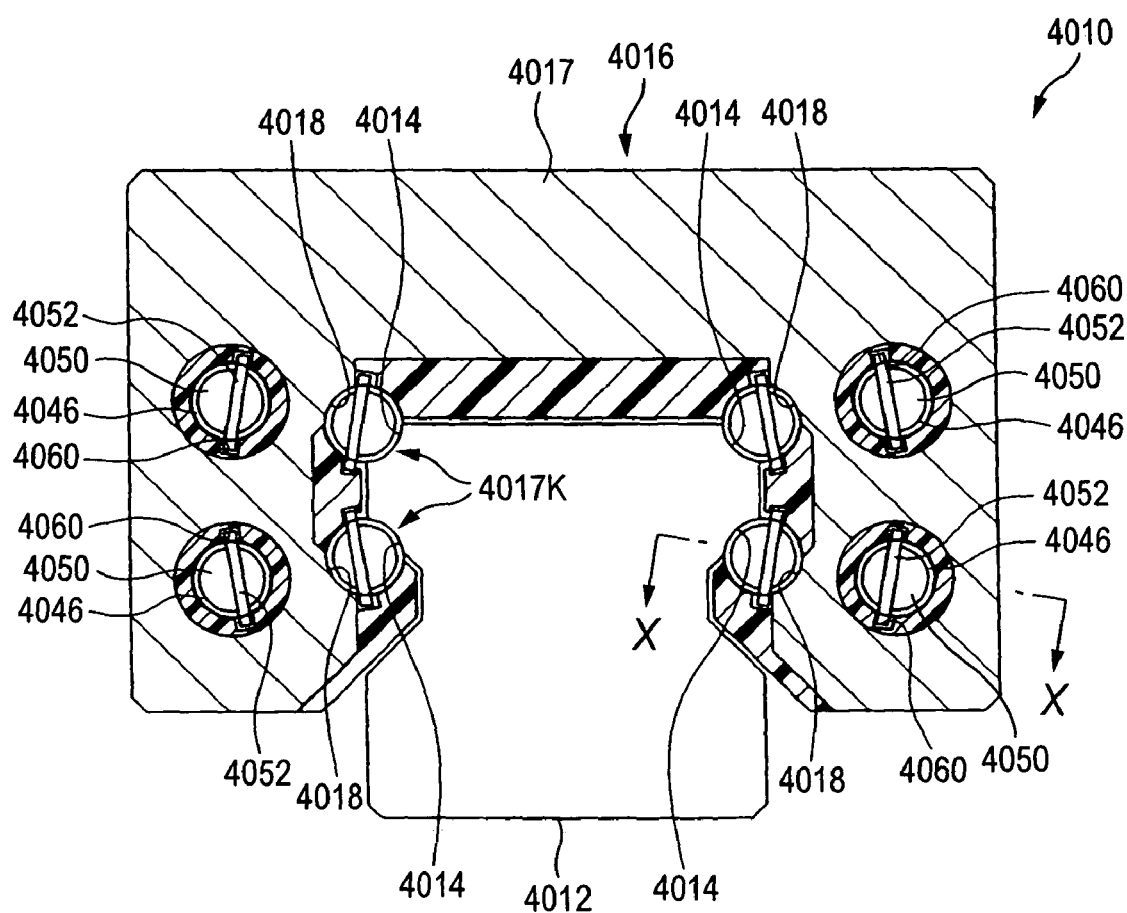
FIG. 54 is a descriptive view showing a slider of a linear guide of a fifth embodiment in the form of a transverse plane.

As shown in FIG. 54, in the rolling-element accommodation belt 4050, a connection section 4052 extending in the widthwise direction thereof within an endless circulation passage 4028 is guided at both widthwise sides by means of groove-shaped guide sections 4060 formed in the endless circulation passage 4028. Open window sections 4017k opened so as to oppose rolling-element guide surfaces 4014 are formed in an inner portion of an essentially-C-shaped sleeve. Areas forming the open window sections 4017k are formed from a resin material (e.g., polyacetal, polyamide, or the like).

Figure 56A:
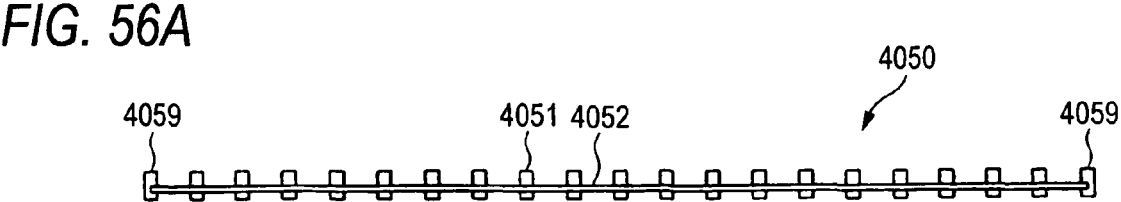
FIG. 56A is a view of a developed, stretched rolling-element accommodation belt.
Figure 56B:
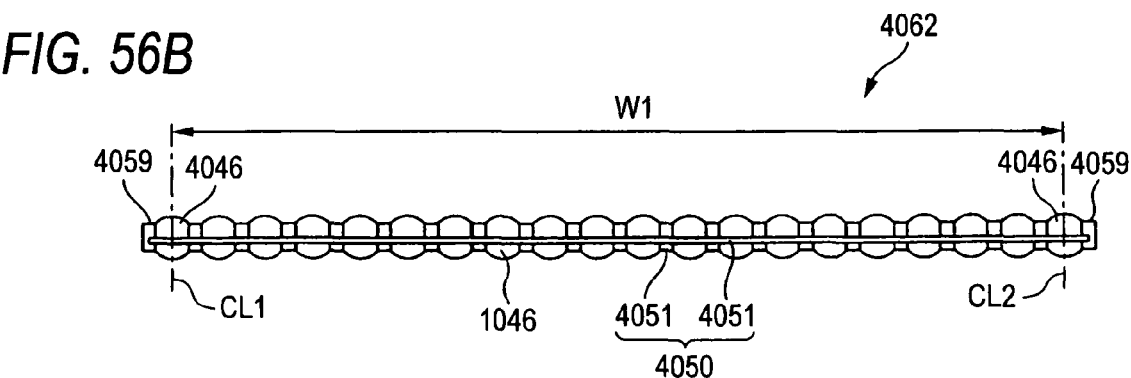
FIG. 56B is a view showing a state where a line of rolling elements is formed by means of causing the rolling-element accommodation belt to accommodate rolling elements.
Figure 56C:
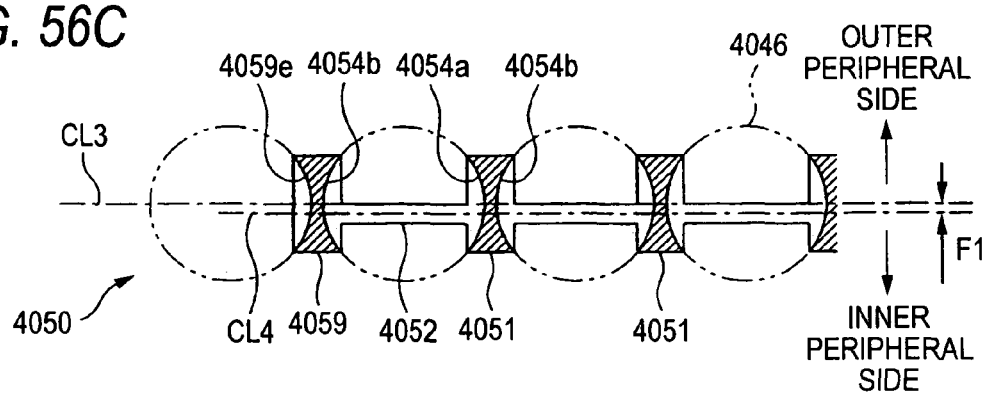
FIG. 56C is a fragmentary enlarged view of the rolling-element accommodation belt shown in FIG. 56A including an end section of the belt.
Figure 56D:
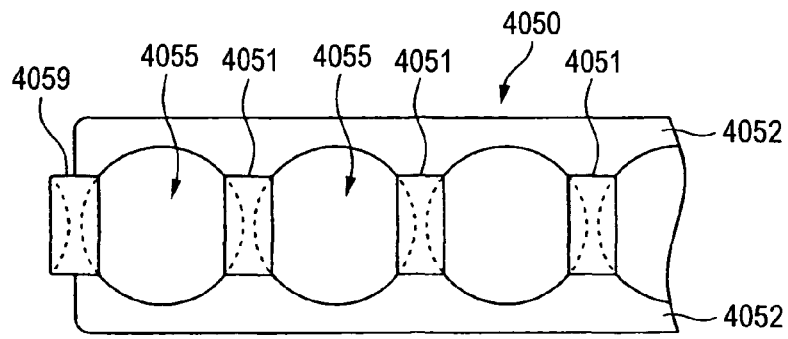
FIG. 56D is a view of FIG. 56C when viewed from above.

FIGS. 56A to 56D are views for describing the rolling-element accommodation belt. FIG. 56A is a view of the developed, stretched rolling-element accommodation belt; FIG. 56B is a view showing a state where a line of rolling elements is formed by means of causing the rolling-element accommodation belt to accommodate rolling elements; FIG. 56C is a fragmentary enlarged view of the rolling-element accommodation belt shown in FIG. 56A including an end section of the belt; and FIG. 56D is a view of FIG. 56C when viewed from above.

This rolling-element accommodation belt 4050 is formed from a synthetic resin material (e.g., polyester-based elastomer, polyurethane, or the like) into a shape having ends, by means of injection molding. As shown in FIGS. 56A to 56D, an end section 4059 is provided at each of the ends. These two end sections 4059 oppose each other in a non-contacting manner within the endless circulation passage 4028 (see FIG. 55). The rolling-element accommodation belt 4050 comprises spacer sections 4051 interposed among adjacent balls 4046 within the endless circulation passage 4028; and a pair of belt-shaped connection sections 4052 for connecting the spacer sections 4051 at both ends in the widthwise direction of the endless circulation passage 4028.

The spacer sections 4051 are short-cylindrical members having an outer diameter smaller than that of the ball 4046. Spherical, concave surfaces 4054a and 4054b continuous with the curved with adjacent balls 4046 are provided on both end faces of the short-cylindrical shape in alignment with the arrangement direction of the balls 4046 within the endless circulation passage 4028. The concave surfaces 4054a, 4054b are arranged on both sides of each of the ball accommodation holes while being separated at a predetermined distance away from each other in the arrangement direction of the balls 4046 (see FIG. 56C). A concave surface 4059e capable of contacting the ball 4046 as do the concave surfaces 4054a, 4054b is provided on a side of each end section 4059 opposite a side thereof facing the rolling-element accommodation section (see FIG. 56C).

The connection section 4052 is a thin, elongated, and belt-shaped member; and circular ball accommodation holes 4055 used for accommodating the balls 4046 are formed in line with the longitudinal direction thereof (see FIG. 56D). The ball accommodation holes 4055 are formed so as to have an inner diameter which enables freely-removable engagement of the ball 4046 in the front-rear direction of the connection section 4052. As shown in FIG. 56C, the connection section 4052 connects the spacer sections 4051 together at both sides in the widthwise direction of the endless circulation passage 4028 and at a position deviated by the amount of offset T toward the inner periphery side in the endless circulation passage 4028 into which the balls are to be accommodated, in relation to a center line CL3 interconnecting the centers of the balls 4046.

In correspondence to the respective ball accommodation holes 4055, the spaces defined by the spacer sections 4051 and the connection sections 4052 serve as a plurality of rolling-element accommodation sections. The balls 4046 are individually accommodated at predetermined intervals into the rolling-element accommodation sections, so that the balls can be aligned into a line of rolling-elements 4062, as shown in FIG. 56B. At this time, in the present embodiment, the rolling-element accommodation sections are formed so as to constrain the accommodated balls 4046 in every direction by means of mutually-opposing concave surfaces 4054a, 4054b at predetermined intervals.

Figure 57:
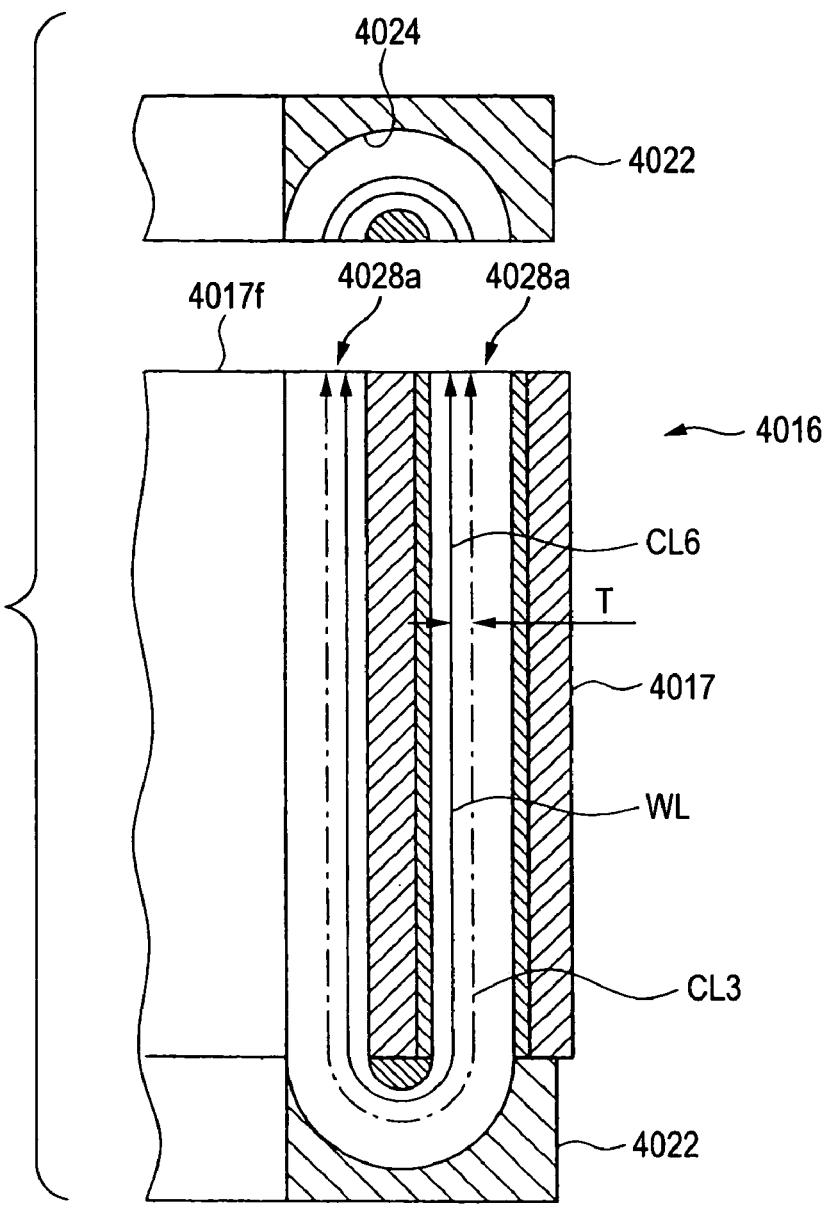
FIG. 57 is a view for describing the slider—into which the rolling-element accommodation belt is to be inserted—in the linear guide apparatus of the fifth embodiment.

In relation to the developed length of the rolling-element accommodation belt 4050, a distance W1 (see FIG. 56B) between the centers of the balls 4046 in the rolling-element accommodation sections located at the respective end sections of the rolling-element accommodation belt is shorter than the length WL of the endless circulation passage 4028 achieved after removal of one end cap 4022 from the slider 4016 shown in FIG. 57 (i.e., the distance W1 between the centers<the length WL of the passage). Reference symbol CL3 shown in FIG. 57 denotes the center line interconnecting the centers of the balls 4046 in the endless circulation passage 4028. The length WL of a line CL6, which is deviated from the center line CL3 toward the inner periphery side of the endless circulation passage 4028 by the amount of offset T, corresponds to a developed length from one opening section 4028a in an end face 4017f of the slider main body 4017 to the other opening section 4028a of the same.

Figure 55:
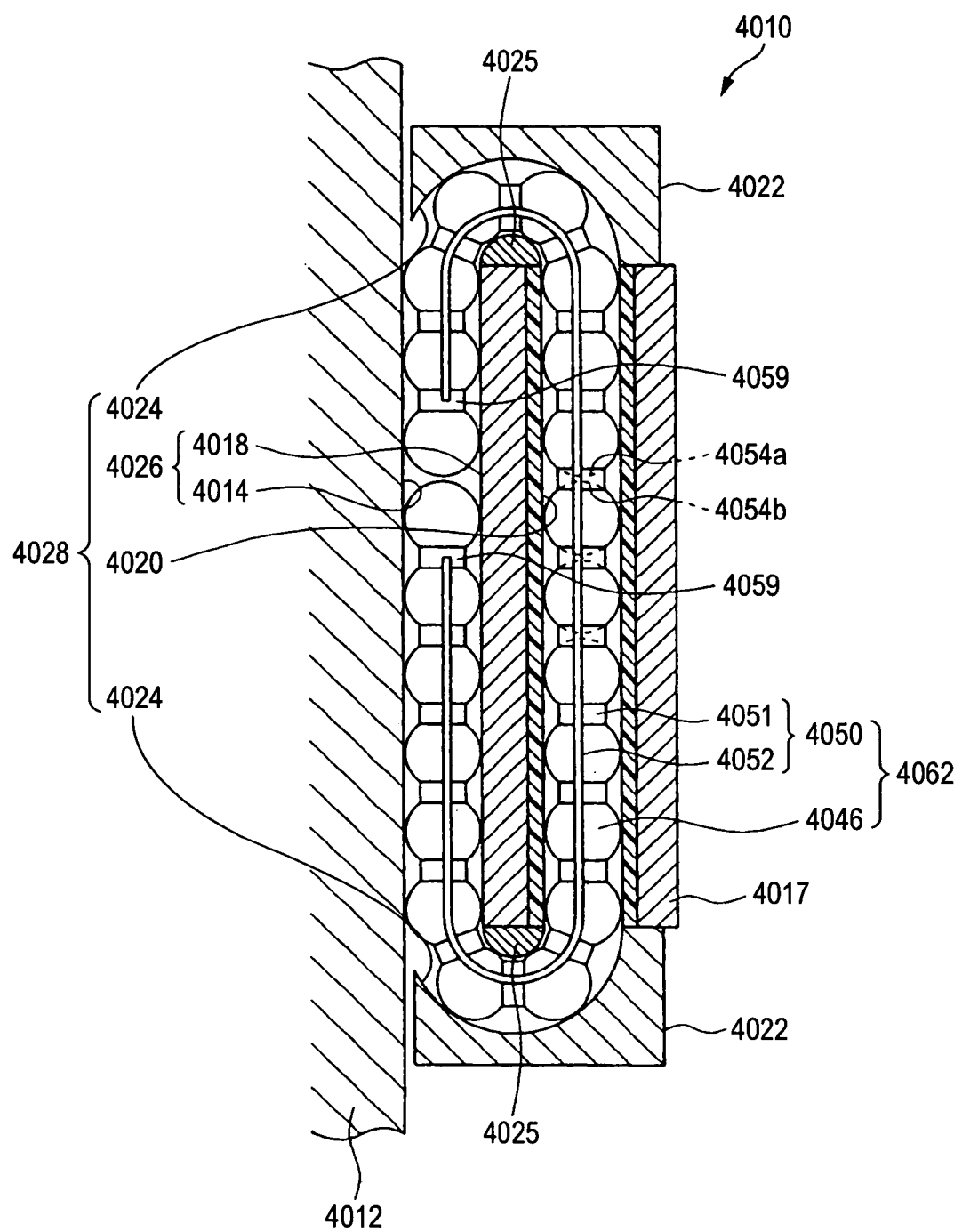
FIG. 55 is a cross-sectional view of the linear guide of FIG. 54 taken along line X-X.

Moreover, as shown in FIG. 55, in four lines of rolling elements 4062 in the respective endless circulation passages 4028 of this linear guide 4010, the two end sections 4059 of each rolling-element accommodation belt 4050 in the respective endless circulation passage 4028 oppose each other in a non-contacting manner within the endless circulation passage 4028. Two balls 4046 which are not accommodated are inserted into a rolling-element accommodation section located between the two mutually-opposing end sections 4059.

By reference to FIG. 58, there will now be described procedures for inserting the line of rolling elements 4062 in the respective endless circulation passages 4028 in the step of inserting the rolling-element accommodation belt 4050 into the linear guide 4010, as well as operations pertaining to the procedures.

In the step of insertion of the rolling-element accommodation belt 4050, one end cap 4022 is removed from the slider 4016 as the step of inserting rolling elements as shown in FIG. 58A, and a line of rolling elements 4062 shown in FIG. 56B is inserted into the endless circulation passage 4028 from the opening formed by removal of the end cap 4022. As shown in FIG. 58A, the line of rolling elements 4062 is inserted into the endless circulation passage 4028 until the line is aligned to the two opened end sections 4059.

At this time, the distance W1 between the centers (see FIG. 56B) is shorter than the length WL of the endless circulation passage 4028 (see FIG. 57) achieved after removal of one end cap 4022 from the slider 4016. The balls 4046 arranged in an opening section 4028a can be inserted in such a way that the center position CL5 achieved at that time becomes inside in relation to the end face 4017f of the slider main body 4017 (indicated by reference symbol U in the drawing), as shown in FIG. 58A. Likewise, the lines of rolling elements 4062 are sequentially inserted into the respective endless circulation passages 4028. In the illustrated example, the center positions CL5 of the balls 4046 located at the respective ends of the rolling-element accommodation belt 4050 are made flush with each other in the drawing. However, the rolling elements do not need to be incorporated while the center positions CL5 are brought into line. The essential requirement is that the balls are incorporated in such a way that the center positions of the balls 4046 located at the respective ends are situated inside in relation to an end face 4017f of the slider main body 4017.

Next, as shown in FIG. 58B, the removed end cap 4022 (a cap member) is attached to the slider main body 4017 (an end cap attachment step) after the step of insertion of rolling elements.

As shown in FIGS. 58C and 58D, the position of the end section 4059 of the rolling-element accommodation belt 4050 achieved in the arrangement direction is moved to the position of the open window section 4017k formed so as to oppose the rolling-element guide surface 4014 in relation to each of the lines of rolling elements 4062 of the plurality of respective endless circulation passages 4028. Subsequently, the two balls 4046 which are not accommodated into any rolling-element accommodation sections are incorporated into a clearance K between mutually-opposing both end sections 4059 (a non-accommodated rolling-element incorporation step). As shown in FIGS. 58C and 58D, the balls 4046 are inserted from the open window sections 4017k of the slider 4016. The width of the open window 4017k is smaller than the diameter of the ball 4046. However, as mentioned previously, the open window section 4017k is formed from a resin material; e.g., polyacetal, polyamide, or the like, and therefore is elastic. For these reasons, the ball 4046 can be snap-fitted from the open window section 4017k, and the thus-fitted ball 4046 does not fall. Finally, the slider 4016 into which the line of rolling elements 4062 is incorporated as mentioned previously is attached to the guide rail 12.

Working-effects of this linear guide 4010 will now be described.

According to the linear guide 4010, in relation to the developed length of the rolling-element accommodation belt 4005, the distance W1 between the centers of the balls 4046 in the rolling-element accommodation sections located at the respective ends is shorter than the length WL of the endless circulation passage 4028 achieved by removal of one end cap 4022 from the slider 4016 (the distance W1 between the centers<the length WL of the passage). When the endless circulation passage 4028 is opened by removal of one end cap 4022 in the step of insertion of the rolling-element accommodation belt 4050, the rolling-element accommodation belt can be inserted in such a way that the center positions CL5 of the balls located at the respective ends of the rolling-element accommodation belt 4050 come to a position inside in relation to the end face 4017f of the slider main body 4017. Accordingly, even when the end cap 4022 contacts the rolling-element accommodation belt 4050 at the time of attachment of the removed one end cap 4022, the rolling-element accommodation belt 4050 extending beyond the end face 4017f of the slider main body 4017 is not flexed to such an extent that the rolling elements are dislodged in unexpected directions. Consequently, the operation for attaching the end cap 4022 can be performed simply and quickly.

According to this linear guide 4010, the end sections 4059 of the rolling-element accommodation belt 4050 oppose each other in a non-contacting manner within the endless circulation passage 4028, and two balls 4046 which are not accommodated into any rolling-element accommodation sections are incorporated into a space between the thus-mutually-opposing end sections 4059. As a result, even when the clearance (clearance K) existing between the end sections 4059 of the rolling-element accommodation belt 5050 is wide, the balls 4046 are arranged in the clearance. Hence, a decrease in the number of balls 4046 bearing the load in the rolling-element raceway 4026 can be inhibited. Consequently, a decrease in the loading capacity of the linear guide 4010 and a decrease in the rigidity of the linear guide 4010 can be prevented.

Embodiment 5-2

Embodiment 5-2 of the present invention will now be described. The linear guide of Embodiment 5-2 differs from that described in connection with Embodiment 5-1 only in the rolling-element accommodation belt. In other respects, the linear guides are similar to each other in terms of structure. Hence, explanations are provided solely to the rolling-element accommodation belt, and repeated explanations of the other portions are omitted.

Figure 59A:
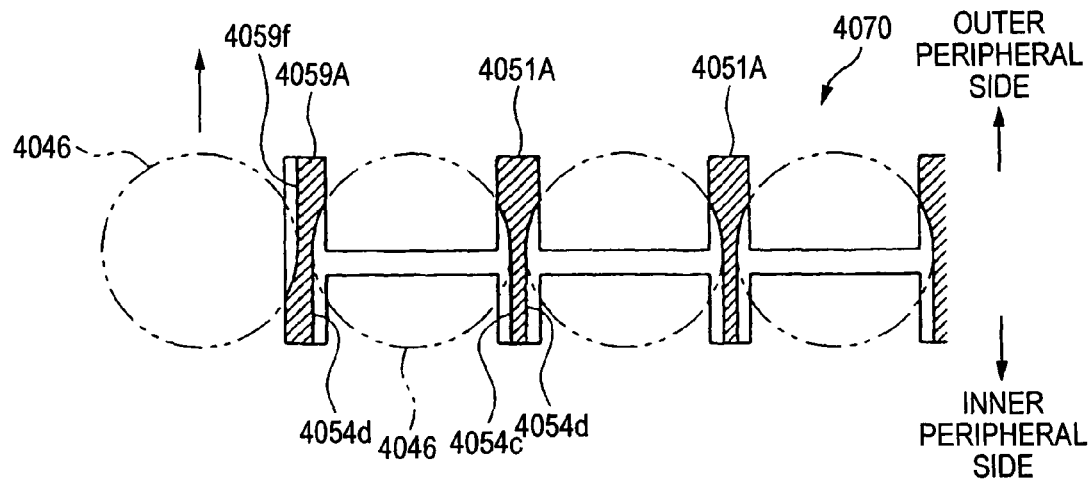
FIG. 59A is a fragmentary enlarged view of the rolling-element accommodation belt including an end section thereof.
Figure 59B:
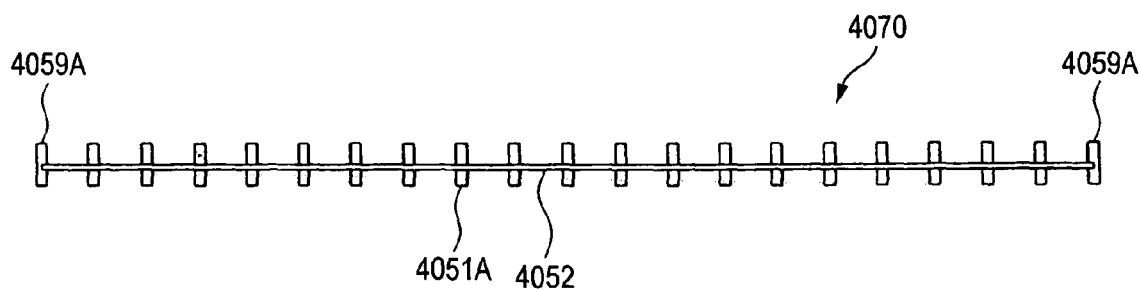
FIG. 59B is a view of the developed, stretched rolling-element accommodation belt.
Figure 59C:
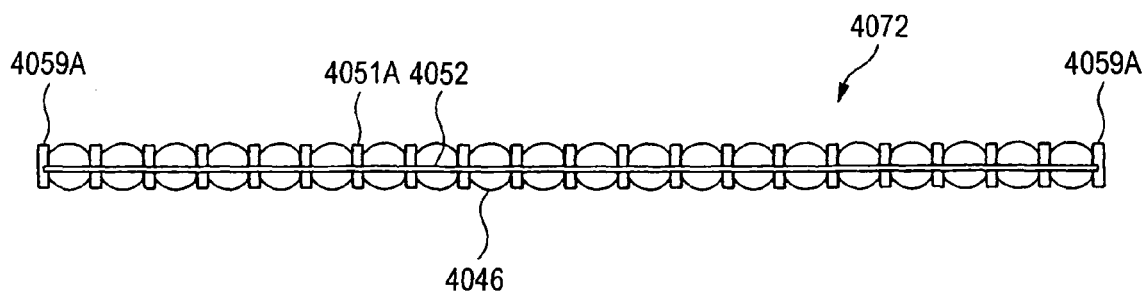
FIG. 59C is a view showing a state where a line of rolling elements is formed by means of causing the rolling-element accommodation belt to accommodate rolling elements.

As shown in FIGS. 59A to 59C, in the linear guide of Embodiment 5-2, the shape of spacer sections in a rolling-element accommodation belt 4070 is different from the shape of the spacer sections in the rolling-element accommodation belt of Embodiment 5-1.

In this rolling-element accommodation belt 4070, each of spacer sections 4051A except spacer sections 4059A located at end sections has contact surfaces 4054c and 4054d, each of which assumes a shape for enabling movement of the ball 4046 to be accommodated toward the inner periphery of the endless circulation passage 4028. A rolling-element-accommodation-section side of the spacer section 4059A located at the end section has the contact surface 4054d whose shape allows movement of the rolling element toward the inner periphery of the endless circulation passage 4028. The other side of the spacer section 4059A has the contact surface 4059f whose shape allows movement of the rolling element toward the outer periphery of the endless circulation passage 4028.

A step for incorporating the rolling-element accommodation belt 4070 will now be described by reference to FIGS. 60A and 60B, 61A to 61C, and 62A to 62D.

Figure 60A:
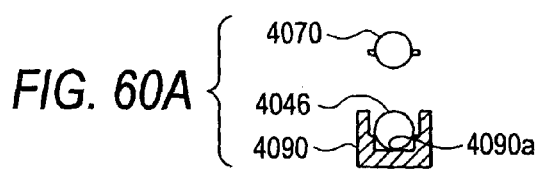
FIG. 60A is a view for describing procedures and operation for inserting a line of rolling elements into a rolling-element accommodation belt of a modification, to thus form a line of rolling elements.
Figure 60B:
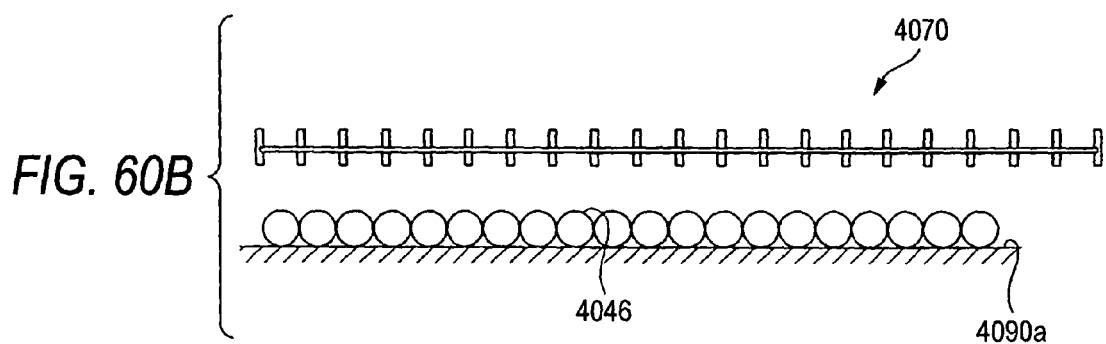
FIG. 60B is a view for describing procedures and operation for inserting a line of rolling elements into a rolling-element accommodation belt of the modification, to thus form a line of rolling elements.

As shown in FIGS. 60A and 60B, only the balls 4046 are arranged on recess sections 4090a in a jig 4090 having an essentially-C-shaped cross-sectional profile, to thus insert the balls 4060 into the rolling-element accommodation belt 4070.

Figure 61A:
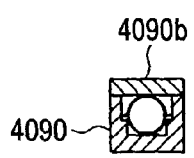
FIG. 61A is a view for describing procedures and operation for inserting a line of rolling elements into a rolling-element accommodation belt of a modification, to thus form a line of rolling elements.
Figure 61B:
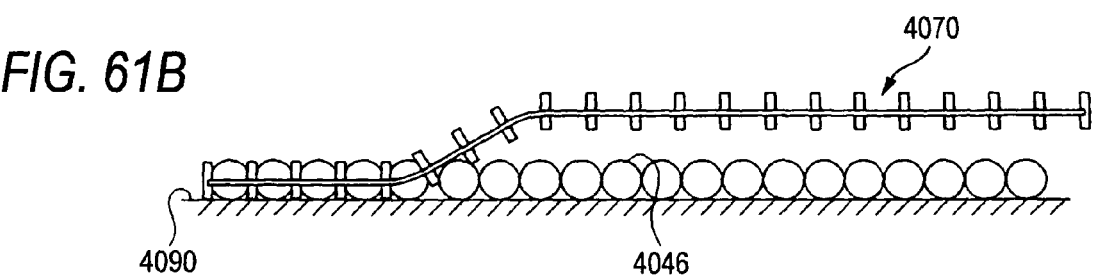
FIG. 61B is a view for describing procedures and operation for inserting a line of rolling elements into a rolling-element accommodation belt of the modification, to thus form a line of rolling elements.
Figure 61C:
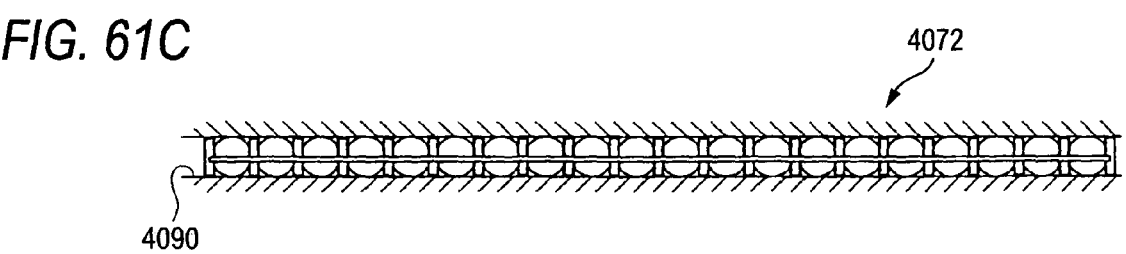

As shown in FIGS. 61A to 61C, the balls 4046 are first sequentially accommodated into the respective rolling-element accommodation sections of the rolling-element accommodation belt 4070 from one end (i.e., the left end in FIG. 61B).

Next, this rolling-element accommodation belt 4070 is situated above the balls 4046, and the balls 4046 are sequentially accommodated into the respective rolling-element accommodation sections of the rolling-element accommodation belt 4070 from one end (i.e., the left end in FIG. 61B) as shown in FIGS. 61A to 61C. The upper opening of the jig 4090 is closed by a top plate 4090b, whereby all the balls 4046 are aligned into a line of rolling elements 4072 incorporated into the rolling-element accommodation belt 4070 (see FIG. 61A). As shown in FIGS. 62A to 62D, the line of rolling elements 4072 accommodated into the jig 4090 is inserted into the slider 4016 according to the procedures similar to those described in connection with Embodiment 5-1 (i.e., procedures described by reference to FIGS. 58A to 58D).

As shown in FIG. 62B, according to the rolling-element accommodation belt 4070, the center positions CL5 of the balls 4046 located at the respective ends of the rolling-element accommodation belt 4070 are located inside in relation to the end faces 4017f of the slider main body 4017 even in the linear guide of Embodiment 5-1. As a result, occurrence of warpage of the rolling-element accommodation belt 4070 is prevented, and dropping of the balls 4046, which would otherwise be caused during assembly of the end cap 4022, is prevented.

Moreover, according to the rolling-element accommodation belt 4070, the ball 4046 can be removably attached to either the front or back of the belt. Hence, efforts required to insert the balls 4046 into the rolling-element accommodation belt 4070 can be diminished significantly.

Specifically, there is adopted a configuration for allowing removal of the rolling elements in at least one direction of the front-and-back direction of the rolling-element accommodation belt, whereby efforts required to insert the rolling elements into the rolling-element accommodation belt can be significantly reduced as compared with the configuration of disabling removal of the balls 4046 in either the direction of front or back of the rolling-element accommodation belt, as described in connection with Embodiment 5-1.

Figure 66:
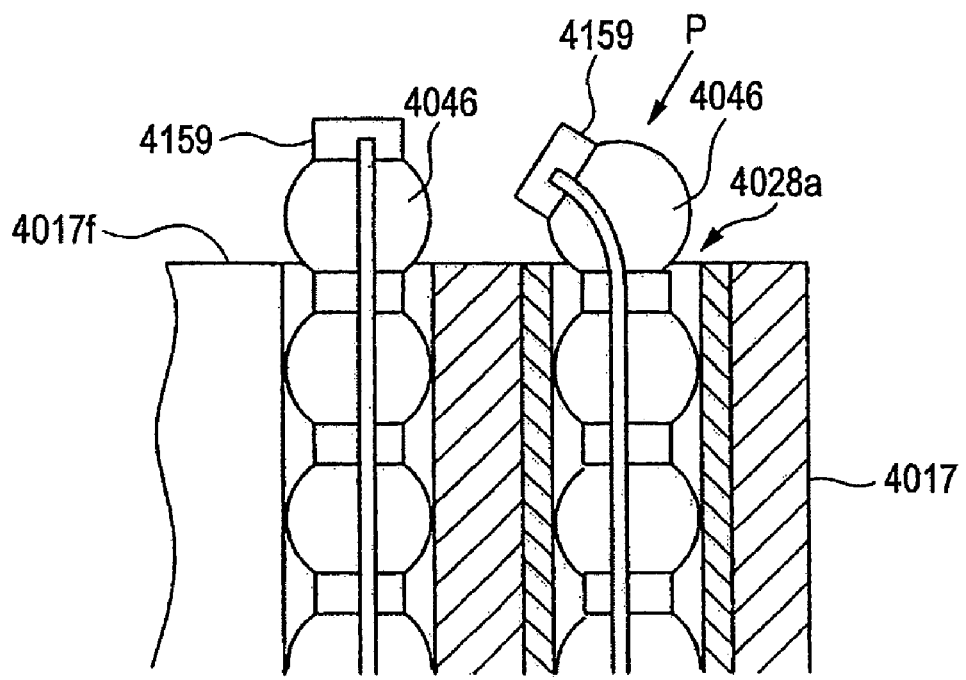

Particularly, the rolling-element accommodation belt of a configuration which enables removal of rolling elements in at least one direction of the front-and-back direction incompletely constrains the rolling elements to the rolling-element accommodation belt. Accordingly, as in the case of the related-art shown in FIG. 66, when the leading end of the rolling-element accommodation belt has jutted out from the end face of the slider main body, the potential risk of the rolling elements falling from the rolling-element accommodation belt is higher. For this reason, in order to reduce the chance of falling of the rolling elements, an advantage yielded by application of the present invention to the rolling-element accommodation belt of a configuration which enables removal of the rolling elements is particularly high.

As illustrated in an enlarged manner in FIG. 59A, according to the rolling-element accommodation belt 4070, the spacer section 4059A situated at the end section is configured such that a contact surface 4059e on the side of the spacer section 4059, which contacts the ball 4046 and opposes the side thereof facing the rolling-element accommodation section, does not constrain the ball 4046 toward the outer periphery side of the endless circulation passage 4028. Accordingly, when the balls 4046 are inserted into the spacer sections 4059A from the open window section 4017k, the contact surface 4059e does not interfere with insertion of the balls. Specifically, according to the rolling-element accommodation belt 4070, the ball 4046 can be more readily inserted between the mutually-opposing spacer sections 4059A at both ends within the endless circulation passage 4028 after assembly of the rolling-element accommodation belt 4070 into the slider 4016.

As mentioned above, according to the linear guide 4010, operation for attaching an end cap after insertion of the rolling-element accommodation belt in the step of incorporation of the rolling-element accommodation belt can be facilitated.

The linear guide apparatus of the present invention is not limited to the embodiments and is susceptible to various modifications without departing from the gist of the present invention.

For instance, the respective embodiments have described the case where the rolling elements correspond to balls. However, the present invention is not limited to the embodiments. Even when the rolling elements are rollers, similar working-effects can be yielded.

Figure 63:
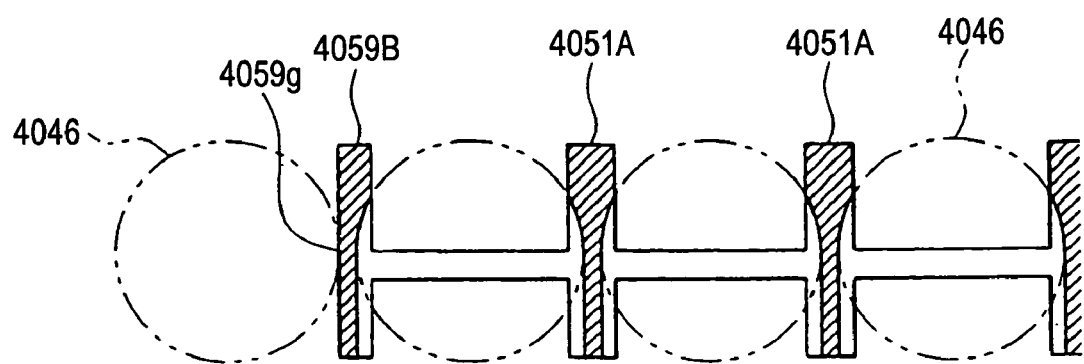
Figure 64:
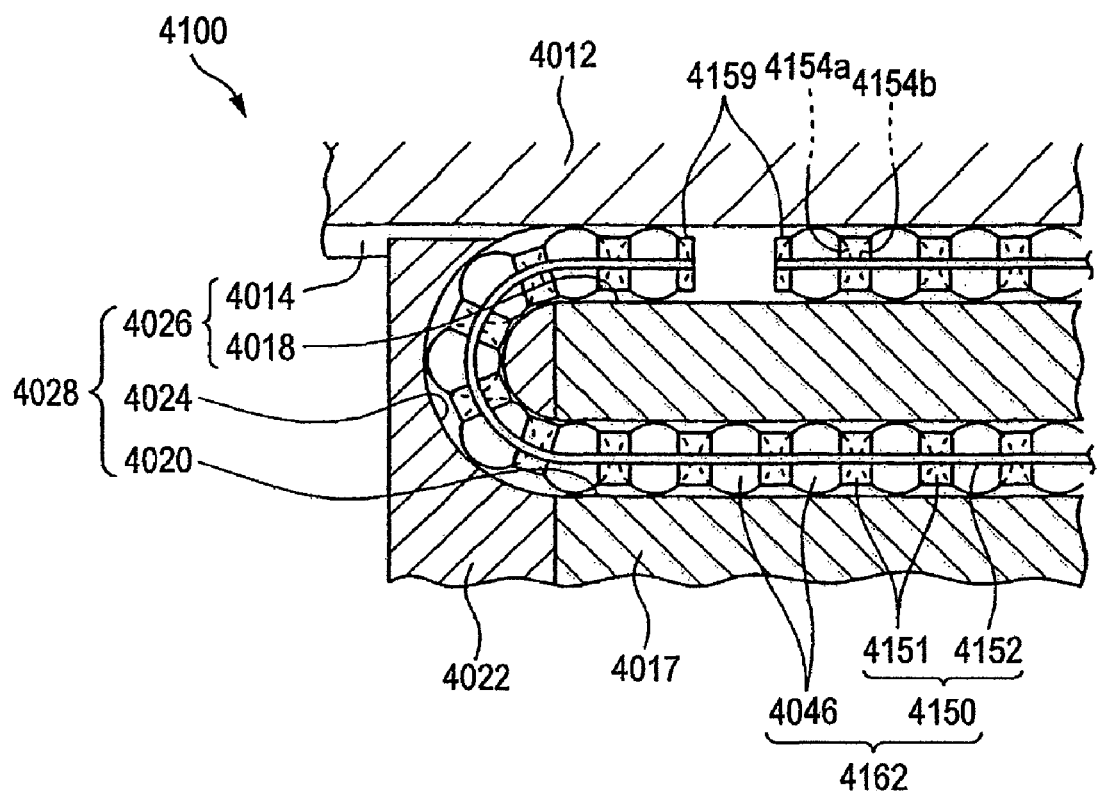

For instance, Embodiment 5-1 has been described by reference to the example wherein the contact surface 4059e of the spacer section 4059 located at the end section, the surface contacting the ball 4046 and opposing the side thereof facing the rolling-element accommodation section, is formed into a concave surface conforming to the curved surface of the ball 4046. Embodiment 5-2 has been described by reference to the example wherein the contact surface 4059f of the spacer section 4059 located at the end section, the surface contacting the ball 4046 and opposing the side thereof facing the rolling-element accommodation section, is formed into a surface which does not constrain the ball 4046 toward the outer periphery side of the endless circulation passage 4028. However, the contact surface is not limited to that surface and can be formed into a plane having an arbitrary shape. However, in order to realize a configuration for enabling easier insertion of a rolling element between mutually-opposing spacer sections located at the respective ends within the endless circulation passage, forming the contact surface which does not constrain a rolling element toward at least the outer periphery of the endless circulation passage is preferable. FIG. 63 shows, e.g., a modification of Embodiment 5-2 as another shape. As illustrated, this modification differs from the embodiment in that the spacer section 4059B located at the end section has a contact surface 4059g, which is a simple plane surface, in place of the contact surface 4059f. According to the rolling-element accommodation belt having the contact surface 4059g of the modification, when the balls 4046 are inserted among spacer sections 4059B from the opening window section 4017k, the contact surface 4059g does not interfere with insertion of the balls 4046. When compared with Embodiment 5-2, the shape of the belt is simple, and hence manufacture of the belt is easy.

For instance, the embodiments have been described by reference to the examples wherein the end sections 4059 of the rolling-element accommodation belt 4050 oppose each other in a non-contacting manner within the endless circulation passage 4028 and wherein two balls 4046 which are not accommodated into the rolling-element accommodation sections are inserted into the space between the mutually-opposing end sections 4059. However, the present invention is not limited to this embodiment. There may also be adopted a configuration where the rolling element is not inserted between the mutually-opposing end sections 4059. However, in order to prevent a decrease in the number of rolling-elements bearing load in the rolling-element raceway to thus prevent a decrease in the loading capacity of the linear guide apparatus and a drop in the rigidity of the same, there is preferably adopted a configuration where the rolling element which is not accommodated into the rolling-element accommodation section is incorporated between the mutually-opposing end sections. Moreover, even in a case where the rolling elements which are not accommodated into the rolling-element accommodation sections are incorporated between the mutually-opposing end sections, the number of rolling elements to be incorporated is not limited to two. For instance, there can be adopted a configuration where one rolling element can be incorporated between mutually-opposing end sections. Alternatively, there can also be adopted a configuration where three or more rolling elements are incorporated between mutually-opposing end sections. As mentioned above, no limitations are imposed on the number of rolling elements which are arranged without being accommodated into the rolling-element accommodation belt.

However, in order to prevent occurrence of direct contact between adjacent rolling elements or prevent generation of noise or abrasion, a smaller number of rolling elements which are arranged without being accommodated into the rolling-element accommodation belt is desirable. However, when the number of rolling elements which are arranged without being accommodated into the rolling-element accommodation belt is only one, difficulty is encountered in achieving a configuration wherein the center positions of the rolling elements accommodated into the rolling-element accommodation sections at the ends of the rolling-element accommodation belt are located inside in relation to the end face of the slider main body. For these reasons, the preferred number of rolling elements which are arranged without being accommodated into the rolling-element accommodation belt is two.

Although the present invention has been described in detail by reference to the specific embodiments, it is manifest to those who are versed in the art that the present invention is susceptible to various alterations or modifications without departing from the spirit and scope of the present invention.

What is claimed is:

1. A linear guide apparatus comprising: a guide rail having a rail-side rolling-element raceway groove extending in an axial direction on an exterior surface thereof; a slider main body which has a slider-side rolling-element raceway groove opposing the rail-side rolling-element raceway groove, which straddles the guide rail so as to be relatively movable, and which has a linear rolling-element return passage; end caps which are joined to respective axial end faces of the slider main body and formed which a circular-arc direction-change passage for bringing the rolling-element return passage into mutual communication with a linear load raceway formed from the rail-side rolling-element raceway groove and the slider-side rolling-element raceway groove; a plurality of rolling elements which are rollably inserted into a rolling-element raceway formed from the load raceway, the rolling-element return passage, and the direction-change passage; and a separator which has ends, aligns the rolling elements into a line at predetermined intervals, and moves through the inside of the rolling-element raceway in conjunction with movement of the plurality of rolling elements, wherein the separator has a plurality of spacer sections interposed among adjacent rolling elements, and a belt-shaped connection section which connects the adjacent spacer sections and is formed to exhibit flexibility which enables flexion along the rolling-element raceway; a connection section guide groove into which the connection section movably fits and which is continuous along the rolling-element raceway is formed in the rolling-element raceway; the connection section guide groove has a linear load guide section formed in the slider-side rolling-element raceway groove, a linear return guide section formed in the rolling-element return passage, and a circular-arc curved guide section formed in the direction-change passage; among the connection sections, at least connection sections close to the respective longitudinal ends of the separator are taken as curved connection sections which are curved along the curved direction of the curved guide section under no load; and a relational expression of $R1 \geq R2$ stands on condition that a curvature radius of the curved connection section is taken as R1 and that a curvature radius of the curved guide section is taken as R2.

2. A linear guide apparatus comprising: a guide rail having a rail-side rolling-element raceway groove extending in an axial direction on an exterior surface thereof; a slider main body which has a slider-side rolling-element raceway groove opposing the rail-side rolling-element raceway groove, which straddles the guide rail so as to be relatively movable, and which has a linear rolling-element return passage; end caps which are joined to respective axial end faces of the slider main body and each of which is formed with a circular-arc direction-change passage for bringing the rolling-element return passage into mutual communication with a linear load raceway formed from the rail-side rolling-element raceway groove and the slider-side rolling-element raceway groove; a plurality of rolling elements which is rollably inserted into a rolling-element raceway formed from the load raceway, the rolling-element return passage, and the direction-change passage; and a separator which has ends, aligns the rolling elements into a line at predetermined intervals, and moves through the inside of the rolling-element raceway in conjunction with movement of the plurality of rolling elements, wherein the separator has a plurality of spacer sections interposed among adjacent rolling elements, and a belt-shaped connection section which connects the adjacent spacer sections and is formed to exhibit flexibility which enables flexion along the rolling-element raceway; a connection section guide groove into which the connection section movably fits and which is continuous along the rolling-element raceway is formed in the rolling-element raceway; the connection section guide groove has a linear load guide section formed in the slider-side rolling-element raceway groove, a linear return guide section formed in the rolling-element return passage, and a circular-arc curved guide section formed in the direction-change passage; among the connection sections, at least connection sections close to the respective longitudinal ends of the separator are taken as curved connection sections which are curved along the curved direction of the curved guide section under no load; and a portion of an inner circumferential surface of the load guide section close to the curved guide section is protruded toward an outer periphery side of the rolling-element raceway in relation to a portion of an inner circumferential surface of the curved guide section close to the load guide section.

3. The linear guide apparatus according to claim 2, wherein a relational expression of A1<B/2 stands on condition that the amount of protrusion of the portion of the inner circumferential surface of the load guide section close to the curved guide section toward the outer periphery side of the rolling-element raceway is taken as A1 and that a clearance existing between the connection section and the connection section guide groove is taken as B.

4. The linear guide apparatus according to claim 2, wherein a chamfered section is formed in the portion of the inner circumferential surface of the load guide section close to the curved guide section.

5. The linear guide apparatus according to claim 2, wherein a chamfered section is formed in the portion of the inner circumferential surface of the curved guide section close to the load guide section.

6. The linear guide apparatus according to claim 2, wherein, among the connection sections, at least connection sections close to the respective longitudinal ends of the separator are taken as curved connection sections which are curved along the curved direction of the curved guide section under no load; and a relational expression of R1≧R2 stands on condition that a curvature radius of the curved connection section is taken as R1 and that a curvature radius of the curved guide section is taken as R2.

7. A linear guide apparatus comprising: a guide rail having a rail-side rolling-element raceway groove extending in an axial direction on an exterior surface; a slider main body which has a slider-side rolling-element raceway groove opposing the rail-side rolling-element raceway groove, which straddles the guide rail so as to be relatively movable, and which has a linear rolling-element return passage; end caps which are joined to respective axial end faces of the slider main body and each of which is formed with a circular-arc direction-change passage for bringing the rolling-element return passage into mutual communication with a linear load raceway formed from the rail-side rolling-element raceway groove and the slider-side rolling-element raceway groove; a plurality of rolling elements rollably inserted into a rolling-element raceway formed from the load raceway, the rolling-element return passage, and the direction-change passage; and a separator which has ends, aligns the rolling elements into a line at predetermined intervals, and moves through the inside of the rolling-element raceway in conjunction with movement of the plurality of rolling elements, wherein the separator has a plurality of spacer sections interposed among adjacent rolling elements, and a belt-shaped connection section which connects the adjacent spacer sections and is formed to exhibit flexibility which enables flexion along the rolling-element raceway; a connection section guide groove into which the connection section movably fits and which is continuous along the rolling-element raceway is formed in the rolling-element raceway; the connection section guide groove has a linear load guide section formed in the slider-side rolling-element raceway groove, a linear return guide section formed in the rolling-element return passage, and a circular-arc curved guide section formed in the direction-change passage; among the connection sections, at least connection sections close to the respective longitudinal ends of the separator are taken as curved connection sections which are curved along the curved direction of the curved guide section under no load; and a portion of an inner circumferential surface of the return guide section close to the curved guide section is protruded toward an outer periphery side of the rolling-element raceway in relation to a portion of an inner circumferential surface of the curved guide section close to the return guide section.

8. The linear guide apparatus according to claim 7, wherein a relational expression of A2<B/2 stands on condition that the amount of protrusion of the portion of the inner circumferential surface of the return guide section close to the curved guide section toward the outer periphery side of the rolling-element raceway is taken as A2 and that a clearance existing between the connection section and the connection section guide groove is taken as B.

9. The linear guide apparatus according to claim 7, wherein a chamfered section is formed in the portion of the inner circumferential surface of the return guide section close to the curved guide section.

10. The linear guide apparatus according to claim 7, wherein a chamfered section is formed in the portion of the inner circumferential surface of the curved guide section close to the return guide section.

11. A linear guide apparatus comprising: a guide rail having a rail-side rolling-element raceway groove extending in an axial direction on an exterior surface thereof; a slider main body which has a slider-side rolling-element raceway groove opposing the rail-side rolling-element raceway groove, which straddles the guide rail so as to be relatively movable, and which has a linear rolling-element return passage; end caps which are joined to respective axial end faces of the slider main body and each of which is formed with a circular-arc direction-change passage for bringing the rolling-element return passage into mutual communication with a linear load raceway formed from the rail-side rolling-element raceway groove and the slider-side rolling-element raceway groove; a plurality of rolling elements rollably inserted into a rolling-element raceway formed from the load raceway, the rolling-element return passage, and the direction-change passage; and a separator which has ends, aligns the rolling elements into a line at predetermined intervals, and moves through the inside of the rolling-element raceway in conjunction with movement of the plurality of rolling elements, wherein the separator has a plurality of spacer sections interposed among adjacent rolling elements, and a belt-shaped connection section which connects the adjacent spacer sections and is formed to exhibit flexibility which enables flexion along the rolling-element raceway; a connection section guide groove into which the connection section movably fits and which is continuous along the rolling-element raceway is formed in the rolling-element raceway; the connection section guide groove has a linear load guide section formed in the slider-side rolling-element raceway groove, a linear return guide section formed in the rolling-element return passage, and a circular-arc curved guide section formed in the direction-change passage; among the connection sections, at least connection sections close to the respective longitudinal ends of the separator are taken as curved connection sections which are curved along the curved direction of the curved guide section under no load; and a portion of an outer circumferential surface of the load guide section close to the curved guide section is protruded toward an outer periphery side of the rolling-element raceway in relation to a portion of an outer circumferential surface of the curved guide section close to the load guide section.

12. The linear guide apparatus according to claim 11, wherein a relational expression of A3<B/2 stands on condition that the amount of protrusion of the portion of the outer circumferential surface of the load guide section close to the curved guide section toward the outer periphery side of the rolling-element raceway is taken as A3 and that a clearance existing between the connection section and the connection section guide groove is taken as B.

13. The linear guide apparatus according to claim 11, wherein a chamfered section is formed in the portion of the outer circumferential surface of the load guide section close to the curved guide section.

14. The linear guide apparatus according to claim 12, wherein a chamfered section is formed in the portion of the outer circumferential surface of the curved guide section close to the load guide section.

15. A linear guide apparatus comprising: a guide rail having a rail-side rolling-element raceway groove extending in an axial direction on an exterior surface thereof; a slider main body which has a slider-side rolling-element raceway groove opposing the rail-side rolling-element raceway groove, which straddles the guide rail so as to be relatively movable, and which has a linear rolling-element return passage; end caps which are joined to respective axial end faces of the slider main body and each of which is formed with a circular-arc direction-change passage for bringing the rolling-element return passage into mutual communication with a linear load raceway formed from the rail-side rolling-element raceway groove and the slider-side rolling-element raceway groove; a plurality of rolling elements rollably inserted into a rolling-element raceway formed from the load raceway, the rolling-element return passage, and the direction-change passage; and a separator which has ends, aligns the rolling elements into a line at predetermined intervals, and moves through the inside of the rolling-element raceway in conjunction with movement of the plurality of rolling elements, wherein the separator has a plurality of spacer sections interposed among adjacent rolling elements, and a belt-shaped connection section which connects the adjacent spacer sections and is formed to exhibit flexibility which enables flexion along the rolling-element raceway, a connection section guide groove into which the connection section movably fits and which is continuous along the rolling-element raceway is formed in the rolling-element raceway, the connection section guide groove has a linear load guide section formed in the slider-side rolling-element raceway groove, a linear return guide section formed in the rolling-element return passage, and a circular-arc curved guide section formed in the direction-change passage, among the connection sections, at least connection sections close to the respective longitudinal ends of the separator are taken as curved connection sections which are curved along the curved direction of the curved guide section under no load, and a portion of an outer circumferential surface of the return guide section close to the curved guide section is protruded toward an outer periphery side of the rolling-element raceway in relation to a portion of an outer circumferential surface of the curved guide section close to the return guide section.

16. The linear guide apparatus according to claim 15, wherein a relational expression of A4<B/2 stands on condition that the amount of protrusion of the portion of the outer circumferential surface of the return guide section close to the curved guide section toward the outer periphery side of the rolling-element raceway is taken as A4 and that a clearance existing between the connection section and the connection section guide groove is taken as B.

17. The linear guide apparatus according to claim 15, wherein a chamfered section is formed in the portion of the outer circumferential surface of the return guide section close to the curved guide section.

18. The linear guide apparatus according to claim 15, wherein a chamfered section is formed in the portion of the outer circumferential surface of the curved guide section close to the return guide section.

19. A linear guide apparatus comprising: a guide rail having a rail-side rolling-element raceway groove extending in an axial direction on an exterior surface thereof; a slider main body which has a slider-side rolling-element raceway groove opposing the rail-side rolling-element raceway groove, which straddles the guide rail so as to be relatively movable, and which has a linear rolling-element return passage; end caps which are joined to respective axial end faces of the slider main body and each of which is formed with a circular-arc direction-change passage for bringing the rolling-element return passage into mutual communication with a linear load raceway formed from the rail-side rolling-element raceway groove and the slider-side rolling-element raceway groove; a plurality of rolling elements rollably inserted into a rolling-element raceway formed from the load raceway, the rolling-element return passage, and the direction-change passage; and a separator which has ends, aligns the rolling elements into a line at predetermined intervals, and moves through the inside of the rolling-element raceway in conjunction with movement of the plurality of rolling elements, wherein the separator has a plurality of spacer sections interposed among adjacent rolling elements, and a belt-shaped connection section which connects the adjacent spacer sections and is formed to exhibit flexibility which enables flexion along the rolling-element raceway, a connection section guide groove into which the connection section movably fits and which is continuous along the rolling-element raceway is formed in the rolling-element raceway, the connection section guide groove has a linear load guide section formed in the slider-side rolling-element raceway groove, a linear return guide section formed in the rolling-element return passage, and a circular-arc curved guide section formed in the direction-change passage, a portion of an inner circumferential surface of the load guide section close to the curved guide section is protruded toward an outer periphery side of the rolling-element raceway in relation to a portion of an inner circumferential surface of the curved guide section close to the load guide section, and a portion of an inner circumferential surface of the return guide section close to the curved guide section is protruded toward an outer periphery side of the rolling-element raceway in relation to a portion of an inner circumferential surface of the curved guide section close to the return guide section.

20. A linear guide apparatus comprising: a guide rail having a rail-side rolling-element raceway groove extending in an axial direction on an exterior surface thereof; a slider main body which has a slider-side rolling-element raceway groove opposing the rail-side rolling-element raceway groove, which straddles the guide rail so as to be relatively movable, and which has a linear rolling-element return passage; end caps which are joined to respective axial end faces of the slider main body and each of which is formed with a circular-arc direction-change passage for bringing the rolling-element return passage into mutual communication with a linear load raceway formed from the rail-side rolling-element raceway groove and the slider-side rolling-element raceway groove; a plurality of rolling elements rollably inserted into a rolling-element raceway formed from the load raceway, the rolling-element return passage, and the direction-change passage; and a separator which has ends, aligns the rolling elements into a line at predetermined intervals, and moves through the inside of the rolling-element raceway in conjunction with movement of the plurality of rolling elements, wherein the separator has a plurality of spacer sections interposed among adjacent rolling elements, and a belt-shaped connection section which connects the adjacent spacer sections and is formed to exhibit flexibility which enables flexion along the rolling-element raceway, a connection section guide groove into which the connection section movably fits and which is continuous along the rolling-element raceway is formed in the rolling-element raceway, the connection section guide groove has a linear load guide section formed in the slider-side rolling-element raceway groove, a linear return guide section formed in the rolling-element return passage, and a circular-arc curved guide section formed in the direction-change passage, a portion of an outer circumferential surface of the load guide section close to the curved guide section is protruded toward an outer periphery side of the rolling-element raceway in relation to a portion of an outer circumferential surface of the curved guide section close to the return guide section, and a portion of an outer circumferential surface of the return guide section close to the curved guide section is protruded toward an outer periphery side of the rolling-element raceway in relation to a portion of an outer circumferential surface of the return guide section close to the return guide section.

21. A linear guide apparatus comprising: a guide rail having a rail-side rolling-element raceway groove extending in an axial direction on an exterior surface thereof; a slider main body which has a slider-side rolling-element raceway groove opposing the rail-side rolling-element raceway groove, which straddles the guide rail so as to be relatively movable, and which has a linear rolling-element return passage; end caps which are joined to respective axial end faces of the slider main body and each of which is formed with a circular-arc direction-change passage for bringing the rolling-element return passage into mutual communication with a linear load raceway formed from the rail-side rolling-element raceway groove and the slider-side rolling-element raceway groove; a plurality of rolling elements rollably inserted into a rolling-element raceway formed from the load raceway, the rolling-element return passage, and the direction-change passage; and a separator which has ends, aligns the rolling elements into a line at predetermined intervals, and moves through the inside of the rolling-element raceway in conjunction with movement of the plurality of rolling elements, wherein the separator has a plurality of spacer sections interposed among adjacent rolling elements, and a belt-shaped connection section which connects the adjacent spacer sections and is formed to exhibit flexibility which enables flexion along the rolling-element raceway, a connection section guide groove into which the connection section movably fits and which is continuous along the rolling-element raceway is formed in the rolling-element raceway, the connection section guide groove has a linear load guide section formed in the slider-side rolling-element raceway groove, a linear return guide section formed in the rolling-element return passage, and a circular-arc curved guide section formed in the direction-change passage, a portion of an inner circumferential surface of the load guide section close to the curved guide section is protruded toward an outer periphery side of the rolling-element raceway in relation to a portion of an inner circumferential surface of the curved guide section close to the load guide section, a portion of an inner circumferential surface of the return guide section close to the curved guide section is protruded toward an outer periphery side of the rolling-element raceway in relation to a portion of an inner circumferential surface of the curved guide section close to the return guide section, a portion of an outer circumferential surface of the load guide section close to the curved guide section is protruded toward an outer periphery side of the rolling-element raceway in relation to a portion of an outer circumferential surface of the curved guide section close to the load guide section, and a portion of an outer circumferential surface of the return guide section close to the curved guide section is protruded toward an outer periphery side of the rolling-element raceway in relation to a portion of an outer circumferential surface of the return guide section close to the return guide section.

22. The linear guide apparatus according to any one of claims 1 through 6, wherein a material used for forming the separators is a thermoplastic or thermoplastic elastomer.

* * * * *